May 23, 1967  G. R. ENGLUND ETAL  3,321,135

KEYBOARD ASSEMBLY FOR ACCOUNTING MACHINE

Original Filed March 14, 1962  51 Sheets-Sheet 1

INVENTORS
GOSTA R. ENGLUND AND
MATS E. MATTSSON
by
Mason, Kolehmainen, Rathburn and Wyss
ATTORNEYS.

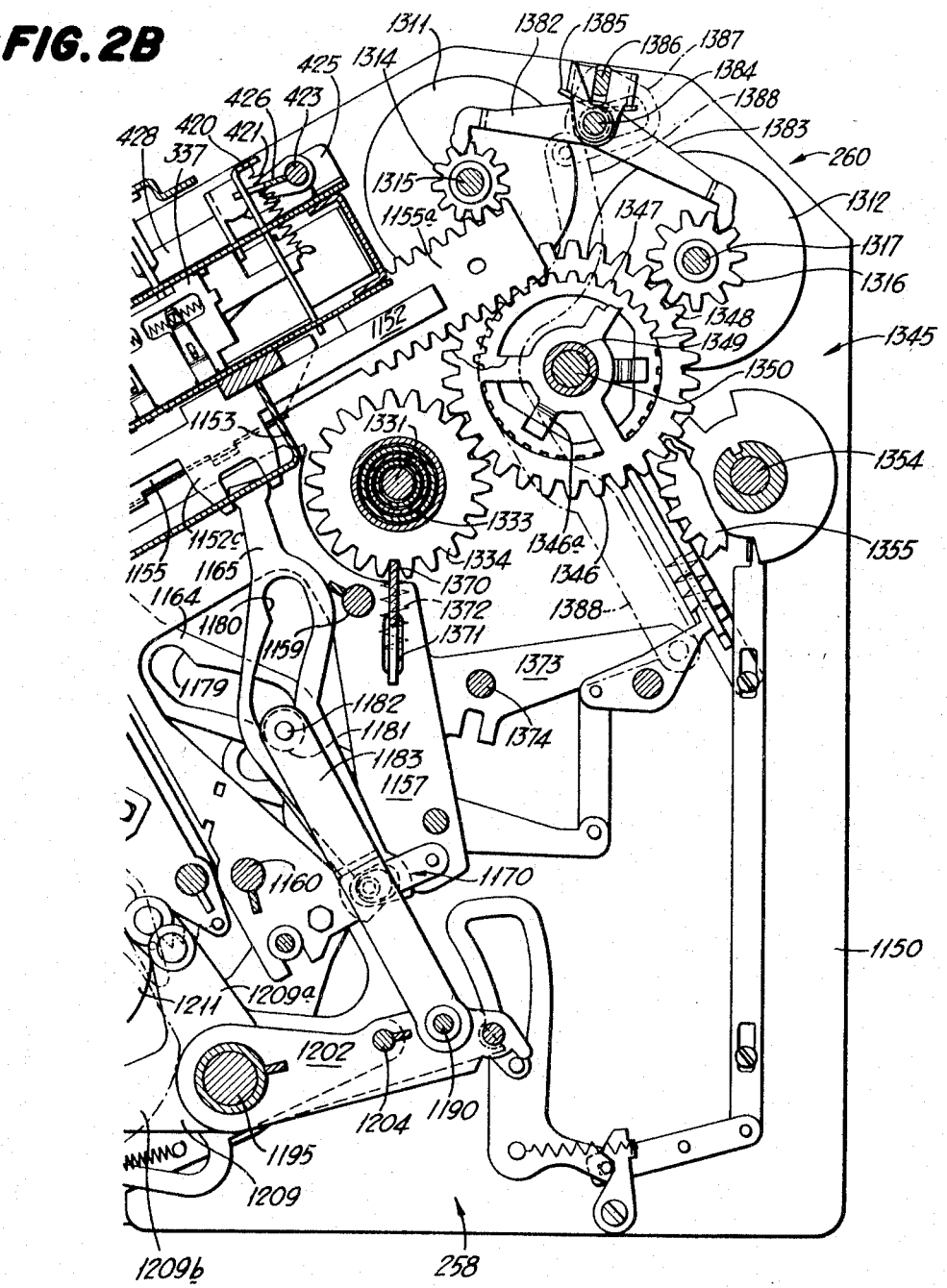

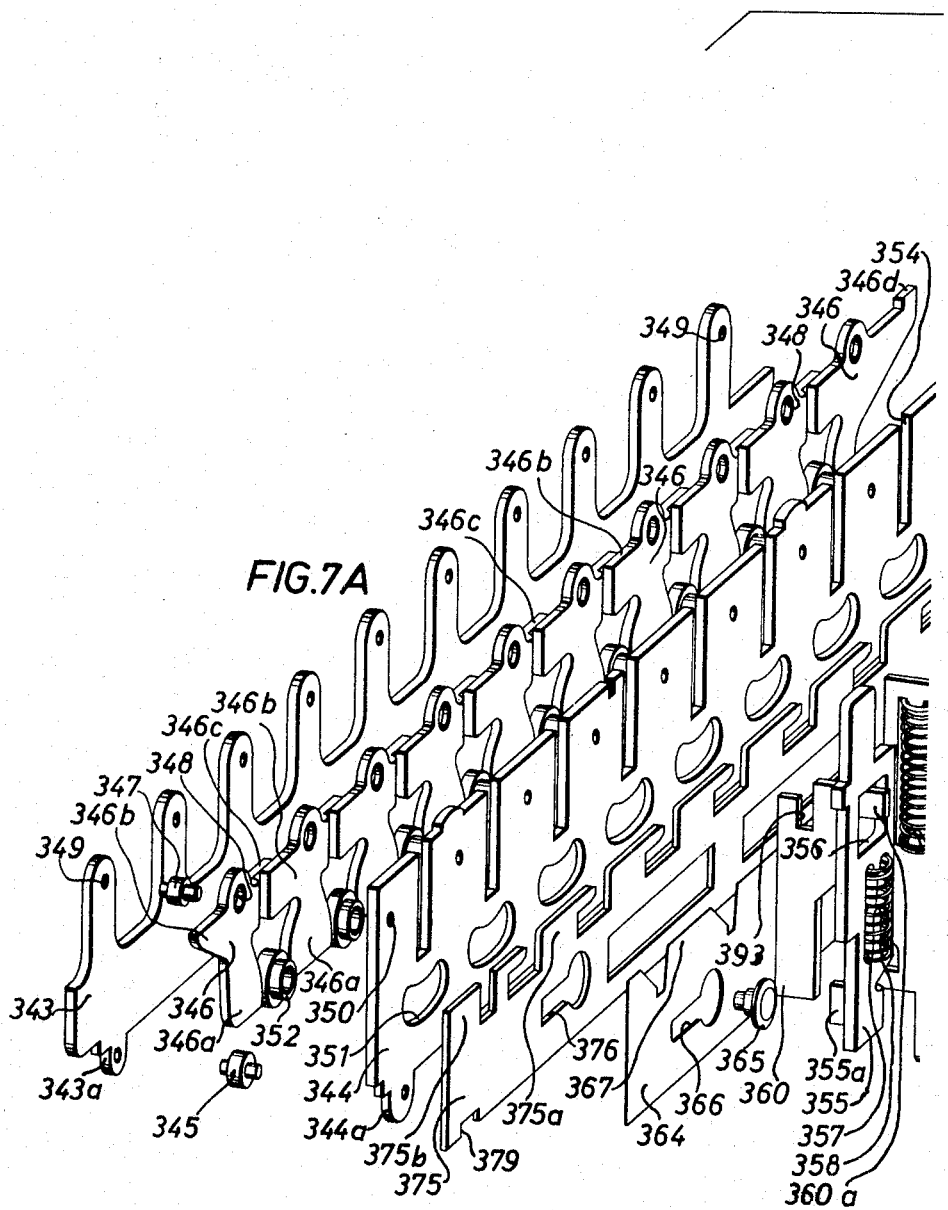

May 23, 1967  G. R. ENGLUND ETAL  3,321,135
KEYBOARD ASSEMBLY FOR ACCOUNTING MACHINE
Original Filed March 14, 1962  51 Sheets-Sheet 13
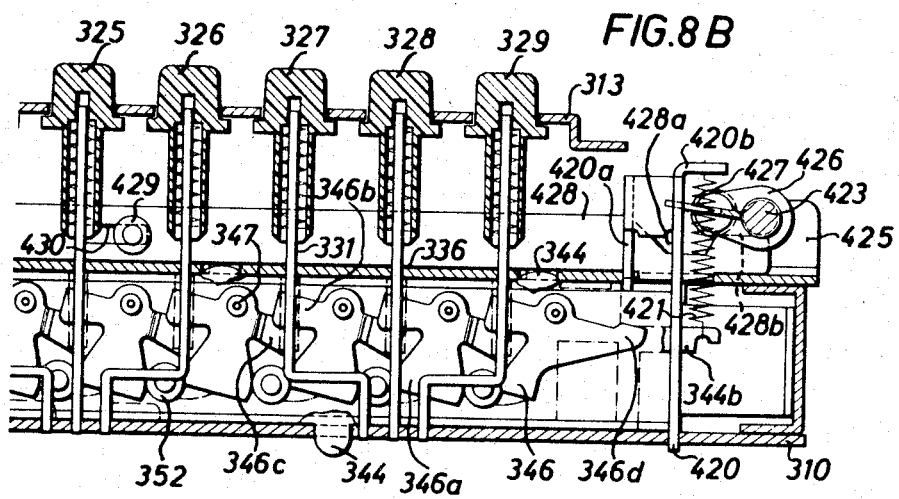
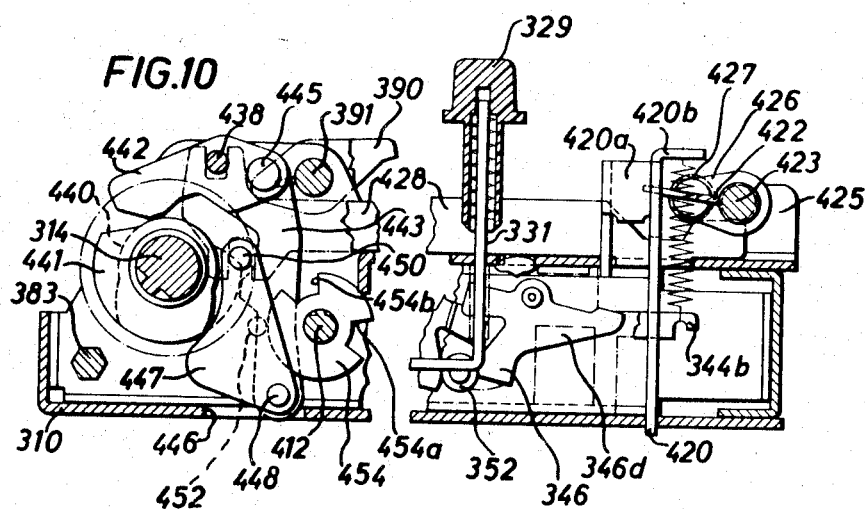

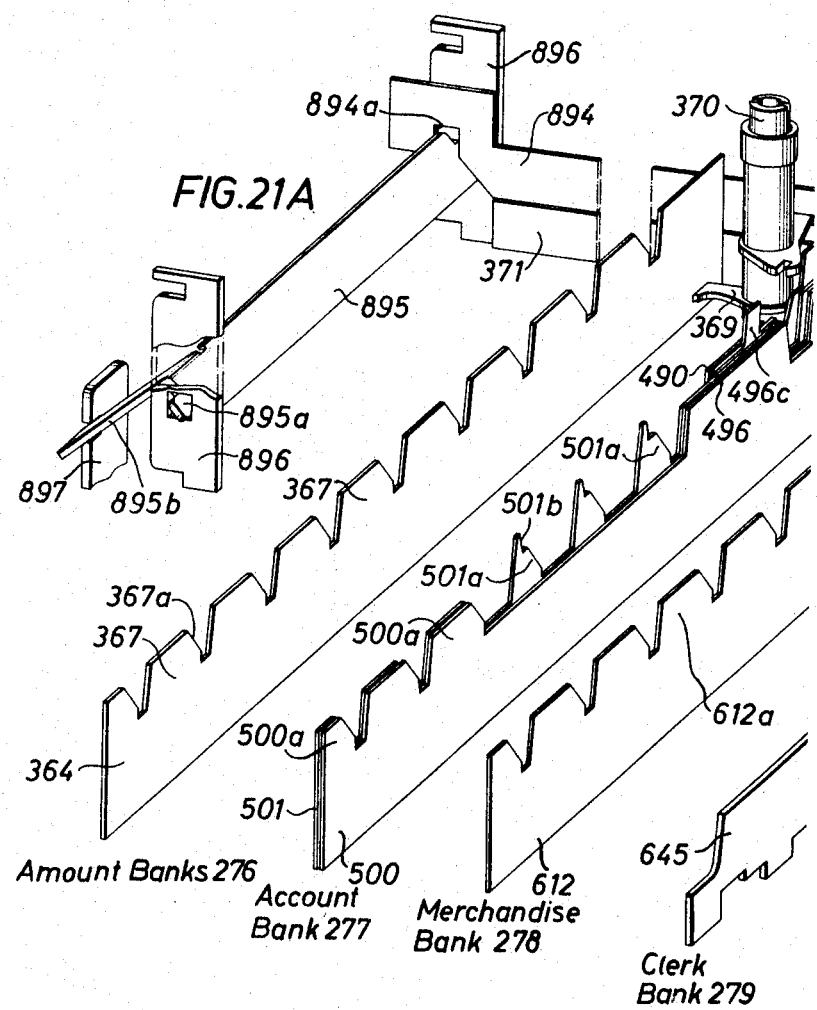

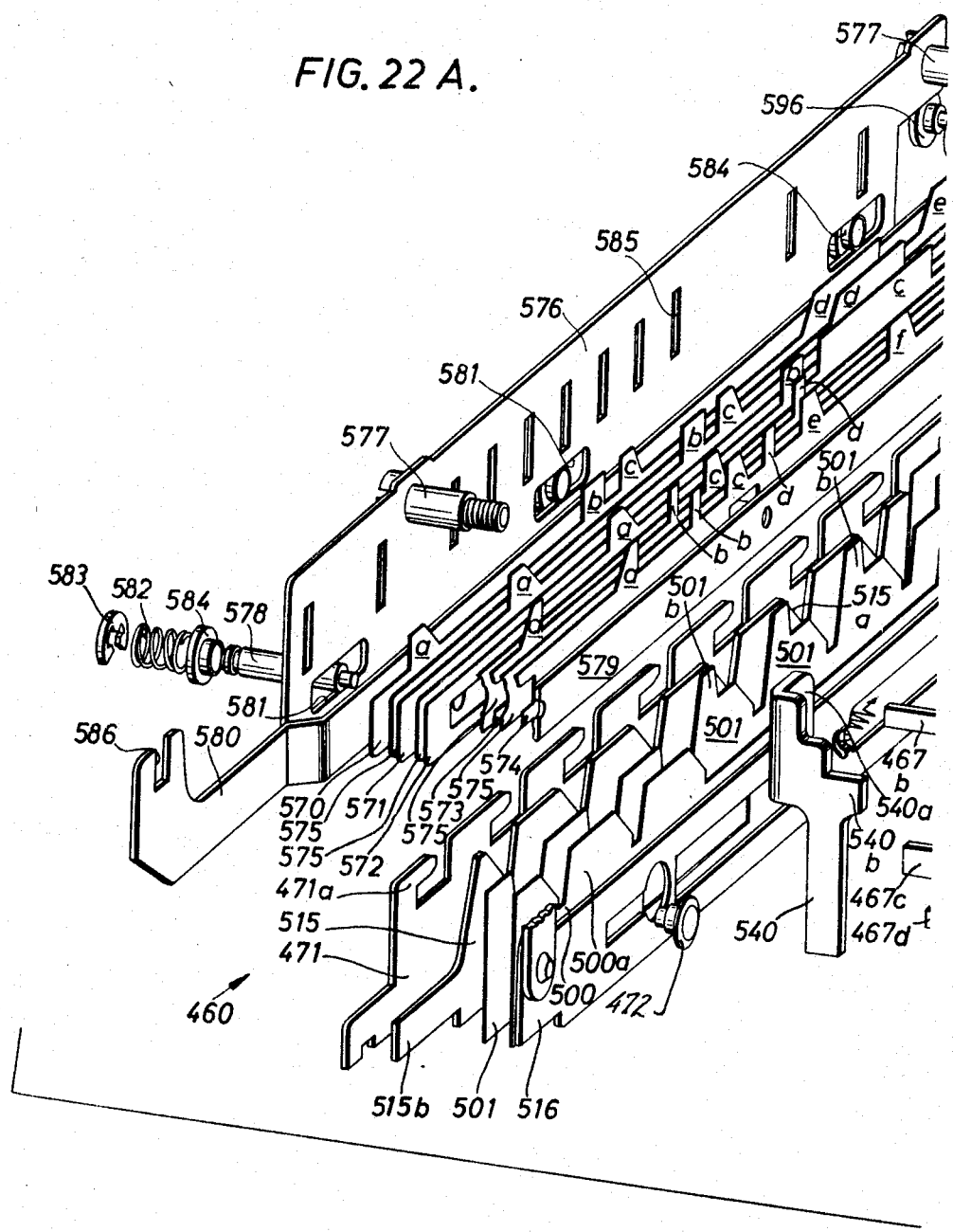

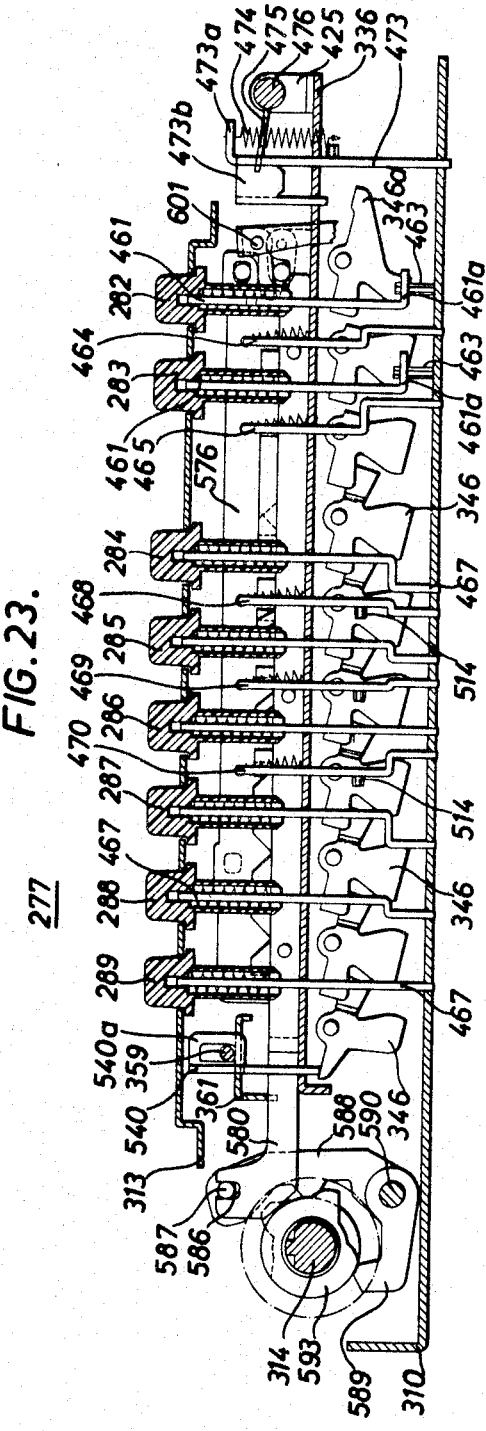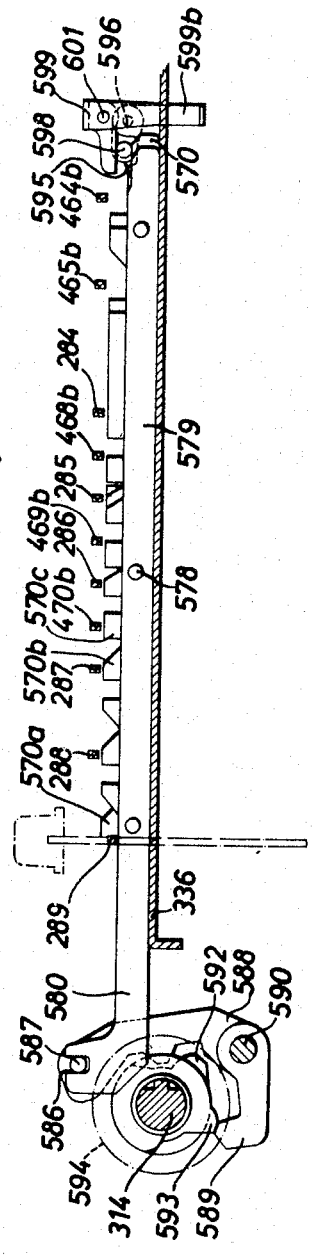

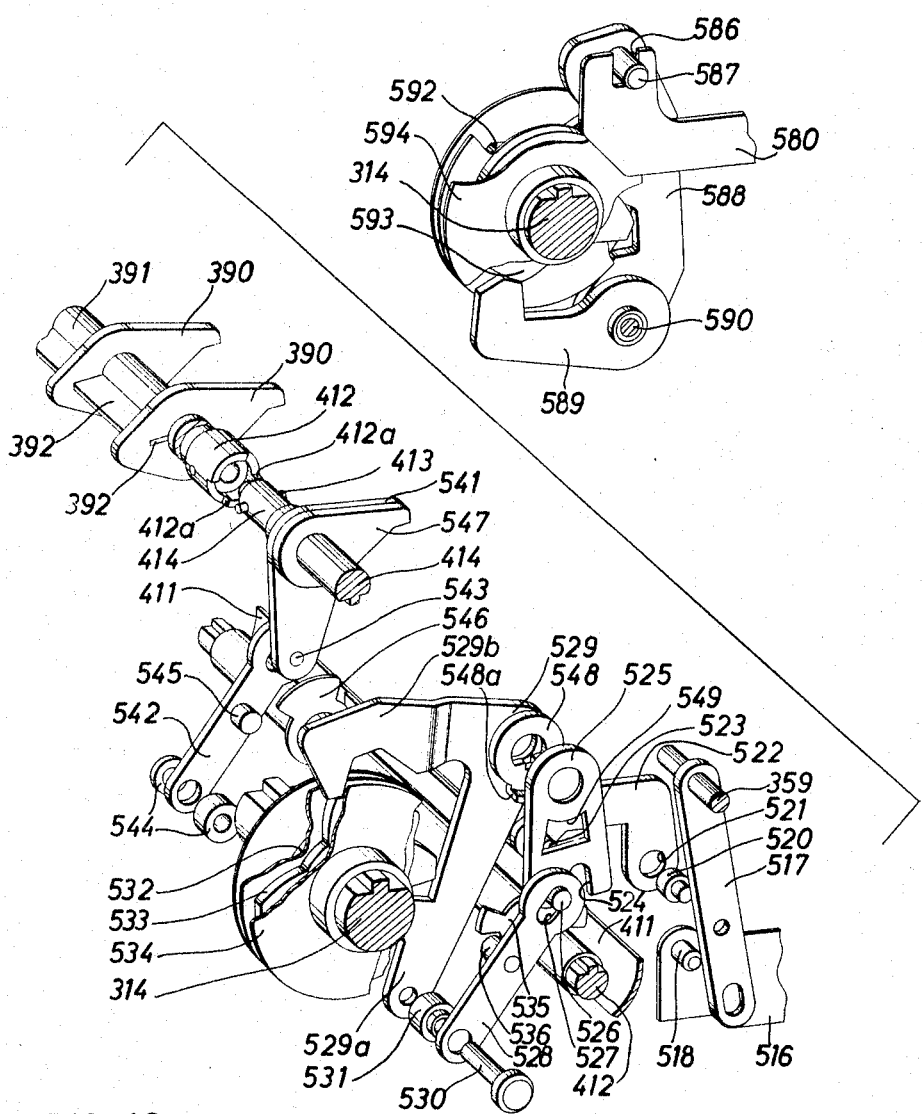

May 23, 1967　　　G. R. ENGLUND ETAL　　　3,321,135
KEYBOARD ASSEMBLY FOR ACCOUNTING MACHINE
Original Filed March 14, 1962　　　　　　　　51 Sheets-Sheet 26

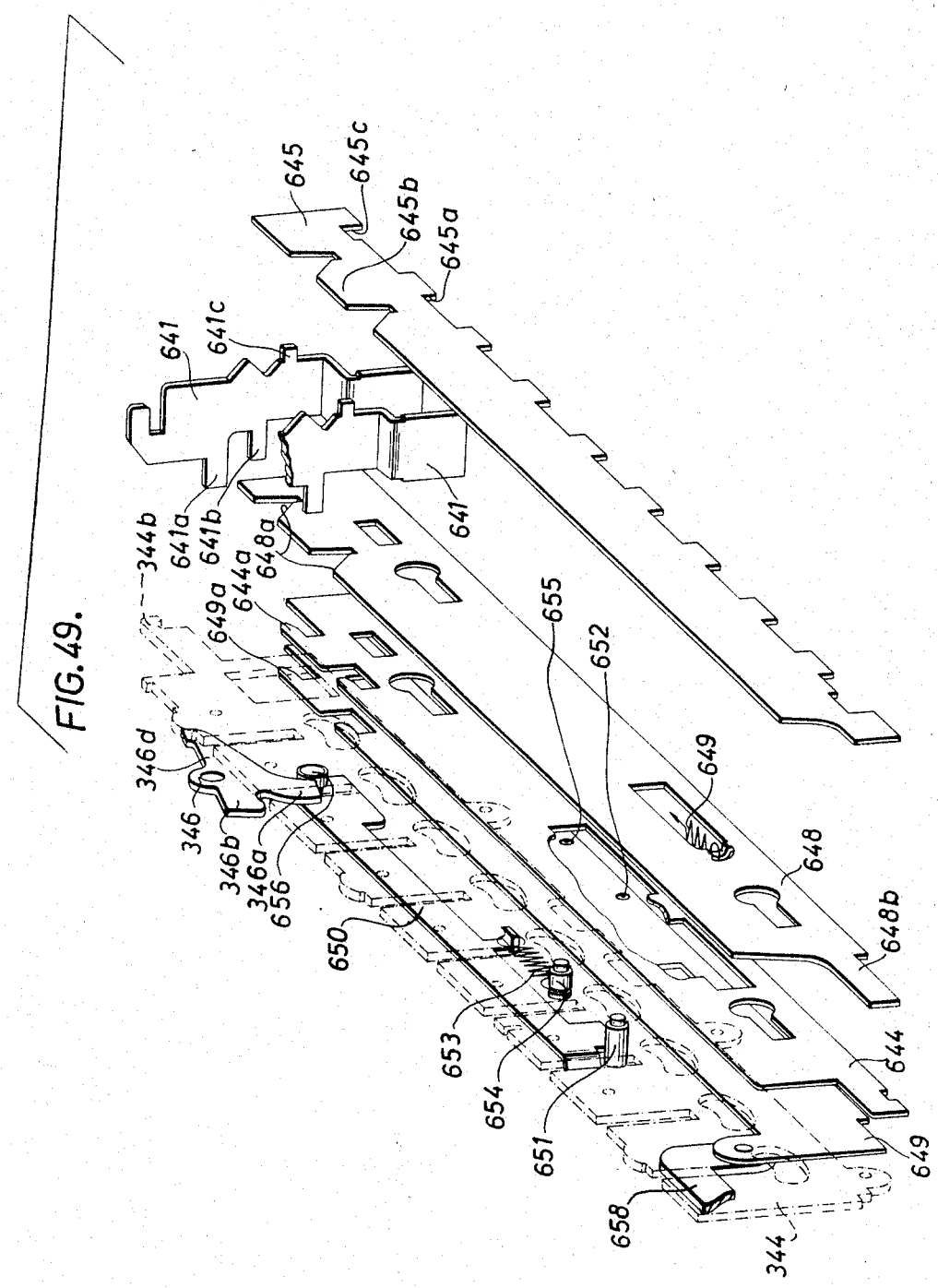

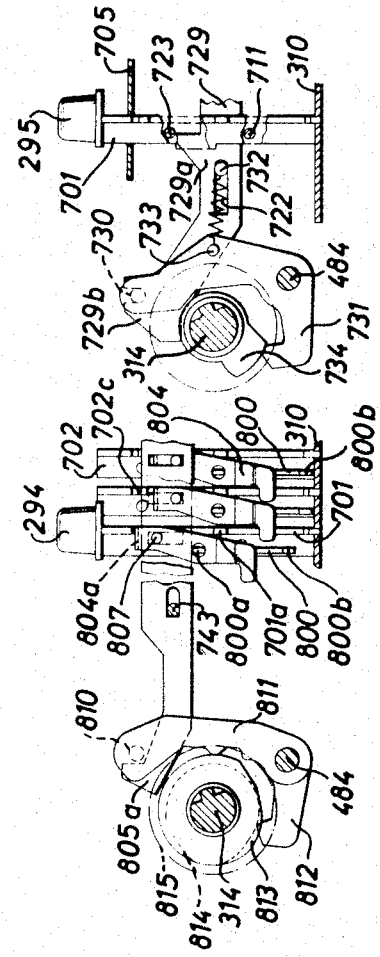
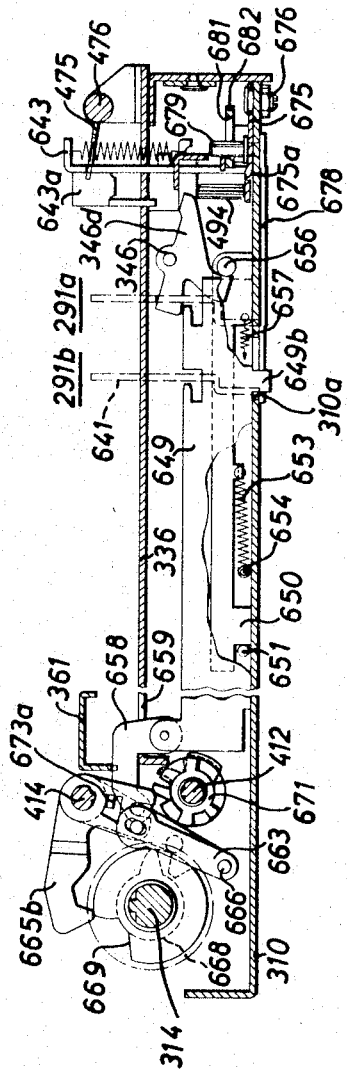
FIG. 57.
FIG. 65.
FIG. 50.

May 23, 1967 G. R. ENGLUND ETAL 3,321,135
KEYBOARD ASSEMBLY FOR ACCOUNTING MACHINE
Original Filed March 14, 1962 51 Sheets-Sheet 30

May 23, 1967 G. R. ENGLUND ETAL 3,321,135
KEYBOARD ASSEMBLY FOR ACCOUNTING MACHINE
Original Filed March 14, 1962 51 Sheets-Sheet 34

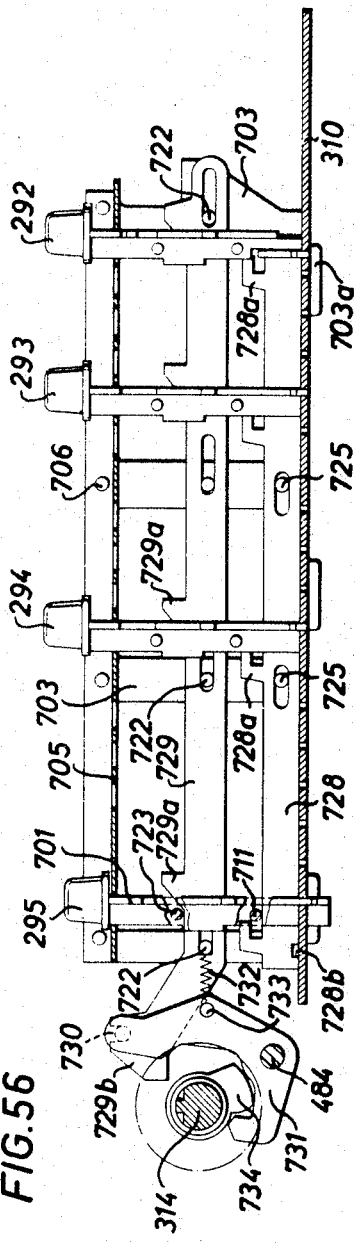
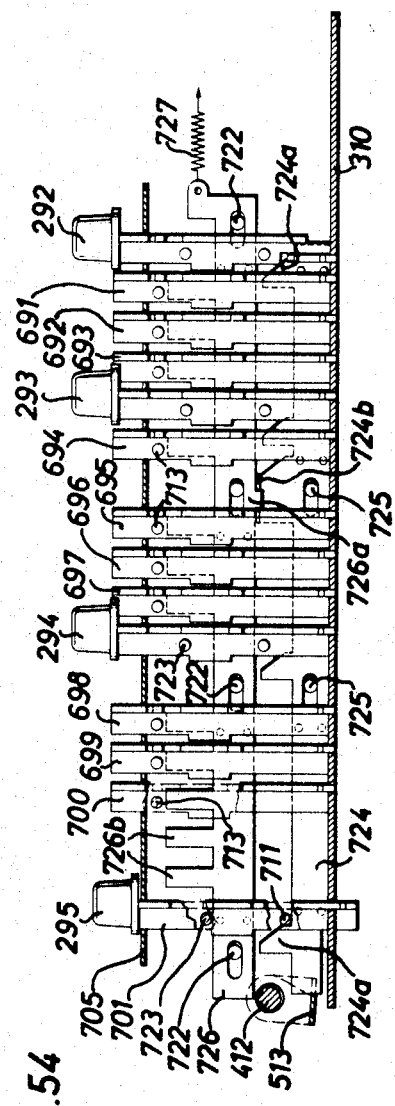

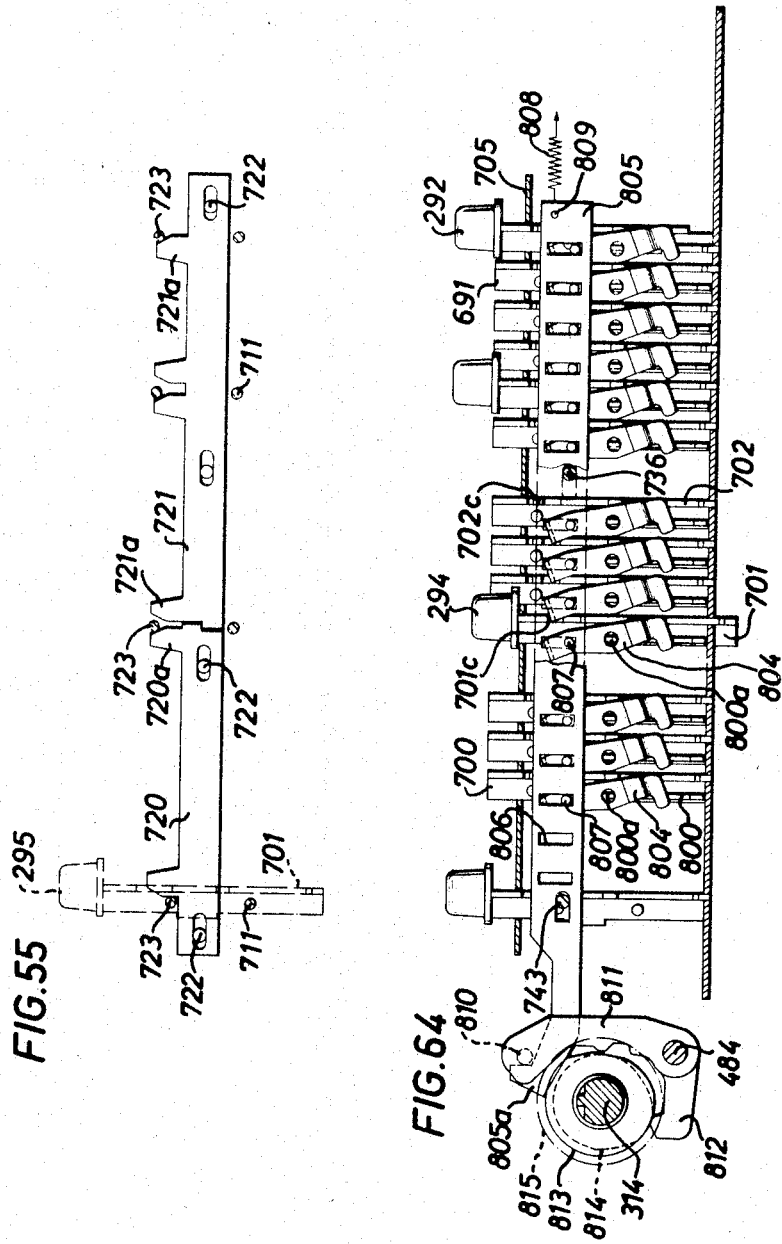

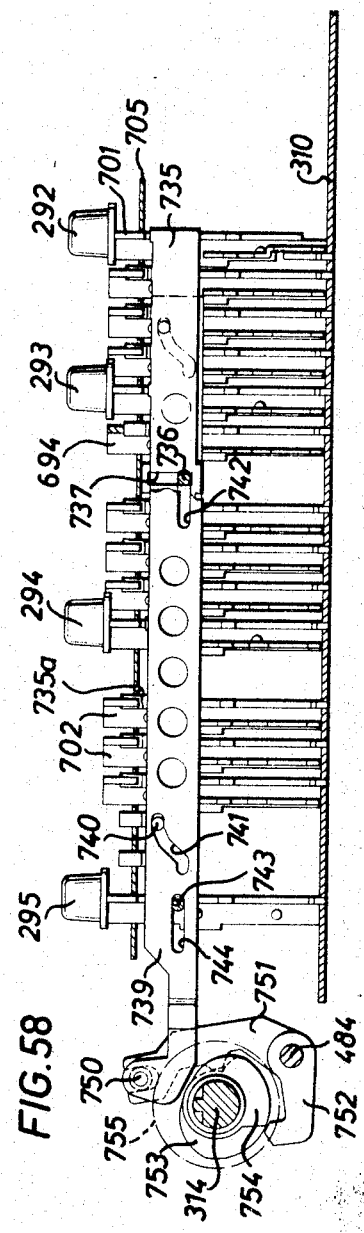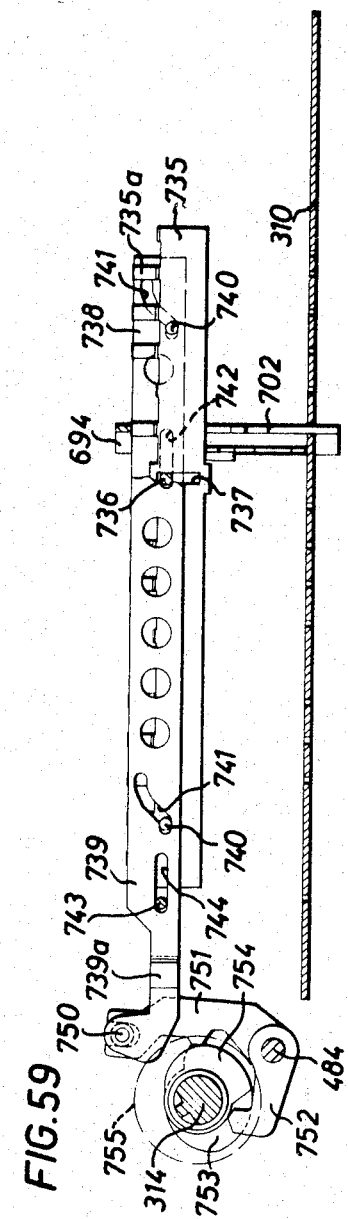

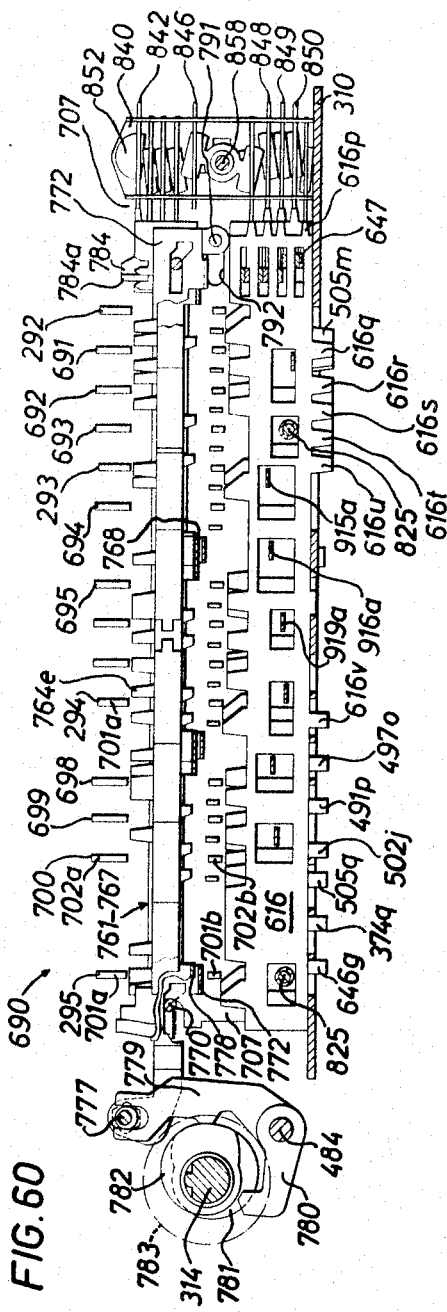

May 23, 1967  G. R. ENGLUND ETAL  3,321,135
KEYBOARD ASSEMBLY FOR ACCOUNTING MACHINE
Original Filed March 14, 1962  51 Sheets-Sheet 40
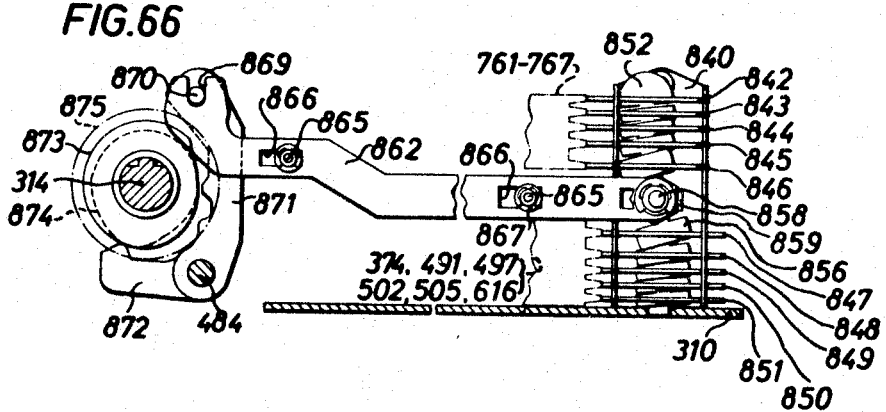
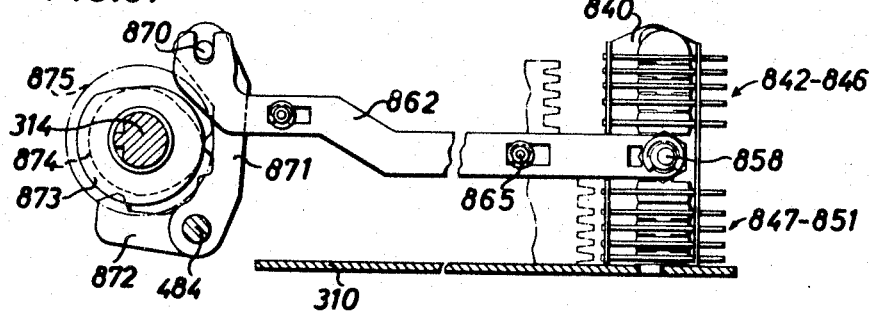
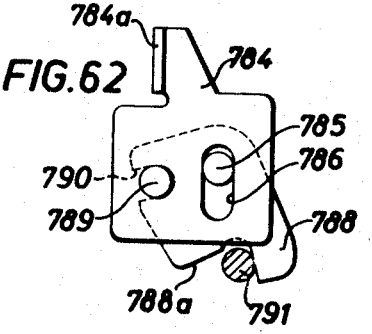
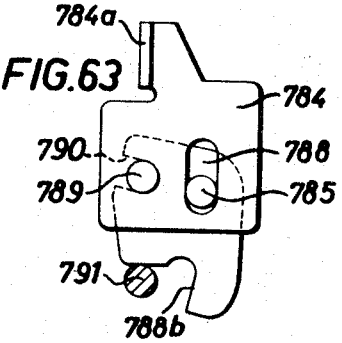

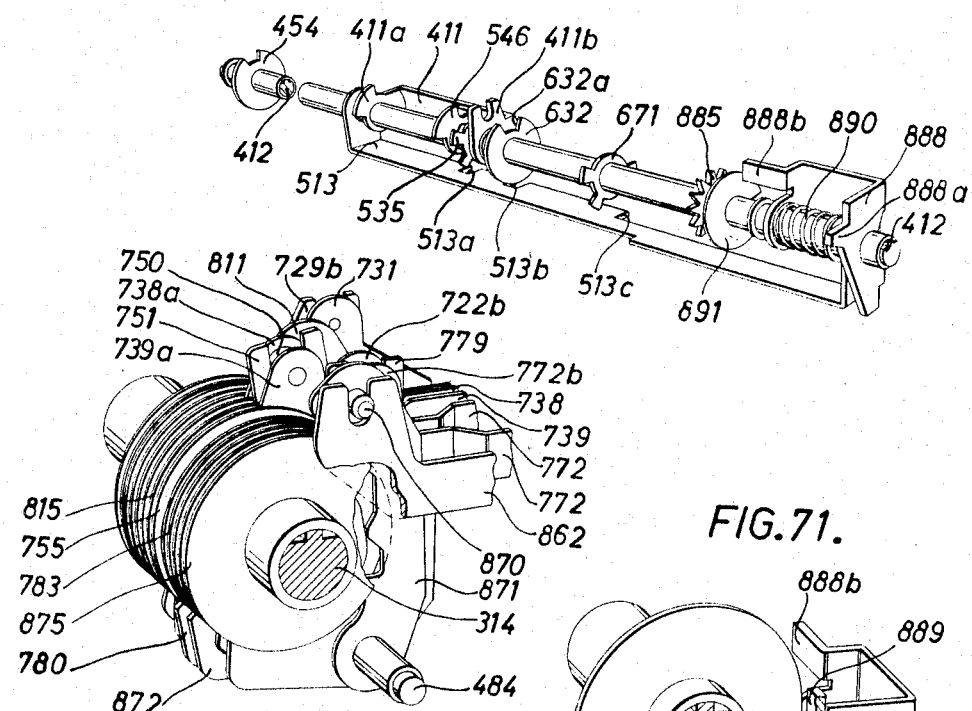
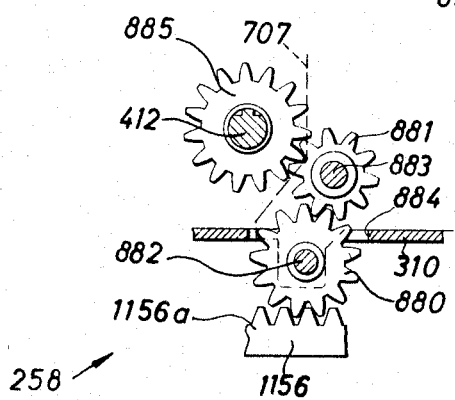
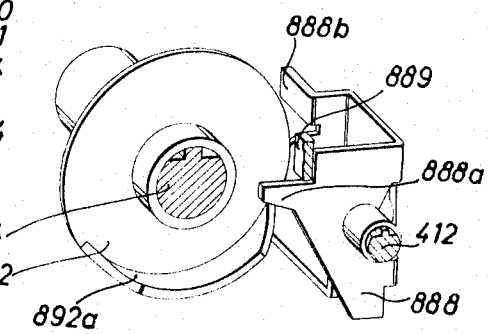
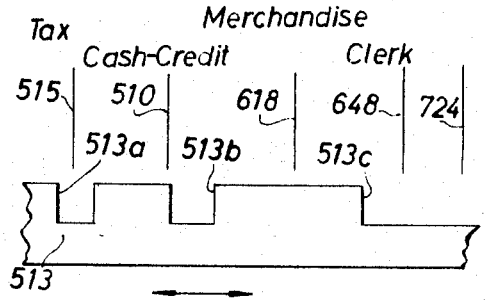

FIG. 81

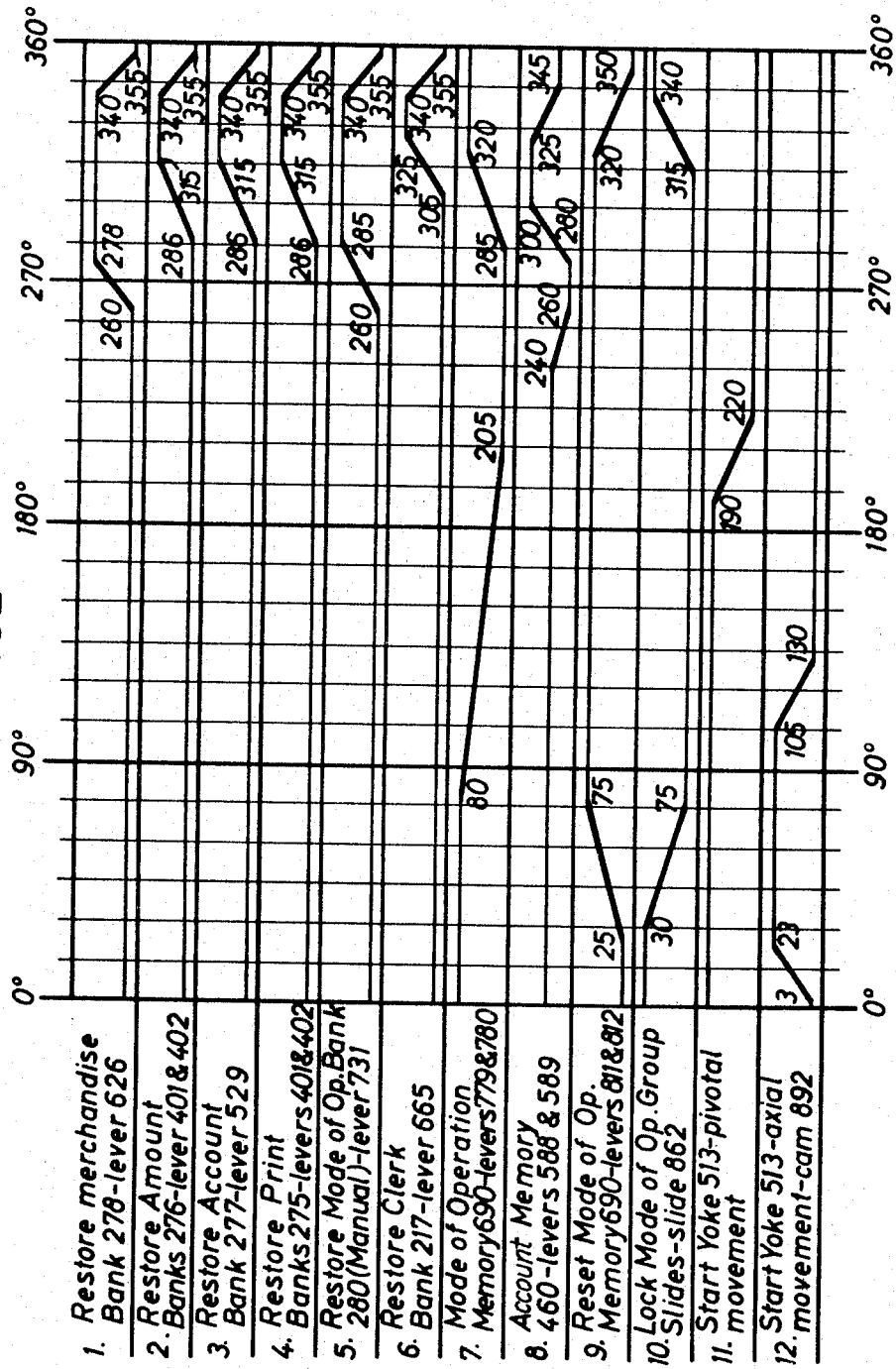

Fig. 83

| Key | Position of Differential Assem. 258 | Type of Operation | Particular Operation Performed by Cash Register 250 | 761 | 762 | 763 | 764 | 765 | 766 | 767 | 820 | 616 | 497 | 491 | 502 | 505 | 374 | 646 | 821 | 822 | 823 |
|---|---|---|---|---|---|---|---|---|---|---|---|---|---|---|---|---|---|---|---|---|---|
| 292 | 11 | Reset | Total of reading and resetting operations controlled by keys | N | | | | | | | | R | R | R | R | R | R | R | | | S |
| 293 | 4 | Listing | Repeated listings by means of indicators | | | | | | | | Op | R | R | R | R | R | R | | | | N |
| 294 | 5 | Listing | Listing of customer number | | | | | | | N | | R | R | R | R | R | | | | | |
| 295 | 3 | Read | Subtotal | | | | S | | N | | | R | R | R | R | R | | | | | |
| 691 | 10 | Read | Subtotal of listings incident to a credit operation | | | | | N | N | | | R | R | R | R | R | R | | | | |
| 692 | 8 | Reset | Resetting of taxable item accumulator | | | | | N | | | | N | N | S | N | N | N | | | | N |
| 693 | 6 | Reset | Resetting of accumulators controlled by key banks | | | | | | | | | N | N | | S | N | N | | | | S |
| 694 | 2 | Read | Reading of accumulators controlled by key banks | | | | | | | | | | | S | | | | | | | S |
| 695 | 11 | Reset | Automatic transfer of total amount into credit accumulator | | | | N | | | | | N | N | S | N | N | N | | | | N |
| 696 | 9 | Listing | Listing of tax amount | | | | | S | | | | N | N | S | S | S | S | | | | S |
| 697 | 7 | Reset | Resetting customer number accumulator during a credit operation | | N | | | | | | | N | S | N | N | N | N | | | | N |
| 698 | 1 | Reset | Resetting customer number accumulator during a cash operation | | N | | N | | | | | N | N | N | N | N | N | | N | S | N |
| 699 | 11 | Reset | Automatic transfer of total amount into cash accumulator | | | | | | | | | N | | N | N | N | N | | S | N | N |
| 700 | 9 | Listing | Listing using merchandise bank | | | | | | | | | | N | N | N | N | S | | | | N |

Slides in Program Memory Means 690: 761, 762, 763, 764, 765, 766, 767
Group Slides in Mode of Operation Bank 280: 820, 616, 497, 491, 502, 505, 374, 646, 821, 822, 823

Fig. 84

| Key | Cash Register Operation | Slides in Program Memory Means 690 ||||||||| Group Slides in Mode of Operation Bank 280 ||||||||||
|---|---|---|---|---|---|---|---|---|---|---|---|---|---|---|---|---|---|---|---|---|
| | | 761 | 762 | 763 | 764 | 765 | 766 | 767 | 820 | 616 | 497 | 491 | 502 | 505 | 374 | 646 | 821 | 822 | 823 |
| 292 | Total Read and Reset | | | | R q | R j | R g | R g | | R k | R h | R h | R h | R j | | R a | | | Bn j |
| 293 | Indicator Repeat | Bs d | R k | R e | Bs S d e | | Bs c | | Op a | R h | R f | R g | R f | R g | R f | | | | Bs h |
| 294 | Customer Number | | | | Bn b | Bs a | Bs a | Bs b | | R d | R c | R d | R c | R d | | | | | |
| 295 | Subtotal | S b | | | | | | | | R a | R a | R a | | R a | | | | | |
| 691 | Subtotal of Listings During Credit | S e | | | | Bs S d e | | | | Bs j | Bs g | Bn h | Bs g | Bs i | Bs h | | | Bs j | Bs i |
| 692 | Reset Taxable Item Accumulator | | S i | | R p | | | S c | | Bs i | | | Bn g | | Bs g | | | | |
| 693 | Reset Accumulator by Key | | S h | | R n | | | | | | | | | | | | | | Bn h |
| 694 | Read Accumulator by Key | | S g | | R m | | | | | | | | | | | | | Bn a | Bn g |
| 695 | Transfer Total to Credit Accumulator | | S f | | Bs R f k | | | R f | | | Bs e | Bn f | Bs e | Bn f | | | Bs b | Bs a | Bs f |
| 696 | List Tax Amount | | R m | | S f | | | | | Bs f | | | | | | | | | Bs e |
| 697 | Reset Number Accumulator (Credit) | | Bs S d e | | R j | Bn c | | | | Bs e | Bs d | Bn e | Bs d | Bn e | Bn e | | | | Bs d |
| 698 | Reset Number Accumulator (Cash) | | Bs S b c | | R i | | | | | Bs c | Bn d | Bs c | Bn d | Bs c | Bs d | | | | Bs c |
| 699 | Transfer Total to Cash Accumulator | S c | S b | | Bs R c h | | R e | R e | | Bs b | | Bs b | | Bs b | Bs c | | | | Bs b |
| 700 | Listing | R g | | | | | | | | | Bs a' | Bs a' | | Bs a' | Bn b | | | | Bs a |

Fig. 85

| # | OPERATION | POSITION OF DIFFERENTIAL ASSEMBLY 258 | SLIDES IN PROGRAM MEMORY MEANS 690 ||||||| GROUP SLIDES IN MODE OF OPERATION BANK 820 ||||||||||
|---|---|---|---|---|---|---|---|---|---|---|---|---|---|---|---|---|---|---|---|
| | | | No Repeat 761 | Aux. Listing 762 | Number 763 | Listing 764 | Credit 765 | Cash 766 | Reset 767 | Repeat 820 | Merch. 616 | Cash 497 | Credit 491 | Taxable Item 502 | Tax Amount 505 | Amount 374 | Clerk 646 | Read 821 | Reset Keys 822 | Key Locking 823 |
| 1 | Normal | | S | S | S | N | N | N | N | N | N | N | N | N | N | N | N | N | N | N |
| 2 | Clerk 279 + Amount 276 + Number 294 | "5" | S | N | N | S | N | N | N | N | N | N | N | N | N | S | S | N | N | N |
| 3 | Amount 276 + Ti2 287 + Merch. V 290 | "9" | N | N | N | S | N | N | N | N | S | N | S | S | N | S | S | N | N | N |
| 4 | Subtotal 295 | "3" | S | S | N | S | N | N | S | N | N | N | N | S | N | N | S | N | N | N |
| 5 | Cash 283 (Automatic recall of Ti1) | "8" | S | S | N | N | N | N | S | N | N | S | N | S | N | N | S | N | N | N |
| 6 | Amount 276 + Tx 284 | "9" | S | S | N | S | N | N | S | N | N | S | N | S | S | S | S | N | N | N |
| 7 | Automatic recall of Ti2 | "8" | S | S | N | N | N | N | N | N | N | S | N | S | N | N | S | N | N | N |
| 8 | Amount 276 + Tx 285 | "9" | S | S | N | S | N | N | S | N | N | S | N | S | S | S | S | N | N | N |
| 9 | Automatic recall of Ti3 | "8" | S | S | N | N | N | N | N | N | N | S | N | S | N | N | S | N | N | N |
| 10 | Amount 276 + Tx 286 | "9" | S | S | N | S | N | N | N | N | N | N | N | S | N | S | S | N | N | N |
| 11 | Auto. reset of Cust. No. to Printer (698) | "1" | N | N | N | N | N | N | N | N | N | S | N | N | N | N | N | N | N | N |
| 12 | Auto. transfer of total to Cash Accum. (699) | "1" | S | S | S | N | N | S | N | N | N | S | N | N | N | N | N | N | N | N |
| 13 | Normal | | S | S | S | N | N | N | N | N | N | N | N | N | N | N | N | N | N | N |
| 14 | Repeat ②-⑩ with Credit 282 not 283 | | S | S | N | N | S | N | N | N | N | N | S | N | N | N | N | N | N | N |
| 15 | Automatic Subtotal of Credit Listing (691) | "10" | S | N | N | S | S | N | N | N | N | N | S | N | N | N | S | N | N | N |
| 16 | Automatic Cust. No. to Printer (697) | "1" | S | S | N | N | N | N | N | N | N | N | S | N | N | N | S | N | N | N |
| 17 | Auto. transfer of total to Credit Accum. (695) | "1" | S | S | S | N | N | N | N | N | N | N | N | N | N | N | N | N | N | N |
| 18 | Normal | | S | S | S | N | N | N | N | N | N | N | N | N | N | N | N | N | N | N |

May 23, 1967     G. R. ENGLUND ET AL     3,321,135

KEYBOARD ASSEMBLY FOR ACCOUNTING MACHINE

Original Filed March 14, 1962     51 Sheets-Sheet 51

Fig. 86

| | MODE OF OPERATION GROUP SLIDES | | | | | | | | | | | PROGRAM MEMORY MEANS 690 | | | | | | |
|---|---|---|---|---|---|---|---|---|---|---|---|---|---|---|---|---|---|---|
| | Key Lock 823 | Reset 822 | Read 821 | Clerk 646 | Amount 374 | Taxable Item 502 | Tax Amount 505 | Credit 491 | Cash 497 | Merch 616 | Repeat 820 | Reset 767 | Cash 766 | Credit 765 | Listing 764 | Number 763 | Aux Listing 762 | No Repeat 761 |
| 1 Normal | N | N | N | N | N | N | N | N | N | N | N | N | N | N | N | S | S | S |
| 2 Read Clerk 301 and Clerk Key 291a and b | S | N | S | S | N | N | N | N | N | N | N | N | N | N | N | S | S | S |
| 3 Read Clerk 301 and Total Key 292 | S | N | S | N | N | N | N | N | N | N | N | N | N | N | N | S | S | S |
| 4 Normal | N | N | N | N | N | N | N | N | N | N | N | N | N | N | N | S | S | S |
| 5 Reset Tax 302 and Tax Item 287 | S | S | N | N | N | S | N | N | N | N | N | N | N | N | N | S | S | S |
| 6 Reset Tax 302 and Tax Amount 284 | S | S | N | N | N | S | S | N | N | N | N | N | N | N | N | S | S | S |
| 7 Reset Tax 302 and Tax Item 288 | S | S | N | N | N | S | N | N | N | N | N | N | N | N | N | S | S | S |
| 8 Reset Tax 302 and Tax Amount 285 | S | S | N | N | N | S | S | N | N | N | N | N | N | N | N | S | S | S |
| 9 Reset Tax 302 and Tax Item 289 | S | S | N | N | N | S | N | N | N | N | N | N | N | N | N | S | S | S |
| 10 Reset Tax 302 and Tax Amount 286 | S | S | N | N | N | N | S | N | N | N | N | N | N | N | N | S | S | S |
| 11 Reset Tax 302 and Total Key 292 | S | S | N | N | N | N | N | N | N | N | N | N | N | N | N | S | S | S |
| 12 Normal | N | N | N | N | N | N | N | N | N | N | N | N | N | N | N | S | S | S |

United States Patent Office

3,321,135
Patented May 23, 1967

3,321,135
KEYBOARD ASSEMBLY FOR ACCOUNTING
MACHINE
Gosta R. Englund, Stockholm, and Mats E. Mattsson, Sollentuna, Sweden, assignors to Svenska Dataregister AB, Stockholm, Sweden, a corporation of Sweden
Original application Mar. 14, 1962, Ser. No. 179,595, now Patent No. 3,263,915, dated Aug. 2, 1966. Divided and this application Sept. 23, 1965, Ser. No. 489,472
Claims priority, application Sweden, Mar. 17, 1961, 2,839/61
19 Claims. (Cl. 235—145)

This invention relates to an accounting machine and, more particularly, to a cash register including a new and improved keyboard assembly.

This application is a division of a copending application Ser. No. 179,595, filed Mar. 14, 1962, now Patent No. 3,263,915.

In recent years, it has become desirable in most business, especially in retail merchandising establishments, to collect a considerable volume of data relating to the sale of goods or services in order to provide a more accurate evaluation of a business. Although this can be done in a number of ways, the desired information often is most easily acquired at the point-of-sale in a retail store. Since the cash register is frequently the only accounting machine in use at the point-of-sale, a considerable amount of information can be collected and stored by increasing the data accumulating capacity of the cash register, and this data can be made more useful by automatically programming the cash register to handle the input data in a manner suited to the accounting practices of the store. However, because of the different quantities, types and forms in which data is used in different businesses, the cash register should provide programming means and data collecting and storing means that are quite flexible to permit a basic cash register construction to be used in widely varying applications. Thus, the keyboard assembly should be capable of being easily constructed to provide different programs.

Accordingly, one object of the present invention is to provide a new and improved accounting machine.

Another object is to provide a cash register including new and improved means for entering, storing, recovering and recording data.

Another object is to provide an accounting machine including a new and improved key bank.

A further object is to provide flexible detent means for a bank of keys in which different groups of coupling links associated with the keys are moved in opposite directions when a key is operated to release any previously operated key.

Another object is to provide a cash register including a new and improved zero stop means for a key controlled, differentially settable assembly.

A further object is to provide a zero stop means for an accounting machine that is normally held in an ineffective condition, is released for operation during each cycle of operation of the accounting machine, and is selectively returned to an ineffective condition at different points in the operating cycle of the machine in accordance with the type or mode or operation being performed by the machine.

Another object is to provide a zero stop means for an accounting machine including a first means for operating a zero stop means from a normally ineffective setting to an effective setting during a cycle of operation of the machine and a second means for determining the type of operation for which the machine is conditioned for controlling the point in the operating cycle at which the zero stop means is returned to an ineffective setting.

Another object is to provide an accounting machine including means for automatically selecting only those ones of a plurality of accumulators or totalizers in which data has been previously stored.

A further object is to provide an accounting machine including memory means for storing the identities of the accumulators in which the data has been stored during preceding operations of the machine.

Another object is to provide a cash register including means for automatically recalling various items of data previously entered into a cash register.

Another object is to provide an accounting machine having a bank of keys and memory means for storing the identities of the keys in the bank that have been previously operated.

A further object is to provide an accounting machine in which data previously stored in accumulators selected by the operation of manual keys is automatically recovered by the operation of keys controlled by memory means that are set by the manual keys.

A further object is to provide an accounting machine having a keyboard and new and improved means for selectively enabling the keys in the keyboard for operation in accordance with keys that have been actuated during preceding operations of the accounting machine.

A further object is to provide a cash register including new and improved means for programming the operation of banks of keys used to control the selection of accumulators.

Another object is to provide an accounting machine including new and improved means for restoring manually actuated keys in a keyboard assembly to a normal condition.

Another object is to provide an accounting machine in which a means for restoring manually actuated keys is controlled by detecting the presence or absence of force manually applied to one or a group of keys.

Another object is to provide an accounting machine in which a means for restoring a manually actuated bank of keys is selectively operated by resilient or power driven means.

Another object is to provide an accounting machine in which the operation of a restoring means to restore one bank of keys to a normal condition is conditioned on the successful restoration of the keys in another bank.

A further object is to provide an accounting machine including new and improved means for latching actuated keys during the operation of the machine.

A further object is to provide an accounting machine including two separate means for latching keys in an actuated position, one of which is operated during each cycle of operation of the machine and the other of which is controlled by the keys.

Another object is to provide an accounting machine including both lock keys and manual keys for controlling the operation of the machine and means controlled by the lock keys for controlling the operability of the manual keys.

Another object is to provide an accounting machine including a memory unit controlled by manually actuated keys in which the operation of the memory means by the manually actuated keys is conditioned on the prior operation of a lock key.

Another object is to provide an accounting machine controlled by manually operable keys in which the keys are selectively freed for operation in dependence on the types of operation performed by the machine during preceding cycles of operation.

Many other objects and advantages of the present invention will become apparent from considering the following detailed description in conjunction with the drawings in which:

FIGURE 1 is a perspective view of a cash register embodying the present invention;

FIGURES 2A and 2B form a side sectional view of the cash register with the housing removed;

FIGURES 3A and 3B form a rear elevational view of the cash register with the housing removed;

Figure 4:
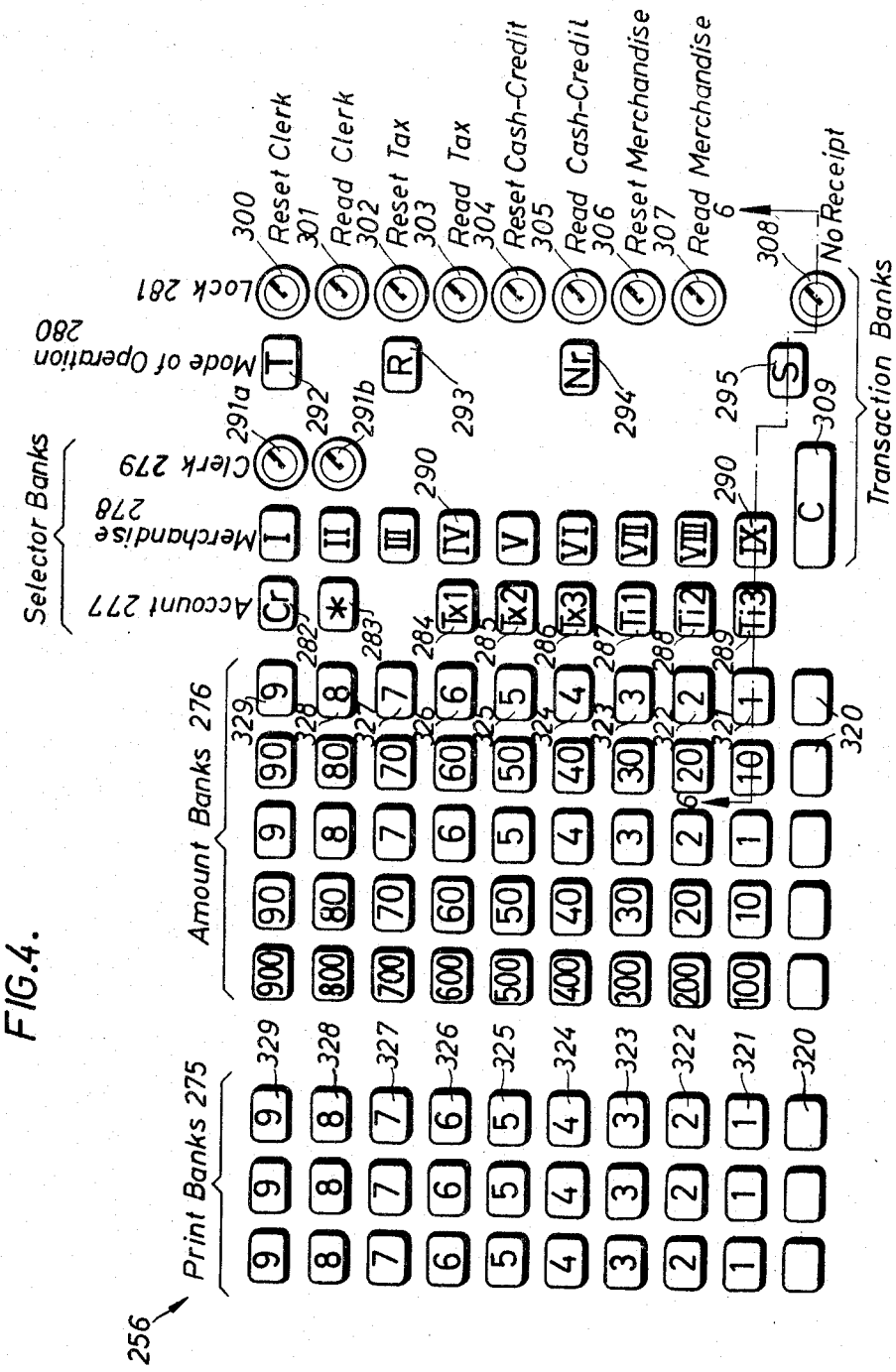
FIGURE 4 is a top view of the keys in a keyboard assembly for the cash register.
Figure 6A:
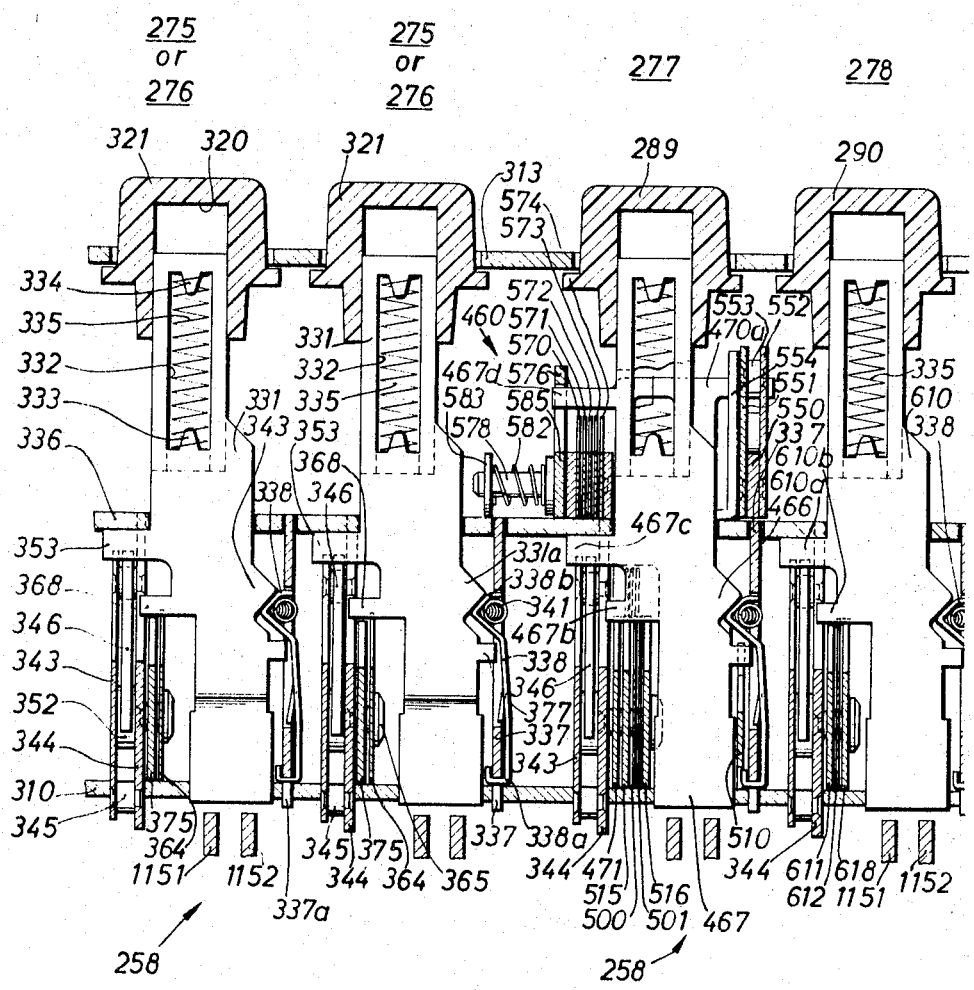
Figure 6B:
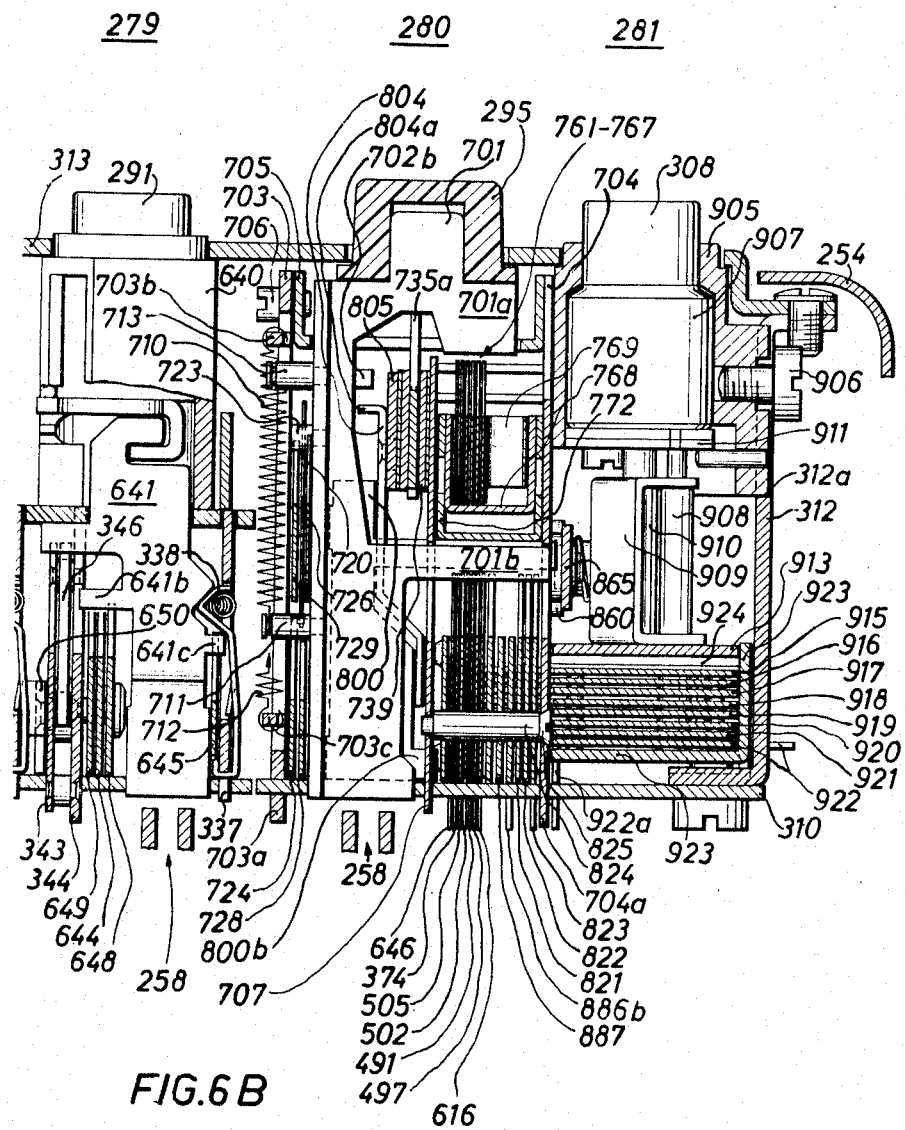
Figure 7B:
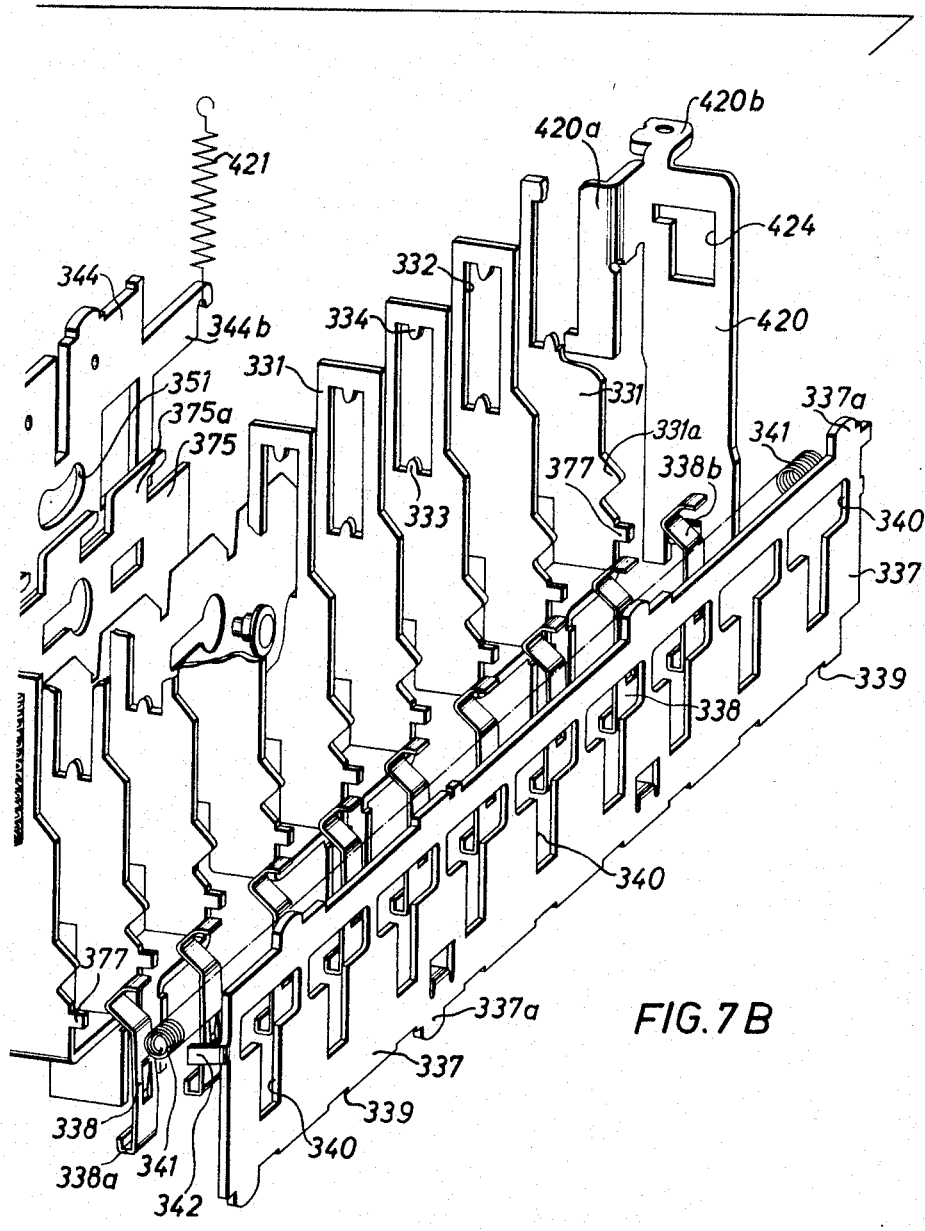
Figure 8A:
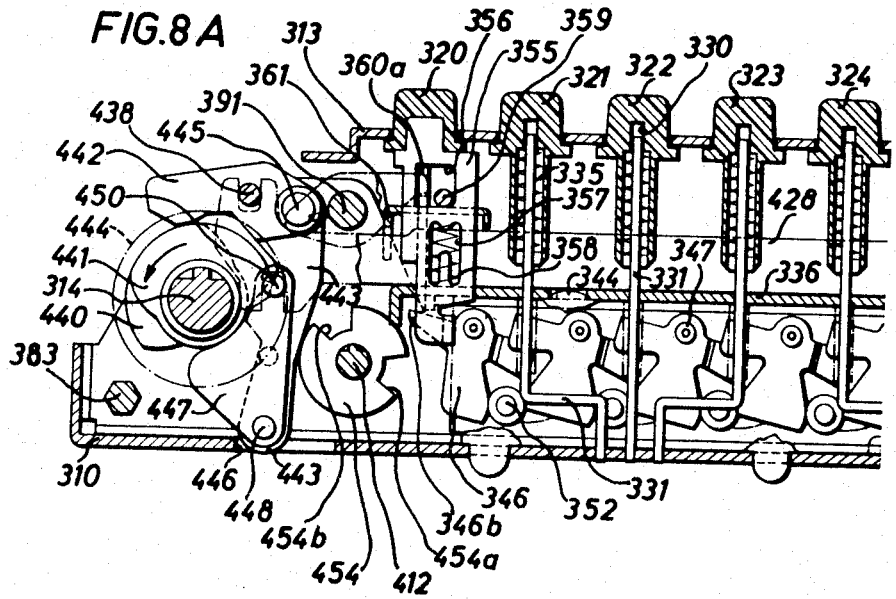
Figure 9:
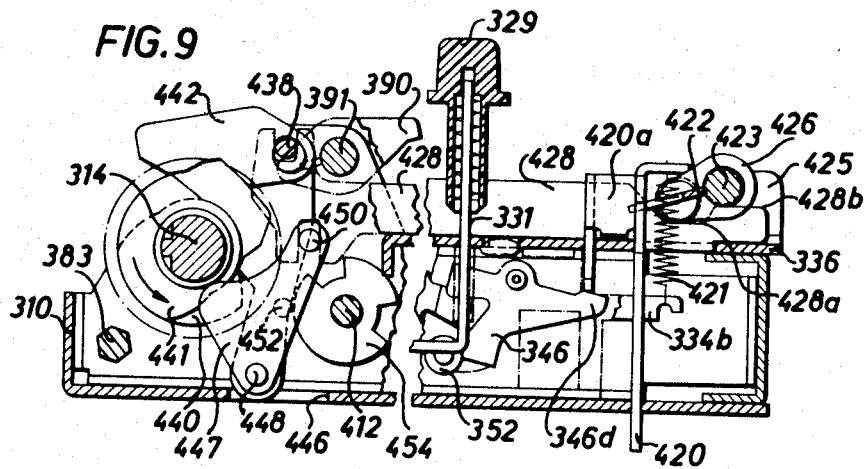
Figure 13:
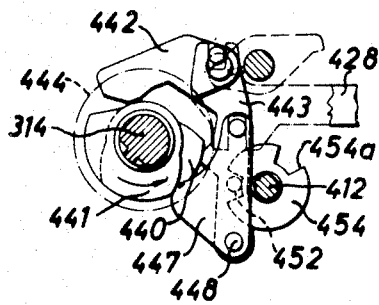
Figure 11:
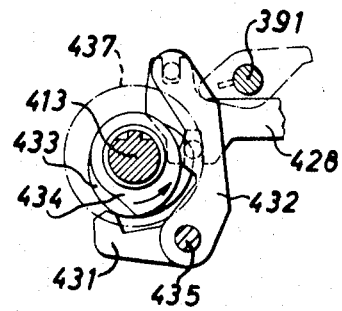
Figure 12:
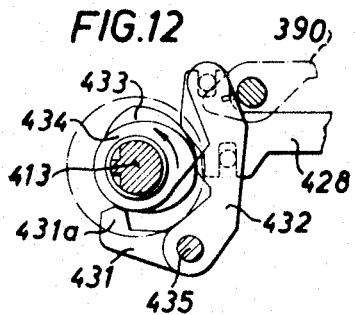
Figure 16:
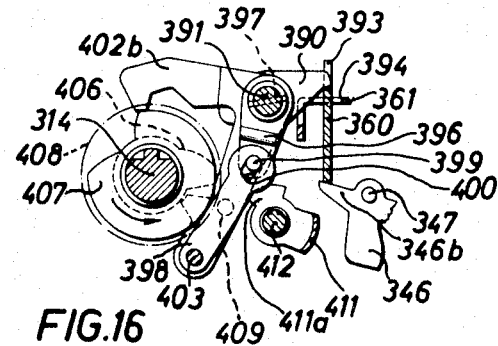
Figure 17:
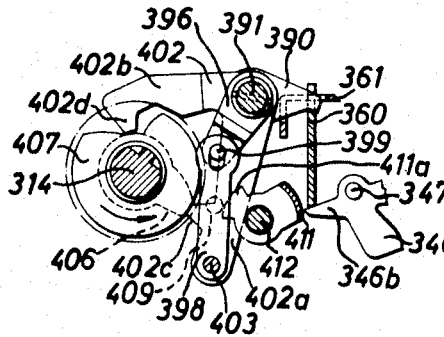
Figure 18:
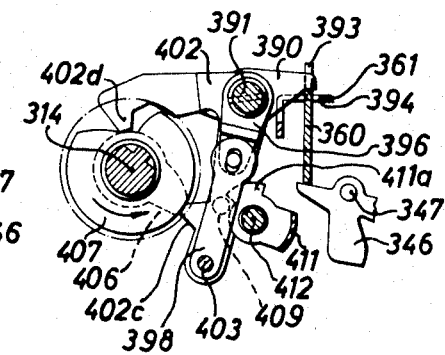
Figure 19:
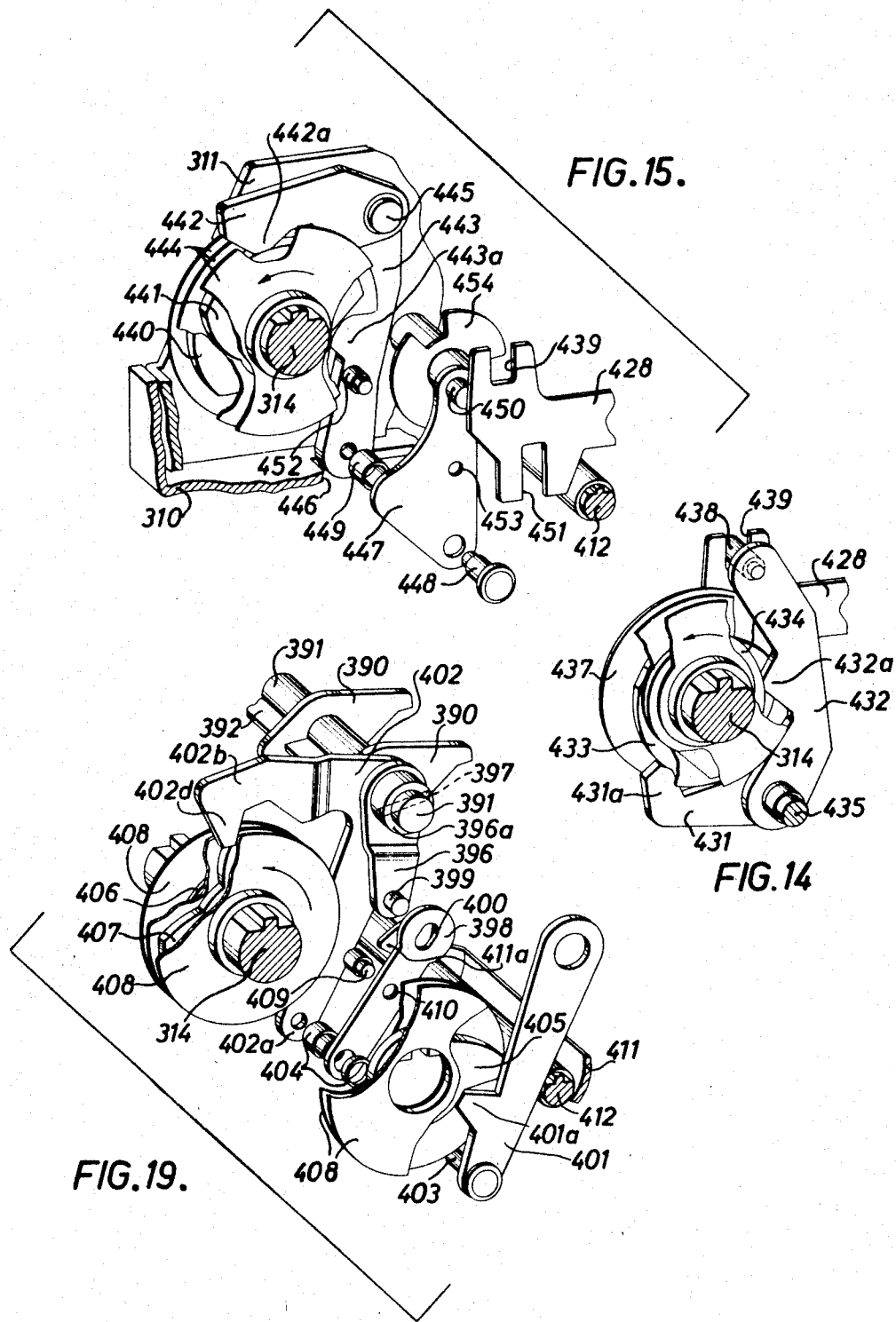
Figure 20:
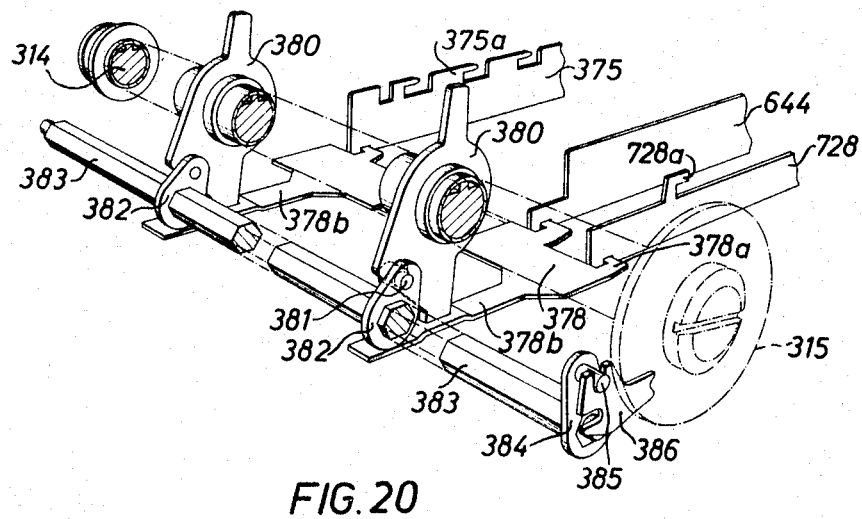
Figure 21B:
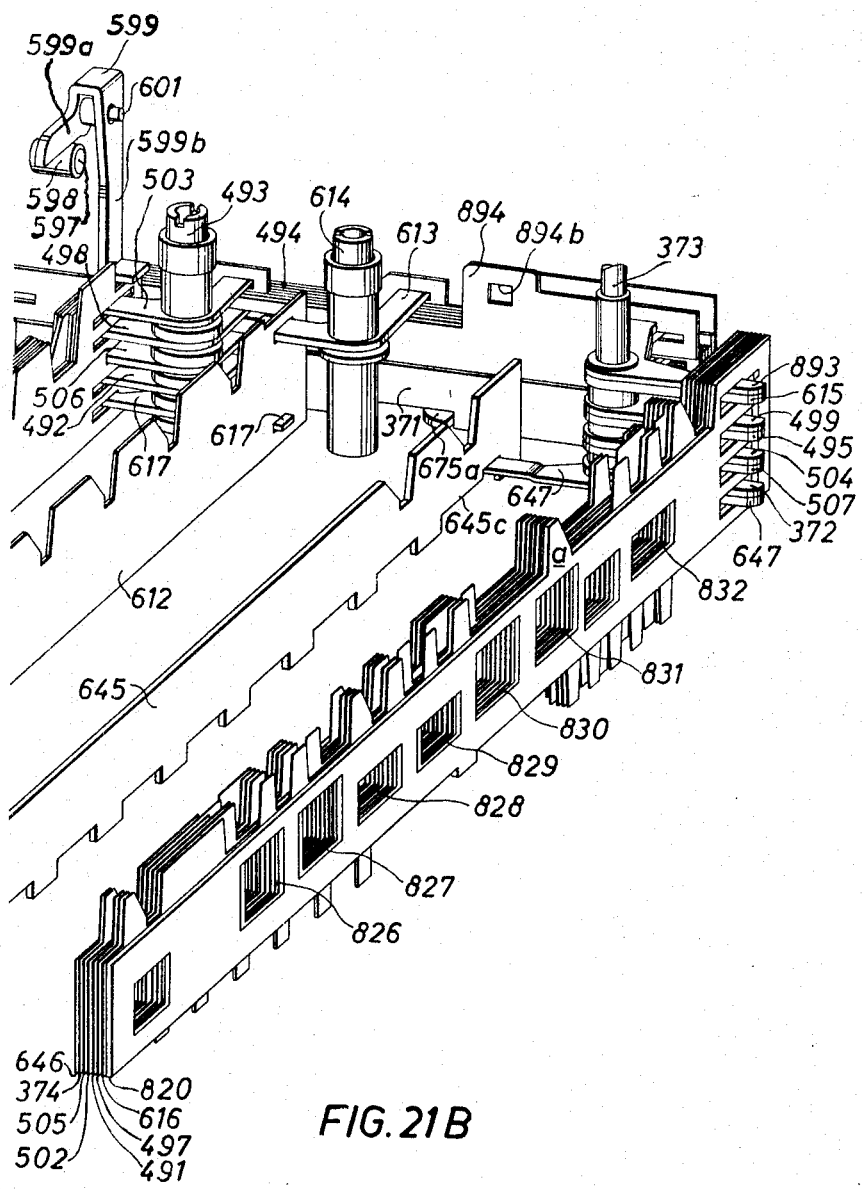
Figure 35:
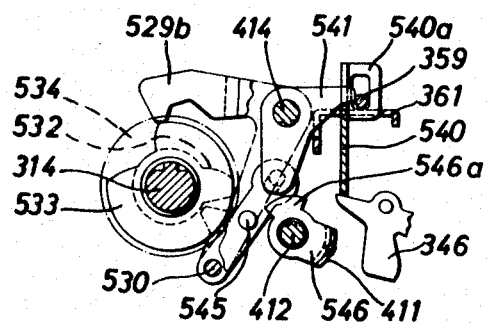
Figure 36:
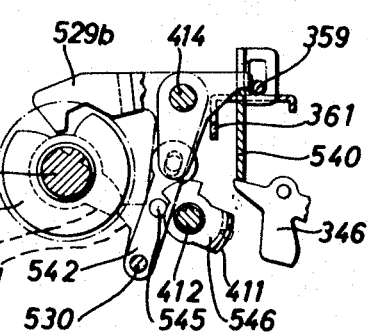
Figure 37:
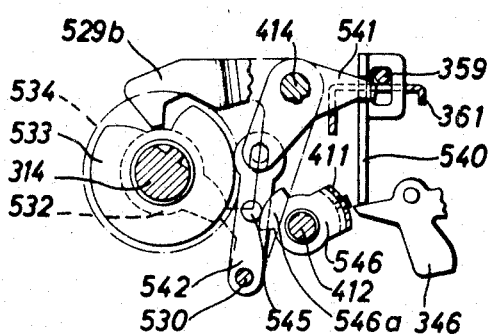
Figure 38:
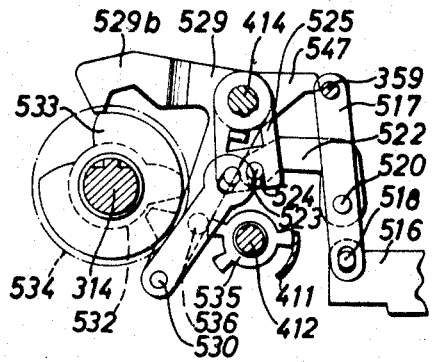
Figure 39:
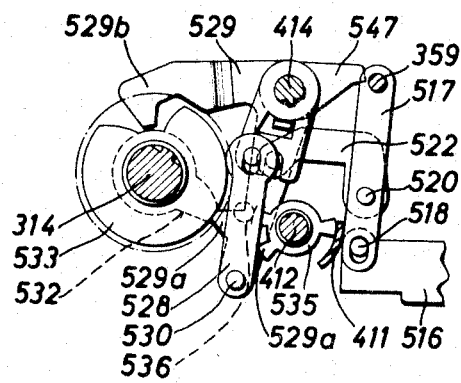
Figure 40:
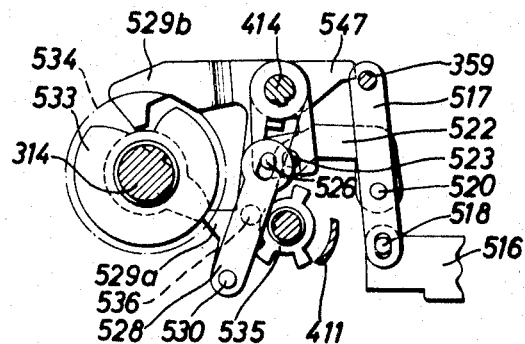
Figure 41:
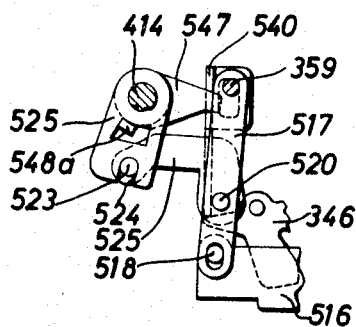
Figure 48:
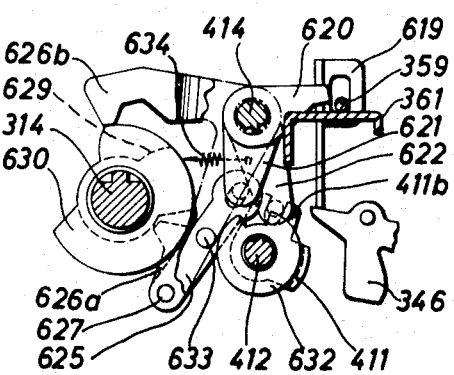
Figure 43:
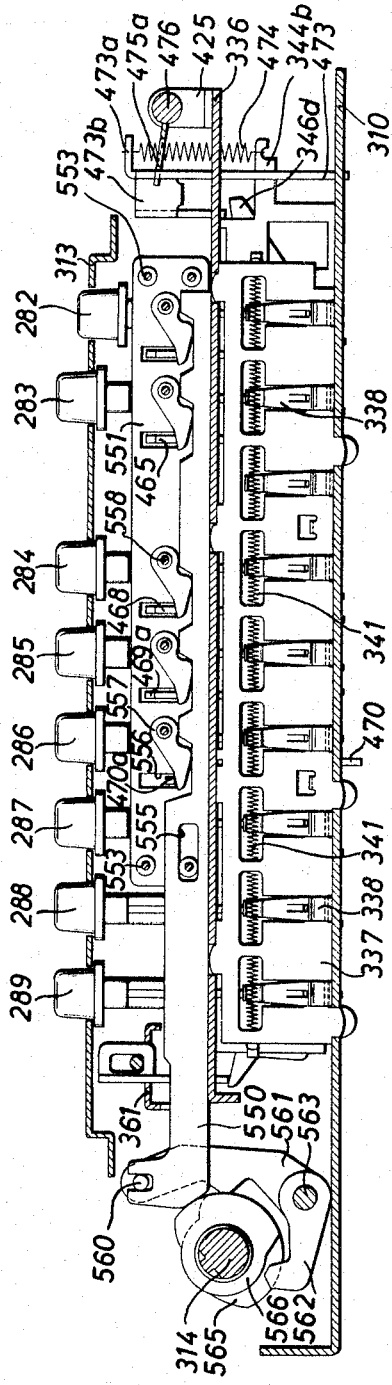
Figure 44:
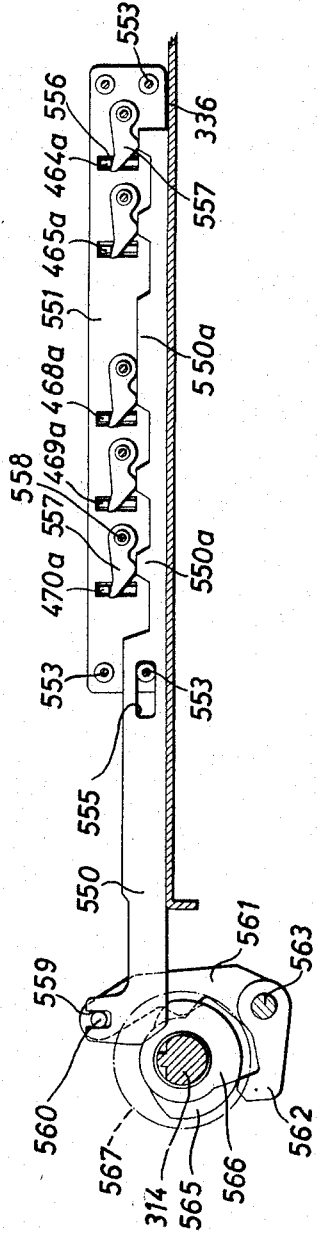
Figure 47:
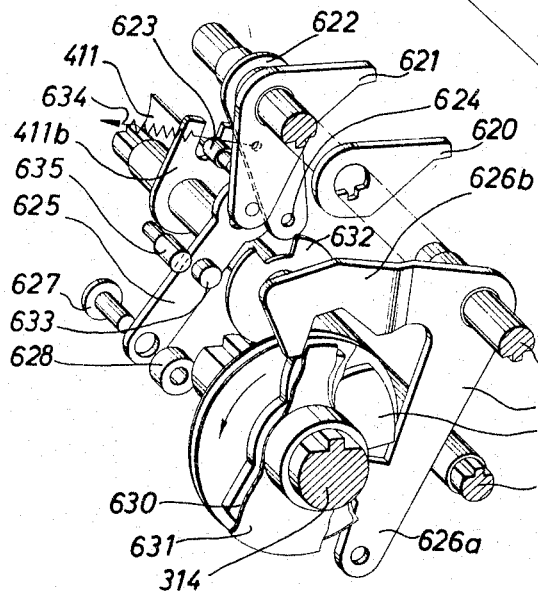
Figure 45:
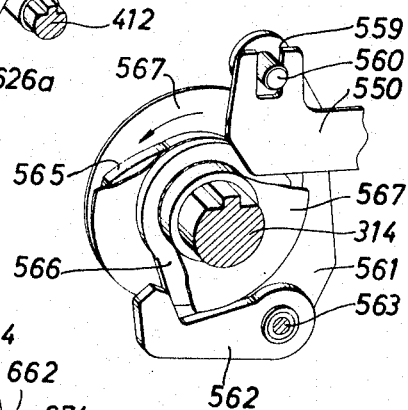
Figure 51:
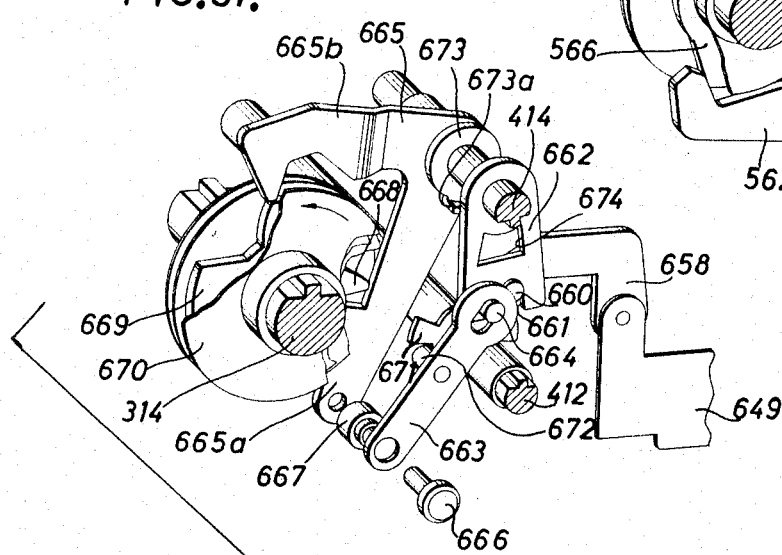
Figure 73:
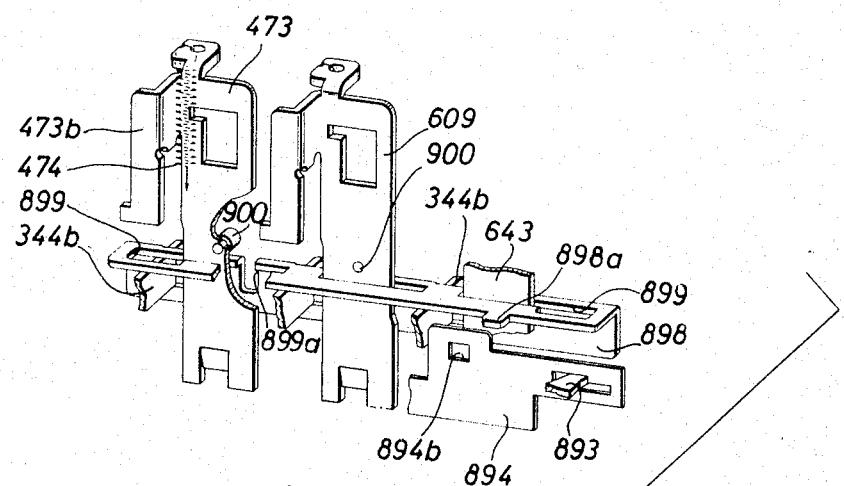
Figure 52:
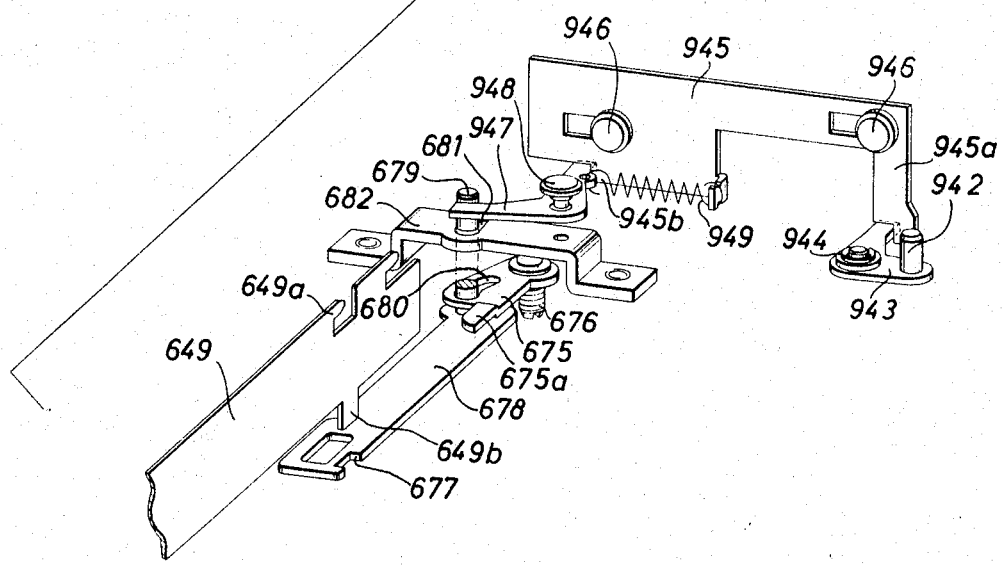
Figure 53A:
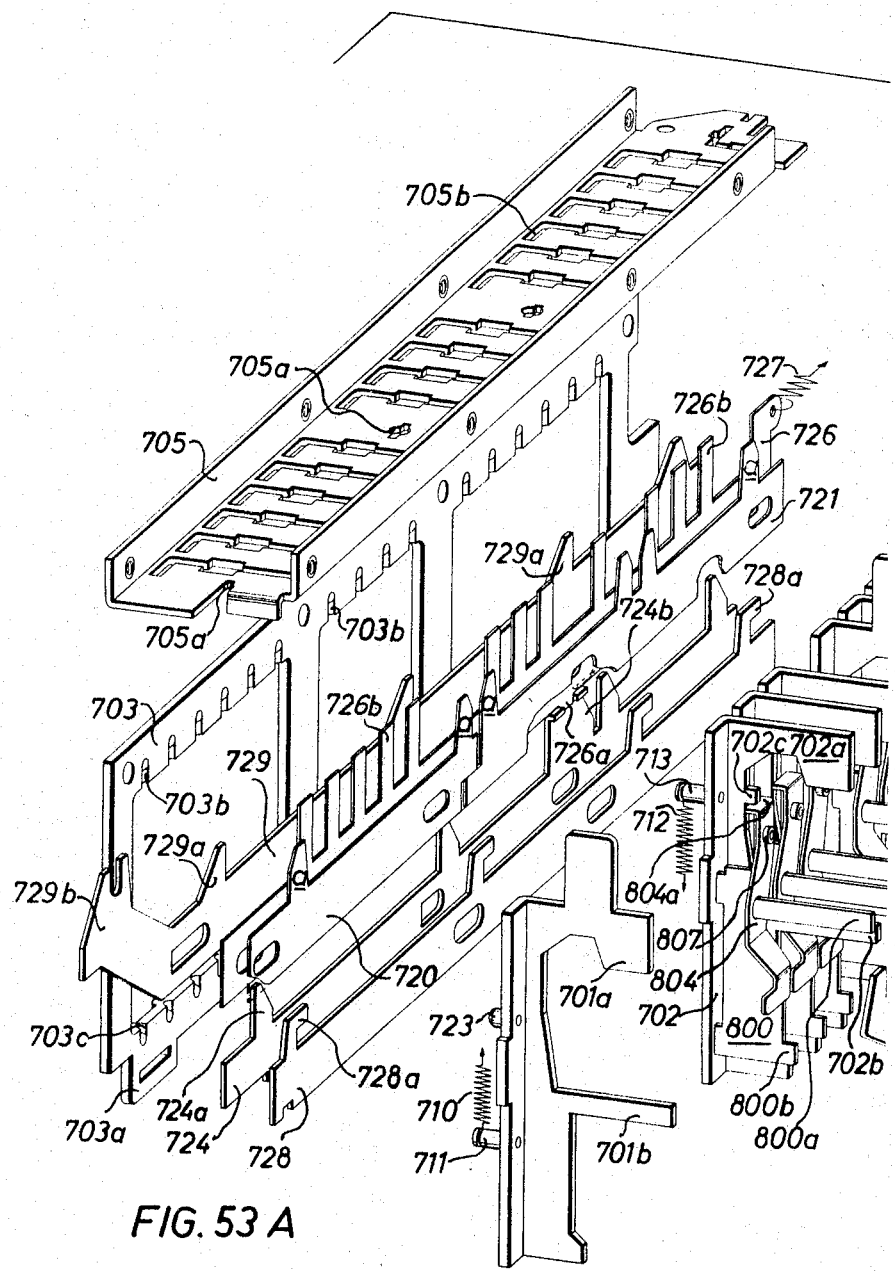
Figure 53B:
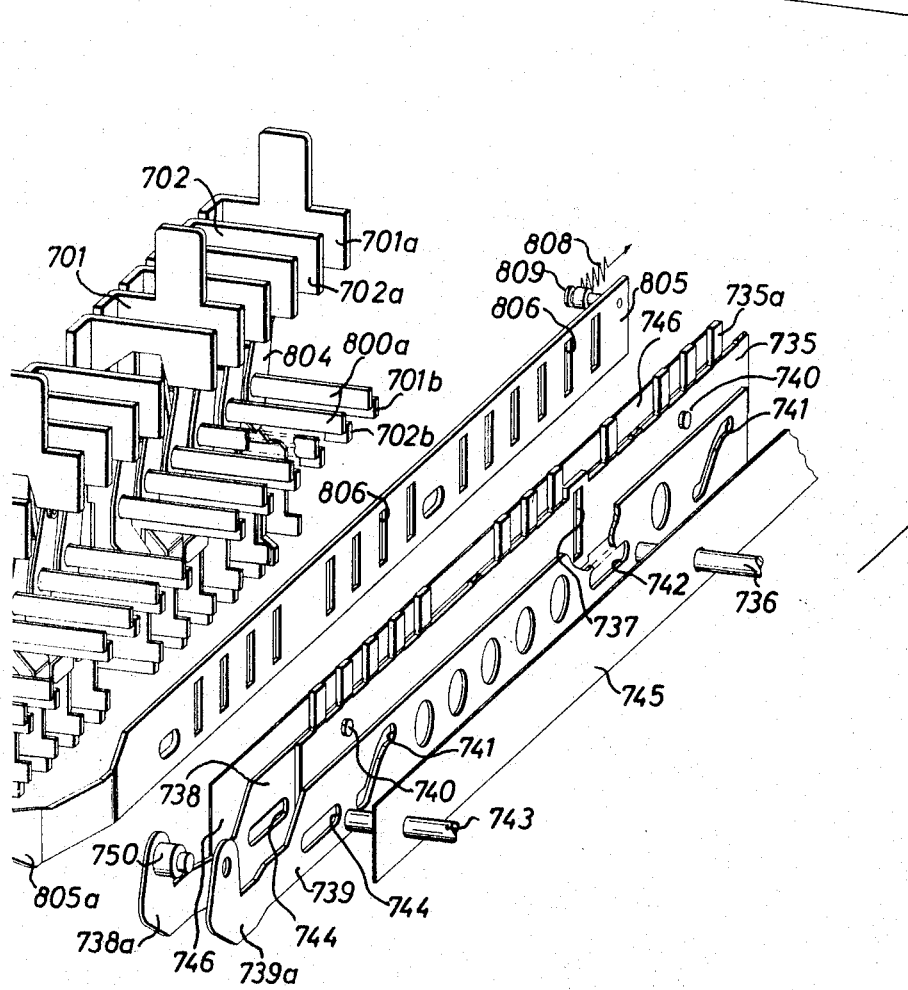
Figure 53C:
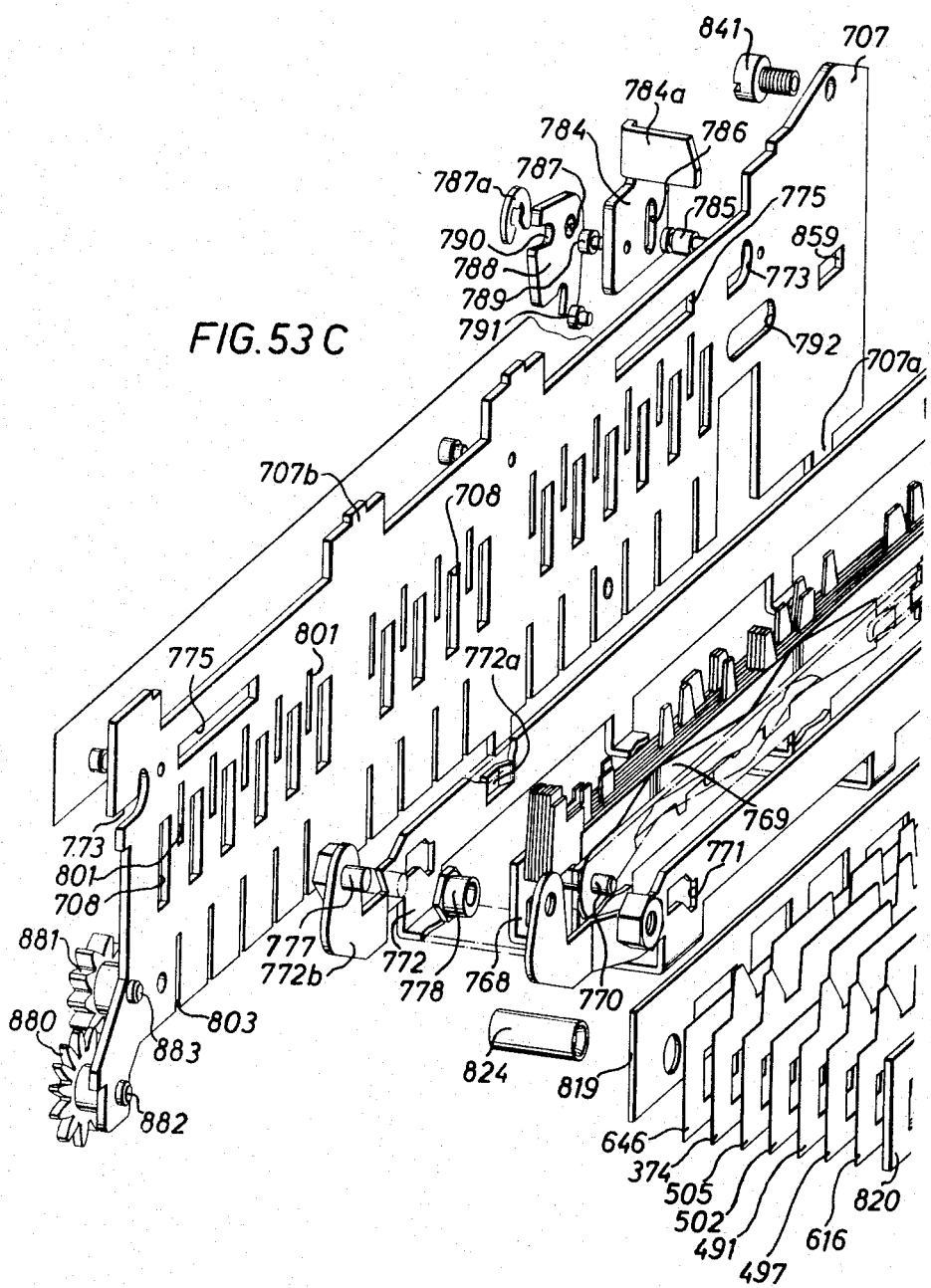
Figure 53D:
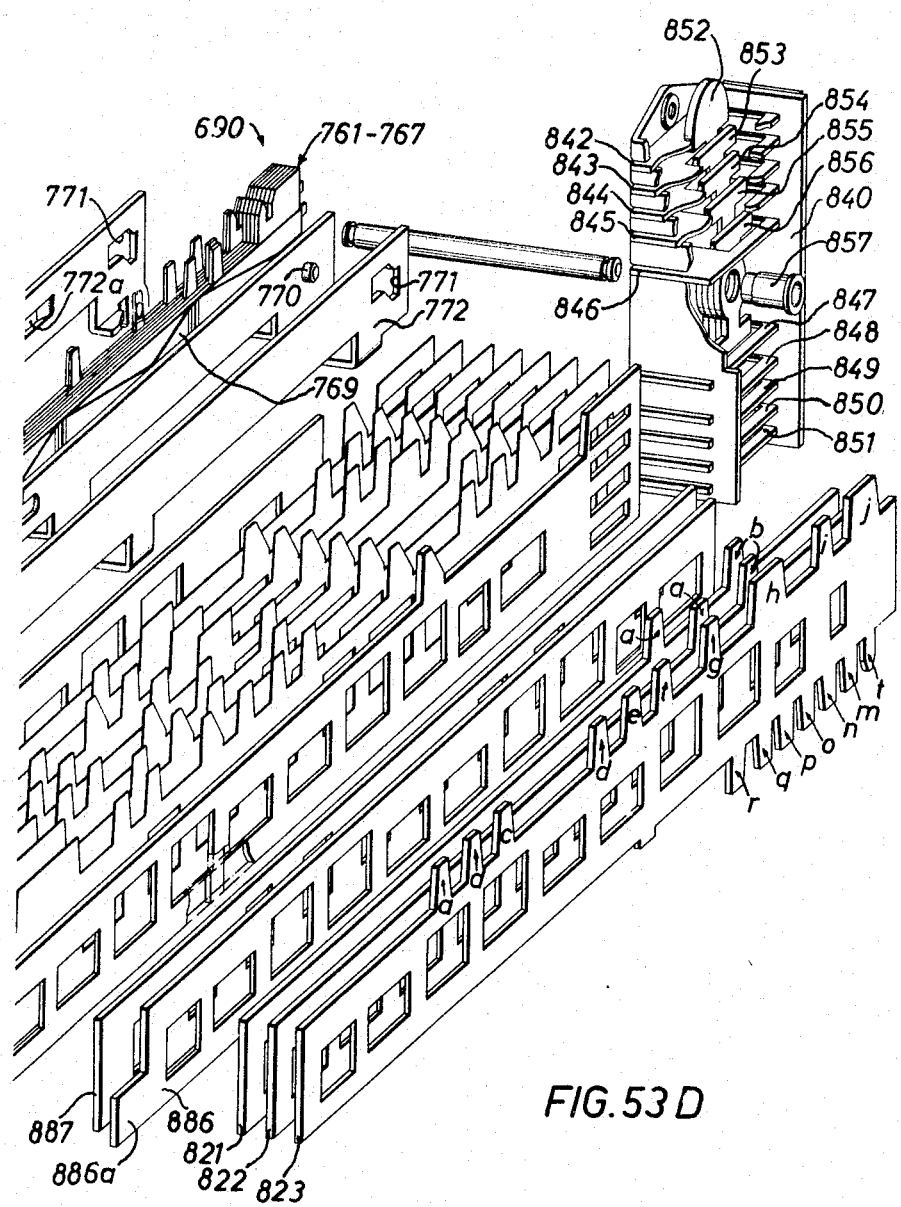
Figure 53E:
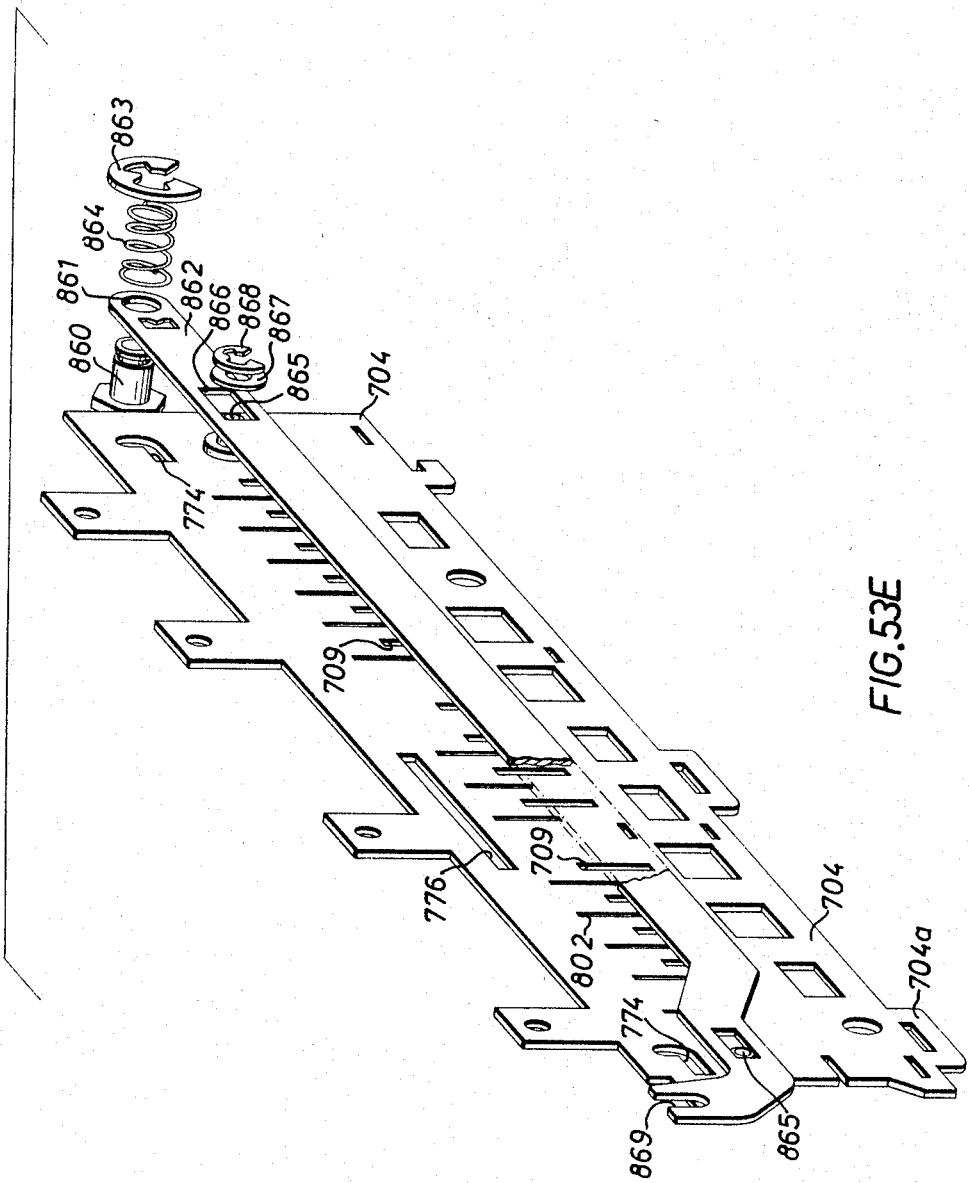
Figure 74:
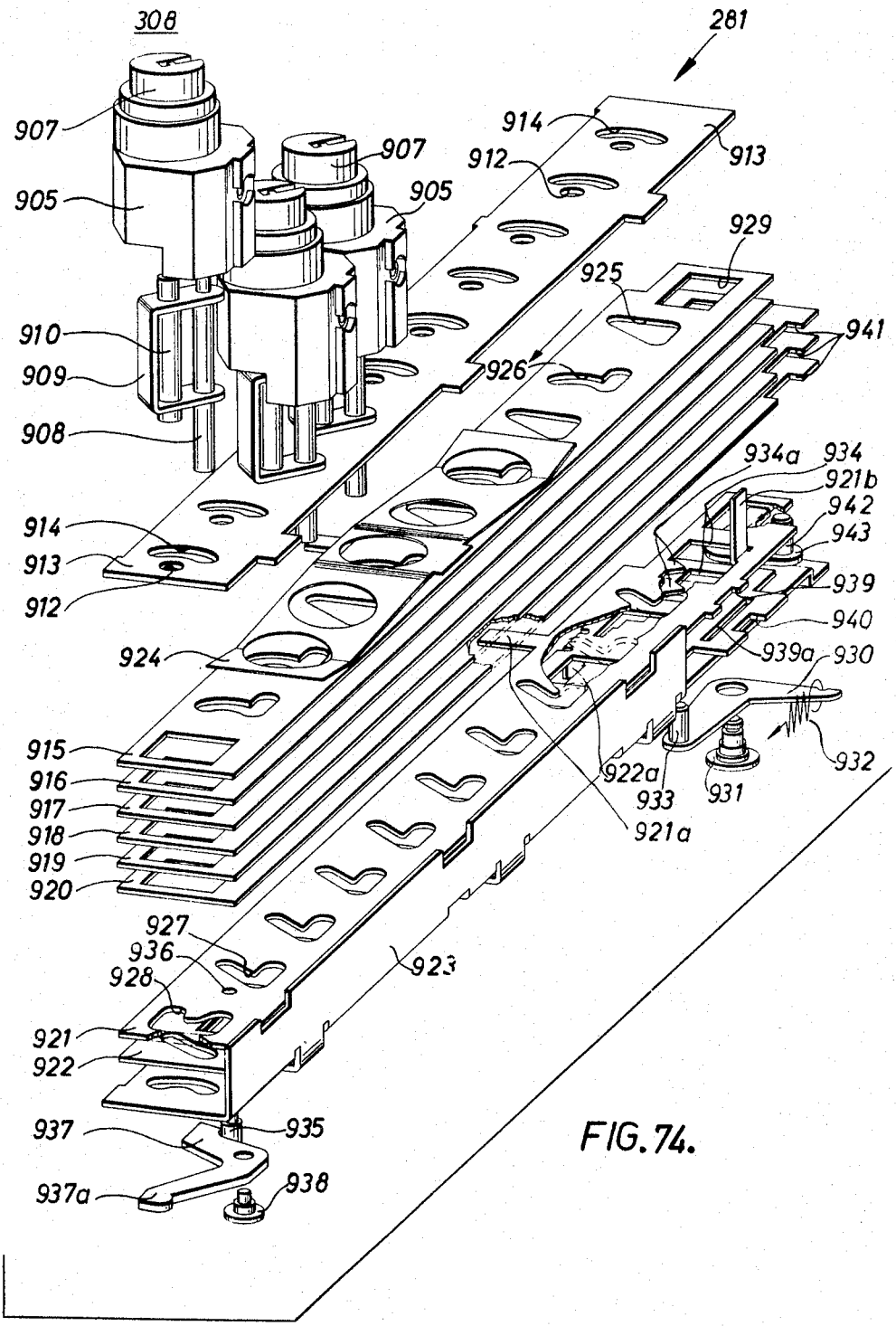
Figure 80:
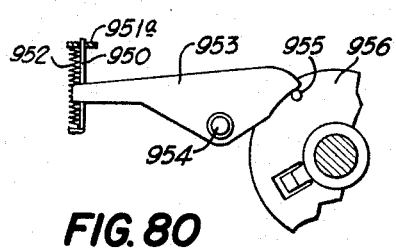
Figure 79A:
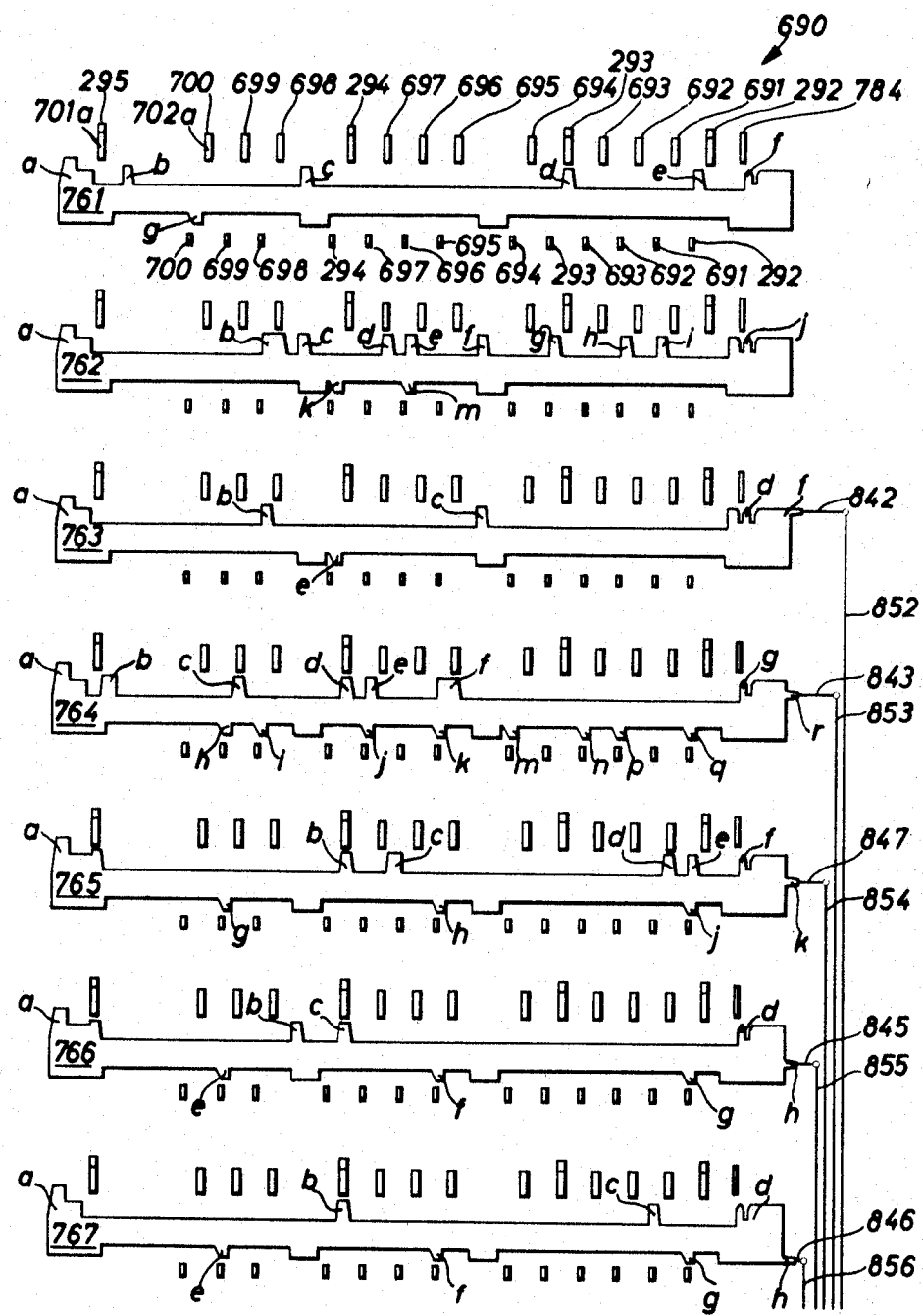
Figure 79B:
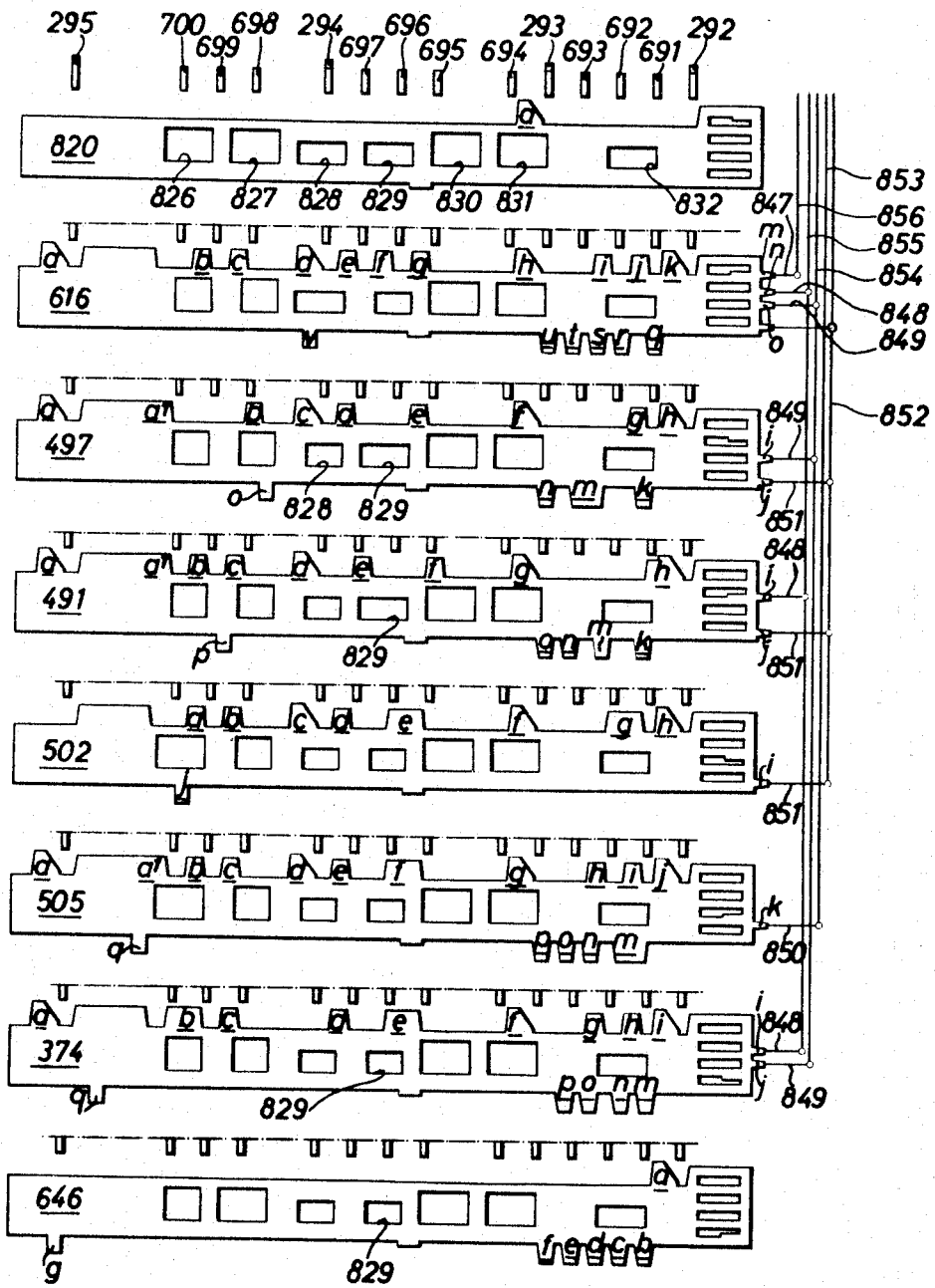

FIGURES 6A and 6B form a sectional view taken generally along line 6—6 in FIGURE 4 illustrating a portion of the keyboard assembly;

FIGURES 7A and 7B form an exploded perspective view of an amount bank in the keyboard assembly;

FIGURES 8A and 8B form a sectional view of an amount bank in the keyboard assembly;

FIGURE 9 appearing on the same sheet as FIGURE 8A, is a fragmentary sectional view similar to FIGURE 8 illustrating a zero stop control means in an effective condition;

FIGURE 10, appearing on the same sheet as FIGURE 8B, is a view similar to FIGURE 9 illustrating the zero stop control means in an effective condition;

FIGURE 11 is a detail view of a drive means for operating the zero stop means shown in a normal condition;

FIGURE 12 is a view similar to FIGURE 11 illustrating the drive means in an operated condition;

FIGURE 13 is a detail view of a testing means for the zero stop mechanism shown in a setting in which the testing means is ineffective to operate the zero stop mechanism;

FIGURE 14 is a fragmentary perspective view of the drive means for the zero stop means shown in FIGURES 11 and 12;

FIGURE 15 is an exploded perspective view of the testing means shown in FIGURES 9, 10 and 13;

FIGURE 16, which appears with FIGURES 17 and 18 on the same sheet as FIGURES 11–13, is a detail view of a mechanism for positively restoring the print and amount banks of the keyboard assembly at the end of a cycle of operation of the cash register, the mechanism being shown in a normal position;

FIGURE 17 is a view similar to FIGURE 16 showing the restoring mechanism in an operated and effective condition;

FIGURE 18 is a view similar to FIGURES 16 and 17 showing the restoring mechanism in an operated and ineffective condition;

FIGURE 19 is an exploded perspective view of the restoring mechanism shown in FIGURES 16–18;

FIGURE 20 is a fragmentary perspective view of an assembly for locking actuated keys of the keyboard assembly in a depressed condition;

FIGURES 21A and 21B form a schematic view in perspective of a plurality of group slides included in the keyboard assembly;

FIGURES 22A and 22B form an exploded perspective view of an account bank in the keyboard assembly of the cash register;

FIGURE 23 is a fragmentary sectional view illustrating the account bank of the keyboard assembly in a normal condition;

FIGURES 24–30 are schematic views of an account memory means included in the account bank of the cash register and showing the memory means in different settings provided during the listing of information in the cash register;

FIGURES 31–34 are schematic views of the memory means provided in the account bank of the register similar to FIGURES 24–30 and illustrate the memory means in various settings provided during a total operation of the cash register;

FIGURE 35 is a detail view of a mechanism for automatically resetting the tax keys provided in the account bank of the cash register and shows the mechanism in a normal position;

FIGURE 36 is a view similar to FIGURE 35 showing the tax key resetting mechanism in an operated and ineffective position;

FIGURE 37 is a view similar to FIGURES 35 and 36 illustrating the resetting mechanism for the tax keys in an operated and effective position;

FIGURE 38 is a detail view of a mechanism for resetting cash and credit keys in the account bank of the cash register and illustrates this mechanism in a normal position;

FIGURE 39 is a view similar to FIGURE 38 illustrating the cash and credit key resetting means in an operated and effective position;

FIGURE 40 is a view similar to FIGURES 38 and 39 illustrating the cash and credit key resetting means in an operated and ineffective setting;

FIGURE 41 is a detail view similar to FIGURES 35–40 illustrating the resetting means for the tax and cash-credit keys in the account bank in an effective setting during a manually controlled resetting operation;

FIGURE 42 is an exploded perspective view of the resetting means shown in FIGURES 35–41;

FIGURE 43 is a sectional view of the account bank of the keyboard assembly illustrating a mechanism for operating automatic keys in the account bank;

FIGURE 44 is a view similar to FIGURE 43 illustrating the automatic key operating means in a normal position;

FIGURE 45 is a perspective view of a drive assembly for actuating the automatic key operating means shown in FIGURES 43 and 44;

FIGURE 46, appearing on the same sheet as FIGURE 42, is a perspective view of a drive assembly for shifting the position of the memory means shown in FIGURES 24–34;

FIGURE 47 is an exploded perspective view of a mechanism for restoring the merchandise bank of the cash register and for controlling the restoration of the amount banks;

FIGURE 48, appearing on the same sheet as FIGURES 37–41, is a detail view of the restoring means shown in FIGURE 47;

FIGURE 49 is a fragmentary exploded perspective view of a clerk key bank in the keyboard assembly of the cash register;

FIGURE 50 is a fragmentary sectional view of the clerk bank;

FIGURE 51, appearing on the same sheet as FIGURES 45 and 47, is an exploded perspective view of a means for resetting the clerk bank;

FIGURE 52 is an exploded perspective view of an assembly for locking the keyboard assembly of the cash register;

FIGURES 53A–53E, when placed side-by-side in the order named with FIGURE 53E placed on its edge, form an exploded perspective view of a mode of operation bank in the keyboard assembly of the cash register;

FIGURE 54 is a fragmentary sectional view of the mode of operation bank shown in an operated condition and illustrating a mode of operation start slide and a slide for preventing operation of automatically actuated keys in the mode of operation bank;

FIGURE 55 is a detail view of two slides provided in the mode of operation bank for preventing the depression of more than one manual key in this bank;

FIGURE 56, appearing on the same sheet as FIGURE 54, is a fragmentary sectional view of means for resetting and latching the manual keys in the mode of operation bank;

FIGURE 57, appearing on the same sheet as FIGURE 50, is a fragmentary view similar to FIGURE 56 illustrating the manual key resetting means in an actuated position;

FIGURE 58 is a sectional view of the normal position of a mechanism for releasing and restoring the automatic keys in the mode of operation bank;

FIGURE 59 is a view similar to FIGURE 58 illustrating the automatic key restoring means in an actuated position;

FIGURE 60 is a fragmentary sectional view illustrating a program memory means and a plurality of group slides provided in the mode of operation bank and illustrating a setting and resetting means for these slides in a normal position;

FIGURE 61 is a view similar to FIGURE 60 illustrating the setting and resetting means for the memory and group slides in an actuated position;

FIGURE 62 is an enlarged elevational view of a mechanism for latching and aligning the memory slides, the latching means being shown in an effective setting;

FIGURE 63 is a view similar to FIGURE 62 illustrating the latching means in a released position;

FIGURE 64, appearing on the same sheet as FIGURE 55, is a fragmentary sectional view illustrating the normal position of a resetting means for the memory slides in the mode of operation bank with one of the manual keys in the bank depressed;

FIGURE 65, appearing on the same sheet as FIGURE 50, is a fragmentary sectional view similar to FIGURE 64 illustrating the memory slide resetting means in an operated condition;

FIGURE 66 is a detail view illustrating the normal position of a mechanism for transferring the settings of the memory slides in the mode of operation bank to the group slides therein;

FIGURE 67 is a view similar to FIGURE 66 illustrating the transferring mechanism in an operated condition;

FIGURE 68 is a perspective view of cam means for actuating the various control and operating mechanisms in the mode of operation bank of the cash register;

FIGURE 69 is a perspective view of various discs for controlling the various components of the keyboard assembly of the cash register and illustrates a start yoke for initiating the operation of the cash register;

FIGURE 70 is an enlarged fragmentary sectional view of a gear train for setting the control means shown in FIGURE 69 under the control of the mode of operation bank of the cash register;

FIGURE 71 is a perspective view of a mechanism for controlling the position of the start yoke shown in FIGURE 69;

FIGURE 72 is a schematic view of the start yoke in relation to various start slides in the keyboard assembly that actuate the start yoke;

FIGURE 73, appearing on the same sheet as FIGURE 52, is an exploded perspective view of a zero stop assembly for the selector banks of the cash register;

FIGURE 74 is an exploded perspective view of a lock bank forming a part of the keyboard assembly of the cash register;

FIGURES 75–78 are enlarged plan views of different coded members used to control the operations of different portions of the keyboard assembly of the cash register;

FIGURES 79A and 79B provide a schematic elevational view of the memory and group slides in the mode of operation bank of the keyboard assembly and the setting and transferring means connected therebetween;

FIGURE 80, appearing on the same sheet as FIGURES 75–78, is a detail view of a mechanism for controlling the operability of the lock bank in the keyboard assembly of the cash register;

Figure 81:
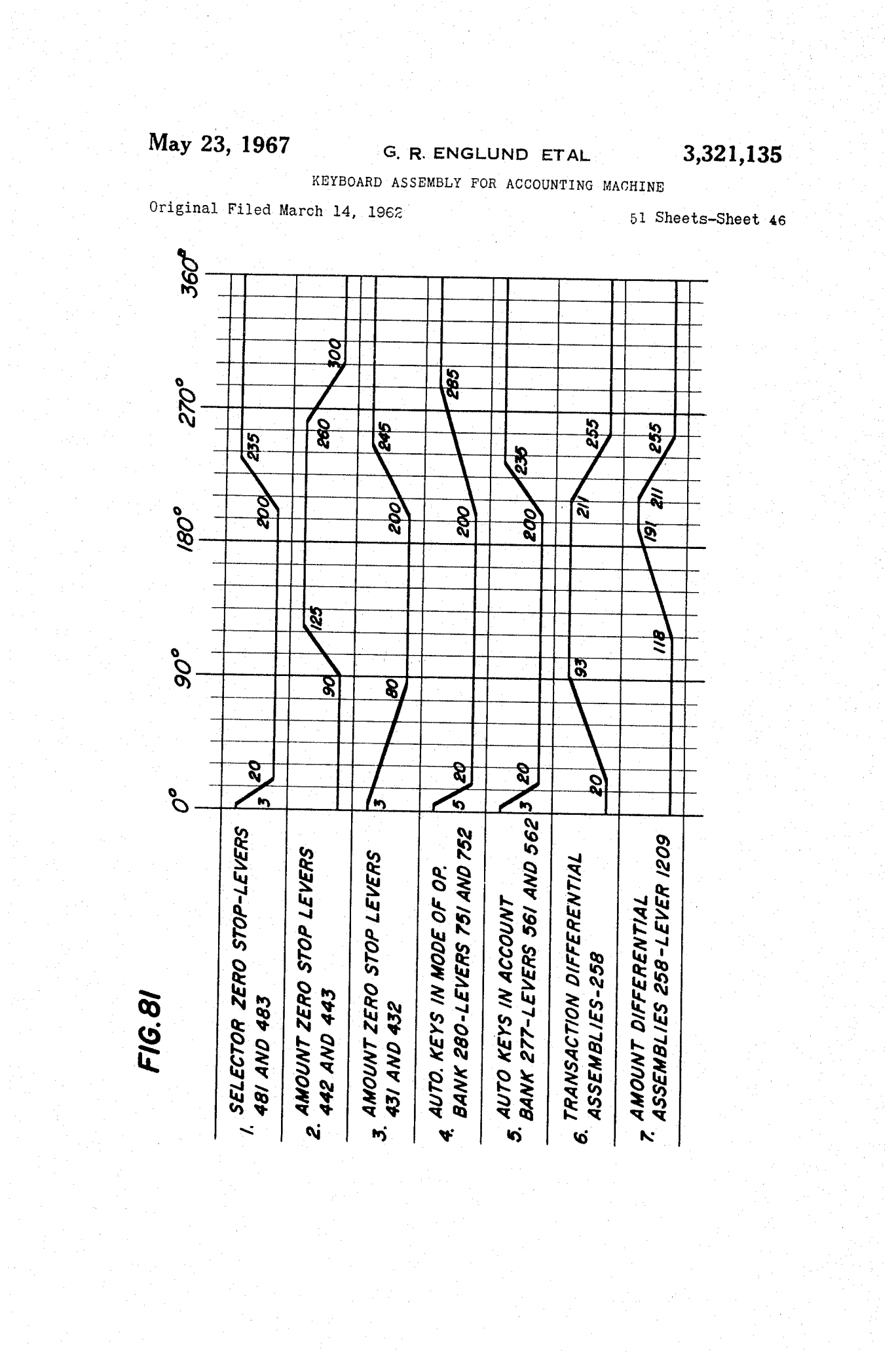

FIGURES 81 and 82 are timing diagrams illustrating the various times during a cycle of operation of the cash register at which different components and mechanisms therein are operated;

FIGURE 83 is a table illustrating the control of the mode of operation means by the program memory means provided in the cash register;

FIGURE 84 is a table illustrating the control exercised over the memory means in the cash register by the operation of the mode of operation means;

FIGURE 85 is a table illustrating a typical sequence of operations of the cash register during listing transactions and FIGURE 86 is a table illustrating a typical sequence of operations of the cash register during reading and resetting transactions.

GENERAL DESCRIPTION

Figure 1:
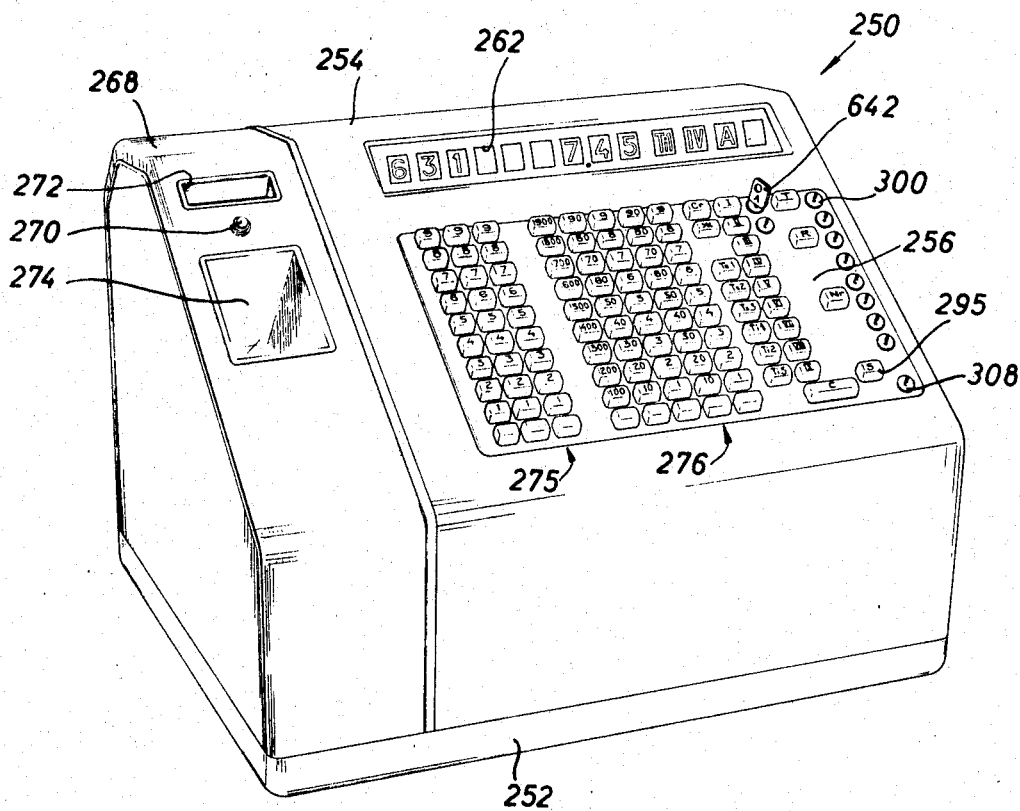

Referring now more specifically to FIGURE 1 of the drawings, therein is shown a cash register which is indicated generally as 250 and which embodies the present invention. The cash register 250 includes novel means for entering and storing, recovering, and recording data; for performing arithmetical operations thereon; and for programming the various data handling operations to be performed. Although the cash register 250 can be provided in different forms for use in many different types of commercial establishments, the novel cash register illustrated and described in detail below is adapted for use in cooperative retail sales outlets in which a customer identification or number must be recorded in conjunction with each sales transaction. In addition, since the cash register 250 is designed for use in retail installations in which various local, state and federal taxes may be applicable, the cash register includes means for diverting entered taxable items on which different taxes are due into separate storage means in the cash register and for automatically recovering this information from storage during a totalizing operation to permit the applicable tax amounts to be entered.

Figure 2A:
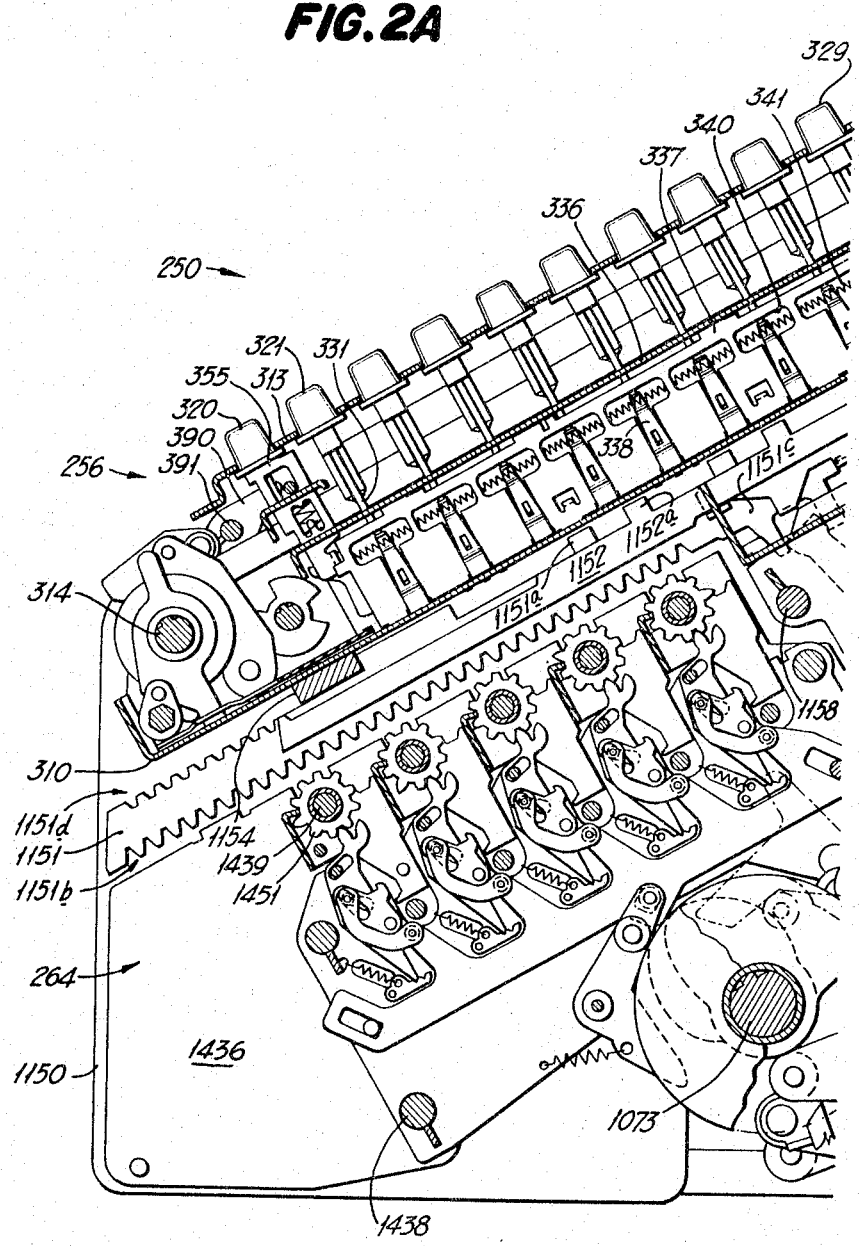
Figure 3A:
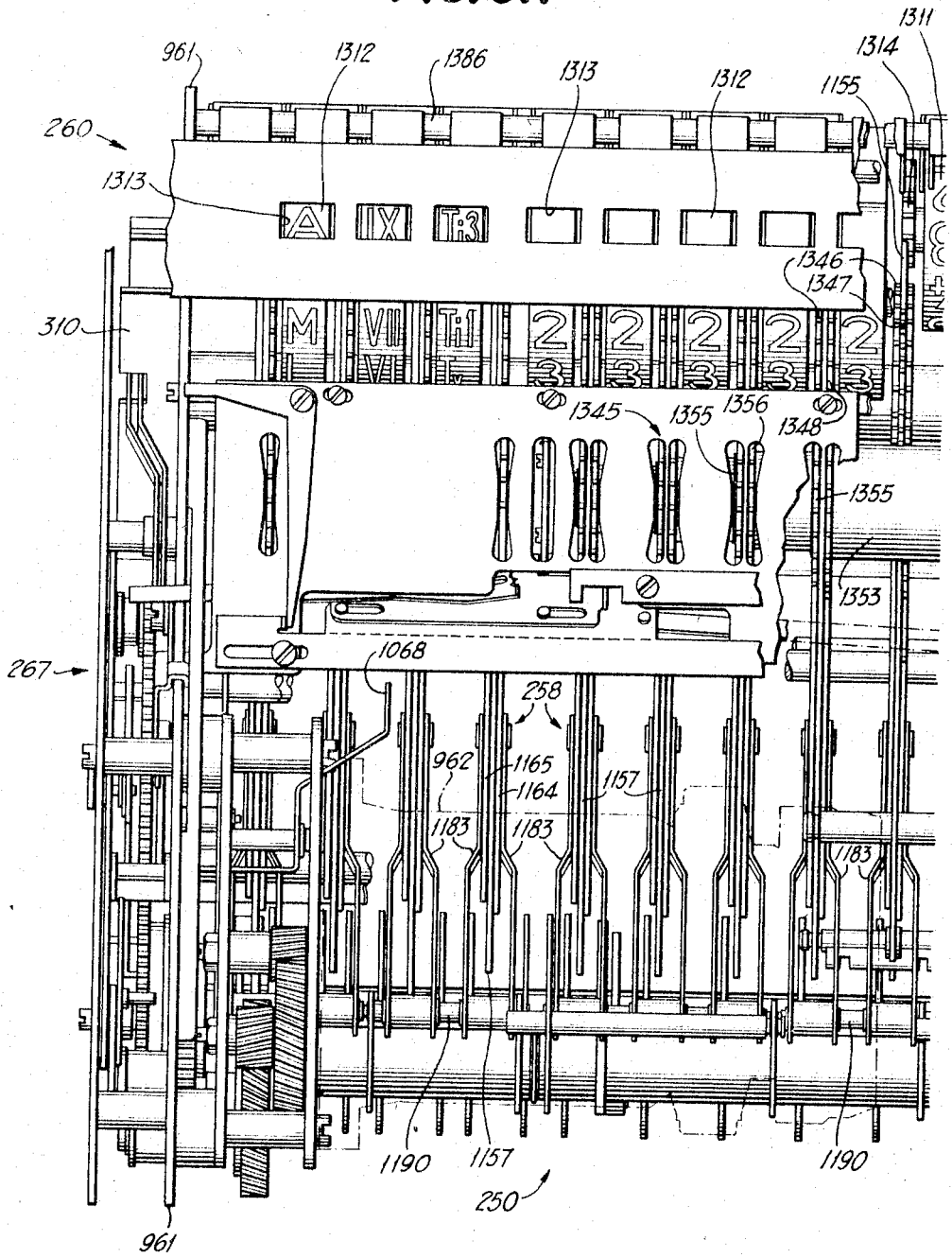
Figure 3B:
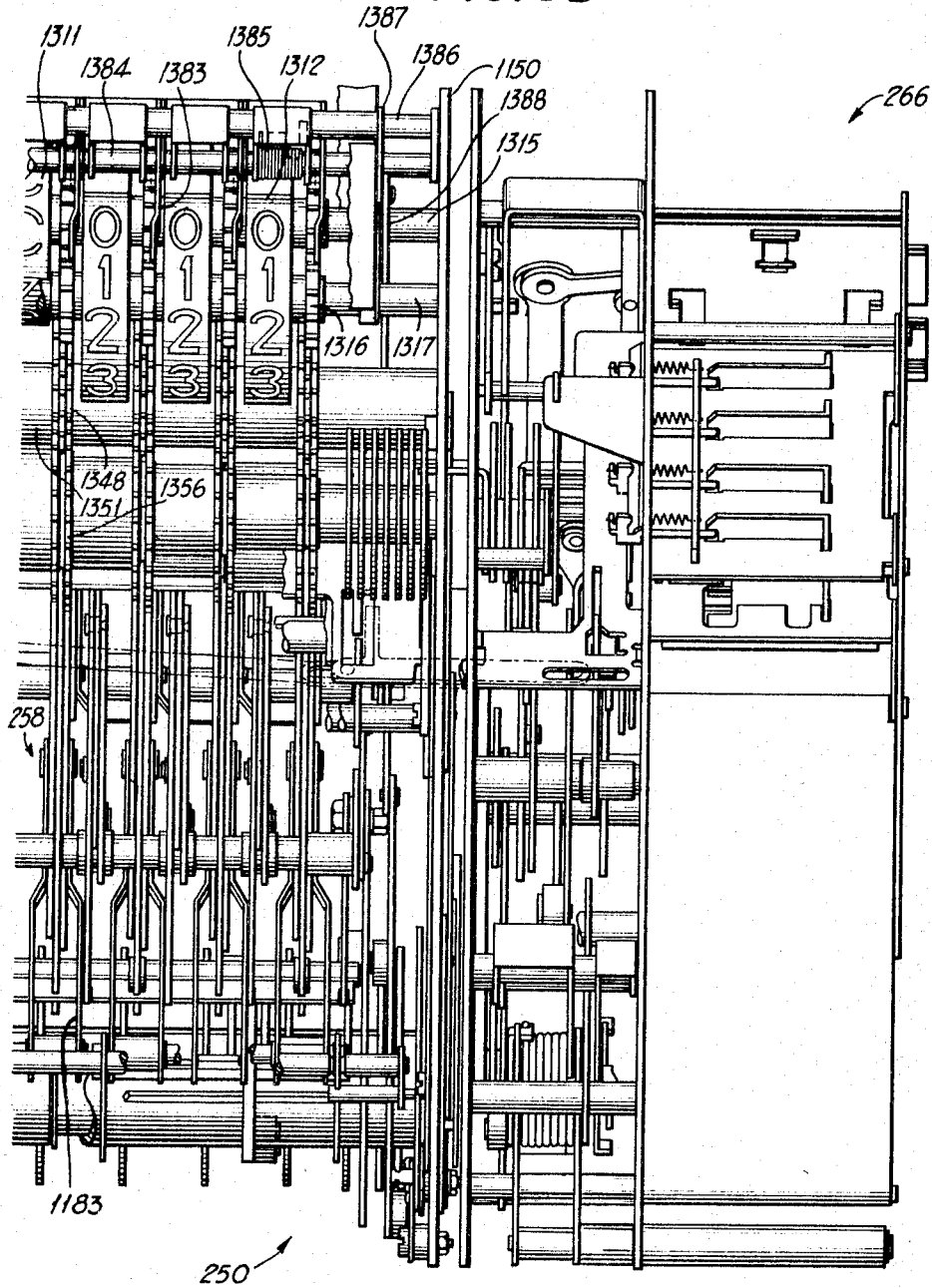

In general, the cash register 250 includes a base 252 for supporting the cash register construction on which a main housing 254 enclosing the main portion of the cash register construction is removably mounted. Although the cash register 250 is not shown as including cash drawers, one or more cash drawers can be provided in place of the base 252. The portion of the cash register construction enclosed by the housing 254 includes a unitary keyboard assembly, indicated generally as 256 (FIGURES 1 and 2), by which control and digital data is manually entered into the cash register 250. The keyboard assembly 256 includes various memory means by which this assembly can be manually operated to enter data in a given order into the cash register 250 by controlling the setting of a plurality of differential assemblies indicated generally as 258 (FIGURES 2 and 3). The selective adjustment of the plurality of differential rack assemblies 258 controls the setting of an indicating assembly, indicated generally as 260 (FIGURES 2 and 3), that provides a visible display of various items of information through a plurality of windows 262 provided in the front and back of the housing 254. The keyboard assembly 256, including the memory means provided therein, also controls the selective transfer of information between the differential rack assemblies 258 and an accumulator or totalizer assembly indicated generally as 264 (FIGURE 2).

The cash register 250 also includes a printing or recording assembly, indicated generally as 266 (FIGURE 3), that is selectively supplied with different items of information under the control of the differential assemblies 258 to provide different types of printed records. The printing assembly 266 is disposed within a housing or cover 268 (FIGURE 1) which is mounted on the base 252 and which is detachably secured to the main housing 254 by a latching means including a manually operable element 270. The printing assembly 266 provides receipts severed from a length of paper tape that are discharged through an opening 272 in the housing 268 and a continuous audit tape or strip that is visible through a window 274 in the housing 268.

The cash register 250 also includes a start test assembly, indicated generally as 267 (FIGURE 3A), that is effective to permit an operation of the cash register 250 to be initiated only when the actuated keys represent data that conforms to the program of the cash register. The start test means 267 is placed in operation by the actuation of a selected group of keys in the assembly 256 that possess the start function and operates upon actuation of one of these keys to sense the type of data entry supplied by the keyboard assembly 256. If the type of entry conforms to the program, the cash register 250 is permitted to operate. Alternatively, if the data conditionally entered into the keyboard 256 is not permitted by the program, the attempted start of the cash register 250 is blocked.

DIFFERENTIAL ASSEMBLIES 258

The cash register 250 includes nine amount differential assemblies 258 (FIGURES 2 and 3) and four transaction differential assemblies 258 which are driven by the main shaft 1073 of the cash register 250 to different settings determined by the actuated keys in the keyboard assembly 256 to control the entry of information into the cash register 250 and to control the performance of various functions thereby. During listing operations, five of the amount differential assemblies 258 are directly controlled by the keys in five amount banks in the keyboard assembly 256 to supply digital data to five orders of the accumulator assembly 264, the printing assembly 266, and the indicating assembly 260, the remaining four higher orders of the accumulator assembly 264 being capable of receiving data from the four lower orders by carry operations. During listing, the keys in three print banks in the assembly 256 directly control the three highest order differential assemblies 258 to supply digital data to only the printing assembly 266 and the indicating assembly 260. During reading or resetting operations, the nine amount differential assemblies 258 are controlled by the accumulator assembly 264 to supply digital information to the printing assembly 266 and the indicating assembly 260. The single transaction or mode of operation differential assembly 258 controlled by the keys in the transaction banks in the assembly 256 conditions the cash register 250 for different types or modes of operation, and the three transaction differential assemblies 258 controlled by the keys in the transaction banks in the assembly 256 select different accumulators in the accumulator assembly 264 as well as provide different auxiliary controls over the operation of the cash register 250.

The differential assemblies 258 included in the cash register 250 are of the positively driven type shown and described in detail in Patent No. 3,103,309. In general, each assembly 258 includes an accumulator slide or rack and a complementary slide or rack that are mounted for oppositely directed translatory movement beneath the keyboard assembly 256. The upper edges of these two racks are provided with spaced projections which engage opposite sides of a depressed key shaft or stem to locate the slides in a position corresponding to the depressed key. In operation, the accumulator slide is moved in one direction to engage one side of a depressed key shaft and the complementary slide is moved in an opposite direction so that one of the projections on this slide engages the opposite side of the depressed key stem to set the complementary slide in a position complementary to the arrested position of the accumulator slide. An indicator slide or rack loosely coupled to the complementary and accumulator slides is set in different positions in accordance with settings of the accumulator and complementary slides and remains in this setting between successive cycles of operation of the cash register 250. Information is transmitted to and removed from the accumulator assembly 264 by selectively moving one or more accumulators into engagement with the toothed portion of the accumulator slide. The differential assemblies 258 are supported on the main frame of the cash register 250 between the right wall 961 (FIGURE 3A), considered from the front of the register 250, and a left supporting wall 1150 (FIGURE 3B) by suitably supporting shafts and bars to be disposed in an inclined position immediately beneath the keyboard assembly 256.

Each of the differential assemblies 258 controlled by the print and amount banks includes an accumulator slide or rack 1151 and a complementary slide or rack 1152 that are slidably mounted for movement parallel to each other in suitable slots formed in a U-shaped supporting element 1153 that extends between and is secured to the side walls, 961 and 1150. The upper edges of the slides 1151 and 1152 are provided with projecting portions 1151a and 1152a that are disposed immediately below the keyboard assembly 256 and are adapted to be moved into engagement with opposite sides of the depressed portion of a key shaft. Projections adjacent the ends of these two slides are adapted to be moved into engagement with two bars 1154 that extend between and are secured to the side walls 961 and 1150 to determine the normal positions of the slides 1151 and 1152 shown in FIGURES 2A and 2B. The left-hand lower edge of the accumulator slide or rack 1151 is provided with a toothed portion 1151b for engaging gears in the accumulator assembly 264. The upper left-hand edge of the rack 1151 includes a toothed portion 1151d that is used when the setting of the assembly 258 is controlled by the accumulator assembly 264.

To provide a means for controlling the setting of the indicator assembly 260 and the printing assembly 266 in dependence on the setting to which the accumulator slide 1151 and the complementary slide 1152 are moved, an indicator slide or rack 1155 is slidably mounted in slots formed in the supporting member 1153 and is disposed between the slides 1151 and 1152. The indicator slide 1155 is loosely coupled to the accumulator slide 1151 and the complementary slide 1152 by suitable projections formed on spaced portions of the slide 1155 that engage shoulders or projections formed on the slides 1151 and 1152. The right end portion of the indicator slide 1155 is provided with toothed portions 1155a along its upper and lower edges for controlling the setting of the indicator assembly 260 and the printing assembly 266.

When the cash register 250 is placed in operation, the accumulator slide 1151 is moved to the right to a position determined by a depressed key shaft or the accumulator assembly 264, and the complementary slide 1152 is moved to the left to a position complementary to that of the accumulator slide 1151. During this movement, the projections on the indicator slide 1155 are engaged by the slides 1151 or 1152 to move the indicator slide 1155 from its previous position to a position corresponding to the present setting of the slides 1151 and 1152. When the differential assembly 258 is restored to its normal position, the complementary slide 1152 is moved to the right to a normal position and the accumulator slide 1151 is moved to the left to a normal position. The indicator slide 1155 remains in the adjusted setting inasmuch as the two slides 1151 and 1152 move away from the engagement with the projections on the indicator slide 1155. Thus, when the differential assembly is actuated to its next setting, the indicator slide 1155 is only moved from its previous setting to the next setting and is not returned to a zero position and operated to a new setting during each cycle of operation of the cash register 250.

The transaction differential assemblies 258 controlled by the selector banks in the assembly 256 are substantially identical to the differential assembly 258 controlled by the keys in the print banks and the amount banks including an accumulator rack 1151, a complementary rack or slide 1152, and an indicator rack or slide 1155 slidably mounted in slots on the supporting element 1153. However, the lower left-hand edge of the accumulator slides 1151 are not provided with the toothed portion 1151b because the differential asemblies 258 in the selector banks are not used to transfer digital information to or receive digital information from the accumulator assembly 264. In addition, the indicator slides 1155 in the assemblies 258 controlled by the selector banks can include coupling means for coupling the indicator racks 1155 to corresponding selecting means in the accumulator assembly 264.

The single differential assembly 258 controlled by the keys in the mode of operation bank in the keyboard assembly 256 is substantially identical to the remaining differential assemblies in including an accumulator rack 1151, a complementary slide or rack 1152, and an indicator slide or rack 1155 that are slidably mounted for parallel movement relative to each other within openings or slots formed in the supporting member 1153. The slides 1151 and 1152 include projections 1151a and 1152a at spaced portions along their upper edges which cooperate with depressed key shafts in the mode of operation bank to set the slides 1151 and 1152 in eleven different complementary positions corresponding to the eleven modes of operation provided in the illustrated cash register 250.

However, since the mode of operation bank does not control the entry of digital information into the accumulator assembly 264, the left-hand lower edge of the accumulator rack 1151 does not include the toothed portion 1151b. In addition, the left end of the indicator slide 1155 is coupled to means for driving or actuating a plurality of different control assemblies in the cash register 250 controlled by the setting of the mode of operation differential assembly 258.

Each pair of accumulator slides 1151 and complementary slides 1152 is actuated by an individual differential actuator which moves the slides in opposite directions to complementary positions during a setting operation and which moves these slides in opposite directions to their normal positions at the conclusion of the setting operation. The differential actuators are operated by the main shaft 1073 of the cash register 250 in a timed sequence so that the differential assemblies 258 controlled by the transaction banks of the keyboard assembly 256 are set prior to the concurrent setting of the differential assemblies controlled by the keys in the print and amount banks.

The differential actuators used to drive the racks or slides 1151 and 1152 are substantially the same as those disclosed in the above identified patent and are mounted on a plurality of apertured supporting plates 1157 (FIGURES 2 and 3) which are supported in spaced positions beneath each pair of slides 1151 and 1152 by a plurality of rods or shafts 1158, 1159 and 1160 which are secured to the side walls of the frame. The rods 1158–1160 pass through aligned openings in the plates 1157 and cooperate with spacer bars that maintain these plates in the desired spaced relationship. The upper end of each of the plates 1157 is received within openings formed in and is secured to the bight portion of the U-shaped support 1153.

To provide means for actuating the slides 1151 and 1152, each of these slides is provided with a depending portion 1151c and 1152c which is received within a suitably formed slot in the bight portion of the support 1153 and which defines a downwardly open recess or notch. The upper end of a differential lever 1164 disposed on one side of the plate 1157 extends through an opening in the lower wall of the support 1153 to be received within the notch formed in the depending portion 1151c on the accumulator slide 1151, and the upper end of another differential lever 1165 disposed on the other side of the plate 1157 extends through an opening in the wall of the support 1153 to be received within the notch formed in the depending portion 1152c on the complementary rack or slide 1152.

The lower ends of the levers 1164 and 1165 are pivotally mounted on the plate 1157 by an assembly 1170.

To provide means for pivoting the differential levers 1164 and 1165 in opposite directions to produce oppositely directed complementary movements of the slides 1151 and 1152, the levers 1164 and 1165 are provided with a pair of inclined cam slots 1179 and 1180, respectively. A pair of rollers 1181 carried on a shaft 1182 are disposed within the slots 1179 and 1180 and are positioned in the lower ends of these slots in the normal position of the differential actuator assembly 258. The ends of the shaft 1182 are carried on the upper ends of a pair of links 1183. When the links 1183 are moved upwardly, the rollers 1181 engage the walls of the slots 1179 and 1180 to pivot the lever 1164 in a clockwise direction and the lever 1165 in a counterclockwise direction. This moves the accumulator rack 1151 to the right and the complementary slide 1152 to the left. Similarly, when the links 1183 are moved downwardly, the lever 1164 moves in a counterclockwise direction and the lever 1165 moves in a clockwise direction to restore the racks or slides 1151 and 1152 to their normal positions.

The links 1183 for actuating the differential levers 1164 and 1165 in the differential assemblies 258 are raised and lowered at selected times during each cycle of operation of the cash register 250 by cam means driven by the main shaft 1073 of the cash register 250. The four pairs of links 1183 connected to the differential levers 1164 and 1165 in the four differential assemblies 258 controlled by the transaction banks of the keyboard assembly 256 are elevated between 20° and 93° of rotation of the main shaft 1073 (see line 6 in FIGURE 81), and are lowered between 211° and 255° of rotation. The pairs of links 1183 for the amount and print differential assemblies are elevated between 118° and 191° of rotation of the main shaft 1073 (see line 7 in FIGURE 81) and are lowered between 211° and 255° of rotation.

The lower ends of the links 1183 for the amount differential assemblies 258 are pivotally mounted on one or more shafts or rods 1190 which are carried on a group or spaced arms 1202. The arms 1202 are pivotally mounted on a shaft 1195 and are held in spaced parallel relation by a shaft 1204 and a cooperating notched plate or bar. To provide means for pivoting the arms 1202 a cam follower lever 1209 (FIGURE 2) is pivotally mounted on the shaft 1195 and is secured at one end to the shaft 1204. One arm 1209a of the lever 1209 carries a roller that is adapted to engage the outer periphery of a cam 1211 that is keyed to the main shaft 1073. A lower arm 1209b of the lever 1209 carries a roller that is adapted to engage the outer periphery of another cam that is keyed to the main shaft 1073. When the main shaft 1073 is rotated in a clockwise direction, the cams pivot the arms 1202 in a counterclockwise direction about the shaft 1195 to raise the links 1183 in the nine amount differential assemblies 258. At a subsequent portion of the cycle of rotation of the main shaft 1073, the arms 1202 are pivoted in a clockwise direction about the shaft 1195 to restore the slides 1151 and 1152 in the amount differential assemblies 258 to their normal position. A similar arrangement is provided for operating the four transaciton differential assemblies 258, but with different timing within the operating cycle of the machine 250.

With reference to FIGURE 81 of the drawings, line 6 indicates that the cams elevate the links 1183 for actuating the four transaction differential assemblies between 20° and 93° of rotation of the main shaft 1073. After the setting of the transaction differential assemblies 258 has been completed, the cams elevate the arms 1202 to set the nine amount differential assemblies 258 between 118° and 191° of rotation of the main shaft 1073 (see line 7 in FIGURE 81). Thus, at the end of 191° of rotation of the main shaft 1073, all of the differential assemblies 258 in the cash register 250 are in their operated settings (see lines 6 and 7 of FIGURE 81). Following 211° of rotation of the main shaft 1073, the cams lower the arms including the arms 1202 to restore the transaction and amount differential assemblies 258 to their normal condition.

INDICATING ASSEMBLY 260

The indicating assembly 260 is operated or set under the control of the plurality of differential assemblies 258 and includes a plurality of indicator drums for visibly displaying to the customer and to the operator of the cash register 250 the information entered into or recovered from the machine during the preceding cycle of operation and the type of operation performed by the cash register. The indicating assembly 260 also supplies information to be recorded by the printing assembly 266 and is of such a construction that the information can be displayed or transmitted to the recorder in any desired order and permits the recording assembly 266 to be disposed at either side of the cash register 250.

The indicating assembly 260 (FIGURES 2 and 3) includes thirteen indicator drums 1311 visible through the openings 262 at the front of the cash register 250 and twelve indicating drums 1312 visible to the customer through suitable openings or windows 1313 (FIGURE 3A) at the back of the cash register 250. The indicator drums 1311 are each secured to a connected gear 1314, and each connected indicator drum 1311 and gear 1314 is rotatably mounted on a shaft 1315 supported between the side walls 961 and 1150. Each of the gears 1314 is engaged by the upper row of teeth on the toothed portion 1155a on one of the indicator racks 1155 so that each of the indicator drums 1311 is set to a position corresponding to the setting of the related differential assembly 258.

The outer peripheries of the drums 1311 in the transaction banks are provided with suitable spaced indicia representing the correspoding settings of the related transactions differential assemblies 258. The tens and units cents and the units dollars drums 1311 are provided with indicia representing "0" and the digits "1–9." On the remaining amount indicating drums 1311, the outer surfaces are provided, in sequence, with "0," a blank space, and the digits "1" through "9." This indicia is arranged on the indicating drums 1311 so as to be disposed in alignment with the windows or openings 262 to correspond to the setting of the related differential assembly 258.

Each of the indicator drums 1312 is secured to a gear 1316, and each connected gear 1316 and indicator drum 1312 are rotatably mounted on a shaft 1317 that is secured between the walls 961 and 1150. When viewed from the back of the cash register 250, the three left-hand drums 1312 represent clerk, merchandise, and account information, respectively. An indicator drum 1312 corresponding to the drum 1311 that supplies mode of operation information is not provided on the rear line of indicator drums. The remaining nine indicator drums 1312, when viewed from left to right at the back of the machine 250 in FIGURE 3, represent amount information considered from the highest order to the lowest order. Thus, the positions of the drums 1311 and 1312 are reversed in order to provide an amount representation that can be read in normal order from left to right in descending denominational order.

As set forth above, the indicator assmbly 260 also supplies information to the printing assembly 266. The printing assembly 266 includes thirteen printing drums or wheels (not shown) which represent the nine digits of numerical information, the account information, the merchandise information, the clerk information and the mode of operation information. The mode of operation drum is secured to a shaft 1331 that is rotatably mounted on the side walls, and the remaining printing drums are secured to a plurality of telescoping shafts or tubes 1333 that are mounted for rotation relative to each other about the axis of the shaft 1331. A gear 1334 is secured to the left end of each of the telescoping shafts 1333.

To provide means for transferring the settings of the indicator racks or slides 1155 to the indicator drums 1312 and the type wheels or drums, each differential assembly 258 in the cash register 250 is provided with a transfer wheel assembly 1345 including three gears or wheels 1346, 1347 and 1348. These three wheels are rotatably mounted on a bearing 1349 carried on a shaft 1350 that is supported between the side walls 961 and 1150, and the transfer wheel units 1345 are supported in spaced positions on the shaft 1350 by a plurality of interposed spacer sleeves 1351. Each of the wheels or gears 1347 is engaged by the teeth on the lower edge of the toothed portion 1155a of the associated indicator rack or slide 1155 (FIGURE 2B) and is connected to the wheel 1346 by a tongue 1346a which is formed integral with the wheel 1346 and which is received within a notch formed in the wheel or gear 1347. Thus, the wheels 1346 and 1347 move together. The wheel 1348 in each of the transfer wheel assemblies 1345 rotates freely about the bearing 1349 and is not connected to the joined wheels 1346 and 1347.

To transmit information from the four indicator racks 1155 in the transaction differential assemblies 258, the driven wheels 1346 in these four assemblies directly mesh with the gears or wheels 1334 secured to the shaft 1331 and the three inner telescoping shafts 1333 to transmit the transaction information to the four transaction type wheels. In addition, the three wheels 1346 driven by the clerk, merchandise and accounting differential assemblies 258 directly mesh with the gears 1316 to set the related indicator drums 1312. However, because the amount information on the indicator drums 1311 and 1312 is to be read from highest order to lowest order when considered from left to right from opposite sides of the machine and because the type wheels in the assembly 266 are also to provide information from lowest to highest order when considered from left to right, the wheels 1346 driven by the amount differential assemblies 258 cannot directly engage the gears or wheels 1334 and 1316.

To accomplish the necessary inversion in order, the transfer wheel assemblies 1345 driven by the amount differential assemblies 258 are disposed on the shaft 1350 so that the connected wheel 1346 is disposed to the left and is used to drive an intermediate motion transmitting system. This motion transmitting system includes a plurality of telescoping shafts or sleeves 1353 (FIGURE 3) which are rotatably mounted on each other for rotation about the axis of a shaft 1354 (FIGURE 2) that is carried between the side walls 961 and 1150. The telescoping shafts 1353 are rotatably mounted on and spaced from each other by the use of split nylon bearings and spacer sleeves. One end of each of the telescoping shafts 1353 is secured to a gear or wheel 1355 that meshes with and is driven by the driven wheel 1346 in one of the transfer wheel assemblies 1345. The other end of each of the telescoping shafts 1353 is secured to a gear or wheel 1356 that meshes with the idler wheel 1348 in the transfer assemblies 1345 connected to the desired indicator drum 1312 and gear 1334.

The indicator assembly 260 includes means for aligning the telescoping shafts 1333 and the indicating drums 1311 and 1312 and for locking these components in adjusted positions between successive cycles of operation of the cash register 250. The locking and aligning means for the telescoping shafts 1333 comprises a locking rail 1370 (FIGURE 2B) which is slidably mounted within slots 1371 formed in the differential assembly supporting plates 1157 and two plates carried on the walls 961 and 1150. The rail 1370 is adapted to engage the teeth formed on the gears 1334 secured to the telescoping shafts 1333. A compression spring 1372 positioned in the opening 1370 and interposed between an arm of a lever 1373 and the rail 1370 normally biases the rail 1370 to the position shown in FIGURE 2B in which it is received within the space between adjacent teeth on the gears 1334. To provide means for shifting the locking rail 1370 into and out of engagement with the wheels 1334, two similar drive means (not shown) are provided. Each of the drive means is disposed adjacent one of the side walls of the frame and each includes one lever 1373 which is pivotally mounted on the frame by a shaft 1374. These drive means pivot the levers 1373 to retract the locking rail 1370 at suitably timed parts of the operating cycle.

To provide means for locking the indicator drums 1311 and 1312, pair of locking members 1382 and 1383 (FIGURES 2B and 3B) are provided for each pair of indicating drums 1311 and 1312, respectively. The outer end of each of these members is formed with a pointed projection adapted to engage the gears 1314 and 1316. The other ends of each of these arms are formed with a U-shaped portion providing a yoke that is pivotally mounted at two points on a shaft 1384 carried between the side walls. The ends of a helical spring 1385 carried on the shaft 1384 between the U-shaped portions continuously biases the member 1382 in a counterclockwise direction about the shaft 1384 and the member 1383 in a clockwise direction about the shaft 1384 to engage the gears 1314 and 1316. The spring 1385 also biases the inner edges of the U-shaped portions into engagement with the sides of a flat shaft 1386.

One end of the flat shaft 1386 is secured to a plate 1387 having an opening through which the shaft 1384 extends. The plate 1387 is pivotally secured to the upper end of a link 1388, and the lower end of the link 1388 is pivotally connected to one of the levers 1373. Thus, when the lever 1373 is pivoted about the shaft 1374 in a clockwise direction at the beginning of each cycle of operation of the cash register, the link 1388 is elevated to turn the shaft 1386 in a clockwise direction about its axis from the normal position shown in FIGURE 3. The opposite sides of the shaft 1336 bear against the yoke portions of the members 1382 and 1383 so that the arms 1382 are pivoted in a clockwise direction about the shaft 1384 against the action of the springs 1385 to move the ends of these members out of engagement with the gears 1314. Similarly, this turning movement of the shaft 1386 moves the members 1383 in a counterclockwise direction about the shaft 1384 against the action of the springs 1385 to lift the ends of the members 1383 out of engagement with the gears 1316. This permits the indicator drums 1311 and 1312 to be set under the control of the differential assemblies 258. When the lever 1373 is restored to its normal position, the link 1388 moves downwardly, and the shaft 1386 is restored to its normal position so that the ends of the members 1382 and 1383 again engage the teeth on the gears 1314 and 1317 to secure the indicator drums 1311 and 1312 in their adjusted positions.

ACCUMULATOR ASSEMBLY 264

The accumulator assembly 264 (FIGURE 2) is operated by the plurality of amount differential assemblies 258 during listing operations to store items of information received from the amount banks 276. During reading operations, the accumulator assembly 264 supplies information through the amount differential assemblies 258 to the indicating assembly 260 and the printing assembly 266, and this information is subsequently returned to storage in the accumulating assembly 264. During resetting operations, the data stored in the accumulator assembly 264 is removed therefrom and transferred through the amount differential assemblies 258 to the indicating assembly 260 and the printing assembly 266. In the illustrated embodiment of the cash register 250, the accumulator assembly 264 includes five totalizer or accumulator lines or shafts providing a customer number register, an account accumulator group, a merchandise accumulator group, a clerk accumulator group, and an itemizing accumulator or itemizer, considered from right to left in FIGURE 2.

The operation of the accumulator assembly 264 is selectively controlled by the transaction banks of the keyboard assembly 256 through an accumulator control unit or means. The accumulator control unit controls the times at which the plurality of accumulator lines are moved into and out of engagement with the amount differential assemblies 258 to control the performance of listing, reading or resetting operations. In addition, the control unit is controlled by the account bank, the merchandise bank, and the clerk bank to select different ones of the plurality of accumulating means provided in each of the accumulator groups for engagement with the amount differential assemblies 258.

The accumulator groups are mounted between a left frame element or wall 1436 and a similar right frame element or wall which are supported beneath the differential assemblies 258 and between the side walls of the main frame of the cash register 250. The side walls including the wall 1436 are secured together in a spaced relation by a plurality of connecting shafts 1438. Each of the accumulator groups includes a shaft 1439 carrying a number of groups of uniformly spaced accumulator gears or wheels 1451 that is equal to the number of individual accumulators provided in each accumulator group. Since the cash register 250 is provided with nine different amount differential assemblies 258, each complete set of accumulator gears on the shafts 1439 includes nine individual accumulator gears 1451 each representing a separate denominational order.

The accumulator control unit raises and lowers one or different combinations of the shafts 1439 to selectively couple the gears 1451 with the toothed portions 1151b on the slides 1151 in read, reset, or list timing to control the transfer of information between the accumulator assembly 264 and the amount differential assemblies 258. The accumulator control unit selects different sets of gears 1451 or different individual accumulators within a selected accumulator group by axially shifting the shafts 1439 under the control of the settings of the transaction differential assemblies 258.

The detailed construction of the accumulator assembly 264 as well as that of the differential assemblies 258, the indicator assembly 260, and the printing or recording assembly 266 is set forth in the copending patent application referred to above.

KEYBOARD ASSEMBLY 256

The keyboard assembly 256 controls and coordinates all of the operations of the cash register 250 and provides means for manually entering digital and control data into the register. In addition, the assembly 256 includes various memory means which permit the operation of only selected key combinations at different points in a transaction, which control the start test means 267 to permit the cash register 250 to be placed in operation only when correct data is sougth to be manually entered, and which control the automatic recovery of certain items of information, such as taxable items, from the accumulator or totalizer assembly 264.

The keyboard assembly 256 (FIG. 4) includes three banks 275 of print keys that are used to enter digital data that is indicated or recorded but is not totalized, such as a numerical designation identifying a sales article. The keyboard assembly 256 also includes five amount key banks 276 that are used to enter digital data, such as amounts or customer numbers, into the cash register 250. Although the amount banks 276 are shown as comprising five banks for entering a five digit number, the accumulating assembly 264 is capable of storing a nine digit number. Thus, the number of amount banks 276 can be expanded, if desirable. Each of the banks 275 and 276 controls a related differential assembly 258.

The keyboard assembly 256 also includes a plurality of transaction banks that are used to enter control information into the cash register 250. The transaction banks include an account bank 277, a merchandise bank 278, and a clerk bank 279, which function as selector banks, a mode of operation bank 280, and a lock bank 281. All of the banks 277–281 except the bank 281 control a selected differential assembly 258. The selector banks 277, 278 and 279 perform the primary function of determining the ones of the totalizers or accumulators in the assembly 264 to which data is directed and from which data is withdrawn. The mode of operation bank 280 selects the type of operation to be performed by the cash register 250, and the lock bank 281 provides means for reading and resetting the accumulators in the assembly 264.

Referring now more specifically to the selector banks, the account bank 277 is effectively or functionally divided into two separate banks, a first of which includes two keys 282 and 283. The credit or charge key 282 is actuated to terminate a series of listing operations in a credit total, and the cash key 283 performs the same function for a cash transaction. The second group or bank in the account bank 277 includes six keys, 284–289, that are used with taxable items. The taxable item keys 287–289 are selectively operated during listing operations to direct amounts on which three different taxes, such as local, state, and federal taxes, are applicable to three separate accumulators in the assembly 264. The tax amount keys 284–286 are used to enter three different tax amounts due into three different accumulators in the assembly 264. The account bank 277 also includes a number of automatically operated keys that are selectively actuated under the control of a memory means during a total operation.

The merchandise bank 278 includes nine keys 290. The lower seven keys "III–IX" (FIGS. 1 and 4) are selectively actuated during data entering operations to direct amounts supplied by the banks 276 to different ones of the accumulators in the assembly 264 in accordance with any desired classification, such as type of merchandise, i.e., groceries, meat, produce, etc. The uppermost two keys "I" and "II" provide refund keys for the adjacent keys in the clerk bank 279. The cash register 250 is controlled to provide a first type of repeated identical entry by manually holding a key in the bank 278 depressed.

The clerk bank 279 includes two lock-type keys 291 which are selectively operated to direct amounts entered by the keys in the amount banks 276 into accumulators in the assembly 264 representing two different clerks. The operaation of one of these keys also free the keyboard assembly for operation by releasing a keyboard lock.

The mode of operation bank 280 includes four manually operable keys 292–295 and additional automatically operable keys that are used to control the setting of the mode of operation differential assembly 258 to select the type or mode of operation to be performed by the cash register 250. The key 292 provides manually actuated means for initiating a total operation of the register 250, and the key 295 provides means for manually initiating a subtotal operation. The key 294 is operated when a customer designation or number is to be registered, and the key 293 is actuated when a second type of repeat operation of the cash register 250 is desired. During this second type of repeat operation, a data item previously entered can be repeatedly entered by locking the indicating assembly 260.

The lock bank 281 includes nine lock keys 300–308. The keys 300 and 301 are used for resetting and reading the clerk accumulators in the assembly 264, respectively, and the keys 302 and 303 are used for resetting and reading the tax accumulators in the assembly 264, respectively. The keys 304 and 305 are used for resetting and reading the cash-credit accumulators in the assembly 264, respectively, and the keys 306 and 307 are used to reset and read the merchandise accumulators in the assembly 264, respectively. The key 308 is actuated when the printing assembly 266 is to issue a receipt during a total operation.

The keyboard assembly 256 also includes a key 309 that is actuated when a motor driven correction of the keyboard assembly 256 is required. The actuation of the key 309 renders a drive motor in the cash register 250 effective to restore or release the actuated keys in the assembly 256.

The keyboard assembly 256 comprises a unitary and separately operable structure that is mounted on the supporting frame for the cash register 250 (FIG. 2) and includes a base or lower plate or wall 310 (FIGS. 2, 5 and 6) to which a pair of side walls 311 and 312 are secured. An apertured top plate 313 (FIG. 6) through which the plurality of keys extends is secured to the flanged upper edges of the side walls 311 and 312. The keyboard assembly 256 is provided with a separate drive shaft 314 (FIGS. 2 and 5) that is driven by and in synchronism with the main shaft of the cash register 250. The drive shaft 314 is rotatably mounted at its opposite ends in the side walls 311 and 312 (FIG. 5) and is connected to a gear 315 that meshes with suitable drive means carried on the main frame of the cash register 250.

Since each keyboard assembly 256 is a unitary, self contained unit, this unit can be constructed and tested independently of the completed cash register 250. In addition, because of the fact that the memory means in each keyboard assembly 256 can be arranged to provide completely different programs of operation for the cash register 250, it is possible to convert one type of cash register into another type of cash register merely by interchanging keyboard assemblies. This flexibility in the programmed operation of the cash register 250 can also be achieved by interchanging coded elements in the memory units in a given keyboard assembly 256.

*Print banks 275 and amount banks 276*

(1) KEYS AND DETENTS

The print banks 275 and the amount banks 276 (FIGS. 4–21), which control the setting of related print and amount differential assemblies 258, are identical and each include a manual correction key 320 and nine keys 321–329 representing the digits "1–9," respectively. Each of the keys 321–329 includes a plastic head portion (FIGS. 6–8) projecting upwardly through an opening in the cover plate 313. The head portion of each of the keys 321–329 includes a transversely extending slot or opening 330 in which the upper end of a key shaft or stem 331 is slidably mounted. The upper end of each of the key stems 331 is provided with an opening 332 into which two lugs 333 and 334 extend. A compression spring 335 is mounted in each of the openings 332 and is retained therein by the lugs 333 and 334. The head portion of each of the keys 321–329 rests on the upper end of the compression spring 335 (FIG. 8) to provide a yielding or resilient connection between the head portions of each of these keys and the key stems 331.

The stems 331 are slidably mounted in transversely extending slots in the plate 310 at their lower ends and are slidably mounted in similar slots in a frame member 336 that is carried on the frame of the keyboard assembly 256. The lower ends of the key stems 331 are disposed above one of the differential assemblies 258 (FIG. 6) in the main body of the cash register 250 so that when a given one of the keys 321–329 is depressed, the related key stem 331 moves downwardly to place its lower end in the path of movement of the two differential elements 1151 and 1152 in the assembly 258. This provides means for arresting movement of the differential assembly 258 in a position corresponding to the value represented by the depressed key.

To provide means for retaining the keys 321–329 in a depressed position, a latch supporting plate 337 (FIGS. 6 and 7) is mounted adjacent the key stems 331 in each of the banks 275 and 276. The plate 337 includes spaced projections 337a along its upper and lower edges that are received within corresponding openings in the base plate 310 and the plate 336. A plurality of detent elements 338 having U-shaped lower ends 338a interposed between the upper surface of the base plate 310 and positioning notches 339 formed in the lower edge of the plate 337 include angularly formed upper end portions 338b that extend through openings 340 in the plate 337. An elongated compression spring 341 secured at its opposite ends to a pair of lugs 342 (FIG. 7B) on the plate 337 is positioned within the offset end portions 338b to resiliently bias the detent elements 338 toward the adjacent edges of the key stems 331. When one of the stems 331 is depressed, a projection 331a (FIG. 6A) cams against the portion 338b to move the adjacent element 338 to the right (FIG. 6) to permit the key stem 331 to move downwardly. When the projection 331a passes beyond the end portion 338b, the spring 342 displaces the detent 338 to the left (FIG. 6) to hold the operated key in a depressed condition.

The keys 321–329 in the banks 275 and 276 are flexible so that the depression of one of these keys prior to the initiation of a cycle of operation of the cash register 250 and following the actuation of another key in the same bank results in the release of the previously depressed key. To accomplish this, each of the banks 275 and 276 includes a coupling assembly comprising a pair of plates 343 and 344 (FIGS. 6 and 7) that are secured together in spaced parallel relation by a plurality of shouldered fasteners 345 which are disposed between and which are secured to depending lugs 343a and 344a on the plates 343 and 344. The lugs 343a and 344a are disposed within suitable openings in the base plate 310, and spaced lugs on the upper edge of the plate 344 are received within suitable openings in the plate 336. The coupling assemblies are mounted adjacent the left-hand edges of the key stems 331 (FIG. 6) in each bank.

Each coupling assembly also includes a plurality of somewhat T-shaped coupling elements 346 (FIGS. 7 and 8) that are disposed adjacent the keys 320–329. The upper end of each of the coupling elements 346 is pivotally mounted between plates 343 and 344 by a pin 347 (FIG. 7) having a large diameter central portion that is received within an opening 348 in the element 346 and two reduced diameter end portions that are received in aligned openings 349 and 350 in the plates 343 and 344, respectively. To interconnect the elements 346 for conjoint movement, the plate 344 is provided with a series of somewhat arcuate openings 351 (FIG. 7) in each of which is mounted the reduced diameter portion of a coupling roller 352. The larger diameter portion of each of the rollers 352 is interposed between and bears against depending leg portions 346a on two adjacent coupling elements 346. In this manner, pivotal movement of one of the coupling elements 346 about the pin 347 results in movement of the remaining coupling elements 346.

To actuate the coupling assembly, each of the key stems 331 includes an arm 353 (FIG. 6) that normally engages the lower surface of the frame element 336 to provide a stop for limiting upward movement of the key stem 331. The arm 353 is received in a slot 354 (FIG. 7A) in the plate 344 and is disposed above a rear arm 346b on the adjacent coupling element 346 and an offset forward arm 346c on the coupling element 346 disposed to left (FIG. 8). Thus, when one of the key stems 331 is depressed and latched in a depressed condition by the associated detent 338, the lower edge of the arm 353 engages the upper surface of the adjacent arm 346b so that this coupling element pivots in a counterclockwise direction (FIGS. 7 and 8) to displace the roller 352 to the right (FIG. 8). This produces a corresponding counterclockwise pivotal movement of the coupling elements 346 disposed to the right of the actuated coupling element.

When these elements 346 are pivoted in a counterclockwise direction the offset arms 346c move upwardly. If one of the keys disposed to the right of the actuated key is in a depressed condition, the arm 353 on this key is engaged by the arm 346c on the related coupling element 346, and this key stem 331 is moved upwardly until the upper edge of the arm 353 on this key stem engages the lower surface of the frame element 336. During this movement, the associated detent 338 is deflected to the right (FIG. 6) against the resilient force supplied by the spring 341. Similarly, the arm 346c engaged by the arm 353 on the actuated key stem 331 pivots the coupling elements 346 disposed to the left of the operated key in a clockwise direction. This clockwise movement of the actuated coupling element 346 displaces the rollers 352 that are positioned to the left of the actuated key so that the coupling elements 346 disposed to the left of the actuated key are pivoted in a clockwise direction. This moves the arms 346b on these coupling elements upwardly so that any previously depressed key positioned to the left of the key that has just been depressed is restored to normal position. Therefore, the depression of one of the keys 321–329 in the banks 275 or 276 restores any previously operated key in the bank to its normal condition.

An operated or depressed one of the keys 321–329 in the banks 275 and 276 can also be restored to a normal condition by manually actuating the related correction key 320. The correction key 320 includes a correction key stem 355 (FIGS. 7 and 8A) that is slidably mounted in the frame 336 at its lower end and includes a projection at its upper end that is received within a slot in the lower end of the button or head of the key 320. The correction key stem 355 includes a pair of openings 356 and 357. A compression spring 358 is mounted in the opening 357 and carried on the key steam 355. The lower end of the compression spring 358 bears against the upper surface of the frame element 336 and provides means for resiliently biasing the correction key 320 to its normal upper position which is determined by engagement of the lower edge of the opening 356 with a shaft or rod 359 that is carried on the frame structure of the keyboard assembly 256.

The correction key 320 includes a second correction key shaft or stem 360 that is slidably mounted on both the frame element 336 and another frame element or channel 361 that is secured to and extends transversely across the front of the frame of the keyboard assembly 256. The shaft 360 includes an offset arm 360a (FIG. 7A) that is normally disposed within the opening 356 to engage the upper edge thereof. When the correction key 320 is depressed, the key stem 355 moves the key stem 360 downwardly through a distance determined by the engagement of the upper edge of the opening 356 with the rod 359. During this movement, the lower end of the key stem 360 engages the arm 346b on the coupling element 346 associated with the correction key 320. This produces counterclockwise rotation of all the coupling elements 346 through the movement to the right (FIG. 8) of the rollers 352. The elevated arms 346c of the coupling elements 346 restore any operated one of the keys 321–329 to its normal condition. When the correction key 320 is released, the compression spring 358 restores this key to the normal position shown in FIG. 8.

(2) GROUP SLIDE

Each of the amount banks 276 includes a group slide 364 (FIGS. 6, 7 and 21) which rests on the upper surface of the base plate 310 and is slidably connected to the plate 344 by a shouldered and headed fastener 365. The fastener 365 passes through an opening 366 in the slide 364 and is secured to the plate 344. The upper edge of the slide 364 is formed with nine projections 367 (FIG. 21A) each having an inclined edge 367a. In the normal position of slide 364 one of the inclined edges 367a is disposed immediately beneath a projection or arm 368 (FIG. 6A) on each key stem 331.

The group slides 364 are actuated by the keys in the amount banks 276 to supply the mode of operation bank 280 with information indicating that at least one amount key has been actuated. The group slides 364 are also selectively locked against movement by the mode of operation bank 280 to prevent operation of the keys in the amount banks 276 in accordance with the program of the cash register 250. When a key in a selected one of the banks 276 is operated, the arm 368 on the depressed key stem 331 engages the inclined portion 367a on the adjacent projection 367 so that the slide 364 is displaced downwardly and to the left (FIGS. 7 and 21) to permit the arm 368 to be received within the notch formed in the upper edge of the slide 364 by two adjacent projecting portions 367.

The upper end of the group slide 364 is connected to one arm of an L-shaped level 369 (FIG. 21) that is pivotally mounted on a post 370 secured to the frame elements 310 and 336. The other arm of the lever 369 is received within an elongated slot (not shown) in a connecting slide 371 that is movably mounted on the frame of the keyboard assembly 256. The group slides 364 in the remaining banks 276 are connected to the single connecting slide 371 in the same manner as the slide 364. The other end of the slide 371 disposed adjacent the mode of operation bank 280 is connected to one arm of another L-shaped lever 372. The lever 372 is pivotally mounted on a post 373 that is secured to the frame elements 310 and 336. The other arm of the lever 372 passes through enlarged openings in a plurality of mode of operation group slides and is received within a recess formed in an amount group slide 374 located in the plurality of group slides in the mode of operation bank 280.

When the group slide 364 is moved downwardly and to the left (FIG. 21), the lever 369 pivots in a counterclockwise direction to move the connecting slide 371 to the left. This pivots the arm 372 about the post 373 in a counterclockwise direction so that the amount group slide 374 in the mode of operation bank 280 is moved upwardly and to the right to a displaced position. By displacing the slide 374, the mode of operation bank 280 is provided with an indication that at least one key in the amount banks 276 has been actuated.

The group slides 364 are restored to a normal position by the start test assembly 267 which attempts to move the mode of operation group slides to a normal position at the beginning of each cycle of operation of the cash register 250. If the keys in the banks 276 are not operated, the assembly 267 moves the slide 374 downwardly and to the left (FIG. 21) to pivot the lever 372 in a clockwise direction so that the connecting slide 371 is moved to the right to pivot the lever 369 in a clockwise direction. This moves the slide 364 upwardly and to the right to its normal position in which the inclined portions 367a are disposed beneath the arms 368 on the key stems 331.

As indicated above, the mode of operation bank 280 also controls the setting of the amount group slides 364 so that the amount banks 276 are freed for manual operation in accordance with the programmed operation of the cash register 250. More specifically, if the amount group slide 374 in the mode of operation bank 280 is locked in its normal position, the slide 371 is locked against movement. When an attempt is made to depress one of the keys in the banks 276, the arm 368 on the actuated key bears against the inclined edge 367a but is unable to move the slide 364. This positively prevents depression of the key.

(3) KEY LATCHING SLIDE

The print banks 275 and the amount banks 276 each include a slide that must positively latch any actuated key in a depressed condition before the cash register 250 can be operated through a complete cycle of operation. To perform this function, each of the banks 275 and 276 includes a latching slide 375 (FIGS. 6, 7 and 20) that is slidably mounted on the lower wall 310 in a position interposed between the group slide 364 and the plate 344.

This movement of the slide 375 is guided by the shouldered portions of the two fasteners 365 which pass through two openings 376 (FIG. 7A) in the slide 375. Each of the slides 375 includes a plurality of somewhat L-shaped projecting portions 375a that cooperate with a plurality of arms or projections 368 on the key stems 331 to lock a depressed key stem 331 in a depressed position and to block depression of a key stem 331 that is in its released condition.

In the normal position of the slide 375, the arms 368 are disposed in vertical alignment with the openings between successive ones of the projection 375a on the slide 375. This permits the keys in the banks 275 and 276 to be depressed so that the arm 368 of the depressed key is moved into the notch formed on the slide 375 between adjacent ones of the projections 375a. When the slide 375 is moved upwardly and to the right (FIG. 7) the arm of the projection 375a associated with the depressed key passes over the top of the arm 368 to latch the depressed key stem 331 in its depressed condition. The arms on the projections 375 disposed adjacent released keys are moved beneath the arms 368 to prevent the associated key stems 331 from being moved downwardly to a depressed conditions. When the slide 375 is moved downwardly and to the left (FIG. 7), the latched key stem 331 is released, and the remaining key stems 331 are freed for actuation. When the latching slide 375 is moved to the right, a blocking portion 375b (FIG. 7) on the slide 375 is moved beneath a lug 355a on the correction key stem 355. This prevents manual actuation of the correction keys 320 after the slide 375 has been operated.

To provide means for shifting the latching slides 375, a plate 378 (FIGS. 5 and 20) is slidably mounted on the frame element 310. The plate 378 is provided with a plurality of L-shaped projecting portions 378a that are received within a plurality of notches 379 (FIG. 7A) formed in the lower edges of the latching slides 375. The plate 378 is also provided with a plurality of projecting tongue portions 378b (FIGS. 5 and 20) having openings in which are disposed arms on a pair of levers 380 that are pivotally mounted on the drive shaft 314. The levers 380 each include a notch in which is mounted a pin 381 secured to an arm 382. The two arms 382 are rigidly secured to a shaft 383 that is pivotally mounted on the side walls 311 and 312 of the frame. An additional arm 384 is secured to the shaft 383 adjacent the side wall 312 and is provided with a pin 385 that is adapted to be received within a notch formed in one end of a link 386. The link 386 is mounted on the main body of the cash register 250 and forms a part of the start test assembly 267. When the keyboard assembly 256 is mounted on the main frame of the cash register 250, the pin 385 is disposed in the notch in the link 386 to interconnect the shaft 383 and the link 386.

When the link 386 is moved to the right (FIG. 20) the shaft 383 is pivoted in a clockwise direction so that the pins 381 on the arms 382 pivot the levers 380 in a counterclockwise direction about the shaft 314. This moves the plate 378 and the latching slides 375 that are connected thereto to the right. As described above, this latches the actuated key stems 331 in a depressed condition and blocks manual operation of the released keys. Toward the end of the operating cycle of the cash register the link 386 is shifted to the left to pivot the shaft 383 in a counterclockwise direction. This pivots the arms 380 in a clockwise direction so that the plate 378 is moved to the left (FIG. 20) or downwardly (FIG. 5) to return the latching slides 375 to their normal positions. This permits the depressed key to be restored to a normal condition and frees the remaining keys for manual actuation.

(4) KEY RESTORING MEANS

The keyboard assembly 256 includes means driven by the main shaft 314 in the keyboard assembly for automatically restoring the depressed keys in the print banks 275 and the amount banks 276 to a normal condition at the end of a cycle of operation of the cash register 250 under the control of the mode of operation bank 280. The power driven means for automatically resetting or restoring the print banks 275 and the amount banks 276 operates on the plurality of manual correction keys 320.

More specifically, the restoring means includes a plurality of arms 390 (FIGS. 5 and 16–19) that are secured in spaced positions on a shaft 391 by a spaced plate 392. Each of the arms 390 is disposed within a notch 393 (FIG. 7A) in the second key stem 360 of each of the correction keys 320 and is guided for pivotal movement by an aligned slot 394 (FIGS. 16–18) in the frame element 361.

Figure 5:
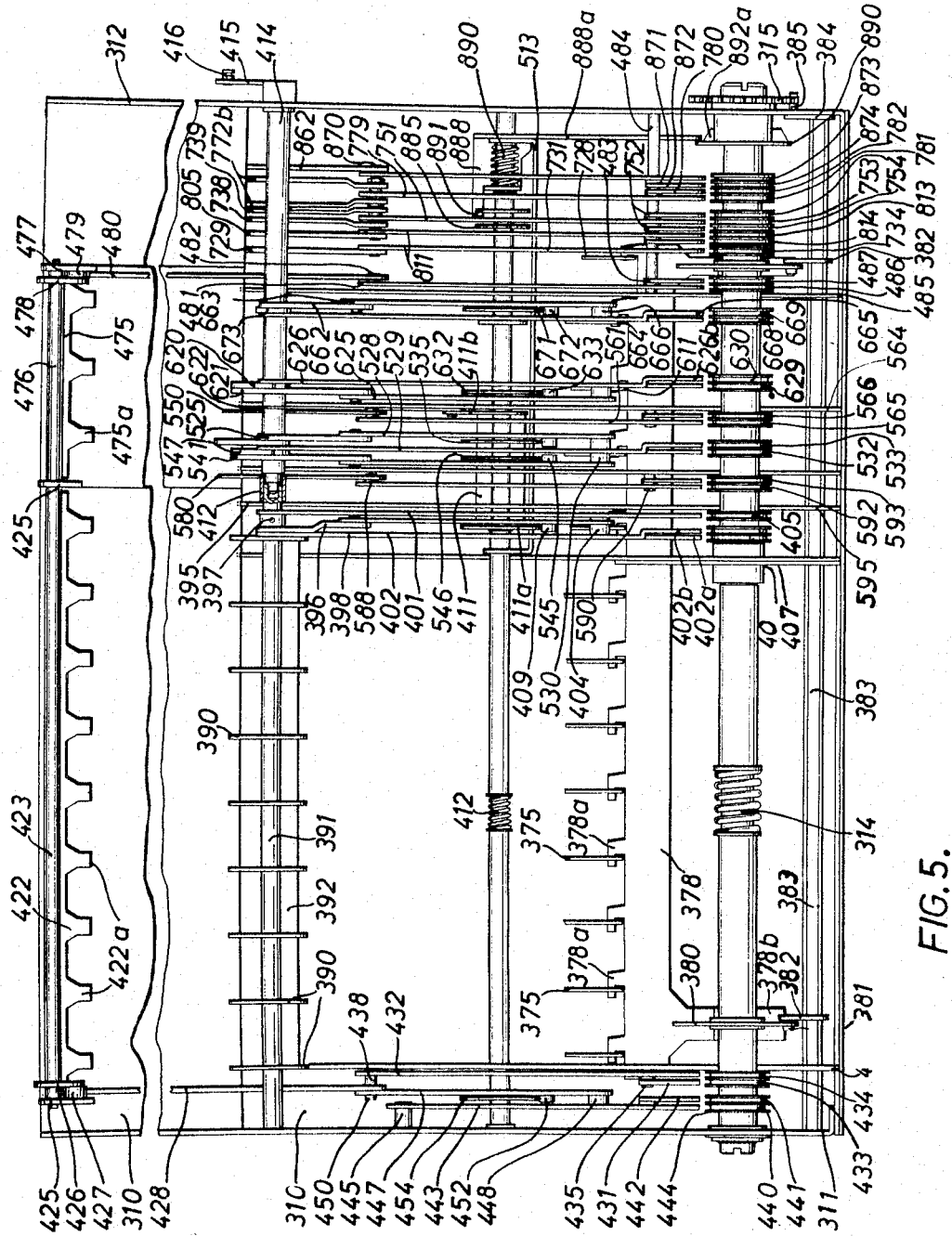
FIGURE 5 is a schematic view illustrating different drive assemblies provided in the keyboard assembly.

To provide means for operating the arms 390, the shaft 391 is pivotally mounted on the side wall 311 of the frame of the keyboard assembly 256 at one end and at its other end in an intermediate upright frame element 395 (FIG. 5). An arm 396 (FIGS. 5 and 17–19) is rigidly secured to the shaft 391 adjacent the frame element 395 by a pin 397 that passes through a hub portion 396a (FIG. 19) of the arm 396. The lower end of the arm 396 is pivotally connected to the upper end of a sensing link by a pin 399 that is received within an opening 400 in the link 398. The lower end of the link 398 is pivotally connected to the lower end of a cam follower lever 401 and the lower end of an arm 402a of a cam follower lever 402 by a pivot pin 403 and a plurality of spacers or washers 404.

The lever 401 is pivotally mounted on the shaft 391 adjacent the hub 396a and includes a projecting portion 401a that engages the periphery of a cam 405 which is keyed or rigidly secured to the drive shaft 314. The cam follower lever 402 is also pivotally mounted on the shaft 391 adjacent the arm 396 and is actuated by a pair of cams 406 and 407 that are keyed to the drive shaft 314. The arm 402a of the lever 402 includes a projecting portion 402c (FIG. 18) that engages the outer periphery of the cam 406, and the arm 402b includes a projecting portion 402d that engages the outer periphery of the cam 407. The cams 405–407 are provided with suitable discs 408 mounted on the shaft 314 to insure correct alignment between these cams and the cam engaging or follower portions 401a, 402c and 402d.

The cam follower levers 401 and 402 provide means for selectively pivoting the shaft 391 toward the end of a cycle of operation of the cash register 250 to reset the print banks 275 and the amount banks 276 to a normal condition in accordance with the operated or released condition of the keys 290 in the merchandise bank 278 used to control the first type of repeat operation. To control the effectiveness of the levers 401 and 402 to restore the banks 275 and 276, a pin 409 secured within an opening 410 in the detecting link 398 tests against a coded means provided by the configuration of an end portion of a yoke 411 that is pivotally mounted on a shaft 412. More specifically, the end of the yoke 411 includes a projecting portion 411a which is moved into the path of movement of the pin 409 when the banks 275 and 276 are to be restored and which is held out of the path of movement of the pin 409 when these banks are not to be restored.

The yoke 411 is normally set in the position shown in FIG. 16. Toward the end of the operating cycle of the cash register, the locking slides 375 are retracted, and an attempt is made to restore an operated key in the merchandise bank 278 to its normal position (see line 1 in FIG. 82). If the merchandise key is restored, indicating that a repeated entry is not to be made, the yoke 411 is pivoted about the shaft 412 in a counterclockwise direction to the position shown in FIG. 17 so that the projecting portion 411a is placed in the path of movement of the detecting pin 409. Alternatively, if the data item previously entered into the keyboard assembly 256 is to be again entered into the cash register 250, the attempt to reset the operated key in the merchandise bank 278 is not effective, and the yoke 411 remains in the position shown in FIG. 16.

Assuming that the yoke 411 is pivoted in a counterclockwise direction to the position shown in FIG. 17, the resetting of the print banks 275 and the amount banks 276 is initiated at 286° of rotation of the main shaft of the cash register 250 (see lines 2 and 4 in FIG. 82). At this point, the cams 405–407 pivot the arms 401 and 402 about the shaft 391 in a counterclockwise direction so that the link 398 is moved to the right from the position shown in FIG. 16 toward the position shown in FIG. 17. During this movement, the pin 409 engages the projecting portion 411a on the yoke 411 so that during the last portion of the movement of the levers 401 and 402, the link 398 is pivoted in a counterclockwise direction about the pin 403 to pivot the arm 396 in a clockwise direction from the position shown in FIG. 16 to the position shown in FIG. 17.

This movement of the arm 396 pivots the shaft 391 in a clockwise direction so that all of the arms 390 turn in a clockwise direction. The engagement of the ends of the arms 390 with the key stems 360 moves these stems downwardly from the position shown in FIG. 16 to the position shown in FIG. 17. The downward movement of the key stems 360 pivots the connecting links 346 in a counterclockwise direction about the pins 347 so that all of the depressed keys in the banks 275 and 276 are elevated or restored to their normal condition. Continuing movement of the shaft 314 pivots the arms 401 and 402 in a clockwise direction (see lines 2 and 4 in FIG. 82) so that the arm 396, the shaft 391 and the arms 390 are pivoted in a counterclockwise direction. This permits the key stems 360 to be restored to their normal positions.

Assuming that a repeat listing operation is to be performed so that the yoke 411 remains in the position shown in FIGS. 16 and 18, the rotation of the main shaft 314 produces the counterclockwise movement of the levers 401 and 402 described above. However, the projection 411a is not disposed in the path of movement of the pin 409, and the link 398 moves fully to the right to the position shown in FIG. 18. Thus, the arm 396 is not pivoted in a clockwise direction, and the shaft 391 and the arms 390 secured thereto are not turned in a clockwise direction to depress the plurality of key stems 360 in the correction keys 320. Therefore, the print banks 275 and the amount banks 276 are not cleared. The continuing rotation of the main shaft 314 restores the cam follower levers 401 and 402 and the elements controlled thereby to the positions shown in FIG. 16 at the end of the operating cycle of the cash register 250.

As indicated above, the resetting or restoring means for the banks 275 and 276 can also be operated by the start test means 267 under the control of the motor correction key 309. To accomplish this, a sleeve 412 (FIGS. 5 and 42) is secured to the end of the shaft 391 adjacent the right side of the frame element 395 (FIG. 5). The sleeve 412 includes two opposite notched portions 412a (FIG. 42) at its outer end that are adapted to receive the opposite ends of a pin 413 carried on one end of a shaft 414. The shaft 414 is rotatably mounted on the frame for the keyboard assembly 256 and is secured to a crank arm 415 (FIG. 5) carrying a pin 416 adjacent the side wall 312 of the frame. The pin 416 connects the crank arm 415 to the start test assembly 267 and is operated by this assembly to pivot the shaft 414 in a clockwise direction (FIG. 42). When the shaft 414 is pivoted in a clockwise direction, the ends of the pin 413 engage the notched portions of the sleeve 412 to pivot the shaft 391 in a clockwise direction. This resets the print banks 275 and the amount banks 276 in the manner described above. The notches 412a formed in the sleeve 412 permit the shaft 391 to be pivoted by the arm 396 without causing a corresponding movement of the shaft 414.

(5) ZERO STOP MEANS

Each of the print banks 275 and the amount banks 276 in the keyboard assembly 256 includes a zero stop means that is effective during certain modes of operation of the cash register 250 to arrest the differential assemblies 258 in a zero position when the keys in the associated banks 275 and 276 have not been operated. In general, the zero stop means comprises a stop element or automatically actuated key stem that is normally retained in an ineffective position. This stop element is freed for movement to a depressed or effective position at the beginning of a cycle of operation of the cash register, and this detent element tests whether or not a key in the bank has been actuated. If no keys have been actuated, the stop element moves to a depressed position in which it is effective to prevent movement of the related differential assembly 258. Alternatively, if a value representing key has been actuated, the zero stop key stem is retained in an ineffective position.

At this point in the cycle of operation of the cash register 250, a detecting means tests to determine whether the mode of operation being performed is one in which the differential assemblies 258 associated with the banks 275 and 276 are to be set under the control of the keyboard assembly 256 or are to be set under the control of other means, such as the accumulator assembly 264. If the differential assemblies 258 are to be set under the control of the keyboard assembly 256, the zero stop key stems remains in their effective or ineffective positions in accordance with the selective actuation of the keys in related banks 275 and 276. Alternatively, if the selected mode of operation requires the differential assemblies 258 to be set under the control of the accumulator assembly 264, for instance, the zero stop control means automatically restores all of the zero stop elements to an ineffective position prior to the actuation of the differential assemblies 258.

The zero stop means in each of the print banks 275 and the amount banks 276 includes a zero stop detent element or key stem 420 (FIGS. 7–10) that is slidably mounted in the frame elements 336 and 310. The key stem 420 also includes an offset portion 420a that is slidably mounted in the frame element 336 to be disposed above the arm 346d on the coupling link 346 associated with the key 329. A tension spring 421 connected between a projecting portion 344b on the plate 344 and an offset portion 420b at the upper end of the key stem 420 provides means for resiliently biasing the zero stop key stem 420 downwardly.

To provide means for selectively rendering the key stem 420 effective and ineffective, a plate 422 (FIGS. 5 and 8–10) secured to a shaft 423 is provided with a plurality of projecting lugs 422a. The lugs 422a are received within openings 424 formed in the upper ends of the key stems 420. The shaft 423 is pivotally mounted on the frame element 336 by a pair of brackets 425 and is secured at one end to an arm 426 carrying a cam follower roller 427. The tension springs 421 act on the key stems 420, the plate 422 and the shaft 423 to bias the roller 427 into engagement with the upper surface of a control slide 428 that is slidably connected to the side wall 311 by a headed fastener 429 (FIG. 8B) that passes through an elongated opening 430 in the control slide 428.

The upper edge of the slide 428 includes a lower surface 428a and an upper surface 428b. In the position of the slide 428 when the cash register 250 is in a normal condition between cycles of operation, the roller 427 engages the upper surface 428b on the slide so that the plurality of zero stop elements 420 are secured in an elevated position (FIG. 8B) against the action of the plurality of tension springs 421. When the slide 428 is shifted to the right to the position shown in FIG. 9, the roller 427 engages the lower surface 428a, and the shaft 423 is pivoted in a counterclockwise direction so that the lugs 422a are lowered within the openings 424.

If one of the keys 321–329 in the bank associated with a particular zero stop element 420 has been actuated, the end coupling link 346 has been pivoted in a counterclockwise direction so that the end of the arm 346d engages the lower end of the offset portion 420a. This prevents the zero stop element 420 from moving downwardly under the influence of the tension spring 421. Alternatively, if one of the keys in the associated bank has not been operated so that the coupling link 346 associated with the last key 329 in the bank remains in the position shown in FIG. 9, the tension spring 421 lowers the associated zero stop stem 420 to the position shown in FIG. 9. In this position, the lower end of the stem 420 is in an effective position to prevent movement or operation of the associated differential assembly 258.

When the slide 428 is moved to the left to the position shown in FIG. 8, the engagement of the roller 427 with the upper surface 428b pivots the arm 426 and the shaft 423 in a clockwise direction so that the lugs 422a on the plate 422 engage the upper edges of the openings 424 in the key stems 420 so that these stems are restored against the force of springs 421 to the normal position shown in FIG. 8. The slide 428 is restored to the position shown in FIG. 8B before the operation of the differential assemblies 258 in those modes of operation selected by the bank 280 in which the assemblies 258 are not to be set by the keyboard assembly 256. Alternatively, the slide 428 is restored to the normal position shown in FIG. 8 following the setting of the differential assemblies 258 in those modes of operation in which the assemblies 258 are to be set under the control of the keyboard assembly 256.

To provide means for positively shifting the slide 428 to the right (FIG. 8) at the beginning of each cycle of operation of the cash register 250 and to provide means for positively moving this slide to the left to its normal position toward the end of each cycle of operation of the cash register, a pair of cam follower levers 431 and 432 (FIGS. 11, 12 and 14) controlled by a pair of cams 433 and 434, respectively, are provided. The cam follower levers 431 and 432 are rigidly secured together and are pivotally mounted on a stub shaft 435 that is carried by an upright frame element 436 (FIG. 5) carried on the frame of the keyboard assembly 256. A projection 431a on the lever 431 engages the outer periphery of the cam 433, and a projection 432a on the lever 432 engages the outer periphery of the cam 434. The cams 433 and 434 are keyed to the main shaft 314, and a plurality of discs 437 disposed adjacent the cams 433 and 434 guide movement of the levers 431 and 432. The upper end of the lever 432 carries a pin 438 that is received within a notch 439 formed in the upper edge of the front end of the slide 428.

As the main shaft 314 is rotated through 3° to 80° (see line 3 in FIG. 81), the cams 433 and 434 pivot the levers 431 and 432 in a clockwise direction about the shaft 435 so that the slide 428 is moved to the right to the position shown in FIG. 12. After the main shaft 314 has been advanced through 200° of rotation (see line 3 in FIG. 81), the cams 433 and 434 pivot the levers 431 and 432 in a counterclockwise direction so that the slide 428 is moved to the left from the position shown in FIGS. 9 and 12 to the normal position shown in FIGS. 8 and 11. During this movement, the shaft 423 is pivoted in a clockwise direction so that all of the zero stop elements 420 are retracted. Accordingly, the cams 433 and 434 and the levers 431 and 432 provide means for positively shifting the zero stop control slide 428 from a normal position in which the zero stop means are ineffective to a position in which the zero stop means are selectively rendered effective in accordance with the presence or absence of operated keys in the related banks 275 and 276. This means also restores the slide to normal after 200° of rotation of the main shaft.

The zero stop assembly also includes a second control means driven by the main shaft 314 and controlled by the mode of operation bank 280 by which the slide 428 is selectively returned to its normal position (FIG. 8) prior to the time at which it is restored by the levers 431 and 432. This operating or control means includes a pair of cams 440 and 441 (FIGS. 5, 8–10, 13 and 15) for operating a pair of cam follower levers 442 and 443, respectively. The cams 440 and 441 are keyed to the shaft 314 and are provided with adjacent discs 444 (FIG. 15) mounted on the shaft 314 for guiding movement of the cam follower levers 442 and 443. These levers are rigidly secured together and are pivotally mounted on the side wall 311 by a stub shaft or pivot pin 445. The lever 442 is provided with a projecting portion 442a that engages the outer periphery of the cam 441, and the lever 443 is provided with a projecting portion 443a that engages the outer periphery of the cam 440. The lower end of the lever 443, which moves within a slot 446 formed in the base plate 310, is pivotally connected to the lower end of a link 447 by a pivot pin 448 and a spacing sleeve 449. The upper end of the link 447 carries a pin 450 that is received within a notch 451 formed in a lower front edge of the control slide 428. A detecting pin 452 is mounted in an opening 453 on the link 447.

Figure 75:
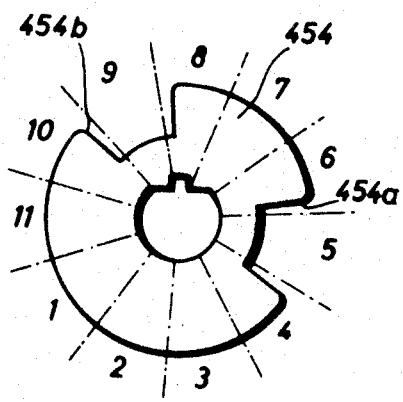
Figure 77:
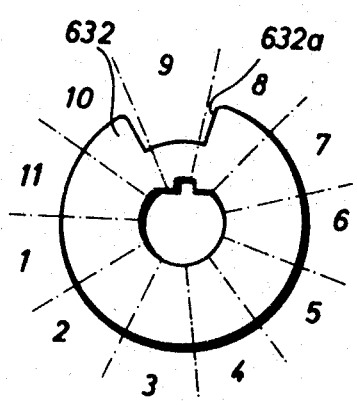
Figure 76:
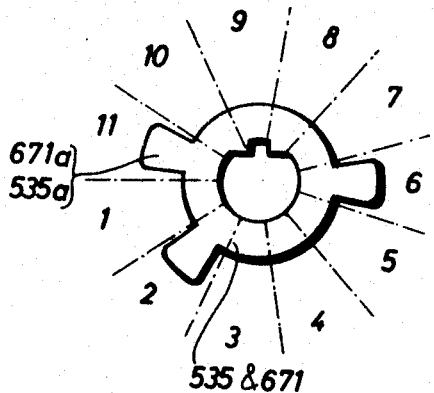
Figure 78:
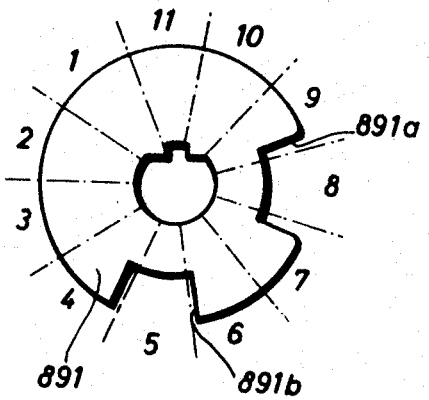

As indicated above, the drive means provided by the cams 440 and 441 and the levers 442 and 443 is selectively rendered effective or ineffective to return the slide 428 to its normal position in advance of its normal return in dependence on the type of operation that has been selected for the cash register 250 by the mode of operation bank 280. To provide this selective control, a coded control member or disc 454 is provided which is keyed to the shaft 412. The shaft 412 is moved to one of eleven different angular settings corresponding to the eleven settings of the mode of operation differential assembly selected by the bank 280. As shown in FIG. 75 of the drawings, the control disc 454 includes two recesses 454a and 454b that are moved into the path of movement of the pin 452 when the shaft 412 is adjusted to settings representing the fifth and ninth settings of the mode of operation bank 280. These settings correspond to operations in which the cash register 250 is conditioned to enter a customer number or designation and an amount, respectively, through the amount banks 276.

Assuming that a resetting or a reading operation is to be performed by the cash register so that the differential assemblies 258 are not to be controlled by the keyboard assembly 256, the control slide 428 must be returned to its normal position before the operation of the print and amount differential assemblies 258 is initiated. Accordingly, the shaft 412 is rotated to a setting in which the outer periphery of the disc 454 is disposed in the path of movement of the pin 452 by the time that 93° of movement of the main shaft 314 has been completed (see line 6 in FIG. 81). During this interval, the levers 431 and 432 are operated to shift the slide 428 to the right to the position shown in FIG. 9 (see line 3 in FIG. 81). Beginning at 90° (see line 2 in FIG. 81), the cams 440 and 441 pivot the levers 442 and 443 in a counterclockwise direction about the shaft 445 from the position shown in FIGS. 9 and 15 to the position shown in FIG. 10. During this movement, the link 447 moves to the left so that the pin 452 bears against the periphery of the disc 454.

During continuing counterclockwise movement of the lever 443 ending at 125° (see line 2 in FIG. 81), the link 447 is pivoted about the pin 452 so that the upper end of this link and the pin 450 are moved to the left from the position shown in FIG. 9 to the position shown in FIG. 10. This moves the link 428 to the left from the position shown in FIG. 9 to the position shown in FIG. 10 so that the roller 427 again engages the elevated surface 428b on the slide 428. This retracts the zero stop elements 420 and is completed before the operation of the print and amount differential assemblies (compare line 2 in FIG. 81 and line 7 in FIG. 81) so that these assemblies can be set by control means other than the keyboard assembly 256. Since the control slide 428 has been restored to its normal position under the control of the levers 442 and 443, the subsequent movement of the levers 431 and 432 at 200° of rotation of the main shaft 314 (see line 3 of FIG. 81) does not serve any useful function. The levers 442 and 443 are restored to a normal condition in the interval between 260° and 300° of rotation of the main shaft 314 (see line 2 in FIG. 81).

If the cash register operation selected by the mode of operation bank 280 is one in which a number or amount is entered by the banks 275 and 276, the zero stop means must be effective, and the levers 442 and 443 must be rendered ineffective to return the slide 428 to its normal position prior to the time at which this slide is returned by the levers 431 and 432. Accordingly, the shaft 412 is set to a position in which one of the recesses 454a or 454b is disposed in the path of movement of the pin 452 prior to the time in which the cams 440 and 441 pivot the levers 442 and 443 in a clockwise direction from the position shown in FIGS. 8 and 15. The rotation of the main shaft 314 in the interval between 90° and 125° again pivots the lever 443 in a counterclockwise direction. However, the pin 452 now moves into one of the recesses 454a or 454b (FIGS. 13 and 75), and the link 447 is not pivoted in a counterclockwise direction about the pin 452. Thus, the slide 428 remains in the position shown in FIG. 9 in which the zero stop detent elements 420 associated with the banks 275 and 276 in which keys have not been depressed are disposed in the path of movement of the associated differential assemblies 258. Since the slide 448 is not reset by the levers 442 and 443, this slide is reset in the manner described above by the levers 431 and 432 in the interval between 200° and 245° of movement of the main shaft 314 (see line 3 of FIG. 81).

*Account bank 277*

(1) GENERAL CONSTRUCTION

Figure 22:
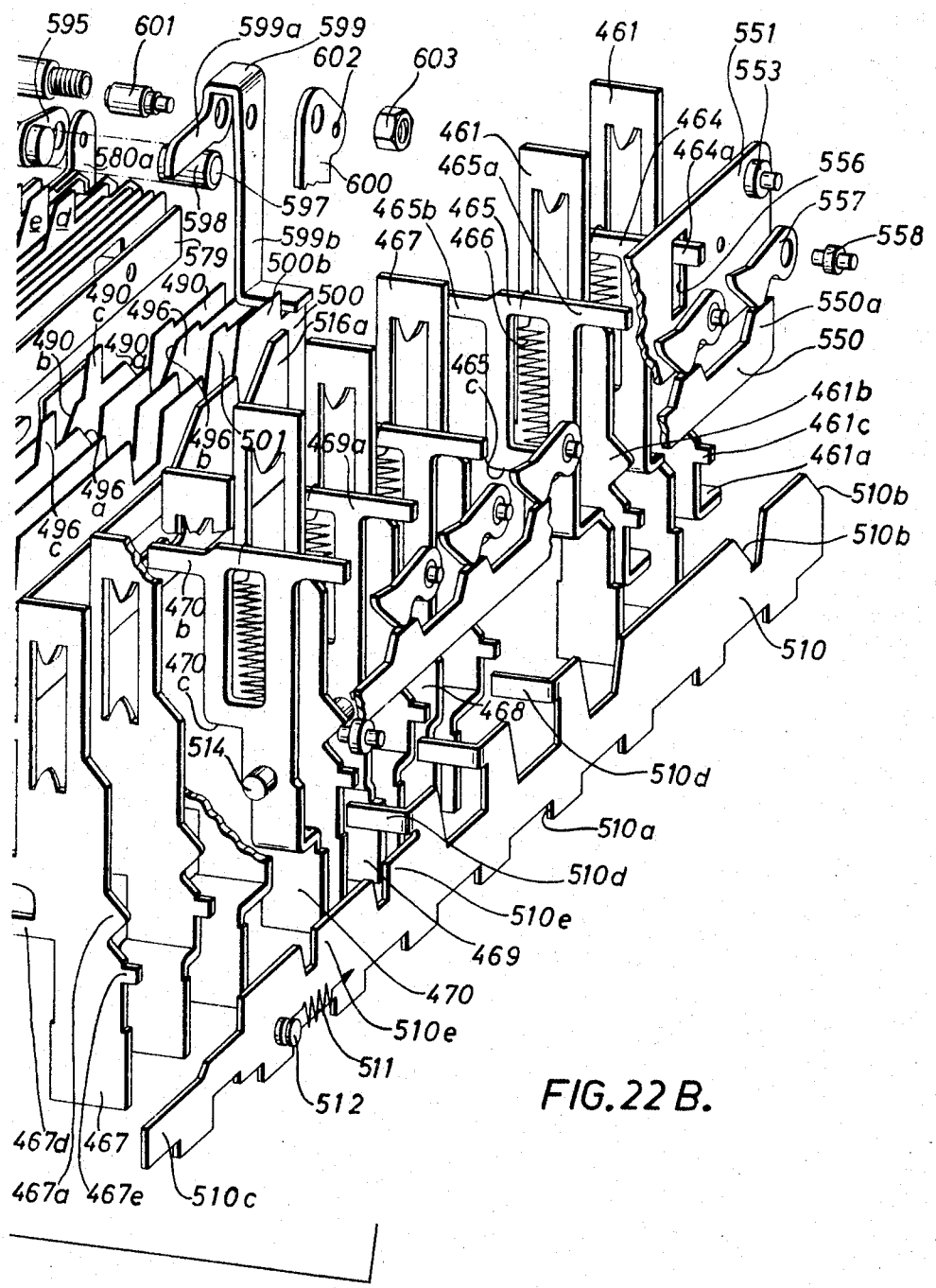

The account bank 277 (FIGS. 6 and 22–44) comprises one of the selector banks provided in the plurality of transaction banks in the keyboard assembly 256 of the cash register 250. This bank is functionally divided into what might be considered to be two separate selector banks. The first of these groups includes the credit or charge key 282 and the cash key 283 that are used to initiate the operation of the cash register 250 when totals are to be respectively accumulated in a cash or credit totalizer. The second functional group in the account bank 277 comprises the tax keys 284–289. The keys 287–289 form taxable item keys and are operated during listing operations to store amounts relating to three different classes of taxable items in three separate accumulators. The keys 284–286 are tax amount keys and are selectively rendered effective during total taking operations to enter taxes due on the amounts stored during the listing operations. The account bank 277 also includes two automatically operated keys associated with the keys 282 and 283 and three automatically operated keys associated with the manually operable keys 287–289. The automatically operative keys in the account bank 277 are selectively actuated in sequence under the control of an account memory assembly 460 (FIGS. 6 and 22).

The cash-credit portion of the account bank 277 includes a pair of key stems 461 (FIGS. 22 and 23) which are slidably mounted on the frame element 336 and which are secured to the head or button portions of the keys 282 and 283 in the same manner as in the amount banks 276. However, the lower ends of the key stems 461 do not extend through the frame element 310 to provide means for controlling the setting of the account differential assembly 258. The lower ends of the stems 461 are each provided with an offset portion 461a having an opening in which is slidably mounted a pin 463 secured to the base 310 of the frame structure (FIG. 23).

The cash-credit portion of the account bank 277 also includes a pair of automatically actuated keys 464 and 465 (FIGS. 22 and 23) that represent credit and cash transactions, respectively. The credit automatic key 464 and the cash automatic key 465 are slidably mounted on the frame elements 310 and 336 and the lower ends of the keys 464 and 465 are adapted to be selectively moved to positions projecting below the plate 310 to control the setting of the account differential assembly 258 under the control of the memory assembly or means 460 and the keys 282 and 283. The keys 464 and 465 are biased downwardly by a tension spring 466 connected between an upper portion of each of these keys and the frame element 336.

The tax portion of the account bank 277 includes the six keys 284–289, each of which is provided with a key stem 467 that is slidably mounted in the frame elements 310 and 336. The key stems 467 are secured to the head or button portions of the keys 284–289 in the same manner as in the banks 275 and 276. The tax portion of the account bank 277 also includes three automatically operable keys 468, 469 and 470 representing the first, second and third taxable items, respectively. These automatically operable keys, which are similar to the keys 464 and 465, are slidably mounted on the frame elements 310 and 336 and are normally biased downwardly by individual tension springs 466 connected between the frame element 336 and an upper portion of each of these keys. The lower ends of the keys 468, 469 and 470 are automatically moved below the wall element 310 under the control of the memory means 460 to provide means for controlling the setting of the associated account differential assembly 258.

The table below lists the positions to which the account differential assembly is adjusted by the actuation of the different manual and automatic keys in the bank 277.

| Key | Position of Account Differential Assembly 258 | Function |
| --- | --- | --- |
|  | 0 |  |
| 289 and 470 | 1 | Third Taxable Item. |
| 286 | 2 | Third Tax Amount. |
|  | 3 |  |
| 288 and 469 | 4 | Second Taxable Item. |
| 285 | 5 | Second Tax Amount. |
| 465 | 6 | Cash. |
| 287 and 468 | 7 | First Taxable Item. |
| 284 | 8 | First Tax Amount. |
| 464 | 9 | Credit. |

The manually operated key stems 461 and 467 in the account bank 277 are releasably held in a depressed condition by the same means provided in the account banks 276. More specifically, the plate 337 is mounted adjacent the right side of the keys 461 and 467 (FIGS. 6 and 43) and supports a plurality of the detent elements 338 which are biased into engagement with the edges of the keys 461 and 467 by the tension spring 341. The keys 461 and 467 include latching portions 461b and 467a that cooperate with the offset ends of the detent elements 338 to releasably secure an actuated key stem in a depressed position.

The account bank 277 also includes means operated by the start test assembly 267 for positively securing an actuated one of the keys 461 and 467 in a depressed condition and for blocking the actuation of other keys. More specifically, this blocking means comprises a locking slide 471 (FIGS. 6 and 22) which is slidably mounted on the upper surface of the frame element 310 and which is secured to a plate 344 similar to the like identified plate in the amount banks 276 by a plurality of shouldered fasteners 472. The latching slide 471 includes a plurality of generally L-shaped projecting portions 471a along its upper edge which cooperate with a plurality of projecting portions on the key shafts 461 and 467, such as projecting portions 467b (FIG. 6) on the key stems 467, either to latch a depressed one of these keys in a depressed condition or to block depression of these keys following the operation of the slide 471. The latching slide 471 is connected to and is operated by the plate 378 in the same manner as the latching slides 375 in the print banks 275 and the amount banks 276 (FIG. 20).

The account bank 277 is also flexible in the sense that the depression of any one of the tax keys 284–289 results in the restoration of any previously operated one of these keys. To accomplish this, the account bank 277 includes a plurality of coupling elements 346 (FIG. 23) secured between the plates 343 and 344 in the same manner as in the amount banks 276. A projection 467c (FIGS. 6 and 22) on the shaft 467 of each of the manual keys 284–289 is disposed above a pair of arms 346b and 346c on an adjacent pair of coupling elements 346 so that the actuation of anyone of these keys produces oppositely directed pivotal movement of the coupling links 346 on opposite sides of the actuated key to elevate or restore any previously operated ones of the keys.

The selective actuation of the tax portion of the account bank 277 does not release the credit key 282 or the cash key 283. The two coupling links 346 disposed on opposite sides of the cash key 283 (FIG. 23) do not include the arms 346c. Thus, although the depression of one of the keys 284–289 results in movement of the coupling links associated with the keys 282 and 283, this movement does not result in the restoration of these keys. This movement is effective to elevate the arm 346d on the last coupling element 346 to a position indicating that a key in the bank 277 has been operated.

The account bank 277 also includes a zero stop means which is similar to the zero stop means provided in the amount banks 276, but which is positively operated preceding the operation of the zero stop means in the print banks 275 and the amount banks 276. The zero stop means includes a zero stop detent element or stem 473 (FIGS. 23 and 43) which is slidably mounted in the frame elements 310 and 336 and which is normally biased to a lowered position by a compression spring 474 that is connected between an offset end portion 473a on the detent element 473 and the lug 344b on the wall 344. The element 473 includes another offset portion 473b that is adapted to be moved into and out of engagement with the arm 346d on the last coupling element 346 in the bank 277. If the arm 346d occupies the position shown in FIG. 23, indicating that none of the keys in the bank 277 have been operated, the lower end of the detent element 473 is free to move into a position arresting movement of the account differential assembly 258. Alternatively, if the last coupling link 346 is in the position shown in FIG. 43, downward movement of the detent element 473 is arrested by engagement with the arm 346d.

To provide means for freeing the detent element 473 for movement to a position determined by the arm 346d, a bracket 475 (FIGS. 5, 23 and 43) is rigidly secured to a shaft 476 and is provided with a plurality of projecting portions 475a, one of which extends into an opening in the zero stop element 473. The shaft 476 is pivotally mounted at its opposite ends on the bracket 425 (FIG. 5) and an additional bracket 477. The shaft 476 is pivoted in clockwise and counterclockwise directions in synchronism with the rotation of the main shaft 314 by a mechanism similar to that provided for pivoting the shaft 423 associated with the zero stop means in the banks 275 and 276. In the selector banks, the zero stop means is always rendered effective and ineffective in a fixed time sequence and, in contrast to the amount and print zero stop means, is provided with only an actuating mechanism for the shaft 476 that is identical to that driven by the cams 433 and 434.

That actuating mechanism for the shaft 476 includes an arm 478 (FIG. 5) that is rigidly secured to the shaft 476 and carries a roller 479 that is biased into engagement with higher and lower control surfaces on the upper edge of a slide 480 that is substantially identical to the slide 428. The slide 480 is connected to a cam follower lever 481 by a pin 482 that is received within a notch formed in one end of the slide 480. The cam follower lever 481 is secured to a second cam follower lever 483, and both of these levers are pivotally mounted on a shaft 484 that is carried by the side wall 312 of the frame and an additional upright wall 485. The levers 481 and 483 are driven by a pair of cams 486 and 487 keyed to the main shaft 314. As indicated in line 1 of FIG. 81 of the drawings, the cams 486 and 487 move the slide 480 upwardly (FIG. 5) between 3° and 20° of rotation of the main shaft 314 so that the shaft 476 pivots in a counter-clockwise direction (FIGS. 23 and 43) to free the zero stop element 473. These cams move the slide 480 downwardly (FIG. 5) to pivot the shaft 476 in a clockwise direction between 200° and 235° of rotation of the main shaft 314.

(2) CASH-CREDIT GROUP SLIDES

The credit and cash keys 282 and 283 in the account bank 277 are each provided with an individual group slide interconnected with the memory means provided in the mode of operation bank 280. A credit group slide 490 (FIGS. 21 and 22) is slidably mounted on the frame element 310 between the left edge of the key stem 461 and the plate 344. The slide 490 includes an inclined surface 490a (FIG. 22) that is normally disposed beneath a projection or shoulder (not shown) on the stem 461 of the credit key 282 and another inclined edge 490b that is normally disposed below a shoulder (not shown) on the stem 461 of the cash key 283.

When the key 282 is depressed, the slide 490 is actuated to set a corresponding credit group slide 491 in the plurality of group slides in the mode of operation bank 280 (FIGS. 6B and 21B). To connect the credit group slides 490 and 491 in the account bank 277 and the mode of operation bank 280, a lever 492 (FIG. 21) is pivotally mounted on a post 493 carried by the frame elements 310 and 336, and a free end of this lever passes through enlarged openings in a number of group slides in the bank 277 to be secured to one end of the group slide 490. The other end of the lever 492 is connected to one of a plurality of connecting slides, indicated generally as 494. The connecting slide to which the lever 492 is connected is also connected to one end of an L-shaped lever 495 that is pivotally mounted on the post 373. The other end of the lever 495 passes through enlarged openings in all of the group slides in the mode of operation bank 280 except the group slide 491 to which this lever is connected.

When the credit key 282 is depressed, the projection on the stem 461 cams against the surface 490a (FIG. 22) and moves the group slide 490 downwardly and to the left (FIG. 21A). In response to this movement, the levers 492 and 495 move the group slide 491 upwardly and to the right (FIG. 21B) as an indication that the credit key 282 has been actuated. The slides 490 and 491 are reset to normal position by the start test assembly 267 in the same manner as the slides 364 and 374. Further, when the slide 491 in the mode of operation bank 280 is locked in its normal position, the credit slide 490 is locked in normal position, and the key 282 cannot be depressed.

A cash group slide 496 (FIGS. 21 and 22) is slidably mounted on the frame element 310 adjacent the credit group slide 490 and includes both a first inclined edge 496a disposed beneath a shoulder (not shown) on the shaft 461 of the key 283 and an opposite inclined edge 496b disposed below the shoulder on the shaft 461 of the key 282. The cash slide 496 is connected to a cash group slide 497 (FIGS. 21B and 22B) in the mode of operation bank by an L-shaped lever 498 that is pivotally mounted on the post 493, one of the plurality of connecting slides 494, and an L-shaped lever or crank 499 that is pivotally mounted on the post 373.

When the cash key 283 is depressed, the shoulder on the shaft 461 engages the inclined edge 496a to move the cash group slide 496 downwardly and to the left (FIGS. 21 and 22). This movement is transmitted through the levers 498 and 499 and the connected slide 494 to move the group slide 497 upwardly and to the right. The group slides 496 and 497 are restored to a normal position by the start test assembly 267. Further, when the group slide 497 is locked in normal position at times determined by the program of the cash register 250, the slide 496 is locked in normal position and the stem 461 of the cash key 283 cannot be depressed.

The credit group slide 490 and the cash group slide 496 also selectively control the operation of the credit automatic key 464 and the cash automatic key 465. More specifically, a shoulder 465c on the cash automatic key 465 is normally disposed immediately above the right edge of a projection 469c (FIG. 22B) on the cash group slide 496. This prevents lowering of the cash automatic key 465. A similar shoulder on the credit automatic key 464 is disposed above the right edge of a projection 490c on the credit group slide 490 to normally prevent the lowering of the key 464.

When the credit key 282 is operated, the shoulder on the stem 461 concurrently engages the inclined surfaces 490a on the credit group slide 490 and the inclined surface 496b on the cash group slide 496 to move the credit group slide 490 downwardly and to the left, as described above, and to move the cash group slide 496 upwardly and to the right. This movement of the credit group slide 490 moves the projection 490c from beneath the shoulder on the credit automatic key 464 to condition this key for operation in addition to supplying information to the mode of operation bank 280 indicating that the credit key 282 has been operated. The movement upwardly and to the right of the cash group slide 496 maintains the projection 496c beneath the shoulder 465c on the cash automatic key 465 to prevent its operation. This movement to the right of the cash group slide 496, which is permitted by an elongated slot in the connected linkage, does not affect the setting of the cash group slide 496 in the mode of operation bank 280.

In a similar manner, the depression of the cash key 283 cams the projection on the related key shaft 461 against the inclined surfaces 496a and 490b to move the projection 496c from beneath the shoulder 465c on the cash automatic key 465 by moving the cash group slide 496 downwardly to the left. The credit group slide 490 is concurrently moved upwardly and to the right but the projection 490c is not moved from beneath the shoulder on the credit automatic key 464.

(3) TAX GROUP SLIDES

The account bank 277 also includes a taxable item group slide 500 and a tax amount slide 501 that are slidably mounted on the frame element 310 and secured to the plate 344 by the headed fastener 472. The taxable item group slide 500 includes three projecting portions 500a having inclined edges that are normally disposed beneath the projections 467b on the key stems 467 of the three taxable item keys 287–289. When one of these keys is depressed, the projection 467b on the related shaft 467 engages the inclined surface on one of the projecting portions 500a so that the taxable item group slide 500 is moved downwardly and to the left (FIG. 21) to set a corresponding taxable item group slide 502 in the mode of operation bank 280.

To accomplish this, the forward end of the slide 500 is connected to one end of an L-shaped lever 503 that is pivotally mounted on the shaft 493. The other end of this lever is secured to one of the connecting slides 494. This connecting slide is also secured to one end of an L-shaped lever 504 that is pivotally mounted on the shaft 373. The other end of the lever 504 passes through elongated openings in all of the group slides in the mode of operation bank 280 except the slide 502 to which this lever is connected. Thus, the actuation of the taxable item group slide 500 by one of the keys 287–289 shifts the taxable item group slide 502 in the mode of operation bank 280 upwardly and to the right (FIG. 21B).

The taxable item slides 500 and 502 are restored to their normal settings by the start test assembly 267. To control the operability of the keys 287–289, the slide 502 in the mode of operation bank 280 can be locked in normal position. This locks the slide 500 in normal position and prevents depression of the key shafts 467 by engagement of the projection 467b with the inclined surface 500a.

The tax amount group slide 501 includes three projecting portions 501a defining inclined surfaces that are normally disposed beneath the projecting portions 467b on the key stems 467 of the tax amount keys 284–286. When one of these keys is depressed, the slide 501 moves downwardly and to the left (FIG. 21A) so that a tax amount group slide 505 in the mode of operation bank 280 is set. The upper or inner end of the slide 501 is connected to one end of an L-shaped lever 506 that is pivotally mounted on the shaft 493. This lever is also connected to one of the plurality of connecting slides 494 and, through this slide, to one end of an L-shaped lever 507 that is pivotally mounted on the shaft 373. The other end of this lever passes through elongated openings in all of the group slides in the mode of operation bank 280, except the slide 505 to which the lever is connected. Thus, the downward movement of the tax amount group slide 501 produced when one of the keys 284–286 is actuated causes the tax amount group slide 505 in the mode of operation bank 280 to move upwardly to a set position.

The tax amount group slides 501 and 505 are restored to a normal condition by the start test assembly 267 in the same manner as the previously described group slides. In addition, the mode of operation bank 280 includes means for selectively locking the tax amount group slide 505 in a normal position. The locking of this group slide is effective through the connecting linkage to lock the tax amount group slide 501 in the account bank 277 in its normal position. Thus, the inclined surfaces on the projections 501a are held beneath the arms or projections 467b on the key shafts 467 of the keys 284–286 to prevent depression of these tax amount keys.

The tax amount group slide 501 is also effective under certain conditions to control the operability or movement of the taxable item automatic keys 468–470 to a depressed position. To provide this function, the tax amount group slides 501 include three projecting portions 501b (FIG. 22A) disposed adjacent or forming a part of the projections 501a. The projections 501b are normally disposed to the right of a shoulder 468c–470c on each of the automatic key shafts 468–470, such as the shoulder 470c on the key shaft 470 (FIG. 22B). When the group slide 501 is moved downwardly and to the left by the actuation of one of the keys 284–286, the three projections 501b are disposed immediately beneath the shoulders 468c–470c and prevent downward movement of these automatic keys.

(4) CASH-CREDIT AND TAX START SLIDES

The account bank 277 is a motorized bank in the sense that the actuation of one of the keys 282, 283 and 284–289 advises the start test assembly 267 that an attempt is to be made to initiate a cycle of operation of the cash register 250. The groups of keys 282 and 283 and 284–289 are selectively rendered effective to control the start test assembly 267 under the control of the mode of operation bank 280. The automatic keys 464, 465 and 468–470 are not effective to control the starting of the cash register 250.

To provide a start under the control of the credit key 282 and the cash key 283, a cash-credit start slide 510 is slidably mounted on the lower wall 310 adjacent the right edge of the key stems 461 and 467 (FIG. 6). The slide 510 is normally urged rearwardly (FIG. 6) or to the right (FIG. 22B) by a tension spring 511 secured to a pin 512 carried on the slide 510. The lower edge of the slide 510 is provided with a plurality of notches or openings 510a for receiving the U-shaped portions 338a of the detent elements 338. The rear end of the slide 510 is provided with two inclined surfaces 510b that are disposed immediately beneath a projecting arm or lug 461c on the stems 461 of the keys 282 and 283.

When either one of these two keys is depressed, the arm 461c engages the inclined surface 510b to move the slide 510 to the left (FIG. 22B) against the action of the spring 511. An end portion 510c on the slide 510 is adapted to engage and pivot a start yoke 513 (FIGS. 5, 69 and 72) that is pivotally and slidably mounted on the shaft 412. The yoke 513 includes a notch or recess 513b that is moved into and out of alignment with the start slide 510 under the control of the mode of operation bank 280. When the notch 513b is aligned with the slide 510, this slide is ineffective to pivot the yoke 513. When the notch 513b is displaced from alignment with the slide 510, movement of this slide pivots the yoke 513 about the shaft 412. This pivoting movement of the yoke 513 advises the start test assembly 267 that an attempt is to be made to initiate a cycle of operation of the cash register 250. When the operated one of the keys 282 or 283 is released, the spring 511 restores the start slide to its normal position and permits the start yoke 513 to return to its normal position.

The start slide 510 also includes three offset arms 510d (FIG. 22B) that are disposed immediately below three pins 514 (FIGS. 22 and 23) that are carried on the taxable item automatic keys 468–470. The arms 510d prevent the depression or operation of the keys 468–470 when the start slide 510 is in its normal position. When the start slide 510 is moved to the left (FIG. 22B) to an actuated condition, the arms 510d are moved out of alignment with the pins 514 so that the keys 468–470 can be depressed. In addition, the start slide 510 cooperates with the group slides 490 and 496 to insure that the zero stop means for the account bank 277 is not effective when one of the automatic keys 464, 465 and 468–470 is used to control the setting of the amount differential assembly 258. When neither one of the keys 282 or 283 is depressed, all of the automatic keys are locked in normal position by the projections on the group slides 490 and 496 and by the arms 510d on the start slide 510. Alternatively, when either one of the keys 282 or 283 is depressed so that one of the automatic keys 464, 465 or 468–470 might be used to control the setting of the account differential assembly 258, the depressed one of the keys 282 or 283 shifts the last coupling link 346d (FIG. 23) to a position in which downward movement of the zero stop detent 473 is arrested.

The amount tax keys 284–289 control a tax amount start slide 515 (FIG. 22) that is slidably mounted on the frame element 310 interposed between the latching slide 471 and the group slide 501. The upper edge of the slide 515 is provided with a plurality of inclined surfaces 515a that are disposed below the projecting arms 467b on the stems 467 of the keys 284–289. Whenever one of these keys is depressed, the slide 515 is moved to the left (FIG. 22A) so that an end portion 515b attempts to engage the start yoke 513. A notch 513a in the yoke 513 (FIGS. 69 and 72) is moved into and out of alignment with the slide 515 under the control of the mode of operation bank 280. The notch 513a prevents the slide 515 from pivoting the yoke 513. In the illustrated cash register 250, the notch 513a is aligned with the slide 515 whenever the keys 287–289 can be operated during listing operations. Thus, only the keys 284–286 pivot the yoke 513 to advise the start test assembly 267 that an attempt is to be made to start the cash register 250 during listing operations. The keys 287–289 are used to start the cash register 250 on reading and resetting operations only.

(5) RESTORING THE MANUALLY OPERATED CREDIT AND CASH KEYS 282 AND 283

The manually operable credit key 282 and cash key 283 are automatically restored to a normal released condition under the control of the mode of operation bank 280. To perform this function, the account bank 277 includes a resetting slide 516 that rests on the frame element 310 and is slidably secured to the plate 344 by the shouldered fasteners 472 (FIGS. 6 and 22). The upper edge of the slide 516 includes two inclined surfaces 516a that are disposed adjacent but not immediately beneath a projection on each of the key stems 461 corresponding to the projection 467b on the key stem 467. Since the inclined surfaces 516a are displaced from the arms on the key stems 461, the keys 282 and 283 can be manually actuated to a depressed or operated condition. However, when the slide 516 is moved downwardly and to the left (FIG. 22) one of the inclined surfaces 516a engages the arm on the depressed key stem 461 to elevate the depressed key to a normal position.

To provide means for controlling the shifting or sliding movement of the restoring slide 516, the forward end of this slide is pivotally connected to an arm 517 by a pin 518 (FIGS. 30–40 and 42). The arm 517 is pivotally mounted on the shaft 359 and carries a pin 520 that is pivotally mounted within an opening 521 (FIG. 42) in an arm 522. The arm 522, which passes through a slot in and slidably engages the frame element 336, carries a pin 523 (FIGS. 38–40) that is received within a notch 524 formed in a lower end of an arm 525 that is pivotally mounted on the shaft 414.

The lower end of the arm 525 (FIG. 42) also carries a pin 526 that is received within an opening 527 formed in the upper end of a link 528. The lower end of the link 528 is secured to a lower arm 529a of a cam follower lever 529 by a pin 530 and a spacer sleeve 531. The arm 529a is pivotally mounted on the shaft 414 and includes a projecting portion that cooperates with the surface of a cam 532 (FIGS. 5 and 42) that is keyed to the main drive shaft 314. The lever 529 also includes a second cam follower arm 529b that cooperates with the outer periphery of a cam 533 that is also keyed to the shaft 314. A plurality of discs 534 mounted on the shaft 314 adjacent the cams 532 and 533 guides movement of the arms 529a and 529b.

As indicated above, the operation of the restoring or resetting slide 516 for the keys 282 and 283 is controlled in accordance with the mode of operation for which the cash register 250 is conditioned. To render the drive means for the slide 516 responsive to control from the mode of operation bank 280, a control or coded disc 535 is keyed to the shaft 412, and this shaft is driven under the control of the mode of operation bank 280 to assume one of eleven angular settings corresponding to the mode of operation selected for the cash register 250. A pin 536 carried on the link 528 tests against the periphery of the disc 535 to selectively render driving means for the slide 516 effective and ineffective.

More specifically, when the slide 516 is to be actuated to reset the operated one of the keys 282 and 283, the shaft 412 is adjusted to its second, sixth, or eleventh settings in which a projection 535a (FIG. 76) on the disc 535 is disposed in the path of movement of the pin 536. Alternatively, when the slide 516 is not to be actuated, the shaft 412 is set to one of the remaining positions in which one of the projections 535a is not disposed in the path of movement of the pin 536.

Assuming that the slide 516 is to be actuated, the coded control element 535 is set to the position shown in FIG. 38 as the mode of operation differential assembly 258 is set (see line 6 in FIG. 81). Toward the end of the cycle of operation of the cash register 250 (see line 3 of FIG. 82), the main shaft 314 has advanced the cams 532 and 533 to a point at which the lever 529 is pivoted in a counterclockwise direction from the position shown in FIG. 38 to the position shown in FIG. 39. During this movement, the lower end of the link 528 is swung to the right so that the pin 536 bears against the projection 535a on the disc 535, and this link subsequently is pivoted in a counterclockwise direction about the pin 536 so that the arm 525 pivots in a clockwise direction about the shaft 414. This movement of the arm 525 carries the arm 522 to the left so that the link or arm 517 pivots in a clockwise direction about the shaft 359 to move the slide 516 to the left. During this movement, the actuated one of the keys 282 and 283 is restored to a normal condition. The continuing movement of the main shaft 314 and the cams 532 and 533 between 340° and 355° pivots the lever 529 in a clockwise direction so that the slide 516 is restored to the normal position shown in FIG. 38 (see line 3 in FIG. 82).

Assuming that the resetting slide 516 is not to be actuated during a given cycle of operation of the cash register 250, the shaft 412 is set so that one of the projections 535a on the disc 535 is not disposed in the path of movement of the pin 536. Accordingly, when the lever 529 is pivoted in a counterclockwise direction, the pin 536 does not engage a projection on the coded element 535, and a fulcrum for pivoting the link 528 is not provided. Thus, the arm 525 is not actuated, and the slide 516 remains in its normal position. In this manner, the resetting slide for the credit and cash keys 282 and 283 is selectively rendered effective in accordance with the mode of operation for which the cash register 250 has been conditioned.

(6) RESTORING THE MANUALLY OPERATED TAX KEYS 284–289

The account bank 277 includes means for selectively restoring the operated ones of the tax amount keys 284–286 and the taxable item keys 287–289 under the control of the main shaft 314 and the merchandise bank 278. This resetting means comprises a means for actuating the first of the coupling units 346 associated with the bank 277. When when the first coupling unit 346 is actuated, all of the coupling links 346 are pivoted in a counterclockwise direction so that any operated one of the manually actuated keys 284–289 is restored to its normal condition. Because the arms are removed from the coupling links 346 associated with the keys 282 and 283, these keys can be restored to a normal condition only under the control of the slide 516.

The actuating means for the first coupling link 346 comprises a correction key stem 540 (FIG. 23) which is slidably mounted in the frame elements 336 and 361 and which includes an apertured offset portion 540a having an opening in which the rod 359 is disposed to limit movement of the element 540. When the element 540 is moved downwardly, all of the coupling links 346 in the account bank 277 are pivoted in a counterclockwise direction so that any depressed one of the keys 284–289 is restored to a normal condition.

The link 540 is operated by the main drive shaft 314 under the control of the merchandise bank 278. More specifically, the correction key shaft 540 is provided with a shouldered portion 540b (FIG. 22A) which is engaged by an L-shaped lever 541 (FIGS. 35–37 and 42) that is pivotally mounted on the shaft 414. The other end of the lever 541 is secured to the upper end of a link 542 by a pin 543 that is received within an enlarged opening in the upper end of the link 542. The lower end of this link is secured to the lower end of the cam follower arm 529a by the pin 530 and a plurality of sleeves or washers 544. To provide means for selectively rendering this drive means effective to actuate the correction stem 540, a detecting pin 545 is carried on the link 542 in alignment with a control or coded disc 546. The disc 546 is pivotally mounted on the shaft 412 and is secured to the yoke 411 so that the position of the control disc 546 is determined by the position of the yoke 411. The yoke 411 is set under the control of the merchandise bank 278, as described in detail above.

When the reset shaft 540 is to be actuated, the yoke 411 is shifted from its normal position shown in FIG. 35 to the position shown in FIG. 37 in which a projecting portion 546a is disposed in the path of movement of the pin 545. Alternatively, if the keys 284–287 are not to be reset, as during a repeat operation, the yoke 411 is retained in the normal position shown in FIGS. 35 and 36 in which the projecting portion 546a is not disposed in the path of movement of the detecting pin 545.

Assuming that the operated one of the keys 284–289 is to be reset during the cycle of operation of the cash register 250, the yoke 411 is shifted from the position shown in FIG. 35 to the position shown in FIG. 37 in which the projection 546a on the control element 546 is disposed in the path of movement of the pin 545. In the interval between 286° and 315° (see line 3 in FIG. 85), the cams 532 and 533 again pivot the cam follower lever 529 in a counterclockwise direction so that the link 542 moves to the right from the position shown in FIG. 35 to the position shown in FIG. 37. During this movement, the pin 545 engages the projecting portion in 546a so that the link 542 pivots in a counterclockwise direction about the pin 545 to pivot the crank 541 in a clockwise direction about the shaft 414. This movement of the crank 541 moves the correction or resetting stem 540 downwardly so that the coupling links 346 are pivoted in a counterclockwise direction to restore any depressed key to its normal condition. During continuing movement of the main shaft 314, the cams 532 and 533 pivot the lever 529 in a clockwise direction so that the lever 541 is restored to its normal condition shown in FIG. 35 (see line 3 of FIG. 82).

In the event that cash register 250 is conditioned for a mode of operation, such as a repeat operation controlled by the bank 278, in which the tax keys 287–289 are not to be restored until the depressed key in the bank 278 is released, the yoke 411 remains in the normal position shown in FIGS. 35 and 36 so that when the cam follower lever 529 is pivoted in a counterclockwise direction, the pin 545 does not engage the projecting portion 546a and the link 542 is not pivoted about the pin 530. Thus, the resetting stem 540 remains in its normal position shown in FIG. 36. The continuing rotation of the cams 532 and 533 restores the drive means to the normal position shown in FIG. 35 toward the end of the cycle of operation of the cash register 250.

(7) MANUALLY CONTROLLED RESTORATION OF THE ACCOUNT BANK 277

In addition to the above described means for resetting the keys 282–289 during a cycle of operation, the keyboard assembly 256 includes means driven by the start test assembly 267 for positively restoring all of the keys in the account bank 277 in response to the actuation of the correction key 309. This restoring means includes an arm 547 (FIGS. 41 and 42) that is disposed adjacent the crank 541 and is keyed to the shaft 414. The end of the arm 547 rests on the shoulder 540b of the correction stem 540. In addition, this restoring means includes a hub 548 which is keyed to the shaft 414 and which includes a projecting portion 548a that is received within an opening 549 in the arm 525.

When the correction key 309 is depressed, the start test assembly 267 pivots the shaft 414 in a clockwise direction so that the arm 547 turns in a clockwise direction to depress the correction stem 540. This pivots the coupling links 346 in a counterclockwise direction to restore an operated one of the keys 284–289. The clockwise rotation of the shaft 414 is effective through the hub 548 and the projecting portion 548a, which bears against the left-hand edge (FIG. 41) of the opening 549, to move the arm 525 with the shaft 414. This pivots the link or arm 517 in a clockwise direction about the shaft 359 so that the slide 516 is moved to the left to restore an operated one of the keys 282 and 283. When the shaft 414 is rocked in a counterclockwise direction to its normal position, the slide 516 and the correction stem 540 are restored to normal conditions.

(8) RELEASING AND RESTORING THE AUTOMATIC KEYS 464, 465 AND 468–470

The automatic keys 464, 465, and 464–470 in the account bank 277 are normally maintained in a restored or reset condition between cycles of operation of the cash register 250 and are automatically freed from restraint to permit a selected one of these keys to be moved to a depressed or actuated condition under the control of the account memory means 460. To provide means for cyclically releasing and restoring the five automatic keys in the account bank 277, this bank includes a control slide 550 (FIGS. 22, 43 and 44) that is mounted on the upper surface of the frame element 336 and is slidably disposed between two plates 551 and 552 (FIG. 6) which are secured to each other by a plurality of shouldered fasteners 553 and to the upper surface of the frame element 336 by a bracket 554 (FIG. 6). One of the fasteners 553 passes through an opening 555 (FIGS. 43 and 44) in the slide 550 to guide its movement. The two plates 551 and 552 are provided with five pairs of aligned openings 556 for receiving five projecting arms 464a, 465a, 468a, 469a and 470a formed integral with the automatic keys 464, 465, 468, 469 and 470.

To hold the automatic keys 464, 465, 468, 469 and 470 in an elevated or restored position against the force of the tension springs 466, five arms 557 are pivotally mounted on the plates 551 and 552 by a plurality of pins 558. In the normal position of the slide 550, a plurality of projecting portions 550a engage the lower surfaces of the arms 557 so that these arms are pivoted to the position shown in FIG. 44. In this position, the upper edge of each of the arms 557 engages one of the arms 464a, 465a, 468a, 469a and 470a to retain the associated automatic keys 464, 465, 468–470 in an elevated position against the downwardly directed force supplied by the tension springs 466.

When the slide 550 is displaced to the right, the projecting portions 550a move from beneath the arms 557 so that the automatic keys 464, 465 and 468–470 are freed for movement to a displaced position in accordance with the setting of the memory means 460. As shown in FIG. 43, the third taxable item automatic key 470 has been freed for operation by the memory means 460 so that its lower end projects below the lower surface of the frame element 310 to provide means for arresting operation of the account differential assembly 258 in its first position. The remaining keys 464, 465, 468 and 469 are retained in a normal position. When the slide 550 is subsequently moved to the left to the normal position shown in FIG. 44, the arms 557 are cammed in a clockwise direction by engagement with the projecting portions 550a, and all of the automatic keys 464, 465 and 468–470 are restored to a normal condition.

To provide means for reciprocating the slide 550, the left-hand end of this slide is provided with a notch 559 (FIGS. 43 and 44) in which is received a pin 560 carried on a cam follower lever 561. The lever 561 is rigidly secured to a second cam follower lever 562, and the two levers are pivotally mounted on a stub shaft 563 that is carried on an upright wall element 564 (FIG. 5) in the frame structure of the keyboard assembly 256. A projection on the lever 561 is adapted to engage the outer periphery of a cam 566 that is keyed to the shaft 314, and a projection on the lever 562 is adapted to engage the outer periphery of a cam 566 that is also keyed to the main shaft 314. A plurality of discs 567 are disposed adjacent the cams 565 and 566 to guide movement of the cam follower levers 561 and 562.

In the interval between 3° and 20° of rotation of the main shaft 314 (see line 5 in FIG. 81), the cams 565 and 566 pivot the levers 561 and 562 in a clockwise direction so that the slide 550 moves from its normal position (FIG. 44) to its set position (FIG. 43). During this movement, the automatic keys are released for selective movement to an operated or depressed position under the control of the memory means 460. After approximately 200° of rotation of the main shaft 314 (see line 5 in FIG. 81), the cams 565 and 566 pivot the levers 561 and 562 in a counterclockwise direction so that the slide 550 is moved to its normal position (FIG. 44). In this position, the arms 557 hold the five automatic keys to their normal position.

(9) ACCOUNT MEMORY MEANS 460

The account bank 277 includes the memory means 460 for controlling the operation of the automatic credit and cash keys 464 and 465, for controlling the operation of the three automatic taxable item keys 468–470, and for controlling the manual actuation of the tax amount keys 284–286. The memory means 460 (FIGS. 6 and 22) includes a first taxable item slide 570, a second taxable item slide 571, a third taxable item slide 572 and a pair of auxiliary slides 573 and 574 that are separated from each other by a number of spacing slides 575. The slides 570–575 are slidably mounted on the upper surface of the frame element 336 disposed between the left edge of the key stems 461 and 467 and a plate 576 that is secured to the frame structure of the keyboard assembly 256 by a plurality of fasteners 577.

The memory slides 570–574 are provided with a plurality of elongated slots, and the spacing slides 575 are provided with a plurality of holes in which are mounted a plurality of pins 578. The inner ends of the pins are secured to a plate 579, and the outer ends of the pins 578 extend outwardly through holes in an actuating slide 580, which is disposed between the slide 570 and the inner wall of the plate 576, and through elongated slots 581 in the plate 576. A compression spring 582 is mounted on the outer end of each of the pins 578 disposed between a lock washer 583 that is carried on the end of the pin 578 and a bearing sleeve 584 that bears against the outer surface of the plate 576 and includes a reduced diameter portion disposed within the slot 581. The sleeves 584 provide bearings for guiding reciprocating movement of the pins 578. The compression springs 582 bias the plate 579 toward the left so that the slides 570–575 are clamped together and against the inner surface of the actuating slide 580. Since the spacing slides 575 are provided with holes and the memory slides 570–574 are provided with elongated slots, the memory slides 570–574 can be shifted relative to each other and to the spacing slides 575.

The keys 464, 465, 468–470 and 284–289 are provided with projecting portions or arms which extend over the slides 570–574 and which are slidably mounted in a plurality of vertically extending slots 585 in the plate 576. Each of the automatic keys 464, 465 and 468–470 includes a projecting portion 464b, 465b, 468b–470b similar to the projecting portion or arm 465b and 470b shown in FIG. 22B, and each of the key stems 467 includes a projecting arm 467b (FIG. 22A). The key stems 461 associated with the keys 282 and 283 are not provided with arms extending over the memory slides 570–574. In the schematic diagrams shown in FIGS. 24–34, the projecting arms 467b on the keys 284–289 are identified by the numbers of the associated keys to clarify the description of the operation. In other words, the projecting arm 467b on the key 289 is identified in FIG. 24 as 289.

The upper edges of the memory slides 570–574 are provided with a plurality of coded projecting portions a–e, a–e, a–d, a–d and a–f, respectively. The tops of certain of these projecting portions selectively block or permit the depression of the automatic keys 464, 465 and 468–470 and the manual keys 284–289. The sides of certain of these projecting portions also cooperate with the arms on the keys 464, 465, 468–470 and 284–289 to control the displacement of these slides to set or normal positions relative to each other.

During each cycle of operation, the memory slides 570–574 are first moved from a center normal position to an extreme left position, then moved to an extreme right position, and then returned to the normal central position. The slides 570–574 are sensed by the related keys in the account bank 277 in the normal or center position and are selectively set and reset during movement to the left and to the right from this central position. To provide means for shifting the memory slides 570–574, the operating slide 580 is provided with a notch 586 at its forward end in which is received a pin 587 (FIGS. 23, 24 and 46) secured to a cam follower lever 588. The cam follower lever 588 is rigidly secured to a second cam follower lever 589, and both of these levers are pivotally mounted on a stub shaft 590 that is carried on an upright wall element 591 (FIG. 5) on the frame of the keyboard assembly 256. A projection on the lever 588 is adapted to engage the outer periphery of a cam 592 that is keyed to the main drive shaft 314, and a projection on the outer end of the lever 589 is adapted to engage the outer periphery of a cam 593 that is also keyed to the main shaft 314. A plurality of discs 594 carried on the main shaft 314 are disposed adjacent the cams 592 and 593 to guide movement of the levers 588 and 589.

Figure 27:
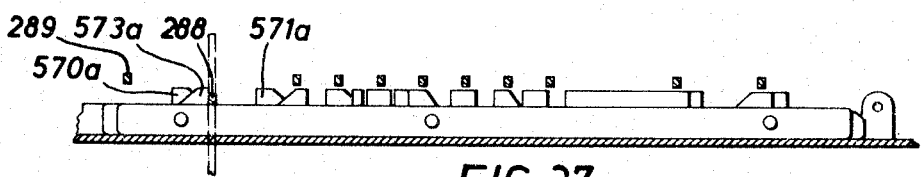

The cams 592 and 593 are so formed that when the main shaft 314 reaches approximately 240° of rotation following the initiation of the cycle of operation of the cash register 250 (see line 8 in FIG. 82), the levers 588 and 589 are pivoted in a counterclockwise direction to move the slide 580 to the left. This moves the connected memory slides 570–574, the spacing slides 575, and the plate 579 to the left from the normal position shown in FIG. 23 to the left-hand position shown in FIG. 24. After a short dwell in this position, the cams 592 and 593 displace the levers 588 and 589 in a clockwise direction through the normal center position to an extreme right position (FIG. 27). After a dwell of approximately 25° in this position (see line 8 of FIG. 82), the cams 592 and 593 pivot the levers 588 and 589 in a counterclockwise direction to restore the slide 580 and the component secured thereto to the normal position shown in FIG. 23. This reciprocation of the memory slides 570–574 occurs during each cycle of operation of the cash register 250.

The account bank 277 also includes means for forwarding an indication to the mode of operation bank 280 whenever one of the taxable item memory slides 570, 571 or 572 has been operated to a displaced position. To accomplish this, an arm 595 (FIGS. 22–24) is pivotally mounted on an upstanding portion 580a of the slide 580 by a pin 596. The other end of the arm 595 carries pin 597 on which a roller 598 is mounted. The roller 598 bears against the inclined right ends of the slides 570–572. One arm 599a of a crank 599 is adapted to engage the roller 598, and the other arm 599b of the crank 599 includes an offset portion that bears against a projection 500b on the taxable item group slide 500. The crank 599 is pivotally mounted on the left arm of a yoke 600 by a pivot pin 601 that passes through aligned openings in the crank 599 and is received within an opening 602 in the arm of the yoke 600. The yoke 600 is carried on the frame.

In the normal position of the memory means 460 (FIG. 23), the roller 598 bears against the end surfaces of the memory slides 570, 571 and 572. When one of these slides is displaced to an operated position (FIG. 24), the roller 598 is engaged by the tapered end surface of the operated slides 570–572 and pivots the arm 595 in a clockwise direction about the pin 596. This elevates the arm 599a of the crank 599 so that this crank pivots in a clockwise direction about the pivot pin 601 and the other arm 599b of this crank shifts the taxable item group slide 500 to the left (FIG. 24). The shifting of the group slide 500 is effective to shift the corresponding taxable item group slide 502 in the mode of operation bank 280. This indicates to the bank 280 that one of the taxable items memory slides in the account memory means 460 has been operated. Whenever all of the memory slides 570–572 are restored to a normal condition, the crank 599 is no longer effective to displace the taxable item group slide 500.

(10) OPERATION OF THE ACCOUNT MEMORY MEANS 460 DURING A LISTING OPERATION

In the normal condition of the account memory means 460, the memory slides 570–574 are in the position shown in FIG. 23 in which the manual keys 287–289 are capable of being manually operated and all of the automatic keys 464, 465 and 468–470 and the manual keys 282–286 cannot be operated. The keys 287–289 can be operated because none of the projecting portions on the slides 570–574 are aligned with the arms 467b on the key stems 467.

In the normal condition of the account memory means, 460, the projections "b" and "c" on the third taxable item slide 570 block the depression of the automatic third taxable item automatic key 470 and the manual third tax amount key 286, respectively. The projections "b" and "c" on the second taxable item memory slide 571 block the depression of the second taxable item key 469 and the manual second tax amount key 285, respectively. The projections "b" and "c" on the first taxable item memory slide 572 block the depression of the first taxable item key 468 and the manual first tax amount key 284, respectively. The cash and credit automatic keys 465 and 464 are not blocked by any of the memory slides 570–574, but they are blocked by the projections 496c and 490c on the cash and credit group slides, respectively, which are positioned beneath the shoulders 465c and 464c on these two automatic keys. The group slides 490 and 496 are locked in normal position by the mode of operation bank 280. The automatic keys 468–470 are also blocked by the arms 510d on the start slide 510.

Assuming that the cash register 250 has been prepared for a listing operation by the entrance of the data and the performance of the control operations required by the program of the cash register 250, the cash register is now conditioned to receive various amounts from the amount banks 276 representing various classes of merchandise, some of which fall within the three groups of taxable items represented by the keys 287–289 and some of which are non-taxable items. Assuming that a first amount to be entered by the banks 276 falls within the third taxable group, the banks 276 are selectively operated in accordance with the amount to be entered. The key 289 is depressed, representing the fact that the amount to be entered relates to an item falling within the third taxable group. When the key 289 is depressed, the projection 467b on the stem 467 of this key moves downwardly adjacent the left edge of the projection "a" on the third taxable item memory slide 570 (FIG. 24). The lower end of this key stem or shaft 467 is also displaced below the lower surface of the frame element 310 into the path of movement of the account differential assembly 258 so that this differential assembly is conditioned for movement to its first setting in which the amount is stored in a third taxable item accumulator in the assembly 264. The operation of cash register 250 is then initiated by depressing a selected one of the keys 290 in the merchandise bank 278 in accordance with the classification of the article corresponding to the amount entered in the amount banks 276.

When the main drive shaft 314 moves from 3 to 20° of its cycle of revolution (see line 5 in FIG. 81), the cams 565 and 566 move the slide 550 to the right (FIG. 43) so that the automatic keys 464, 465 and 468–470 are freed for downward movement to an effective setting. However, downward movement of all of these keys is blocked by the means described above. During the ensuing portion of the cycle of rotation of the drive shaft 314, the amount represented by the actuated keys in the account banks 276 is registered by setting the amount differential assemblies, and the proper accumulators for receiving this information are selected by the account and merchandise differential assemblies, among others. Beginning at around 200° of rotation, the cams 565 and 566 return the slide 550 to its normal position (FIG. 44) to hold the automatic keys 464, 465 and 468–470 in their normal position, and the amount entry is also transferred from the amount differential assemblies 258 to the selected accumulators, including the third taxable item accumulator selected by the account differential assembly 258.

After approximately 240° of rotation of the main shaft (line 8 of FIG. 82), the cams 592 and 593 shift the slide 580 from its normal position (FIG. 23) to its left position (FIG. 24). Since the projection on the key 289 is disposed at left of the projecting portion 570a on the third taxable item memory slide 570, this slide is held against movement when the slide 580 and the memory slides connected thereto are displaced to the left. Accordingly, the third taxable item memory slide 570 is displaced to the right relative to the remaining slides 571–574 to a set position. This setting of the slide 570 provides an indication in the account memory means 460 that at least one item falling within the third taxable group has been entered into the cash register 250.

When the slide 570 is shifted to the right (FIG. 24), the tapered end of this slide engages the roller 598 so that the arm 595 is pivoted in a clockwise direction about the pin 596. The roller 598 engages the arm 599a on the crank 599 so that this crank is pivoted in a clockwise direction about the pivot pin 601. This displaces the arm 599b to the left so that it engages the projecting portion 500b on the taxable item group slide 500. This holds the taxable item group slide 500 in set position to which it was operated by the prior depression of the key 289 and thus retains this slide in an operated condition for so long as any one of the taxable item memory slides 570–572 in the account memory means 460 remains in an operated or set condition.

The cams 592 and 593 then shift the slide 580 to an extreme right position and return this slide to its normal center position in the interval between 280° and 345° of rotation of the main shaft 314. In the period after the slide 580 has been moved to its extreme right position and prior to the time at which it is restored to its normal central position, the depressed key 289 is restored to its normal condition under the control of the cams 532 and 533 (compare lines 3 and 8 in FIG. 82).

Figure 25:
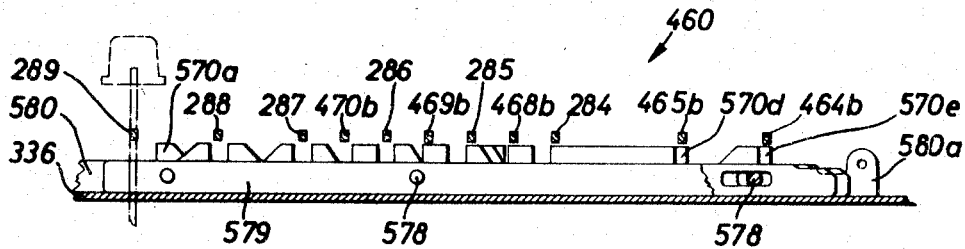
Figure 26:
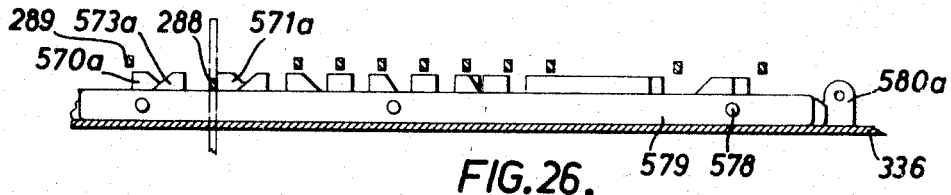

The present setting of the account memory means 460 with the slide 580 restored to its normal condition and the third taxable item slide 570 set is illustrated in FIG. 25 of the drawings. In this condition, the projections "d" and "e" on the third taxable item memory slide 570 have been moved beneath the projections on the cash and credit keys 465 and 464, respectively, to further block the operation of these keys. Further, the projections "b" and "c" on the memory slide 570 have been displaced from beneath the projections on the keys 470 and 286, respectively, so that these particular means for obstructing depression of the automatic third taxable item key 470 and the manual third tax amount key 286 have been removed. However, the key 470 remains locked in a restored or normal condition by an arm 510d on the cash credit start slide 510. Further, even though the manual third tax amount key 286 is now freed for operation by the account memory means 460, the tax amount group slide 501 is held in its normal position by the mode of operation bank 280 so that the key 286 cannot be depressed. Thus, although the memory means 460 has freed the keys 286 and 470, these keys cannot be actuated. The mode of operation bank 280 also frees the group slides 490 and 496 to permit operation of the keys 282 and 283.

Figure 28:
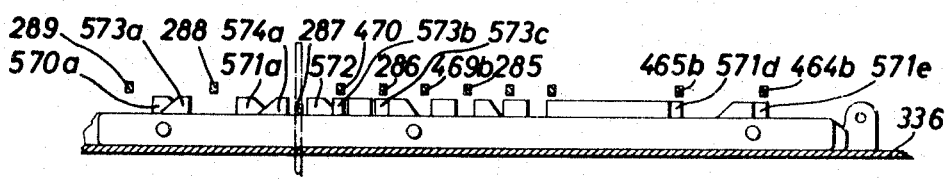
Figure 29:
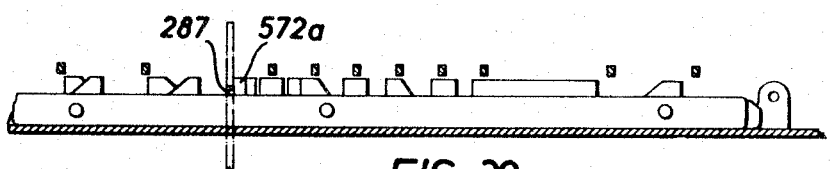
Figure 30:
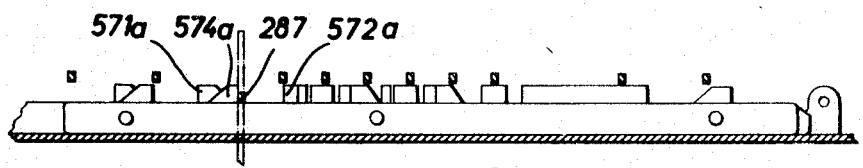
Figure 31:
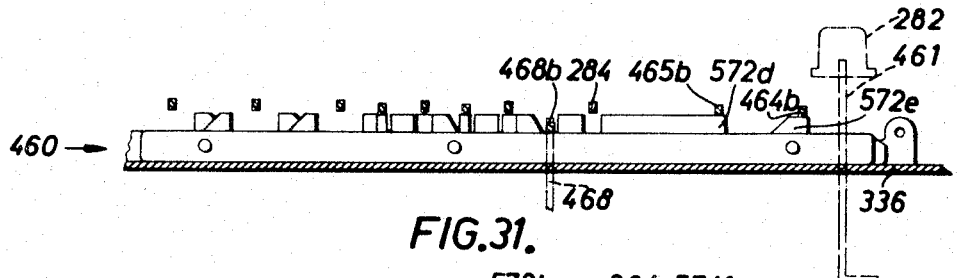

The cash register 250 can now be operated to enter other amounts that relate to non-taxable items or other amounts relating to items falling within the third taxable group without changing the setting of the account memory means 460. When an item falling within the second taxable group is to be entered into the cash register 250, the keyboard assembly 256 is operated in the manner described above except that the key 288 is depressed to an operated position to control the setting of the account differential assembly 258 to its fourth position. When the key 288 is depressed, the projection 467b on the related key shaft 467 is disposed to the left of the projection "a" on the second taxable item memory slide 571 and to the right of the projection "a" on the auxiliary memory slide 573. Therefore, when the slide 580 is shifted to the left (FIG. 26), the key 288 engages the projection 571a and shifts the second taxable item memory slide 571 to the right to its set position. The slide 580 is then moved to its extreme right position during which the key 288 engages the projection 573a. This shifts the auxiliary slide 573 to the left relative to the remaining memory and spacing slides so that the auxiliary slide 573 is now in a set position (FIG. 27). The slide 580 then restores the account memory means 460 to its normal center position (FIG. 28).

When the second taxable item memory slide 571 is operated to a set condition, the right end of this slide also engages the roller 598 so that the taxable item group slide 500 is held in a set position through the crank 599. In addition, the portions 571d and 571e are disposed beneath the projections 465b and 464b, respectively, to block operation of the cash and credit automatic keys 464 and 465. The projecting portions 571b and 571c are moved from beneath the projecting arms on the keys 469 and 285 so that the second taxable item automatic key 469 and the manual second tax amount key 285 are freed for operation. Thus, the setting of the second taxable item slide 571 partially frees the second tax amount key 285 and the second taxable item automatic key 469. These keys remain blocked by the mode of operation bank 280 and the start slide 510.

As noted above, the auxiliary memory slide 573 is also set whenever the second taxable item memory slide 571 is set. When the slide 573 is set, the projecting portions 573b and 573c are disposed beneath the projections on the third taxable item automatic key 470 and the third tax amount key 286, respectively. During a total operation, the amounts stored in the various taxable item accumulators are automatically recalled to permit the entrance of the tax amounts due thereon, and these taxable item totals are recalled from the first taxable item accumulator, if any, then the second taxable item accumulator, if any, finally the third taxable item accumulator, if any. Accordingly, the setting of the auxiliary memory slide 573 whenever the second taxable item memory slide 571 is set blocks the third taxable item automatic key 470 and the third tax amount key 286 to prevent these keys from being operated on a total operation until the second taxable item and the second tax amount operations have been disposed of.

The cash register 250 can now be operated in the manner described above to enter non-taxable items or items falling in the second and third taxable item group without changing the setting of the account memory means 460. However, when an amount representing an item falling within the first taxable group is to be entered, the key 287 is actuated to a depressed condition so that the projection 467b on the associated key shaft 267 is disposed between the projecting portion 574a on the auxiliary memory slide 574 and the projection 572a on the first taxable item memory slide 572 (FIG. 28). The slide 580 is then actuated to shift the account memory means 460 to the left from the normal position shown in FIG. 28 to the position shown in FIG. 29. During this movement, the key 287 engages the projection 572a so that the first taxable item memory slide 572 is shifted to the right to indicate the accumulation or storage of an amount in the first taxable item amount accumulator in the cash register 250. When the memory slide 572a is set, this slide also engages the roller 598 so that the crank 599 is held in a position retaining the taxable item group slide 500 in set condition. The slide 580 then moves the account memory means 460 to the extreme right position (FIG. 30), and the key 287 engages the projection 574a on the auxiliary slide 574. This engagement of the projection 574a by the operated key 287 during the movement of the memory means 470 to the right displaces the auxiliary slide 574 to the left relative to the remaining slides so that this auxiliary slide is now in a set position. The operated key 287 is restored to its normal condition under the control of the cams 532 and 533, and the account memory means 460 is restored to its normal central position (FIG. 31) by the slide 580.

In this condition, all of the memory slides 570–574 in the account memory means 460 have been operated to set conditions in which only the first tax amount key 284 and the automatic first taxable item key 468 are conditioned for operation. More specifically, when the first taxable item memory slide 572 is set, the portions 572c and 572d on this slide are moved beneath the projections on the automatic keys 465 and 464, respectively, so that these keys cannot be operated. In addition, the setting of the slide 572 moves the projecting portions 572b and 572c from beneath the projections on the automatic first taxable item key 468 and the first tax amount key 284 so that these keys are now freed for operation by the memory means 460. When the auxiliary slide 574 is set, the projections "b," "c," "d" and "e" on this slide are disposed beneath the keys 470, 286, 469 and 285, respectively. Thus, the set auxiliary slide 574 prevents the automatic or manual actuation of the automatic second and third taxable item keys and the second and third tax amount keys. As in the case of the auxiliary slide 573, the auxiliary slide 574 insures that the second and third taxable amounts and the second and third taxes cannot be entered into the cash register 250 until the first taxable item total is recalled from its accumulator and the first tax amount entered.

With the account memory means 460 in this condition, further operation of the keys 287–289 does not change the setting or condition of the memory means 460. Although the setting of the account memory means 460 has been described with the third, second and first taxable items entered in this order, it is obvious that the slides 570–574 can be set in any order and that less than all of the slides can be set in accordance with the presence or absence of items in each of the three taxable item groups.

(11) OPERATION OF THE ACCOUNT MEMORY MEANS 460 DURING A TOTAL OPERATION

During a typical total operation, the actuation of one of the keys 282 or 283 places the account memory means 460 in operation to automatically reset the first used taxable item accumulator or totalizer by transferring the total amount of the taxable items to the drums of the indicating assembly 260 to permit the operator to determine the amount of tax due. When this tax has been determined and manually entered by the account banks 276, the proper tax amount keys 284–286 are depressed and the cash register 250 transfers this amount to the listing accumulator and to the proper tax amount accumulator in the totalizer or accumulator assembly 264. When this tax amount has been entered, the account memory means 460 automatically resets the next taxable item accumulator having data therein by transferring the total value to the indicating assembly 260. The operator once again determines the tax applicable to the second group of items and enters this amount by the selective operation of amount banks 276 and one of the keys 284–286. This operation continues until all of the different taxable item accumulators have been reset and the applicable taxes entered by the selective actuation of the tax amount keys 284–286. When the last necessary tax amount has been entered, the account memory means 460 causes the operation of a selected one of the cash and credit automatic keys 465 and 464 in accordance with the depressed one of the keys 283 and 282 so that the total operation of the cash register 250 is completed in accordance with the program provided for a total operation.

In accordance with whether the preceding listing operations relates to a cash or credit transaction, one of the keys 282 or 283 is actuated to initiate a total operation. Assuming that the credit key 282 is depressed, the credit group slide 490 is moved to the left (FIG. 22) to move the projection 490c from beneath the shoulder 464c on the credit automatic key 464. However, the credit automatic key 464 remains blocked against movement to a depressed position by the projecting portions 570e, 571e and 572d in the memory means 460 which are disposed beneath the arm 464b. The operation of the key 282 also shifts the cash group slide 496 to the right but the projection 496c remains beneath the shoulder 465c to block the cash key 465. The setting of the credit group slide 490 is also effective to set the connected credit group slide 491 in the mode of operation bank 280 to advise this bank that a credit total operation has been initiated. The setting of the group slides 490 and 496 prevents subsequent depression of the key 283.

The depression of the key stem 461 for the key 282 also cams the cash-credit start slide 510 to the left (FIG. 22) to block the manual taxable item keys 287–289 with the portions 510e and to move the arms 510d from beneath the pins 514 on the automatic keys 468–470. Since the automatic keys 469 and 470 are blocked by the projecting portions 574d and 572a, 573b and 574b, respectively, these keys cannot be depressed. However, none of the projections on the memory slides 570–574 is disposed beneath the arm 468b on the first taxable item automatic key 468. Thus, this key is free to be moved to an actuated or depressed setting when a cycle of operation of the cash register 250 is initiated.

The notch 513a is aligned with the tax start slide 515 but the notch 513b is not aligned with the start slide 510 at this time. Thus, the movement to the left of the cash-credit start slide 510 pivots the start yoke 513 so that a cycle of operation of the cash register 250 is initiated. In the interval between 3° and 20° of rotation of the main shaft 314, the cams 565 and 566 (see line 5 in FIG. 81) move the slide 550 to the right from the position shown in FIG. 44 to the position shown in FIG. 43 so that the arms 557 release all of the automatic keys 464, 465, and 468–470 for movement to a depressed condition. As described above, only the key 468 is free, and the spring 466 connected thereto depresses this key (FIG. 31) so that its lower end projects beneath the lower surface of the frame element 310 to set the account differential assembly 258 in its seventh position. During an ensuing portion of the cycle of operation of the cash register 250, the account differential assembly 258 selects the accumulator storing the total value of the first taxable item, and this total is read out to the indicating assembly 260.

The cams 565 and 566 then restore the slide 550 to its normal position so that the arms 557 are pivoted in a clockwise direction about the pins 558 to elevate the depressed automatic key 468 to its normal condition (line 5 in FIG. 81). The memory means 460 is reciprocated, but the settings of the memory slides remain unchanged because the key 486 is elevated before this reciprocation takes place (compare line 5 in FIG. 81 and line 8 in FIG. 82 and see also FIG. 33). During this cycle of operation, the mode of operation bank 280 frees the group slide 501 to permit operation of the three tax amount keys 284–286 and shifts the yoke 513 so that the notch 513b is aligned with the cash-credit start slide 510 and the notch 513a is not aligned with the tax start slide 515.

The cash register 250 is now in a condition in which the total value of the items in the first taxable group is displayed by the indicating assembly 260, the cash-credit start slide is ineffective, the tax start slide 515 is effective, and the tax keys 284–286 are freed for operation. The operator now determines the amount of the first tax amount due and this amount is entered in the amount banks 276. The first tax amount key 284 is then depressed to shift the tax amount group slide 501 to its set position to advise the mode of operation bank 280 that a tax amount is to be entered during the ensuing operation. When the slide 501 is set, the projections 501b move beneath the shoulders 468c–470c to block the automatic keys 468–470. In addition, the depression of the key 264 displaces the tax start slide 515 to the left (FIG. 22) so that the end portion 515b of this slide pivots the start yoke 513 to initiate a cycle of operation of the cash register.

Figure 32:
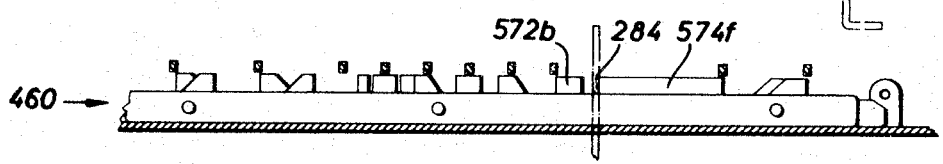
Figure 33:
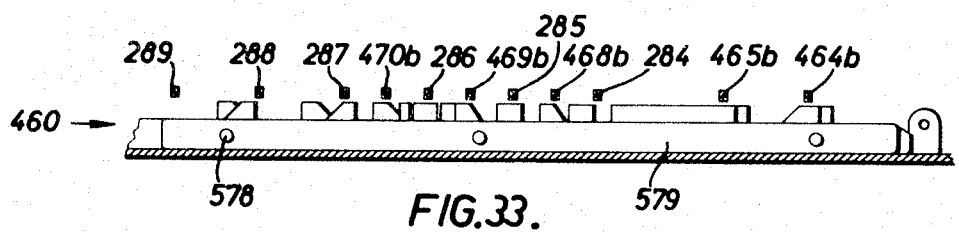

At the start of this cycle of operation of the cash register 250, the slide 550 is again actuated to release all of the automatic keys. However, since the keys 464 and 465 are blocked against depression by the account memory means 460 and since the keys 468–470 are blocked by the group slide 501, the automatic keys are not operated. The account differential assembly is set in its eighth position by the depressed key 284 to select the first tax amount accumulator, and the amount differential assemblies transfer the entered tax amount into this accumulator. During a further portion of the cycle of rotation of the main shaft 314, the slide 580 moves the account memory means 460 to its extreme left position. During this movement, the shaft 467 for the actuated key 284 engages the projection 574f on the auxiliary slide 574 to move this slide to the right relative to the remainder of the slides in the account memory means 460 to its normal position (FIG. 32). The slide 580 then moves the memory means 460 to its extreme right position so that the shaft 467 of the depressed key 284 engages the projecting portion 572b on the first taxable item memory slide 572. This moves the memory slide 572 to the left relative to the remainder of the memory means 460 so that this memory slide is restored to its normal condition. The depressed key 284 is then restored to a normal condition (line 3 in FIG. 82) to release the start slide 515 and the account memory means 460 is returned to its central or normal position (line 8 in FIG. 82).

The restoration of the auxiliary slide 574 frees the automatic keys 469 and 470 and the manual keys 285 and 286. However, the keys 286 and 470 remain blocked by the auxiliary slide 573. The restoration of the first taxable item memory slide 572 blocks the depression of the manual key 284 and the automatic key 468. The restoration of this slide also removes one set of projections, i.e., 572c and 572d, from beneath the automatic keys 464 and 465. However, the cash and credit automatic keys 465 and 464 remain blocked.

During and at the end of the cycle of operation, the mode of operation bank 280 locks the tax amount group slide 501 in a normal position to free the keys 468–470 and to lock the keys 284–286. The bank 280 also shifts the start yoke 513 to render the slide 515 ineffective and to render the slide 510 effective. Since the slide 510 is still in an operated position, an additional cycle of operation of the cash register 250 is initiated. The slides are now in a position in which only the automatic second taxable item key 469 can be depressed.

During the next cycle of operation of the cash register 250, the second taxable item automatic key 469 is lowered by the connected spring 466 and under the control of the slide 550 so that its lower end controls setting movement of the account differential assembly 258 to its fourth position in which the second taxable item totalizer is effective to set the indicating assembly 260. During and at the end of this cycle of operation, the mode of operation bank frees the tax amount group slide 501 and shifts the start yoke 513 to render the slide 510 ineffective and the start slide 515 effective. Thus, the register 250 now stops and awaits a manual start.

The operator determines the second tax amount due on the second taxable item total, enters this into the cash register through the amount banks 276, and depresses the second tax amount key 285 which initiates a cycle of operation similar to that described above during which the second tax amount is entered into the second tax amount totalizer. During this cycle of operation, the slide 580 moves the account memory means 460 to its left and right extreme positions and restores this memory means to its normal central position. During the movement to its left position, the auxiliary slide 573 is reset to its normal position in the same manner as the auxiliary slide 574 by engagement with the projection 573d on this slide. During the movement to its right position, the key 285 engages projection 571b on the second taxable item memory slide 571 so that this slide is restored to its normal position to block the keys 285 and 469 with the projection 571c and 571b, respectively. At the end of this cycle of operation, the credit key 464 is blocked only by the memory slide projection 570e. The keys 286 and 470 are freed for operation by the resetting of the auxiliary slide 573. However, the tax amount group slide 501 is locked in normal position by the bank 280 to block the key 286.

An additional cycle of operation of the cash register 250 is now automatically initiated by the shifting yoke 513 during which the automatic third taxable item key 470 is lowered to a depressed condition under the control of the slide 550 so that the total amount in the third tax group is transferred from its accumulator to the indicating assembly 260. The cash register 250 is stopped at the end of this cycle of operation in the manner described above, and the tax amount group slide 501 is freed. The operator now determines the amount of tax due for the total shown on the indicator assembly 260, and this amount is entered by the amount banks 276. The third tax amount key 287 is depressed to actuate the start slide 515 so the cash register 250 starts a cycle of operation during which the amount from the banks 276 is transferred to the third tax accumulator.

During this cycle of operation, the account memory means 460 is shifted to the extreme left and right positions and returns to its normal position. Since an auxiliary slide is not provided in combination with the third taxable item memory slide 570, the movement to the left of the memory means 460 does not result in the adjustment of any of the slides in the memory means 460. However, when the memory means 460 is moved to the extreme right position, the projection 570b on the third taxable item memory slide 570 engages the depressed key 286 so that the third taxable item memory slide 570 is restored to its normal position. This releases the crank 599 to free the taxable item group slide 500 for return to a normal position.

Figure 34:
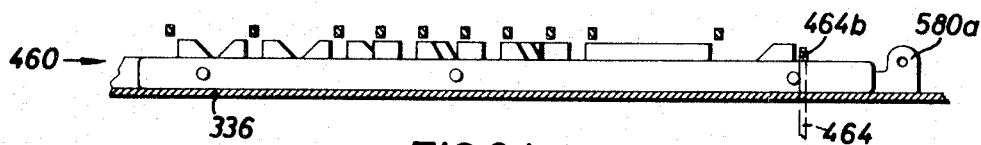

The account memory means 460 is now in the position shown in FIG. 34 in which all of the keys 284-286 and 468-470 are blocked from operation by the slides 570-574 in the memory means 460. The keys 287-289 are blocked by the operated cash-credit start slide 510. The prior operation of the credit key 282 displaced the projecting portion 490c from under the shoulder 464c on the key 464 and held the projection 496c beneath the shoulder 465c on the key 465. Thus, only the key 464 is capable of operation.

The cash register 250 now performs a number of automatically initiated cycles of operation under the control of the cash-credit start slide 510 which was rendered effective to control the starting of the cash register by shifting the position of the start yoke 513 during the preceding cycle of operation in which the third tax amount was entered. The number of different cycles of operation automatically performed by the cash register 250 is determined by the program of the cash register. In the illustrated embodiment of the cash register 250, the program is such that a credit total operation is terminated by three successive cycles of operation of the cash register, in a first of which an automatic subtotal operation is performed to provide a customer receipt, in second of which the customer number is automatically transferred to the printing assembly 266, and in a third of which the total standing in a transaction itemizer is transferred to the credit accumulator selected by the account differential assembly 258 in its ninth position. If the total operation has been initiated by the depression of the cash key 283, the cash register performs only two automatically initiated cycles of operation corresponding to the second and third operations of the cash register during a credit total operation. Even though the account differential assembly 258 is set to its ninth position by the depressed key 464 on three successive cycles during a credit total operation or by the key 465 on two successive cycles of operation on a cash total operation, an accumulator control means provided in the accumulator assembly 264 selectively renders the accumulator selected by the account differential assembly 258 effective in only certain ones of these cycles of operation in dependence on the setting of the mode of operation differential assembly 258.

During the third automatically initiated cycle of operation in the case of a credit total or the second automatically initiated cycle of operation in the case of a cash total, the mode of operation bank 280 controls the setting of the coded element 535 to its eleventh position to render the cam follower lever 529 and the link 528 effective to actuate the cash-credit reset slide 515. This resets the depressed stem 467 of the credit key 282 and permits both the credit group slide 490 and the cash group slide 496 to be restored to a normal position in which the projections 490c and 496c are again disposed beneath the shoulders 464c and 465c on the automatic keys 464 and 465 to prevent their depression. Further, when the key 282 is restored to its normal condition, the spring 511 restores the cash-credit start slide 510 to its normal position to interrupt continued operation of the cash register 250. When the start slide 510 is restored to its normal condition, the projections 510e are moved from beneath the arms 467e on the shafts 467 of the taxable item keys 287-289 to free these keys for subsequent operation. Further, the arms 510d are again moved beneath the pins 514 to further block operation of the automatic keys 468-470.

*Merchandise bank 278*

(1) GENERAL CONSTRUCTION

The merchandise bank 278 forms one of the transaction banks in the keyboard assembly 256 and, more particularly, comprises a selector bank for controlling the selection of different accumulators in the group of merchandise accumulators in the totalizer assembly 264. The selective operation of the keys I-IX (FIG. 4) in the merchandise bank 278 controls the operation of the associated merchandise differential assembly 258 to render different ones of the accumulators in the accumulator assembly 264 effective to receive or transmit data. The merchandise differential assembly can also control the accumulator assembly 264 to prevent the storage of data from the keyboard assembly 256 in selected accumulator groups. The merchandise bank 278 is a motorized bank so that the operation of one of the keys 290 therein is effective to initiate a cycle of operation of the cash register 250. In addition, the merchandise bank 278 operates in conjunction with the mode of operation bank 280 to control the selective restoring of the amount banks 276 and the account bank 277 during repeat operation. When the cash register is conditioned for a repeat operation, a data item previously entered into the keyboard assembly 256 is repeatedly entered into the cash register 250 for so long as one of the keys 290 in the merchandise bank 278 remains actuated.

In its construction, the merchandise bank 278 is substantially identical to the construction of the amount bank 276 except that the bank 278 also includes a start slide for initiating a cycle of operation of the cash register 250. As illustrated in FIGS. 4 and 6, the merchandise bank 278 includes nine keys 290 which are designated by the numerals I–IX. These keys are used to control the selection of nine separate accumulators in the assembly 264 and to set the merchandise differential assembly 258 to its ninth through first positions, respectively. The assemblies 260 and 266 are controlled to display "I–IX" when the merchandise differential assembly 258 is set in its ninth through first positions, respectively.

As indicated above, the construction of the merchandise bank 278 is identical to the construction of the amount banks 276, and the bank 278 is therefore not shown in detail. In general, each of the keys 290 includes a key shaft 610 (FIG. 6A) that is slidably mounted on the frame for the keyboard assembly 256. The lower end of each of the key stems 610 projects below the lower surface of the frame, when actuated, to be moved into the path of movement of the related differential assembly 258. The buttons of the keys 290 are resiliently connected to the key stems or shafts 610 by the springs 335, and an actuated one of the key shafts 610 is releasably held in an actuated or depressed condition by one of the plurality of the spring biased detents 338. The merchandise bank 278 is a flexible bank so that the depression of one of the key shafts 610 causes a projecting portion 610a thereon to actuate the related coupling link 346. This displaces the coupling links 346 so that any other actuated key 290 is restored to a normal condition and so that an indication is provided to the zero stop means for the bank 278 indicating that one of the keys 290 has been actuated.

To provide a means for locking an actuated one of the keys 290 in a depressed condition and to prevent actuation of other keys 290 when a cycle of operation of the cash register 250 has been initiated, the merchandise bank 278 includes a latching slide 611 which is identical to the latching slide 375 in the amount bank 276 and which is actuated by the element 378 (FIG. 5). The projecting portions of the upper edge of the slide 611 cooperate with a projecting portion 610b on the key shaft 610 either to lock this key in a depressed condition or to prevent depression of this key following the initiation of the cycle of operation of the cash register 250.

The merchandise bank 278 also includes a zero stop assembly of generally the same construction provided in the amount banks 276. This zero stop assembly includes a zero stop element 609 (FIG. 73) which is actuated by one of the projecting portions 475a on the plate 475 (FIG. 5) and which is controlled by the last coupling link 346 in the series of coupling links associated with the key shafts 610. The last link 346 renders the zero stop 609 ineffective whenever one of the keys 290 is actuated, and this zero stop is rendered effective to arrest the operation of the merchandise differential assembly 258 in a zero position when the keys 290 are not actuated. The zero stop assembly for the merchandise bank 278 is operated at the same time as the zero stop means provided in the other selector banks and prior to the operation of the zero stop means in the print banks 275 and the amount banks 276 (compare lines 1–3 in FIG. 81).

(2) MERCHANDISE GROUP SLIDE

The merchandise bank 278 also includes a group slide 612 (FIGS. 6A and 21) that is actuated whenever one of the keys 290 in the bank 278 is depressed to advise the mode of operation bank 280 that merchandise key has been operated. The group slide 612 is also actuated by the mode of operation bank 280 to selectively free or block the keys 290 for operation in accordance with the program of the cash register 250. In order to prevent concurrent operation of the credit and cash keys 282 and 283 and one of the merchandise keys 290, the group slide 612 is interconnected with the group slides 490 and 496 in the account bank 277.

The group slide 612 is slidably mounted on the base plate 310 (FIG. 6A) adjacent the latching slide 611 and is provided with a plurality of projecting portions 612a (FIG. 21) having an inclined surface that is normally disposed beneath the projection 610b on the related key shaft 610. Whenever one of the keys 610 is depressed, the projecting portion 610b engages the inclined surface on the related projecting portion 612a to move the group slide 612 downwardly and to the left (FIG. 21). One end of the group slide 612 is connected to one arm of an L-shaped lever 613 that is pivotally mounted on a post 614. The other end of the lever 613 is connected to one of the connecting slides 494. The other end of this connecting slide is connected to one arm of an L-shaped lever 615 that is pivotally mounted on the post 373. The other end of this lever is connected to a merchandise group slide 616 in the mode of operation bank 280. Thus, when the group slide 612 is moved downwardly and to the left by the actuation of one of the keys 290, the corresponding merchandise group slide 616 in the mode of operation bank 280 is moved upwardly and to the right. Similarly, when the merchandise group slide 616 in the mode of operation bank 280 is held in normal position, the group slide 612 in the merchandise bank 278 is held in normal position with projection 612a beneath the projecting portion 610b on the key stem 610. This prevents manual actuation of the keys 290. The slides 612 and 616 are reset to normal by the start test assembly 267.

As indicated above, the group slides 490 and 496 in the account bank 277 and the group slide 612 in the merchandise bank 278 are interconnected. More specifically, one end of a lever 617 (FIG. 21) which is pivotally mounted on the post 493 passes through enlarged openings in the group slides 500 and 501 and is received within restricted openings in the group slides 490 and 496. The other end of the lever 617 is connected to the group slide 612. Therefore, whenever the slide 612 is actuated by operation of one of the keys 290 to move the slide 612 downwardly, the lever 617 is pivoted about the post 493 in a clockwise direction to shift the group slides 490 and 496 to a position in which operation of the related keys 282 and 283 is blocked. Similarly, actuation of either one of the keys 282 or 283 pivots the lever 617 in a counterclockwise direction so that the merchandise group slide is moved upwardly to block actuation of any of the keys 290.

(3) MERCHANDISE START SLIDE

The merchandise bank 278 is a motorized bank and includes a start slide 618 for initiating a cycle of operation of the cash register 250. The start slide 618 is slidably mounted on the upper surface of the plate 310 immediately adjacent the group slide 612. The slide 618 includes a plurality of projecting portions along its upper edge having inclined surfaces disposed beneath the projections 610b on the key shaft 610. Whenever one of the keys 290 is operated so that the corresponding key shaft 610 is depressed, the projecting portion 610b engages the inclined surface to move the slide 610 toward the front of the keyboard assembly 256 to engage and pivot the start yoke 513 (FIG. 72). The start slide 618 is returned to its normal position by resilient biasing means when the depressed one of the key shafts 610 is restored to its normal condition.

(4) KEY RESTORING MEANS AND REPEAT CONTROL

The merchandise bank 278 includes means controlled by the mode of operation bank 280 for selectively resetting the keys 290 to a normal condition toward the end of each cycle of operation of the cash register 250. This resetting means for the merchandise bank 278 is also manually controlled by the keys 290 in the bank 278 so that the restoring means for the keys in the print banks 275, the amount banks 276, and the account bank 277 are rendered effective or ineffective in accordance with the operated or released condition of the keys 290 in the merchandise bank 278. This provides for the repeated entry of identical data items from the keyboard assembly 256.

The keys 290 and the related key shafts 610 in the merchandise bank 278 are reset under the control of the coupling links 346 in much the same manner as the keys in the banks 275 and 276. The first coupling link 346 is adapted to be engaged by a resetting element or stem 619 (FIG. 48) that is slidably mounted on the channel 361. A shoulder on the element 619 is engaged by a pair of arms 620 and 621 (FIG. 47). The arm 620 is keyed to the shaft 414 so that when the keyboard assembly 256 is reset by a motor controlled reset operation initiated by the actuation of the key 309 (FIG. 4), the clockwise movement of the shaft 414 pivots the arm 620 to depress the stem 619. This pivots the first coupling element 346 in a counterclockwise direction, and the counterclockwise movement is transmitted to the remaining coupling links 346 so that the depressed one of the key shafts 610 is restored to its normal condition.

To provide controllable means for resetting the keys in the bank 278 and for controlling the resetting of the banks 275, 276 and 277, the arm 621 is pivotally mounted on the shaft 414 and is secured by a sleeve to an arm 622 that is also rotatably mounted on the shaft 414. A pin 623 is secured to a lower end of the arm 622 within an opening 624 and is received within a notch formed in an upper edge of an end portion 411b of the yoke 411, which yoke is pivotally mounted on the shaft 412.

The arm 621 is pivotally connected to a link 625 that is also pivotally connected to one arm 626a of a cam follower lever 262 by a pin 627 and a spacer sleeve 628. The lever 626 (see also FIG. 5) is pivotally mounted on the shaft 414 and includes an additional cam follower arm 626b. The arm 626a is adapted to engage a cam 629 that is keyed to the shaft 314, and the arm 626b is adapted to engage the outer periphery of a cam 630 that is also keyed to the shaft 314. A plurality of discs 631 mounted on the shaft 314 guide movement of the arms 626a and 626b relative to the cams 629 and 630, respectively.

To provide means for selectively rendering the restoring means for the key bank 278 effective or ineffective in accordance with the setting of the mode of operation bank 280, a control disc 632 is keyed to the shaft 412 which is set to eleven positions corresponding to the eleven settings of the mode of operation differential assembly 258. The disc 632 (FIGS. 47, 48 and 77) is positioned in the path of movement of a pin 633 carried on the link 625 and is provided with one recess 632a (FIG. 77) that is disposed in the path of movement of the testing pin 633 when the shaft 412 has been operated to a position corresponding to the ninth setting of the mode of operation differential assembly 258. A tension spring 634 connected between the frame of the keyboard assembly 256 and the arm 622 biases this arm and the arm 621 for movement about the shaft 414 in a clockwise direction so that an edge of the link 625 is normally held in engagement with a pin 635 that is secured to the frame.

Assuming that a cycle of operation of the cash register 250 has been initiated and that the mode of operation bank 280 sets the shaft 412 to any of its eleven settings except the ninth setting, the outer periphery of the control disc 632 is disposed in the path of movement of the pin 633. The main shaft 314 for the keyboard assembly 256 is placed in rotation so that following 260° of rotation (see line 1 in FIG. 82), the cams 629 and 630 pivot the lever 626 about the shaft 414 in a counterclockwise direction from the normal position shown in FIG. 48. This moves the lower end of the link 625 to the right so that the pin 633 engages the outer edge of the disc 632. During continuing movement of the lever 626, the link 625 pivots in a counterclockwise direction about the pin 633 to pivot the arm 621 in a clockwise direction about the shaft 414. This depresses the stem 619 so that the depressed merchandise key 290 in the bank 278 is restored to a normal condition.

The pivotal movement of the link 625 about the pin 626 also pivots the arm 622 in a clockwise direction about the shaft 414 so that the yoke 411 is pivoted in a counterclockwise direction about the shaft 412. This movement of the yoke 411 shifts the projecting portion 411a on the yoke 411 and the projecting portion on the disc 546 that is connected to the yoke 411 to their effective positions disposed in the paths of movement of the testing pins 409 and 545, respectively. This movement is completed by 278° of rotation so that when the restoring means for the keys in the amount bank 276 and the account bank 277 are subsequently rendered effective (see lines 1, 2 and 3 of FIG. 82), the resetting means are operated to restore the keys in the banks 275, 276 and 277. The continuing rotation of the main shaft 314 restores the lever 626 to its normal position (FIG. 48) together with the components controlled thereby.

Assuming, however, that the cash register 250 has been conditioned for a listing operation so that the shaft 412 has been set to its ninth position, the notch 632a is disposed in the path of movement of the pin 633. Therefore, when the lever 626 is pivoted in a counterclockwise direction about the shaft 414 and the link 625 is moved to the right, the pin 633 enters the recess 632a and the link 625 is not positively pivoted about the pin 633 by the movement of the lever 626. If none of the keys 290 in the merchandise bank 278 are manually held in a depressed condition to indicate that repeated entry of the data item into the cash register 250 is desired, the spring 634 is now enabled to pivot the arms 621 and 622 in a clockwise direction about the shaft 414. The arm 621 depresses the restoring element 619 to pivot the coupling links 346 so that the depressed one of the keys 290 in the merchandise bank 278 is restored.

The pivotal movement of the arm 622 pivots the yoke 411 so that the amount bank 276 and the account bank 277 are restored. This operation by the spring 234 is possible because the force provided by this spring exceeds the force provided by the resilient bias for the detent 338 associated with the depressed key shaft 610 and because the lower end of the link 625 has been shifted to the right from the position shown in FIG. 48 to move the edge of the link 625 away from engagement with the stop pin 635. The cams 629 and 630 restore the components controlled thereby to their normal position during the final movement of the main shaft 314.

Assuming that one of the keys 290 in the merchandise bank 278 is manually held in a depressed condition to produce repeated entries of the amount entered into the keyboard assembly 256, the counterclockwise movement of the lever 626 about the shaft 414 again moves the pin 633 into the recess 632a in the control disc 632, but the manual force exerted on the depressed key overcomes the resilient bias provided by the spring 634. Thus, the arms 622 and 621 remain in their normal positions so that the stem 619 is not depressed and the yoke 411 is not pivoted about the shaft 412. This prevents the operation of the restoring means for the banks 275, 276, 277 and 278. Since the depressed key 290 is not restored, the start slide 618 maintains the yoke 513 in a deflected position so that the cash register 250 starts an additional cycle of operation during which the previous entry remaining in the keyboard assembly 256 is again entered into the cash register. This operation continues until such time as the depressed key 290 in the merchandise bank 278 is manually released.

At the end of the cycle of operation in which the key 290 is released, the spring 634 is rendered effective to pivot the arms 621 and 622 in a clockwise direction about the shaft 414. This restores the actuated key 290 in the merchandise bank 278 and pivots the yoke 411 to its effective position so that the banks 275, 276 and 277 are restored to normal conditions. Since the operated key 290 is now restored, the merchandise start slide 618 returns to its normal position, and an additional cycle of operation of the cash register 250 is not initiated.

Clerk bank 279

(1) GENERAL CONSTRUCTION

The clerk bank 279 provides one selector bank by which selected accumulators in the accumulator assembly 264 are condtiioned to receive or supply data during operation of the cash register 250. The clerk bank 279 is shown as including two lock-type keys 291a and 291b for controlling the setting of the related clerk differential assembly 258 to select either a clerk A or a clerk B accumulator during data entering or recovering operations. Additional clerk keys up to a total of nine can be provided. The keys 291a and b in the clerk's bank 279 also control a keyboard latching means that frees the keyboard assembly 256 for operation when one of the keys 291 has been actuated. The clerk bank 279 normally is not effective to control the initiation of a cycle of operation of the cash register 250, but can be rendered effective to start the cash register 250 when certain reading and resetting operations controlled by the lock bank 281 are to be performed.

In general, the clerk bank 279 is constructed in the same manner as the print banks 275 and the amount banks 276, except that the keys 291 are of a "pop-up" locking construction. Each of the keys 291 includes a lock cylinder or barrel 640 (FIG. 6B) that is connected to a key shaft or stem 641 which is slidably mounted in the plates 310 and 336. When a key 642 (FIG. 1) is inserted into one of the barrels 640 and turned in a counterclockwise direction to the position shown in FIG. 1, the key 642 can be actuated to depress the key shaft 641 to its lower or actuated position in which its lower end is effective to control the setting of the related clerk differential assembly 258. The key shafts 641 are selectively held in normal or depressed conditions by spring biased detent elements 338 (FIG. 6B).

The clerk's bank 279 includes a pair of coupling links 346, one of which is shown in FIGS. 49 and 50, pivotally mounted between the plates 343 and 344 adjacent the keys 291 and 291b to provide means for controlling a clerk zero stop assembly and a second clerk latching slide. The zero stop assembly includes a zero stop element 643 (FIG. 50) that is actuated by a projection on the plate 475a concurrently with and in the same manner as the zero stop means in the account bank 277 and the merchandise bank 278. The zero stop element 643 is provided with a projecting portion 643a that is selectively released for or blocked against movement to a depressed or effective setting in accordance with the position of the arm 346d on the coupling element 346 associated with the key 291a.

The clerk bank 279 includes a first latching slide 644 (FIGS. 6B and 49) of the type provided in the amount banks 276 and the merchandise bank 278. The first latching slide 644 is slidably mounted on the upper surface of the plate 310 for movement parallel to the plate 344. The slide 644 includes two latching portions 644a (FIG. 49) on its upper rear edge which are disposed adjacent projecting arms 641b formed on the key shafts 641 of the keys 291a and 291b. The arms 641b are normally disposed in alignment with the openings defined by the latching portion 644a to permit either one of the two key shafts 641 to be depressed. When the slide 644 is actuated, the latching portion 644a moves over the arm 641b on the depressed key 641 to maintain this key in a locked condition. The other latching portion 644a moves beneath the arm 641b on the normal key 641 to prevent its actuation. The forward end of the slide 644 is connected to the plate 378 (FIG. 20) and is actuated in synchronism with the other latching slides, such as the slide 375, under the control of the pivotal movement of the shaft 383. The slide 644 is used in the clerk bank 279 only to prevent operation of a normal one of the keys 291a or b following the initiation of a cycle of operation of the cash register 250 because this bank includes an additional locking slide that performs the primary function of retaining a depressed key in an operated condition until the proper time for restoring this key is reached.

(2) CLERK GROUP SLIDE

The clerk bank 279 includes a group slide 645 (FIGS. 6B, 21 and 49) which is actuated by the depression of one of the keys 291 to advise the mode of operation bank 280 that a clerk key has been operated. The slide 645 is not controlled by the mode of operation bank 280 to block manual actuation of the keys 291. The group slide 645 is slidably mounted on the upper surface of the plate 310 interposed between the right edge of the key shafts 641 (FIG. 6B) and the plate 344. The lower edge of the slide 645 is provided with a plurality of notch portions 645a (FIG. 49) into which the upturned lower ends of the detents 338 extend. The upper edge of the slide 645 is provided with a plurality of projecting portions 645b having inclined surfaces that are normally disposed beneath projecting arms 641c on the key shafts 641. When either one of the keys 291 is actuated, the depression of the related key shaft 641 cams the arm 641c against the tapered surface on the projecting portion 645b, and the slide 645 is moved downwardly (FIGS. 21B and 49).

In order to transmit movement of the clerk group slide 645 to a corresponding clerk group slide 646 in the mode of operation bank 280, the lower edge of the slide 645 is provided with a notched recess 645c (FIGS. 21B and 49) in which is received one end of a lever 647. The lever 647 is pivotally mounted on the shaft 373 and includes a portion that is connected to the slide 646 and passes through openings in the adjacent group slides in the mode of operation bank 280. When the slide 465 is moved downwardly in FIG. 21B, the lever 647 pivots about the shaft 373 to move the slide 646 upwardly. Similarly, when the slide 646 is moved downwardly, the slide 645 is moved upwardly to its normal position.

(3) CLERK START SLIDE

The clerk bank 279 includes a start slide 648 (FIGS. 6B and 49) that is normally ineffective to initiate a cycle of operation of the cash register 250. The start slide 648 is rendered effective to start the cash register 250 during certain resetting and reading operations controlled by the lock bank 281 under the control of the actuation of selected keys in the bank 281.

The start slide 648 is slidably mounted on the upper surface of the plate 310 immediately adjacent the first latching slide 644 (FIG. 6B). A tension spring 649 connected between the slide 648 and the frame of the keyboard assembly 256 normally biases the slide 648 to a position in which a pair of inclined surfaces 648a (FIG. 49) formed on the upper edge of the slide 648 are disposed beneath the arms 641b on the two key shafts 641. In the normal position of the start yoke 513 (FIGS. 69 and 72), the slide 648 is aligned with a recessed portion 513c on the yoke and is ineffective to pivot it. When the slide 648 is to be rendered effective to start the cash register 250, the lock bank 281 shifts the yoke 513 to the right (FIG. 72) so that the slide 648 is aligned with the edge of the yoke 513. The depression of one of the keys 291 cams the arm 641b against the adjacent surface 648a to move the slide 648 downwardly (FIG. 49) against the action of the tension spring 649. A projecting front edge 648b on the start slide 648 engages the start yoke 512 and pivots this yoke in a clockwise direction about the shaft 412 (FIG. 69) to initiate a start operation. The spring 649 returns the start slide 648 to its normal position when the depressed one of the keys 291 is restored to a normal condition.

(4) SECOND CLERK LATCHING SLIDE

The clerk bank 279 includes a second latching slide 649 that is used to latch an actuated one of the keys 291 in a depressed condition and to prevent actuation of more than one key in the bank 279. The second latching slide 649 is moved to an effective or latching position in direct response to the actuation of one of the keys 291 without regard to the initiation of a cycle of operation of the cash register 250 and is selectively released for return to an ineffective position during a cycle of operation of the cash register 250 under the control of the mode of operation bank 280.

The second latching slide 649 is slidably mounted on the upper surface of the plate 310 (FIGS. 6, 49 and 50) interposed between the plate 344 and the first latching slide 644. The slide 649 includes two latching portions 649a similar to the latching portions 644a on the first latching slide 644. The latching portions 649a cooperate with the arms 641b on the two key shafts 641.

To move the second latching slide 649 to an operated or effective position in direct response to the actuation of one of the keys 291, an operating slide or link 650 (FIGS. 49 and 50) is provided. The slide 650 is slidably mounted on the upper surface of the plate 310 adjacent the left surface of the plate 343 (FIG. 6B). The forward edge of the slide 650 is normally held in engagement with a pin 651 (FIGS. 49 and 50) which is secured within an opening 652 in the slide 649 and which extends through suitable openings formed in the plates 343 and 344. The slide 651 is held in engagement with the pin 651 by a tension spring 653 that is connected between a lug on the slide 650 and a pin 654 which is secured within an opening 655 on the slide 649. The pin 654 extends through suitable openings formed in the plates 343 and 344. The rear end of the slide 650 carries a roller or pin 656 that bears against the depending leg 346a of the coupling link 346 associated with the key shaft 641 of the key 291a.

This coupling link 346 is pivoted in a counterclockwise direction (FIG. 50) whenever either one of the two key shafts 641 is depressed. The leg 346a of this coupling link bears against the roller or pin 656 to move the slide 650 to the right. This movement of the slide 650 is transmitted through the tension spring 653 and the pin 654 to move the second latching slide 649 to the right (FIG. 50) or upwardly (FIG. 49) so that the latching portion 649a passes over the top of the arm 641b on the depressed key shaft 641 to latch the operated one of the two clerk keys 291 in a depressed condition. The depressed key holds the slides 649 and 650 in their operated conditions against the action of a tension spring 657 (FIG. 50) which is connected between the slide 650 and the frame and which tends to return these slides to their normal positions.

To provide means for selectively restoring the second latching slide 649 to a normal position under the control of the setting of the mode of operation bank 280, the front end of this slide is pivotally connected to a link 658 (FIGS. 50 and 51) that extends upwardly through an opening 659 in the plate 336 and is received within a guiding slot or notch formed in a lower edge of the channel element 361. A pin 660 secured to the other end of the link 658 is received within a notch 661 formed in a lower end of an arm 662 that is pivotally mounted on the shaft 414. The lower end of the arm 662 is pivotally connected to the upper end of a link 663 by a pin 664, and the lower end of the link 663 is pivotally connected to a lower arm 665a of a cam follower lever 665 by a pivot pin 666 and a spacing sleeve 667. The lever 665 is pivotally mounted on the shaft 414 and includes a second or upper arm 665b. The lower arm 665a cooperates with a cam 668 that is keyed to the shaft 314, and the arm 665b cooperates with a cam 669 that is also keyed to the shaft 314. Three discs 670 mounted on the shaft 314 adjacent the cams 668 and 669 guide movement of the arms 665a and 665b relative to the outer peripheries of the cams.

As indicated above, the drive mechanism shown in FIG. 51 is selectively rendered effective to reset the second latching slide 649 under the control of the mode of operation bank 280. This control is exerted by a coded member 671 that is keyed to the shaft 412. The coded member 671 includes projecting portions 671a (FIG. 76) in positions corresponding to the second, sixth and eleventh settings of the mode of operation bank 280 that are selectively moved into and out of the path of movement of a detecting pin 672 secured to the link 663. When a projecting portion 671a is placed on the path of movement of the pin 672, the slide 649 is reset. Alternatively, when the pin 672 does not engage one of the projections 671a on the member 671 during its movement, the slide 649 remains in its latching or effective position.

Assuming that the operated one of the clerk keys 290 is to be restored during a cycle of operation of the cash register 250, the mode of operation bank 280 is operated during an initial portion of the cycle of rotation of the main shaft 314 (see line 6 in FIG. 81) to its second, sixth or eleventh setting so that the code disc 671 is set with one of the projections 671a in the path of movement of the pin 672. In FIG. 50, the shaft 412 is set in a position corresponding to the eleventh position of the mode of operation differential assembly 258. When the main shaft 314 has passed through approximately 305° rotation (see line 6 in FIG. 82), the cams 668 and 669 pivot the lever 665 in a counterclockwise direction about the shaft 414 so that the lower end of the link 663 is moved to the right. The pin 672 is moved into engagement with the projection 671a so that continuing counterclockwise movement of the lever 665 produces counterclockwise movement of the link 663 about the pivot pin 672. This pivots the arm 662 in a clockwise direction about the shaft 414 so that the link 658 and the second latching slide 649 are moved to the left (FIG. 50).

This movement of the slide 649 is transmitted through the tension spring 653 to the slide 650 and is effective through the pin or roller 656 to pivot the links 346 associated with the keys 291a and 291b in a clockwise direction. During this movement, the arms on these two coupling links engage the arms 641a on the depressed key shaft 641 to restore the previously actuated one of the clerk keys 291. These keys are released for movement to a normal position by the displacement of the latching portions 649a on the second latching slide 649. The lever 665 and the components controlled thereby are restored to a normal condition at the end of the cycle of rotation of the main shaft 314 (see line 6 in FIG. 82).

Alternatively, if the mode of operation bank 280 controls the setting of the shaft 412 to a position in which one of the projections 671a is not disposed in the path of movement of the detecting pin 672, the pivotal movement of the lever 665 during the rotation of the main shaft 314 is still effective to shift the position of the link 663, but the pin 672 is not blocked to produce counterclockwise movement of the link 663. Thus, the slide 649 remains in its set or effective position, and the depressed key is not automatically restored during this cycle of operation of the cash register 250.

To provide means for resetting the clerk bank 279 during a motor controlled correction operation initiated by the actuation of the key 309, a hub 673 (FIG. 51) is keyed to the shaft 414. This hub includes a projecting portion 673a that is received within an opening 674 in the arm 662. When a motor controlled restoring or correction operation is initiated by depressing the key 309, the shaft 414 is pivoted in a clockwise direction (FIGS. 50 and 51) so that the left edge of the projecting portion 673a engages the left edge of the opening 674. This displaces the link 658 and the slide 649 to the left to reset the clerk bank 279 in the manner described above. The opening 674 is enlarged to permit the arm 662 to be pivoted on the shaft 414 without producing a corresponding movement of the hub 673 that is keyed to this shaft.

(5) KEYBOARD LATCH

The keyboard assembly 256 includes a keyboard latch or lock for preventing operation of the keyboard unless one of the keys in the clerk bank 279 or one of the keys in the lock bank 281 has been actuated. This latching means is provided by a latching or detent element 675 (FIGS. 21B, 50 and 52) that is pivotally mounted on the plate 310 adjacent the back wall of the keyboard assembly 256 by a stud 676. The latch element 675 includes a projecting portion 675a that is disposed within notches formed in the lower edges of the plurality of connecting slides 494 (FIG. 21B). In its normal or latching position, the portion 675a engages the right shoulder of the notches in the connecting slides 494 to prevent the slides from being moved to the left. Thus, the group slides 367, 490, 496, 500, 501 and 612 in the banks 275, 276, 277 and 278 are locked against movement to a set position. Therefore, when an attempt is made to operate a key in one of these banks, the arm on the key shaft engages the locked group slide and is blocked against depression. Thus, the latch element 675 in its normal position prevents the actuation of the keys in the banks 275–278.

The latching element 475 is selectively rendered effective and ineffective under the control of the clerk bank 279 and the lock bank 281. To provide means for rendering the latch element 475 ineffective when one of the keys 291 in the clerk bank 279 is actuated, the lower edge of the second latching slide 649 is provided with a depending portion 649b which extends downwardly through an opening 310a (FIG. 50) in the plate 310 to be received within a notch 677 formed in a slide 678 that is slidably mounted on the lower surface of the plate 310. A pin 679 is secured to the other end of the slide 678 and extends vertically upward through another opening in the plate 310, a curved cam opening 680 (FIG. 52) in the latch element 675, and a straight slot 681 that is formed in the bight portion of a U-shaped bracket 682 that is secured to the upper surface of the plate 310.

As soon as one of the keys 291a or 291b is depressed, the slide 649 is moved to the right (FIG. 50) or upwardly (FIG. 52) to move the slide 678 and the pin 679 in a corresponding direction. The pin 679 engages the walls defining the curved slot 680 so that the latch element 675 is pivoted in a clockwise direction about the stud 676 to a displaced position spaced from the shoulders forming the notches in the lower edges of the connecting slides 494. This frees the slides for movement to the left (FIG. 21B) and releases the banks 275–278 for operation. When the second latching slide 649 is restored to its normal position, the displacement of the slide 678 and the pin 679 restores the latching element 675 to a normal condition.

Mode of operation bank 280

The mode of operation bank 280 provides one of the transaction banks in the keyboard assembly 256 and is either manually or automatically actuated and controlled to condition the keyboard assembly 256 in the cash register 250 for different types or modes of operation in accordance with the established program for the cash register, the previous operations performed by the cash register, and the data manually entered into the keyboard assembly 256. The mode of operation bank 280 and the mode of operation differential assembly 258 selectively condition the cash register for listing, reading or resetting operations, selectively lock or free the key banks in the assembly 256, control the setting of the shaft 412 by which the assembly 256 is conditioned for different types of operation, control the setting of the start yoke 513, control the printing program performed by the printing assembly 266, and perform various other control operations, such as controlling the accumulator assembly 264 and conditioning the cash register 250 for a second type of repeat operation in which a repeated entry of data is made under the control of the indicating assembly 260. To perform these functions, the keys in the mode of operation bank 280 are automatically or manually actuated under the control of a program memory means 690 (FIGS. 60 and 61) and the plurality of mode of operation group slides, including the slides 374, 491, 497, 502, 505, 616 and 645.

(1) KEY CONSTRUCTION

The mode of operation bank 280 includes the four manually actuated keys 292–295 and ten automatically actuated keys 691–700 (FIG. 54) that are individually operated during each cycle of the operation of the cash register 250 to control the setting of the mode of operation differential assembly 258 to a selected one of eleven different positions. Although the cash register 250 is illustrated as including four manually actuated keys and ten automatically operated keys, the cash register can be provided with a greater or lesser number of manual keys and automatic keys in accordance with the numbers and types of operations to be performed by the cash register 250.

Each of the manual keys 292–295 includes a key shaft or stem 701 (FIGS. 53A and 53B), and each of the automatic keys 691–701 includes a key shaft or stem 702. These two key stems or shafts are substantially identical except that the key stems 701 includes portions at their upper ends projecting through openings in the plate 313 for receiving the buttons on the keys 292–295. The key shafts 701 and 702 are slidably mounted on the frame of the assembly 256 between a pair of upright side supporting elements or plates 703 (FIGS. 6B and 53A) and 704 (FIGS. 6B and 53E) which are secured to the lower frame plate 310 at their lower ends by notched portions 703a and 704a received within openings in the plate 310 and which are connected at their upper ends by a channel shaped plate 705 (FIGS. 6B and 53A) that is secured to these plates by a plurality of fasteners 706 (FIG. 6B). An intermediate supporting wall element or plate 707 (FIGS. 6B and 53C) is disposed between the plates 703 and 704 and rests on the upper surface of the frame element 310. The lower edge of the plate 707 includes depending lugs 707a (FIG. 53C) that are received within suitable apertures formed in the plate 310, and the upper edge of the plate 707 is provided with a plurality of projecting lugs 707b that are received within openings 705a (FIG. 53A) in the top plate 705.

The key shafts 701 and 702, which are somewhat L-shaped in configuration, are slidably mounted in a plurality of openings 705b (FIG. 53A) in the plate 705 and suitably aligned openings in the frame element 310. The key shafts 701 and 702 normally occupy the position shown in FIG. 6B in which the lower ends of the shafts are spaced above the mode of operation differential assembly 258. When one of these keys is depressed or displaced to an actuated condition (FIGS. 54 and 64), the lower end of the shaft 701 or 702 is moved into the path of movement of the differential assembly 258 to arrest setting movement of the assembly in a desired one of its eleven positions. Each of the shafts 701 and 702 includes an upper portion 701a or 702a (FIGS. 6B, 53A and 53B) that is disposed above and is adapted to be moved into sensing engagement with the program memory means 690. Each of these shafts also includes a horizontally extending arm 701b or 702b that is slidably received within aligned openings 708 and 709 (FIGS. 53C and 53E) formed in the wall elements 707 and 704, respectively, so as to overline the group slides in the mode of operation bank 280. The arms 701b and 702b selectively engage the group slides to control downward movement of the related key shafts 701 and 702. The manual key shafts 701 are resiliently urged in an upward direction by a tension spring 710 (FIG. 6B) that is connected between a pin 711 secured to the key shaft 701 and a portion 703b on the plate 703 (FIGS. 6B and 53A). The automatic key shafts 702 are resiliently biased in a downward direction by a tension spring 712 that is connected between a pin 713 secured to the key shaft 702 and a portion 703c on the plate 703.

(2) START AND LATCHING SLIDES

The mode of operation bank 280 includes means actuated by the operation or depression of one of the manual keys 292–295 for placing the cash register 250 in operation, for preventing the actuation of another one of the manual keys or any of the automatic keys, and for latching a depressed manual key in a depressed condition. These operations are performed by a plurality of slides that are disposed between the plate 703 and the left edge of the key stems 701 and 702 (FIG. 6B).

To prevent concurrent manual actuation of more than one of the manual keys 292–295, the mode of operation bank 280 includes two slides 720 and 721 (FIGS. 53A and 55) which are slidably mounted on the plate 703 by a plurality of pins 722 that are received within elongated slots formed in the slides 720 and 721. The slides 720 and 721 abut at their inner ends and are provided with a plurality of projecting portions 720a and 721a having inclined surfaces that are normally disposed beneath a plurality of pins 723, each secured to the left edge (FIG. 6B) of one of the key shafts 701. When one of the keys 292–295 is depressed, such as the key 295 shown in dashed outline in FIG. 55, the slides 720 and 721 are shifted so that the inclined surfaces on the projections 720a and 721a bear against the pins 723 to prevent the depression of any normal keys. Similarly, when an attempt is made to concurrently depress two or more of the keys 292–295, the engagement of the inclined surfaces on the projections 920a and 921a by the pins 723 prevents the full depression of any of the keys.

To provide means for initiating a cycle of operation of the cash register 250 in response to the depression of one of the manual keys 292–295, the mode of operation bank 280 includes a start slide 724 (FIGS. 6B, 53A and 54) that is slidably mounted on the lower frame element 310 by a plurality of pins 725 that are slidably received within elongated grooves formed in the slide 724 (FIG. 54). The slide 724 includes a plurality of projecting portions 724a formed along its upper edge, each including an inclined surface that is normally disposed beneath the pin 711 on one of the key shafts 701. When one of the keys 292–295 is depressed, such as the key 295 shown in FIG. 54, the pin 711 on the depressed key shaft 701 engages the inclined surface on the projecting portion 724a to move the slide 724 to the left to the position shown in this figure. The left end of the slide 724 bears against the yoke 513 so that when the slide 724 is moved to the left (FIG. 54), the start yoke 513 is pivoted in a clockwise direction about the shaft 412 to initiate a cycle of operation of the cash register 250.

When the start slide 724 is actuated by the depression of one of the manual keys 292–295, an automatic key locking slide 726 (FIGS. 53A and 54) is actuated to an effective setting to which operation of the automatic keys 691–700 is prevented. More specifically, the blocking slide 726 is slidably mounted on the plate 703 by the pins 722 which are received within elongated slots formed in the slide 726. The lower edge of the slide 726 is provided with a depending portion 726a that is received within bifurcations formed in a portion 724b that projects upwardly from the upper edge of the start slide 724. The upper edge of the slide 726 is provided with a plurality of upwardly extending portions 726b that are normally disposed adjacent but to the right of the pins 713 on the key shafts 702.

When the start slide 724 is moved to the left (FIG. 54), the blocking slide 726 is also moved to the left by virtue of its interconnection with the slide 724, and the projecting portions 726b are moved beneath the pins 713. Thus the depression of any of the automatic keys 691–700 is prevented whenever the start slide 724 is shifted in response to the depression of one of the manual keys 292–295. A tension spring 727 (FIG. 54) connected between the frame of the keyboard assembly 256 and the right end of the slide 726 provides means for restoring both of the slides 724 and 726 to a normal position when all of the manual keys 292–295 are restored to a normal position.

The mode of operation bank 280 also includes a latching slide 728 that is operated at the beginning of each cycle of operation of the cash register 250 to positively secure an actuated one of the manual keys 292–295 in a depressed condition and to prevent the depression of one of these keys following the initiation of a cycle of operation. The slide 728 (FIGS. 6B, 53A and 56) is slidably mounted on the upper surface of the lower plate 310 disposed between the start slide 724 and the left edge of the key shafts 701 and 702 (FIG. 6B). The slide 728 (FIG. 56) is slidably connected to the supporting element 703 by the pins 725 that are received within elongated slots formed in the slide. The upper edge of the slide 728 is provided with a plurality of L-shaped portions 728a that are normally disposed to the left of the pins 711 on the key shafts 701. The left end of the slide 728 is provided with a notch 728b in which is received one of the projecting portions 378a on the plate 378.

The slide 728 is moved to the right from the normal position shown in FIG. 56 when a cycle of operation of the cash register 250 is initiated. In this position, the projecting portion 728a that is disposed adjacent a depressed one of the keys 292–295 is disposed above the related pin 711 to prevent the release of the key. The upper edges of the remaining projecting portions 728a are disposed below the pins 711 on the normal ones of the keys 292–295 to prevent depression of these keys. The latching slide 728 is restored to its normal position by the plate 378 at the end of a cycle of operation.

(3) MANUAL KEY RESTORING MEANS

The mode of operation bank 280 includes means actuated by the main shaft 314 in the keyboard assembly 256 for automatically restoring all of the manual keys 292–295 to a normal position at the end of each cycle of operation of the cash register 250. This restoring means includes a slide 729 (FIGS. 6B, 53A, 56 and 57) that is slidably mounted on the plate 703 by the pins 722 which are received within elongated grooves formed in the slide 729. This slide is provided with a plurality of inclined projecting portions 729a at spaced positions along its upper edge that are normally disposed adjacent the pins 723 carried on the key shafts 701 (FIG. 56). With the restoring or resetting slide 729 in its normal position, the keys 292–295 can be depressed without engaging the projecting portions 729a.

To provide means for actuating the restoring slide 729, the forward end of this slide is provided with an upwardly extending portion 729b (FIGS. 5, 56, 57 and 68) having a notch in which is received a pin 730 that is carried on the upper end of a cam follower lever 731. The lever 731 is pivotally mounted on the shaft 484 and is resiliently biased to the normal position shown in FIG. 56 by a tension spring 732 that is interconnected between one of the pins 722 and a pin 733 secured to the lever 731. The cam follower lever 731 is actuated by a single lobe cam 734 that is keyed to the main shaft 314.

Assuming that the manual key 295 has been actuated or depressed and the cash register 250 placed in operation, the main shaft 314 is placed in rotation. After approximately 260° of rotation (see line 5 in FIG. 82), the cam 734 engages the lever 731 and pivots this lever in a counterclockwise direction about the shaft 484 to move the slide 729 to the left from the position shown in FIG. 56 to the position shown in FIG. 57. During this movement, the inclined surface on the projecting portion 729a disposed adjacent the depressed key, such as the key 295, engages the pin 723 to move the depressed manual key upwardly to a normal position. Following approximately 340° of rotation (see line 5 in FIG. 82), the lobe on the cam 734 moves beyond the engaged portion on the lever 731, and the tension spring 732 restores the lever 731 and the slide 729 to the normal position shown in FIG. 56.

(4) AUTOMATIC KEY RELEASING AND RESTORING MEANS

The mode of operation bank 280 includes means actuated by the main shaft 314 for releasing and restoring the automatic keys 691–700 once during each cycle of operation of the cash register 250. When the automatic keys are released, a selected one of these keys is moved to an operated position by the connected biasing spring 712 in accordance with the settings of the mode of operation group slides and the program memory means 690 and in dependence on whether one of the manual keys 292–295 has been actuated. At the end of the cycle of operation, the automatic keys are all restored to a normal condition.

To provide means for releasing the automatic keys and for returning any actuated one of these keys to a normal position incident to each cycle of operation of the cash register 250, the bank 280 includes a plate 735 (FIGS. 6B, 53B, 5B, 58 and 59) that is mounted on the keyboard frame for reciprocating movement by a pin 736 which is secured to the intermediate supporting plate 707 (FIG. 6B) and which is received in an elongated and vertically extending slot 737 in the plate 735. The upper edge of the plate 735 is provided with a plurality of arms 735a that extend upwardly to engage a lower surface of each of the key shafts 702 (FIGS. 6B and 58). The plate 735 is is disposed between a pair of operating slides 738 and 739 (FIG. 53B) and is connected thereto by a pair of studs 740 which are carried on the plate 735 and which are slidably received within two angular grooves 741 formed in each of the slides 738 anad 739. The slides 738 and 739 are mounted on the plate 707 for sliding movement in a horizontal direction by the pin 736, which passes through a pair of horizontally elongated slots 742 in the slides 738 and 739, and by an additional pin 743 which is secured to the plate 707 and which extends through two horizontally elongated slots 744 in the slides 738 and 739. A pair of spacer plates 745 and 746 are disposed adjacent the slides 739 and 738, respectively, and include openings through which the pins 736 and 743 pass. In the normal position of the cash register 250, the pins or studs 740 occupy the upper ends of the slots 741 in the slides 738 and 739 so that the upper ends of the arms 735a engage the key stems 702 to hold the automatic keys 681–700 in normal elevated positions.

To provide means for elevating and lowering the plate 735, the forward ends 738a and 739a of the slides 738 and 739 are connected together by a bearing pin 750 that is pivotally received within a notch formed in an upper end of a lever 751 (FIGS. 5, 58, 59 and 68) which is pivotally mounted on the shaft 484 and which is disposed between the forward portions 738a and 739a. The cam follower lever 751 is rigidly secured to a pair of identical cam follower levers 752 which are pivotally mounted on the shaft 484 and which are disposed on opposite sides of the lever 751. The cam follower lever 751 includes a projecting portion that is adapted to engage a cam 753 which is keyed to the shaft 314 and which is disposed between a pair of identical cams 754. The two cams 754 are keyed to the shaft 314 and are engaged by projecting portions on the two cam follower levers 752. Movement of the levers 751 and 752 relative to the cams 753 and 754 is guided by a plurality of spacing discs 755 which are carried on the shaft 314.

When a cycle of operation of the cash register 250 is initiated, the shaft 314 is rotated in a counterclockwise direction from the normal position shown in FIG. 58 to the position shown in FIG. 59 so that after approximately 20° of rotation (see line 4 of FIG. 81) the levers 751 and 752 have been pivoted in a clockwise direction about the shaft 484 to move the slides 738 and 739 to the right. During this movement, the pins 740 on the plate 735 are forced into the lower ends of the slots 741 so that the plate 735 is lowered relative to the automatic keys 691–700. The vertical movement of the plate 735 during the movement of the slides 738 and 739 is guided by the engagement of the pin 736 with the vertically extending slot 737 in the plate 735.

Assuming that the portions 702a and 702b of the key shaft 702 for the automatic key 694 are not obstructed by the program memory means 690 and the group slides, the tension spring 712 connected to this automatic key moves the key shaft 702 to the depressed or operated position shown in FIG. 59. This downward movement is permitted by the lowering of the arm 735a on the plate 735. Downward movement of the key shafts 702 is limited by engagement of the key stems with the upper edges of the slides 738 and 739. The remaining automatic keys are held against downward movement by engagement with the group slides or the program memory means 690.

After 200° of rotation of the shaft 314 (see line 4 of FIG. 81), the cams 753 and 754 engage the levers 751 and 752 to pivot these levers in a clockwise direction about the shaft 484 so that the slides 738 and 739 are moved to the left from the operated position shown in FIG. 59 to the normal position shown in FIG. 58, this movement being completed at around 285° of rotation of the main shaft 314. During this movement, the pins 740 secured to the plate 735 are forced upwardly in the slots 741, and the arms 735a on the plate 735 engage the key shafts 702 to restore any depressed shaft 702 and to secured all of these shafts in a normal position until the initiation of the next cycle of operation of the cash register 250.

(5) PROGRAM MEMORY MEANS 690

The program memory means 690 is provided in the mode of operation bank 280 to permit the manual keys 292–295 and the automatic keys 691–700 to be operated in only a predetermined sequence so that the cash register 250 can only be operated to receive, store and recover information in a desired and predetermined program. The program memory means 690 cooperates with the plurality of mode of operation group slides to permit the manual keys 292–295 and the automatic keys 691–700 to be operated in accordance with the prior operations performed by the cash register 250, as indicated by the setting of the program memory means 690, and the information supplied to the cash register 250, as indicated by the settings of the group slides actuated by the keys in the keyboard assembly 256. In addition, the program memory means 690 controls the freedom of movement or the setting of the group slides in the mode of operation bank 280 to selectively block or permit movement of the group slides in the banks 275–278 so that the keys of the keyboard assembly 256 are selectively blocked or freed for operation in accordance with the setting of the program memory means 690.

To accomplish these functions, the program memory means 690 includes seven memory slides or elements 761–767 (FIGS. 6B, 53C, 53D, 60 and 61) which are movably mounted beneath the portions 701a and 702a of the key shafts 701 and 702 and which include projecting portions along their upper edges for selectively engaging the portions 701a and 702a to prevent actuation of the related manual and automatic keys to a depressed or effective position. These slides are selectively moved relative to each other to normal and set positions during cycles of operation of the cash register 250 so as to provide different patterns of projections for selectively rendering different ones of the keys 292–295 and 691–700 capable of operation.

A plan view of the seven program memory slides 761–767 is shown in FIG. 79A. These slides comprise the no-repeat slides 761, the auxiliary listing slide 762, the number slides 763, the listing slide 764, the credit slide 765, the cash slide 766 and the reset slide 767. The upper edges of the slides 761–767 are provided with alphabetically designated projecting portions, such as the portions 761e on the no-repeat slide 761, that either are disposed beneath the key shafts 701 and 702 to block the operation of a related one of the keys 292–295 and 691–700 or are engaged by a depressed one of the key shafts during a setting movement of the program memory means 690 to shift the position of the slide to a set position. The right end of each of the slides 761–767 is also provided with a toothed or projecting portion such as a toothed portion 761f on the slide 761 which co-operates with a locking means for securing the memory slides 761–767 in position when the program memory means 690 is in its normal position.

The lower edge of each of the slides 761–767 includes at least one projection such as a projection 761g on the slide 761 that is engaged by resetting means controlled by a depressed one of the keys 292–295 and 691–700 during return movement of the program memory means 690 to reset a previously set one of the slides to its normal positions. The remaining projections on the lower edges of the slides 761–767 are used to support these slides. Each of the slides 763–767 is also provided with a single projection on its right end, such as the projection 763f on the number memory slide 763. These projections are spaced vertically from each other and are used to selectively lock the group slides in the mode of operation bank 280 in their normal position so as to lock corresponding portions of the key banks 275–278.

The slides 761–767 are slidably mounted within an open and generally U-shaped cradle 768 (FIGS. 53C and 53D) with spacer slides disposed between the individual memory slides. A pair of undulating flat springs 769 are interposed between the right, upstanding wall of the cradle 768 and the right spacer slide so as to resiliently bias the memory slides 761–767 toward the left, upstanding wall of the cradle 768. A pair of pins 770 carried on the side walls of the cradle 768 adjacent its opposite ends pass through elongated slots in the memory slides 761–767 and circular openings in the interposed spacer slides to permit the positions of the memory slides to be adjusted relative to each other.

To mount the memory slides 761–767 on the frame of the keyboard assembly 256 for both horizontal and vertical movement relative thereto, the ends of the pins 770 project beyond both vertical walls of the cradle 768 and are received within two pairs of cam slots 771 formed in opposite vertical side walls of a second generally U-shaped and open cradle or carrier 772. The left ends of the pins 770 are also disposed within two arcuate slots 773 in the center supporting plate 707 (FIG. 53C) and the right ends of the pins 770 are received within two arcuate slots 774 formed in the right supporting plate 704 (FIG. 53E). The carrier frame 772 is mounted on the walls 707 and 704 for horizontal sliding movement by a plurality of struck-out portions 772a that are slidably mounted in two elongated grooves 775 in the wall 707 and a single elongated groove 776 in the wall 704.

The memory slides 761–767 are normally held in an upper or elevated position (FIG. 60) in which the projections on these slides are effective to partially control the actuation of the manual keys 292–295 and the automatic keys 691–700. After one of these keys has been operated and a cycle of operation of the cash register has been initiated, the memory slides 761–767 are moved downwardly and to the left from the normal position shown in FIG. 60 to the displaced position shown in FIG. 61 by displacing the carrier 772 to the left. During this movement the actuated one of the keys 292–295 and 691–700 engages one of the projections on the upper edges of the slides 761–767 to set a selected one of these slides. During a return movement of the carrier 772 to the right, the slides 761–767 are moved to the right and then upwardly from the displaced position shown in FIG. 61 to the normal position shown in FIG. 60. During this movement, a memory slide restoring or resetting means controlled by the depressed one of the keys 292–295 and 691–700 selectively engages projections on the bottom edges of the slide 761–767 to restore one or more of these slides to a normal position.

More specifically, the ends of the pins 770 normally are disposed in the upper ends of the slots 773 and 774 in the supporting walls 707 and 704 and in the upper ends of the slots 771 in the carrier 772. When the carrier 772 is moved to the left in a horizontal direction guided by the engagement of the projecting portions 772a with the slots 775 and 776, the pins 770 are cammed downwardly by engagement with the walls of the slots 773, 774 and 771 so that the carrier 768 and the memory slides 761–767 are lowered. During continuing movement of the carrier 772 to the left, the ends of the pins 770 move to the generally horizontal portions of the slots 773 and 774 so that the carrier 768 and the memory slides 761–767 move to the left to the position shown in FIG. 61. When the carrier 772 is moved to the right, the carrier 768 and the memory slides 761–767 first move to the right with the carrier 772 and are then moved upwardly to the normal position shown in FIG. 60.

The carrier 772 is shifted to the left and then returned to its normal position under the control of the main drive shaft 314. More specifically, two forward portions 772b of the carrier 772 are connected by a fastener 777 on which an eccentric bearing sleeve 778 (FIG. 53C) is mounted. The sleeve 778 is received within a notch formed in an upper end of a cam follower lever 779 (FIGS. 5, 60 and 61) which is pivotally mounted on the shaft 484 and which extends between the spaced portions 772b. The lever 779 is rigidly secured to a cam follower lever 780. A projecting portion on the lever 779 is adapted to engage the outer periphery of a cam 781 which is keyed to the shaft 314 and which is disposed adjacent a cam 782. The cam 782 is also keyed to the shaft 314 and is engaged by the cam follower lever 780. A plurality of discs 783 mounted on the shaft 314 guide movement of the levers 779 and 780 relative to the cams 781 and 782.

When a cycle of operation of the cash register 250 is initiated, the main shaft 314 is rotated in a counterclockwise direction from the normal position shown in FIG. 60. When this shaft is rotated through approximately 80° (see line 7 in FIG. 82), the cams 781 and 782 deflect the levers 779 and 780 in a counterclockwise direction about the shaft 484 so that the carrier 772 is moved to the left to the displaced position shown in FIG. 61. This produces the movement downwardly and to the left of the memory slides 761–767 described above. These memory slides remain in this position until such time as the main shaft 314 has rotated through approximately 285°. At this time (see line 7 in FIG. 82), the cams 781 and 782 pivot the levers 779 and 780 in a clockwise direction about the shaft 484 to move the carrier 772 to the right from the displaced position shown in FIG. 61 to the normal position shown in FIG. 60. During this movement of the carrier 772, the memory slides are moved to the right and then upwardly to their normal positions.

The program memory means 690 includes aligning and locking means which are normally effective to secure the program memory slides 761–767 in their adjusted normal or set positions between cycles of operation of the cash register 250 and which are rendered ineffective when the carrier 772 is moved. This aligning means (FIGS. 53C and 60–63) includes an aligning element 784 with a portion 784a that is moved into and out of engagement with the lock portions or teeth 761f, 762j, 763d, 764g, 765f, 766d and 767d (FIG. 79A) on the memory slides 761–767. The dent element 784 is mounted for vertical movement relative to the memory slides 761–767 by a stud 785 (FIGS. 53C, 62 and 63) which is secured to the wall 707 and which is slidably received within a vertically elongated slot 786 in the detent 784. The stud 785 also passes through a circular opening 787 in an operator element 788 and carries a lock washer 787a that secures the elements 788 and 784 in assembled position. The detent 784 is connected to the operator 788 by a stud 789 which is secured to the detent 784 and which is received within a notch 790 in the operator element 788.

When the carrier 772 is moved to the left, a pin 791 which is secured to a depending portion of the carrier 772 and which extends through an opening 792 in the wall 707 bears against an edge 788a (FIG. 62) on the operator element 788 so that the operator 788 pivots in a clockwise direction about the stud 785. This moves the pin 789 upwardly so that the detent element 784 is moved vertically upward to the elevated position shown in FIG. 63. In this position, the locking portion 784a of the detent 784 is displaced from engagement with the memory slides 761–767. When the carrier 772 is moved to the right from its displaced position to its normal position, the pin 791 bears against an edge 788b (FIG. 63) on the operator element 788 so that this element pivots about the stud 785 in a counterclockwise direction to force the pin 789 downwardly. This moves the detent element 784 to its lower position in which its locking portion 784a again engages the aligning teeth on the memory slides 761–767. The memory slides 761–767 remain locked until after the next cycle of operation of the cash register 250 has been initiated and the carrier 772 has been shifted to the left.

To illustrate one possible setting operation of the program memory means 690, it is assumed that the manually actuated number key 294 is actuated from the normal position shown in FIG. 60 to the depressed position shown in FIG. 61. In this position, the portion 701a of the key shaft 701 for the manual key 294 is disposed to the left of the projection 764e on the listing memory slide 764. When a cycle of operation of the cash register 250 is initiated, the initial movement of the carrier 772 to the left elevates the detent element 784 so that all of the memory slides 761–767 are freed for relative movement. During the remaining portion of the movement to the left, the projection 764e bears against the portion 701a of the key shaft 701 of the depressed number key 294 so that the listing memory slide 764 is moved to the right relative to the remaining slides in the program memory means 690. In this manner, the listing memory slide 764 is displaced to a set position during the movement of the carrier 772 to the left from the position shown in FIG. 60 to the position shown in FIG. 61.

(6) RESTORING THE MEMORY SLIDES 761–767

The program memory means 690 is selectively adjusted to condition the cash register 250 for different types of operations in accordance with the program of operation for which this cash register is designed and in dependence on the types of operations that previously have been performed by the cash register. This selective adjustment of the program memory means 690 is accomplished by changing the positions of the memory slides 761–767 relative to each other as each different type of operation is performed by the cash register 250. As indicated above, the projections on the upper edges of the slides 761–767 are engaged by a depressed one of manual or automatic keys 292–295 or 691–700 during the movement of the carrier 772 to the left to displace one of the slides to a set position. During the movement of the carrier 772 to the right, the one of a plurality of reset elements 800 individual to the operated keys 292–295 and 691–700 selectively engages the projections on the lower edges of the memory slides 761–767 to restore a previously set one or ones of these slides to a normal position.

Referring now more specifically to FIGS. 53A, 53B and 64 of the drawings, each of the automatic keys 691–700 and each of the manual keys 292–295, except the sub-total key 295, is provided with one of the reset elements 800. Each of these elements is disposed immediately adjacent the related key stem 701 or 702 and includes both an upper arm 800a and a lower projection 800b. The arm 800a extends generally parallel to the related arm 701b or 702b and is slidably mounted in aligned slots 801 (FIG. 53C) and 802 (FIG. 53E) in the walls 707 and 704, respectively. The lower edge of the correction element 800 normally rests on the upper surface of the frame plate 310 with the projections 800b slidably received in a plurality of slots 803 (FIG. 53C) in the plate 707. A coupling link 804 is pivotally mounted on each of the arms 800a and is used to selectively couple the resetting element 800 with a depressed one of the key shafts 701 or 702.

To selectively move the links 804 into and out of coupling engagement with the related key shafts 701 and 702, an operating slide 805 (FIGS. 6B, 53B and 64) is slidably mounted on the plate 707 by the pins 736 and 743 immediately adjacent the spacer 746. The slide 805 is provided with a plurality of vertically extending and elongated slots 806 in each of which is received a pin or roller 807 secured to one of the links 804. A tension spring 808 (FIGS. 53B and 64) is connected between the frame of the keyboard assembly 256 and a pin 809 that is secured to the rear end of the slide 805. This slide is normally held in the position shown in FIG. 64 in which each of the links 804 is pivoted slightly in a counterclockwise direction from a vertical position.

During each cycle of operation of the cash register 250 and following the actuation of one of the keys 292–295 and 691–700, the slide 805 is shifted to the right from the position shown in FIG. 64 to the position shown in FIG. 65 so that the link 804 associated with a depressed one of the mode of operation keys is connected to the resetting element 800 associated with the depressed key. To provide means for shifting the position of the slide 805, a forward portion of this slide is provided with an upstanding portion 805a that normally bears against a pin 810 (FIG. 64) carried on the upper end of a cam follower lever 811 (see also FIG. 5). This lever is pivotally mounted on the shaft 484 and is rigidly connected to a second cam follower lever 812. A projecting portion on the lever 811 is adapted to engage the outer periphery of a cam 813, and a projecting portion on the lever 812 is adapted to engage the outer periphery of a cam 814, the cams 813 and 814 being keyed to the main shaft 314. A plurality of discs 815 carried on the shaft 314 adjacent the cams 813 and 814 guide movement of the levers 811 and 812.

After a cycle of operation of the cash register 250 has been initiated and during the interval between 25° and 75° of rotation of the shaft 314 (see line 9 in FIG. 82), the cams 813 and 814 permit the levers 811 and 812 to be pivoted in a clockwise direction about the shaft 484 by the spring 808. This shifts the slide 805 to the right to the position shown in FIG. 65 so that all of the coupling links 804 are pivoted in a clockwise direction about the arms 800a on the resetting elements 800. This movement places an offset upper end 804a on each of the coupling links 804 in alignment with a projection 701c or 702c on the key shafts 701 and 702. If the key shaft 701 or 702 is in a normal position, the offset end 804a on the coupling link 804 is disposed beneath the projecting portion 701c or 702c. Alternatively, if the key shaft 701 or 702 has been depressed, the offset end portion 804a of the coupling link 804 is disposed above the projecting portion 701c or 702c. In the illustrative example set forth above, the projecting portion 804a on the link 804 carried on the resetting element 800 associated with the depressed key 294 is disposed above the projection 701c on the related key shaft 701, and all of the remaining offset portions 804a are disposed beneath the projecting portions 701c and 702c on the remaining key shafts.

The automatic keys 691–700 and the manual keys 292–295 are positively elevated to normal positions by the time that 285° of rotation of the shaft 314 has been completed (see line 4 in FIG. 81 and line 5 in FIG. 82). When the key shaft 701 of the number key 294 is elevated under the control of the slide 729, the projecting portion 701c on this key shaft engages the offset portion 804a on the related link 804 and the resetting element 800 associated with this key is elevated to the position shown in FIG. 65. This lifts the arm 800a on this resetting element to a position to the right of the projection 762k (FIG. 79A) on the auxiliary listing slide 762 and the projecting portion 763e (FIGS. 61 and 79A) on the number slide 763, the memory slides 761–767 now being in their lowered position. Therefore, when the carrier 772 is subsequently moved to the right beginning at 285° of rotation of the main shaft 314 (see line 7 of FIG. 82), the arm 800a on the resetting element 800 associated with the formely depressed number key 294 engages the projections 762k and 763e to move the auxiliary listing memory slide 762 and the number memory slide 763 to the left relative to the remainder of the slides 761–767 to restore these two slides to a normal position. At the completion of the return of the carrier 772, the slides 761–767 are elevated to the normal position shown in FIG. 60.

After the carrier 772 has returned to its normal position at approximately 320° of rotation of the main shaft 314 (see line 7 in FIG. 82), the cams 813 and 814 engage the levers 811 and 812 and pivot them in a counter-clockwise direction about the shaft 484 so that the slide 805 is moved to the left from the position shown in FIG. 65 to the position shown in FIG. 64 against the action of the tension spring 808. This pivots all of the links 804 in counterclockwise directions about the arms 800a and moves the offset portion 804a on the coupling link 804 associated with the number key 294 out of engagement with the projection 701c on the related key shaft 701. The resetting element 800 and the coupling link 804 carried on this resetting element should drop to the normal position shown in FIG. 64 by gravity. In the event that this does not occur, the lower edge of the plate 735 will engage and depress the arm 800a on the resetting element associated with the number key 294 when this plate is lowered between 3° and 20° of rotation of the main shaft 314 (see line 4 in FIG. 81) at the start of the next cycle of operation of the cash register 250.

Thus, in the illustrative example set forth above, the depression of the number key 294 causes the setting of the listing slide 764 during the movement of the carrier 772 to the left and causes the restoration of the auxiliary listing slide 762 and the number slide 763 during return movement to the right. The program memory means 690 has now been advised that a number operation has been performed and the pattern of projections supplied by the slides 761–767 is varied in accordance with this information. In this manner, the shifting of the carrier 772 and the movement of the slide 805 during each cycle of operation of the cash register 250 controls the setting of the program memory means 690.

(7) MODE OF OPERATION GROUP SLIDES

The mode of operation bank 280 includes a plurality of group slides that perform three main functions in controlling the operation of the cash register 250. In the first place, the group slides cooperate with the slides 761–767 in the program memory means 690 to permit selective operation of the manual keys 292–295 and the automatic keys 691–700. Secondly, the group slides in the mode of operation bank are selectively freed for or held against movement under the control of the program memory means 690 to selectively free the keys in the keyboard assembly 256 for operation or to block these keys against operation in accordance with the program of the cash register 250. A third function performed by the group slides is that of controlling the start test assembly 267 to permit the cash register 250 to initiate a cycle of operation only when a proper data entry has been made into the keyboard assembly 256. The group slides also perform a number of additional control functions.

The group slides in the mode of operation bank 280 include the group slides 374, 491, 497, 502, 505, 616 and 646 (FIGS. 6, 21, 53C and 53D) which are connected to and set by the group slides in the related banks of the keyboard assembly 256 in the manner described above. In addition, the group slides include a repeat control slide 820 (FIG. 53D) that is actuated by the manual repeat key 293, a read key slide 821, a reset key slide 822, and a key lock slide 823, that are actuated by the lock bank 281. These slides are slidably mounted on the upper surface of the lower frame plate 310 between the wall members 707 and 704 with spacing slides disposed therebetween (FIG. 6B). A pair of sleeves 824 (FIG. 53C) which pass through elongated openings in the slides and circular openings in the spacers are disposed between and secured to the walls 707 and 704 by a plurality of fasteners 825.

The group slides in the mode of operation bank 280 are also selectively locked in normal position under the control of the keys in the lock bank 281 to control the freedom of operation of the banks 275–278 and to control the actuation of the keys in the mode of operation bank 280. The slides 821, 822 and 823 are set only under the control of the lock bank 281, and the remaining group slides are operated by the lock bank 281 in addition to the various means described above. To provide means for selectively shifting the positions of the group slides 374, 491, 497, 502, 505, 616, 646 and 820–823, each of these slides is provided with seven longitudinally spaced openings 826–832 (FIGS. 61 and 79B) into which actuating arms controlled by the keys in the lock bank 281 extend. These openings are of different longitudinal length in accordance with whether the related group slide is or is not to be actuated by the movement of the arm disposed in each of these openings. As an example, the opening 828 in the cash group slide 497 is smaller or shorter than the opening 828 in the merchandise group slide 616. Thus, when the arm controlled by the lock bank 281 that extends into the opening 828 is moved from right to left during a locking movement, the slide 497 is actuated to or held in a normal position and the slide 616 is not because the longitudinal length of the opening 828 in the slide 616 is greater than the length of the opening 828 in the slide 497.

Accordingly, the group slides in the mode of operation bank 280 can be operated to a set condition under the control of the related group slides controlled by the keys in the banks 275–279 and can be operated to or held in a normal position by the program memory means 690, the manual keys 292–295, and the keys in the lock bank 281.

(8) LOCKING THE MODE OF OPERATION GROUP SLIDES FROM THE PROGRAM MEMORY MEANS 690

The mode of operation bank 280 includes means operative at the end of each cycle of operation of the cash register 250 for sensing the program memory means 690 and for locking selected ones of the group slides in the mode of operation bank 280 in normal position. By locking the group slides in accordance with the setting of the program memory means 690, the keys in the keyboard assembly 256 are selectively blocked against or freed for manual actuation in accordance with the predetermined program of the cash register 250 and the automatic keys 691–700 are at least partially conditioned for operation. In general, this means includes means for sensing the projections on the right ends of the memory slides 761–767 and for actuating the projections on the right ends of certain of the group slides in the mode of operation bank 280 to restore and secure selected group slides in a normal position. The setting means remains in an effective condition in the interval between successive cycles of operation of the cash register, is rendered ineffective after a cycle of operation of the cash register 250 has been initiated, and remains ineffective until the program memory means 690 has been adjusted to a new setting and secured therein by the detent means 784. At this time the setting means transfers the new setting of the program memory means 690 to the group slides in the mode of operation bank 280.

The setting means for transferring information from the program memory means 690 to the group slides includes a generally U-shaped supporting frame 840 (FIGS. 53D, 61, 66 and 67) that is mounted on the upper surface of the lower frame plate 310 and secured to the right end of the wall 707 (FIG. 53C) by a bolt 841. The frame 840 supports five vertically spaced and horizontally slidable detecting or sensing plates 842–846 and five vertically spaced setting plates 847–851. Each of the sensing plates 842–846 is connected to one of the setting plates 847–851 by one of a plurality of levers 852–856 which are pivotally mounted on a sleeve 857 that is carried on a shaft 858.

The left end of the shaft 858 extends through an opening 859 (FIG. 53C) in the wall element 707 and is secured in position therein by a lock washer (not shown). The other end of the shaft 858 passes through an eccentric adjusting sleeve 860 (FIG. 53E) and an opening 861 in an actuating link 862 and is secured thereto by a lock washer 863 that is carried on a notched end of the sleeve. A compression spring 864 is interposed between the lock washer 863 and the link 862. The link 862 is slidably mounted on the right surface of wall 704 by a pair of pins 865 that are received within a pair of elongated slots 862. A washer 867 and a lock washer 868 mounted on each of the pins 865 secure the link 862 in position on the wall element 704.

To provide means for actuating the setting means, the front end of the link 862 is provided an upwardly extending notch 869 (FIGS. 53E and 66–68) in which a pin 870 is received. The pin 870 is secured to the upper end of a cam follower lever 871 which is pivotally mounted on the shaft 484 and which is rigidly secured to a second cam follower lever 872. The cam follower lever 871 is adapted to engage a cam 873 that is keyed to the shaft 314. The lever 872 is adapted to engage the outer periphery of a cam 874 that is also keyed to the shaft 314. A plurality of discs 875 are disposed adjacent the cams 873 and 874 to guide movement of the cam follower levers 871 and 872.

In the normal condition of the cash register 250, the levers 871 and 872 hold the link 862 in a position in which the shaft 858 is in its extreme left position. In this position, the levers 852–856 force the detecting elements 842–846 to their left positions to engage the projections provided at the right ends of the memory slides 761–767 (FIG. 79A). Those of the plates 842–846 that engage a projection on one of the memory slides 761–767 pivot the related levers 852–856 in a clockwise direction about the shaft 858 so that the corresponding one of the plates 847–851 is moved to the left. If this plate is aligned with a projection on the right end of one of the group slides (FIG. 79B), the slide having the projection engaged by the displaced plate is shifted to the left and held in its normal position. The memory slides 761–767 are secured in their adjusted positions in the normal condition of the cash register by the detent means 784, and the group slides are the only slides that are free to be displaced.

When the cash register 250 is placed in operation and the main shaft 314 is rotated 30° in a clockwise direction (see line 10 in FIG. 82), the cams 873 and 874 pivot the levers 871 and 872 in a clockwise direction about the shaft 484 so that the link 862 is moved to the right from the normal position shown in FIG. 66 to the displaced position shown in FIG. 67. This moves the shaft 858 to the right so that all of the levers 852–856 are moved to the right to move all of the plates 842–851 to the right and out of engagement with the projections on the ends of the group slides and the memory slides 761–767. Thus, the program memory means 690 is freed for setting movement and the group slides previously held in normal position are now free to move.

When the shaft 314 has advanced through 315° of rotation, the cams 873 and 874 pivot the levers 871 and 872 in a clockwise direction about the shaft 484 to move the link 862 from the displaced position shown in FIG. 67 to the normal position shown in FIG. 66. It should be noted that this movement takes place following the completion of the setting of the program memory means 690 (see line 7 in FIG. 82) so that the memory slides 761–767 are secured against inadvertent movement by the detent means 784. When the slide 862 moves to the left to the position shown in FIGS. 60 and 66, the pattern of projections now presented to the sensing plates 842–846 at the right ends of the memory slides 761–767 selectively shifts the levers 852–856 so that selected ones of the plates 847–851 are moved to the left. Those of the plates 847–851 that engage projections on the right ends of the group slides in the memory bank 280 move these group slides to their normal positions and lock them in this position until after the next cycle of operation of the cash register 250 has been initiated.

FIGURES 79A and 79B of the drawings illustrate the program of the mode of operation bank 280 insofar as it pertains to the selective locking of the group slides in the mode of operation bank 280 under the control of the program memory means 690. In these schematic drawings the memory slides 761–767 (FIG. 79A) are shown in their right or set position and the group slides 374, 491, 497, 502, 505, 616, 646 and 820 (FIG. 79B) are shown in their left or normal position. The setting means including the plates 842–851 and the levers 852–856 are indicated schematically by the lines interconnecting the projections on the right portions of these two groups of slides.

When the number memory slide 763 is operated to its set position, the projection 763f engages the plate 842 and moves the lever 852 to shift the plate 851 to the left. The plate 851 engages the projection 616p on the merchandise slide 616, the projection 497j on the cash slide 497, the projection 491j on the credit slide 491, and the projection 502i on the taxable item slide 502. Thus, the slides 616, 497, 491 and 502 are locked in a normal position to prevent the operation of any of the keys in the merchandise bank 278 and the account bank 277, except for the tax amount keys 284–286. These keys are normally blocked by the account memory means 460.

When the listing memory slide 764 is latched in a set position, a projection 764r on this slide engages the plate 843 to pivot the lever 853. The plate 850 is moved into engagement with a projection 505k on the tax amount group slide 505. This locks the group slide 505 in a normal position and prevents the actuation of the tax keys 284–286. However, the remainder of the keyboard is freed for operation.

When the credit slide 765 in the program memory means 690 is latched in a set condition, a projection 765k on this slide engages the sensing plate 844 to pivot the lever 854 so that the plate 849 is moved to the left. This plate engages a projection 616o on the merchandise slide 616, a projection 497i on the cash slide 497, and a projection 374j on the amount slide 374 to displace these slides to the left to their normal positions. Accordingly, when the credit memory slide 765 is set, the keys in the merchandise bank 278, the cash key 282 and all of the amount banks 276 and print banks 275 cannot be actuated.

When the cash memory slide 766 is latched in a set position, a projection 766h engages the plate 845 and moves this plate to the right so that the lever 855 is pivoted to shift the plate 848 to the left. The plate 848 engages a projection 616n on the merchandise group slide 616, a projection 491i on the credit group slide 491, and a projection 374j on the amount group slide 374 so that these group slides are moved to the left to their normal position. Accordingly, none of the keys in the merchandise bank 278, the credit key 283 in the account bank 277, and none of the print and amount keys in the banks 275 and 276 can be actuated.

When the reset slide 767 is latched in a set position, the sensing plate 846 is engaged by a projection 767h to pivot the lever 856 so that the plate 847 is moved to the left. This plate engages a projection 616m on the merchandise slide 616 to move this slide to the left and retain it in a normal position. This locks the keys in the merchandise bank 278 against actuation.

(9) MODE OF OPERATION PROGRAM

The mode of operation bank 280 not only selects the mode or type of operation that is to be performed by the cash register 250 during any given cycle of operation but also controls the program of operations through which this cash register is operated during successive cycles of operation. The mode of operation bank 280 controls the type of information that can be entered into the keyboard assembly 256, controls the type and number of printed records produced by the cash register 250, controls the start test assembly 267 to determine whether or not a cycle of operation of the cash register 250 can be initiated with the information that has been supplied to the keyboard assembly 256, and selectively conditions the accumulator assembly 264 to either receive, transfer or readout information. Although the mode of operation bank 280 included in the cash register 250 is illustrated in conjunction with one particular type of program, it should be understood that a variety of other programs can be provided in accordance with the type of data handling system with which cash register 250 is to be used merely by changing the memory and group slides.

In general, the program of the cash register 250 is controlled either directly by the program memory means 690 and the plurality of group slides of the mode of operation bank 280 or indirectly through the mode of operation differential assembly 258 that is selectively set to one of eleven different settings under the control of the manual keys 292–295 and the automatic keys 691–700. Since the various controlling operations are controlled at least in part by the selective manual actuation of the manual keys 292–295 and the automatic operation of the automatic keys 691–700, two tables are set forth in FIGS. 83 and 84 illustrating the conditions under which the keys 292–295 and 691–700 can be operated and the manner in which the operation of these keys controls the program memory means 690 and the group slides in the mode of operation bank 280.

The table in FIG. 83 lists the manual and automatic keys provided in the mode of operation bank 280 in conjunction with the position to which the mode of operation differential assembly 258 is actuated by the depression of each of these keys and a brief description of the type and nature of the operation performed by the cash register 250 in response to the operation of each of the keys. The right hand portion of the table lists the positions to which the memory slides 761–767 and the group slides 274, 502, 374, 491, 497, 505, 616, 646 and 820–823 must be set in order to permit the manual or automatic operation of each of the keys in the mode of operation bank. The control over the actuation of the keys 292–295 and 691–700 illustrated in FIG. 83 is in addition to the blocking control provided by the slides 720, 721 and 726.

In the right portion of the table, the letter "R" in one of the horizontal rows associated with the manual keys 292–295 indicates that the group slide identified in the vertical column will be reset to its normal or left position in response to the manual actuation of the key. The letter "N" in one of the columns indicates that the designated one of the program slides 761–767 or group slides must be in its normal or left position to permit the operation of the key in the associated row of the table. The letter "S" in one of the columns indicates that the designated one of the memory slides 761–767 or group slides must be in its set or right position if the key in the corresponding row is to be operated. The absence of a character in the columns and rows indicates that the designated one of the manual keys 292–295 or automatic keys 691–700 is indifferent to the setting of the memory or group slide and can be operated when the slide is in either of its settings.

As an example, the subtotal key 295 can be depressed only when the listing slide 764 is in its set position and the credit slide 765 and the cash slide 766 are in their normal position. The key 295 can be depressed when the remainder of the memory or group slides are in either of their settings. The table further indicates that when the manual key 295 is depressed, the group slides 374, 491, 497, 505 and 616 are manually restored to their normal position. It also indicates that if a key in the banks 275, 276 277 or 278 is depressed, the key 295 cannot be depressed because the indicated group slides cannot be moved to normal positions.

As a further example, the automatic key 697 can be lowered to its depressed or actuated condition only when the auxiliary listing slide 762 is in its normal position and the credit slide 765 is in its set position. Further, the key locking group slide 823, the amount group slide 374, the tax amount group slide 505, the taxable item group slide 502, the cash group slide 497 and the merchandise group slide 616 must be in their normal positions, and the credit group slide 491 must be in its set position. The automatic key 697 is indifferent to the settings of the remainder of the group slides and memory slides.

The table in FIG. 84 illustrates the manner by which the keys 292–295 and 691–700 are selectively blocked from movement to a depressed condition by an engagement with specified portions on the memory slides 761–767 and the group slides in the mode of operation bank 280. In addition, this table illustrates the manner in which the memory slides and the group slides in the bank 280 are selectively set and reset by engagement with the keys 292–295 and 691–700.

In FIG. 84 the occurrence of the letter "R" in one of the columns under the numerical designation of a group slide indicates that the depression of the manual keys 292–295 identified in the horizontal row resets the group slide to a normal position. The lower case character appearing below "R" designates the projection on the group slide (FIGS. 53 and 79B) that is engaged by the arm 701a on the key shaft 701 of the identified key. The letter "R" in one of the columns under the designated memory slides 761–767 indicates that this slide is reset to a normal position when the key identified in the horizontal row is operated. The lower case character appearing below the letter "R" in the column indicates the projection (FIG. 79A) engaged by the arm 800a on the element 800 associated with the indicated key.

The letter "B" appearing in one of the columns indicates that the depression of the key identified in the horizontal row is blocked by engagement with the projection on the designated slide that is identified by the lower case character appearing below "B." The letters "s" and "n" appearing to the right of "B" indicate whether the blocking takes place when the indicated slide is in its normal "n" or set "s" position. For instance, the designation "Bn" indicates that actuation of a key to its depressed condition is blocked by the indicated slide in its normal position. On the other hand, the indication "Bs" indicates that the depression of the related key is blocked in the set position of the slide. The letter "S" in one of the columns indicates that the designated memory slide 761–767 is moved to a set condition when the projecting portion on this slide designated by the adjacent lower case character is engaged by the keys 292–295 and 691–700 listed in the corresponding row. The projecting portion identified by the lower case character is engaged by the arm 701a or 702a during the movement of the carrier 772 to the left so that the engaged slide is moved to its set or right position relative to the remainder of the memory slides.

As an illustration of the information provided by the table in FIG. 84 the actuation of the manual key 294 is blocked by the projection 764d on the listing slide 764 when this memory slide is in its set position. When the manual key 294 is depressed, the arm 701b on this key engages the projecting portion "d," "c," "d," "c," "d" on the group slides 616, 497, 491, 502 and 505, respectively, to reset these slides to their normal positions. When the carrier 772 is placed in operation following the actuation of the key 294, the arm 701a on the key shaft 701 of the key 294 engages the projection 764e on the listing slide 764 so that this slide is moved to its set position. When the carrier 772 is returned to its normal position by movement toward the right, the arm 800a on the resetting element 800 associated with the key shaft 701 of the manual key 294 engages the projections 762k and 763e on the auxiliary listing slide 762 and the number slide 763 to restore these slides to their normal positions.

As an additional example of the data supplied by the table in FIG. 84 a consideration of the horizontal line of information appearing to the right of the automatic key 692 indicates that this key can be lowered to an effective position only when the group slides 616, 505, 374 and 823 are in a normal position and the group slide 502 is in a set position. More specifically, the arm 702b on the key shaft 702 associated with the key 692 would engage the projections "i," "h," "g" and "i" on the merchandise group slide 616, the tax amount group slide 505, the amount group slide 374 and the key locking group slide 823, respectively, if these slides were in a set position. Similarly, if the taxable item group slide 502 is in a normal position, the arm 702b would engage the projection 502g on the slide 502. When the key 692 is depressed, the arm 702a on this slide is disposed to the left of the projection 762i and 767c on the auxiliary listing slide 762 and the reset slide 767. Therefore, when the carrier 772 is displaced to the left, the memory slides 762 and 767 are operated to a set condition. The shaft 702 of the automatic key 692 is then restored to its normal elevated position by the elevation of the plate 735 following the coupling of the resetting element 800 to the depressed key 692 under the control of the plate 805. Thus, the arm 800a on the elevated resetting element 800 is disposed to the right of the projection 764b on the listing slide 764. When the carrier 772 moves to the right to return to its normal position, the listing slide 764 is moved to the left relative to the remainder of the memory slide 761–767 to be restored or reset to its normal condition.

To illustrate a programmed operation of the cash register 250 under the control of the keyboard assembly 256, one typical series of listing operations of the keyboard assembly 256 is described below with reference to the table shown in FIG. 85. This table lists a sequence of operations and illustrates the set and normal positions of the memory slides 761–767 and of the mode of operation group slides by the use of the designations "N" (normal) and "S" (set).

In the particular program used in the cash register 250, the first entry supplied to the cash register 250 at the beginning of each series of operations must be a customer number which is stored in the cash register and recovered at the end of the transaction to control the printing assembly 266 to provide a record of the identity of the customer. Following the entry of the customer's number, the costs of various items are entered through the amount bank 276 in conjunction with items of information from the selector banks 277–279 identifying the class of merchandise, the taxable or untaxable nature of the item, and the clerk handling the transaction. As described above, taxable items falling within any of the three different groups of taxable itsem or items of no taxable significance can be entered in random fashion during the listing operations. At the conclusion of the transaction, either the cash key 282 or the credit key 283 is actuated to initiate the concluding or total operations of the cash register.

If taxable items have been entered, these items are automatically recalled to the indicator assembly 260 and the related tax item is entered, the entrance of any tax amount, except the last, causing the automatic recall of the next taxable item subtotal. At the conclusion of an operation initiated by the depression of the cash key 283, the customer number accumulator is automatically reset to transfer the customer number to the printing assembly 266, and the cash register then automatically transfers the total from the transaction or listing itemizer to the cash accumulator. At the conclusion of a credit operation initiated by the depression of the credit key 282, the listing itemizer is read to transfer a total for the transaction to the printing assembly 266 to provide an additional charge receipt, and the cash register then automatically resets the customer number accumulator to the printing assembly 266 and automatically transfers the total from the transaction itemizer to the credit accumulator.

In the normal condition of the keyboard assembly 256 following the completion of a previous transaction, all of the modes of operation group slides and the prorgam memory slides 764–767 are in a normal position. The memory slides 761–763 are in a set condition (see line 1 in FIG. 85). In this condition, the no repeat slide 761 blocks depression of the indicator repeat key 293 to prevent the initiation of a repeat operation inasmuch as the preceding item entered into the cash register does not represent an entry that is to be repeated. Further, the set number slide 763 controls the group slides in the mode of operation bank 280 to permit only a proper customer number entry to be made. More specifically, the setting of the number memory slide 763 locks the merchandise group slide 616, the cash group slide 497, the credit group slide 491 and the taxable item slide 502 in their normal positions so that the key bank 278, the keys 282, 283 and the taxable item keys 287–289 cannot be depressed. The account memory means 460 is also in its normal condition and blocks the operation of the tax amount key 284–286. In addition, because of the fact that none of the keys in the lock bank 281 and none of the clerk keys 291a or 291b has been actuated, all of the interconnecting slides 464 are latched, and all of the group slides and keys in the assembly 256 are locked against operation.

When the cash register 250 is to be placed in operation, a selected one of the clerk keys, such as the clerk "A" key 291a, is depressed to set the clerk group slides 645 and 646. This frees the keys in the keyboard assembly 256 for operation. However, only the keys in the print and amount banks 275 and 276 and the number key 294 can be operated. The clerk then depresses a group of keys in the amount banks 76 representing the number assigned to the customer and depresses the number key 294 which is the only key in the mode of operation bank 280 that can be depressed. If a transaction involves a customer for which a customer number is not relevant, the number key 294 is depressed without actuating any of the keys in the amount banks 276.

When the customer number key 294 is depressed, the mode of operation start slide 724 is deflected to the left (FIG. 54) to actuate the start yoke 513 so that a cycle of operation of the cash register 250 is initiated. During this cycle of operation, the slide 862 releases the group slides and the customer number represented by the depressed keys in the banks 276 is stored in the customer number accumulator or register for subsequent use under the control of the mode of operation differential assembly 258 to its fifth position. During movement to the left by the carrier 772, the listing memory slide 764 is moved to a set position and during return movement of the carrier 772, the auxiliary listing slide 762 and the number slide 763 are restored to a normal condition (see line 2 in FIG. 85). Further, toward the end of the cycle of operation, all of the actuated keys in the keyboard assembly 256, with the exception of the depressed clerk key 291a, are restored to their normal condition. This permits the start slide 724 to be restored by the spring 727 to stop the cash register 250.

At the end of this cycle of operation of the cash register 250, the link 862 is again moved to the left so that the group slides in the mode of operation bank 280 are now set under the control of the new positions to which the memory slides 761–767 in the program memory means 690 have been set. Since the number slide 763 has been reset, the merchandise group slide 616, the cash group slide 497, the credit group slide 491 and the taxable item group slide 502 are freed for movement to a set position under the control of the related banks in the assembly 256. Thus, the merchandise bank 278, the cash key 283, the credit key 282 and the taxable item keys 287–289 can now be operated. However, in view of the fact that the listing memory slide 764 is now in a set condition, the tax amount keys 284–286 are locked against operation by locking the tax amount group slide 505 in its normal condition. The keyboard assembly 256 is now freed for a normal operation during which the costs of various items can be entered into the various accumulators in the cash register 250.

Assuming that an entry relating to the amount of an item falling in merchandise class V and in taxable item group one is to be entered, the keys in the amount banks 276 are selectively operated in accordance with the value of the article. Since the group slides are reset at the start of a cycle of operation, the amount group slide 374 is already in a set position from the prior operation. The depression of the taxable item group one key 287 shifts the taxable group slide 502 to a set condition, and the merchandise V key 290 is depressed to shift the group slide 616 to a set position (see line 3 in FIG. 85). Thus, the memory slides 761–767 in the program memory means 690 are in the condition shown in line 2 of FIG. 85 and the group slides in the mode of operation bank 280 are in the condition shown in line 3 of FIG. 85.

The actuation of the merchandise V key 290 shifts the merchandise start slide 618 to the left so that the start yoke 513 is pivoted to initiate a cycle of operation. From considering the table in FIG. 83, it will be seen that only the automatic key 700 can be depressed with the combination of settings of the memory slides 761–767 and group slides provided in the cash register 250 at this time. Accordingly, the automatic key 700 is depressed to its lowered condition to control the setting of the mode of operation differential assembly 258 to its ninth position. This causes the entry of the amount shown in the banks 276 into the taxable item one accumulator, the merchandise V accumulator, and the machine listing accumulator or itemizer. In addition, during the cycle of operation, the account memory means 460 in the account bank 277 is operated by setting the slides 572 and 574 therein to indicate the fact that an item in the first taxable item group has been stored in the cash register 250. The setting of these slides also actuates the crank 599 so that the taxable item group slide 502 is locked in set position. Toward the end of this cycle of operation of the cash register 250, the actuated keys in the keyboard assembly 256, with the exception of the clerk key 291a, are restored to their normal condition. This restores the start slide 618 to stop the cash register.

From considering the table in FIG. 84, it will be noted that the return movement of the carrier 772 to the right during this cycle of operation causes the resetting of the no repeat memory slide 761 so that the memory slides 761–767 and the group slides now occupy the settings shown in line 3 of FIG. 85. When the no repeat slide 761 is reset to its normal condition, the manual repeat key 293 is freed for operation (see FIG. 83). Since the repeat key 293 can now be operated, the same entry previously entered into the cash register 250 can be repeatedly entered into the cash register by depressing the key 293. Thus, the program memory means 690 insures that the key 293 can be operated only following a prior listing operation.

The cash register 250 can now be operated to list different amounts in different accumulators in the assembly 264 under the control of the keys in the amount banks 276, the merchandise bank 278, and the clerk bank 279 in the manner described above. During these data entering operations, the keys 287–289 are not operated if the entered amount does not fall within one of the three taxable groups. Alternatively, if one of the keys 287–289 is actuated, the account memory means 460 in the account bank 277 is set to provide an indication of the ones of the taxable item accumulators in which entries have been made.

At any time during the listing of the various items in the cash register 250, the manual subtotal key 295 can be manually actuated, as shown in FIG. 84. This key should be operated only if the keys 282 and 283 are not operated and no keys are operated in the amount banks 276 and the merchandise bank 278. If the group slides associated with these keys are in a set position at the completion of the preceding cycle, the depression of the subtotal key 295 restores the associated group slide to a normal condition. Alternatively, if an amount key, for instance, in one of the banks 276 has been operated, the slide 374 is locked in set position, and the projection 374a will block operation of the key 295. The operation of the subtotal key reads the subtotal out of the listing itemizer to the indicator assembly 260 and the printing assembly 266.

More specifically, when the subtotal key 295 is depressed, the start slide 724 is shifted to the left to pivot the start yoke 513 so that a cycle of operation of the cash register is initiated. The actuation of the subtotal key 295 controls the mode of operation differential assembly to move to its third setting so that the total in the itemizer is transferred to the indicating assembly 260 and the printing assembly 266 and returned to the itemizer. During the left movement of the carrier 772, the no repeat slide 761 is shifted to its set position (see FIG. 84). At the end of the subtotal cycle of operation, the start slide 724 is restored to its normal condition so that another cycle of operation of the cash register 250 is not automatically initiated, and the memory and group slides in the mode of operation bank 280 are in the positions shown in line 4 of FIG. 85. Since the indicating assembly 260 is now set in a position representing a subtotal derived from the itemizer, this entry is not of the type that can be repeatedly entered. Accordingly, the setting of the no repeat memory slide 761 during the subtotal operation moves the projection 761d into a position to block the depression of the repeat key 293.

Following the subtotal operation, additional entries of different amounts into the cash register 250 can be made under the control of the keyboard assembly 256 in the manner described above so that at the end of any given one of these operations, the memory and group slides in the mode of operation bank 280 are in the position shown in line 3 of FIG. 85.

Assuming that the previous listing operations represent a cash transaction in which the goods purchased are to be paid for in cash, the clerk actuates the cash key 283. The operation of the cash key 283 moves the cash group slide 497 to a set position and also conditions the cash automatic key 465 in the bank 277 for operation. Thus, the group slides in the mode of operation bank 280 present the pattern of set and normal positions shown in line 5 of FIG. 85, and the memory slides 761–767 presents the pattern of set and normal conditions shown in line 4 of FIG. 85.

The depression of the cash key 283 also displaces the start slide 510 so that the start yoke 513 is shifted to initiate a cycle of operation of the cash register 250. During this cycle, the account memory means 460 automatically selects the first used one of the tax item accumulators. Assuming that items have been stored in all three of the taxable item accumulators, the account differential assembly 258 is set to a position in which the first taxable item accumulator is selected. As only the automatic key 692 is now free, this key moves to a depressed condition to control the setting of the mode of operation differential assembly 258 to its eighth position. In this position, the mode of operation differential assembly controls the engagement of the selected first taxable item accumulator with the amount differential assemblies 258 with reset timing so that the amount accumulated in the first taxable item accumulator is removed from the first taxable item accumulator and transferred to the indicating assembly 260. This provides the operator with a visual indication of the total value of all of the items falling within the first taxable item group that have been stored in the cash register since the last total operation. Since the account bank 277 is not reset to a normal condition during a cycle of operation in which the mode of operation differential assembly 258 is adjusted to its eighth position, the start slide 510 remains in its deflected position. However, the start yoke 513 is shifted axially along the shaft 412 to render the deflected start slide 510 in the account bank ineffective to initiate another cycle of operation of the cash register 250, and the register is stopped.

During this cycle of operation, the memory slides 762 and 767 are set, and the slide 764 is reset. Thus, when the link 862 is moved to the left to transfer the setting of the program memory means 690 to the group slides in the mode of operation bank 280, the set condition of the slide 767 latches the merchandise group slide 616 in its normal position to prevent the operation of the merchandise bank 278. Since the memory slide 764 is reset, the tax amount group slide 705 is no longer locked in its normal position, and the tax amount keys 284–286 can now be operated in accordance with the setting of the account memory means 460.

The clerk now visually observes the total amount of the items in the first taxable group and determines the tax amount due thereon. When this determination has been made, the clerk actuates the keys in the amount banks 276 in accordance with the amount of the tax due and actuates the first tax amount key 284. With the start yoke 513 in its left deflected position, the actuation of the key 284 shifts the start slide 515 so that the yoke 513 is pivoted to initiate a cycle of operation during which the account differential assembly 258 is adjusted to its seventh setting to select the accumulator for receiving the first tax amount. The slides in the program memory means 690 are in the position shown in line 5 of FIG. 85, and the group slides in the mode of operation bank 280 are in the position shown in line 6 of FIG. 85. under these conditions, only the automatic key 696 (see FIG. 83) is free and is lowered to an effective position.

The key 696 arrests the mode of operation differential assembly 258 in its ninth position so that the first tax amount is stored in the first tax amount accumulator and the itemizer. During this cycle of operation, the depressed key 696 is effective to set the listing slide 764 and to reset the auxiliary listing slide 762. When the link 862 is returned to the left, the setting of the program memory means 690 is transferred to the group slides in the mode of operation bank 280. Since the listing slide 764 has now been set, the tax amount slide 505 is returned to and held in a normal condition so that the memory slides 761–767 are now in the position shown in line 6 of FIG. 85 and the group slides are in the position shown in line 7 of FIG. 85. Further, the operated tax key 284 is effective to partially restore the memory means 460 in the account bank 277 so that an indication is provided that the first taxable item total has been recovered and the first tax amount entered. As described above, the account memory means 460 is now conditioned to select the second taxable item accumulator.

At the end of the cycle of operation, the depressed key 284 and the depressed keys in the amount bank 276 are restored to a normal condition. The start slide 515 associated with the tax amount 284–286 is restored to a normal condition, the start yoke 513 is moved axially along the shaft 412 to the right, a position in which it is controlled by the position of the start slide controlled by the cash and credit keys 283 and 282. Therefore, another cycle of operation of the cash register 250 is automatically initiated under the control of the displaced cash-credit start slide 510.

The pattern of set and normal conditions provided by the program memory means 690 and the group slides in the mode of operation bank 280 permits the key 692 to be lowered again to control the transfer of the total of the items in the second taxable group to the indicating assembly 260, this accumulator being selected by the account memory means 460 in the account bank 277. During this cycle of operation, the auxiliary listing slide 762 is set and the listing slide 764 is reset (see FIG. 84). During this cycle of operation, the start yoke 513 is shifted so that the deflected cash-credit start slide 510 is no longer effective to initiate a further cycle of operation of the cash register 250, and the start yoke 513 is rendered responsive to control by the tax amount start slide 515

The clerk then determines the second tax amount due on the second taxable item total now displayed on the indicating assembly 260 and enters this amount into the cash register 250 by selectively actuating the keys in the amount banks 276 followed by the actuation of the second taxable amount key 285. The actuation of the amount keys in the banks 276 and the key 285 sets the group slides 374 and 505, respectively, so that the group slides in the mode of operation bank 280 now occupy the position shown in line 8 in FIG. 85. The memory slides 761–767 occupy the positions shown in line 7 of FIG. 85.

The depressed key 285 displaces the effective start slide 515 to start the cash register. With the illustrated set and normal conditions of the slides, the automatic key 696 is again lowered so that the second tax amount is listed in the second tax amount accumulator selected by the depressed key 285 and also in the itemizer.

During this cycle of operation, the depressed key 696 resets the memory slide 762 and sets the listing slide 764 so that at the end of the cycle of operation the setting of the program memory means 690 is transferred to the group slides in the mode of operation bank 280 by locking the tax amount group slide 505 in its normal condition. The depressed second tax amount key 285 is effective to partially reset the account memory means 460 so that the automatic key 470 for selecting the third taxable item accumulator is next operated. Further, the start yoke 513 is shifted back to a position in which it is deflected by the displaced cash-credit start slide 510, and an additional cycle of operation of the cash register 250 is automatically initiated.

During this cycle, the account memory means 460 lowers the automatic key 470 to select the third taxable item accumulator. Further, since the memory slides 761–767 are in the condition shown in line 8 of FIG. 85 and the group slides in the mode of operation bank 280 are in the condition shown in line 9 of FIG. 85, the automatic key 692 is lowered in the mode of operation bank 280 to arrest the mode of operation differential assembly 258 in its eighth position so that the third taxable item accumulator is reset and the total transferred to the indicating assembly 260.

The clerk then enters the third tax amount by the depression of the third tax amount key 286 in conjunction with the keys in the amount bank 276 (see line 10 in FIG. 85), and this tax is transferred to the third tax amount accumulator and the other accumulator set forth above in the description in the storage of the first and second tax amounts. Since the depression of the third tax amount key 286 completes the restoration of the account memory means 460 to its normal condition, the tax item group slide 502 can be restored to its normal condition along with the tax amount group slide 505 and the amount slide 374 at the beginning of the next cycle of operation. The start yoke 513 is shifted to the position in which it is controlled by the deflected cash-credit start slide 510, and an additional cycle of operation of the cash register 250 is initiated with the memory slides 761–767 in the position shown in line 10 of FIG. 85. The group slides are set to the position shown in line 11 of FIG. 85 at the beginning of this cycle by the resetting means in the start test assembly 267.

An inspection of FIG. 83 indicates that only the automatic key 698 is now freed for operation so that this key is depressed during the following cycle of operation of the cash register 250. The depression of the automatic key 698 controls the cash register 250 so that the customer number stored in the customer number register is transferred to the indicating assembly 260 and the printing assembly 266. This resets the customer number register to a normal condition. As indicated in FIG. 84, the depression of the automatic key 698 sets the slides 762 and 766 and resets the slide 764 in the program memory means 690. Thus, the group slides are now in the position shown in line 12 of FIG. 85 and the memory slides 761–767 are in the setting shown in line 11.

Since the cash-credit start slide 510 is still in a displaced position, the yoke 513 is pivoted to automatically initiate another cycle of operation of the cash register 250. As indicated in FIG. 83, only the key 699 is now freed for movement to a depressed condition so that during this cycle of operation of the cash register 250, the automatic key 699 controls the setting of the mode of operation differential assembly 258 to its eleventh position. This setting causes the itemizer to be reset and the total standing therein to be transferred to the cash accumulator selected by the depressed cash key 465 in the account bank 277 and to the clerk A accumulator selected by the depressed key 291a. The key 699 sets the memory slides 762 and 763 and resets the memory slides 764–767.

When the mode of operation differential assembly 258 is adjusted to its eleventh position, the reset means for the clerk bank 279 and the cash and credit keys 283 and 282 are rendered effective so that the depressed keys 291a and 283 are restored to a normal condition. Since the cash key 283 is restored, the cash-credit start slide 510 is returned to a normal condition, and further operation of the cash register 250 is terminated. The set slide 763 locks the group slides 616, 497, 491 and 502 in normal position, and the slides will occupy the positions shown in line 13 of FIG. 85, the clerk slide 646 being reset to normal at the start of a subsequent cycle if a clerk key 291 is not depressed at that time. The cash register 250 has now been restored to a normal condition in which the next operation must include the actuation of the customer number key 294.

Accordingly, during listing operations, the keyboard assembly 256 can be freed for normal operation only if the first of each series of entries includes the operation of the customer number key 294 to list the number, real or arbitrary, designating the customer. The cash register can then be operated to enter the amounts pertaining to the different types of merchandise including both taxable and nontaxable items.

The cycle of operations performed by the keyboard assembly 256 and the cash register 250 on those cycles of operation which are terminated by the actuation of the credit key 282 are identical to the operations described above and illustrated in lines 2–10 of FIG. 85 with the exception that the credit group slide 491 is operated to a set condition rather than the cash group slide 497 in the operations shown in lines 5–10. At the end of these operations, the memory slides 761–767 in the program memory means 690 and the group slides in the mode of operation bank 280 present the pattern of set and normal positions shown in line 14 of FIG. 85.

Since the cash-credit start slide 510 is maintained in a displaced position and the start yoke 513 is moved to a position in which this slide controls its actuation incident to the entrance of the third tax amount, the cash register 250 now automatically initiates an additional cycle of operation. A consideration of FIG. 83 indicates that only the automatic key 691 can be lowered to a depressed condition when the slides are in the position indicated in line 14 of FIG. 85: Thus, the automatic key 691 is lowered during this cycle of operation to set the mode of operation differential assembly 258 to its tenth position in which the itemizer is read to transfer the subtotal from this itemizer to the printing assembly 266 and the indicating assembly 260. This permits an additional receipt to be printed by the printing assembly 266 on credit transactions. During the cycle of operation in which the itemizer is read, the actuated key 691 sets the slides 761 and 765. The setting of the slide 765 prevents the operation of the automatic key 691 during the next cycle of operation of the cash register 250 and also locks the merchandise group slide 616, the cash group slide 497, and the amount group slide 374 in their normal positions. Thus, at the end of this cycle of operation, the slides in the mode of operation bank 280 are in the position shown in line 15 of FIG. 85.

Since the cash-credit start slide 510 is still deflected, the cash register 250 initiates an additional cycle of operation during which the automatic key 697 is lowered (compare line 15 in FIG. 85 with the table in FIG. 83). This arrests the mode of operation differential assembly 258 in its first position so that the customer number accumulator or register is reset and the customer number is transferred to the printing assembly 266 and the indicating assembly 260. During this cycle of operation the memory slide 762 is set and the listing memory slide 764 is reset so that the pattern of set and normal conditions is that shown in line 16 of FIG. 85. The setting of the slide 762 and the resetting of the slide 764 performs the same general function described above in the cash key terminated operation of the cash register.

Since the cash-credit start slide 510 is still in a displaced position, another cycle of operation of the cash register 250 is initiated during which the automatic key 695 is lowered to arrest the setting of the mode of operation differential assembly 258 in its eleventh position. This automatically transfers the total standing in the itemizer to the selected clerk A accumulator and to the credit accumulator which has been selected by the depressed credit automatic key 464 in the account bank 277. The actuation of the key 695 produces the same resetting and setting of the slides in the program memory means 690 as the key 699, except that the credit group memory slide 765 is reset to a normal condition rather than the cash slide 766. Further, since the key 695 sets the related mode of operation differential assembly 258 to its eleventh position, the resetting means associated with the depressed key 282 is again rendered effective to restore this key and the start slide 510 to a normal position so that automatic operation of the cash register 250 is terminated. The slide 491 is restored to normal by the start test assembly 267 at the start of the next cycle of operation, and the slide 646 is restored when the depressed key 291a is released.

Accordingly, the cash register 250 is operated when the transaction is terminated by a credit operation rather than a cash operation in substantially the same manner as the cash operation except that the cash register 250 is automatically operated through three cycles of operation following the entrance of the third tax amount rather than only two automatic operations. In two of these three automatic operations, the same functions of reading out the customer number and automatically transferring the itemizer total to the credit accumulator are performed. However, in the additional operation, the program memory means 690 causes the automatic transfer of a subtotal from the cash register itemizer to the printing assembly 266 to provide an additional receipt on credit transactions.

(10) KEYBOARD CONTROL

The mode of operation bank 280 in addition to controlling the selection of the mode of operation to be performed by the cash register 250 by controlling the setting of the mode of operation differential assembly 258 also conditions the keyboard assembly 256 for different types of operations in accordance with the setting to which the mode of operation bank 280 has been actuated. In general, the mode of operation bank 280 performs two different types of controlling operations. In the first place, the setting of the mode of operation differential assembly 258 under the control of the depressed one of the keys in the mode of operation bank 280 controls the angular position to which the control shaft 412 carrying the coded elements, such as the elements 454, 535, 632 and 671, is adjusted. Thus, the mode of operation bank 280 controls the times at which the keys in the keyboard assembly 256 are reset to normal condition and selectively conditions the merchandise bank 278 for performing repeated listing operations. The second function performed by the mode of operation bank 280 is the axial shifting of the position of the start yoke 513 so that different ones of the start slides in the motorized banks are selectively rendered effective and ineffective to initiate a cycle of operation of the cash register. For key controlled operations utilizing the keys in the lock bank 281, the start yoke 513 is also shifted under the control of the bank 281.

As indicated above, the control shaft 412 is shifted to one of eleven different settings corresponding to the eleven different settings to which the mode of operation differential assembly 258 can be adjusted under the control of the mode of operation bank 280. Accordingly, whenever a cycle of operation of the cash register 250 is initiated, the mode of operation differential assembly 258 is first adjusted to its setting together with the other transaction banks (see line 6 in FIG. 81) and the control shaft 412 is concurrently therewith adjusted to a corresponding setting so that the plurality of coded elements 454, 535, 632 and 671 are adjusted to corresponding settings. To set the shaft 412, a pair of meshing gears 880 and 881 (FIGS. 53C and 71) are pivotally mounted on a pair of shafts 882 and 883. The shaft 883 is carried on the wall element 707 and is disposed above the lower frame plate 310 for the keyboard assembly 256. The lower shaft 882 is secured to a depending portion of the wall element 707 that extends through an opening 884 in the wall element 310 to be engaged by a toothed rack element in the mode of operation differential assembly 258. The gear 881 meshes with a gear 885 that is keyed to the control shaft 412. In this manner, the setting of the mode of operation differential assembly 258 adjusts the control shaft 412 to a position corresponding to the one of the eleven positions selected by the actuation of the keys in the mode of operation bank 280.

As indicated above, the mode of operation bank 280 also at least partially controls the shifting movement of the start yoke 513 along the axis of the shaft 412 so that different ones of the start slides 510, 515, 618 and 648 are rendered effective to control the initiation of a cycle of operation of the cash register 250. To accomplish this, the mode of operation bank 280 includes a start yoke slide 886 (FIGS. 6B and 53D) that is slidably mounted on the upper surface of the lower wall element 310 disposed between the slide 821 and a slide 887 with spacing slides disposed therebetween. The slide 887 is secured against relative movement by engagement with the sleeves 824, and the slide 886 is provided with an elongated opening in which the sleeve 824 are received to permit the slide 886 to be reciprocated relative to the frame of the keyboard assembly 256. The lower edge of the start yoke slide 886 is provided with a depending portion 886b (FIG. 6B) that is engaged by a drive means forming a part of the start test assembly 267. This mechanism displaces the slide 886 downwardly and to the left (FIG. 53D) after a cycle of initiation of the cash register 250 has been initiated by the clockwise movement of the start yoke 513 about the axis of the shaft 412 and prior to the initiation of rotation of the main shaft 314 (see line 11 in FIG. 82). When the slide 886 moves to the left, a projecting portion 886a on this slide engages the yoke 513 and pivots it in a clockwise direction about the shaft 412 to hold this yoke in a deflected position so as to permit axial movement of the yoke 513 without interference with the start slides 510, 515, 618 and 648.

To provide means for shifting the start yoke 513 in an axial direction under the control of the mode of operation bank 280, a test yoke 888 is slidably mounted on the control shaft 412 (FIGS. 5, 69 and 71) and is connected to the right end of the start yoke 513 so that these two yokes move together along the axis of the control shaft 412. A projection 889 on the frame of the keyboard assembly 256 engages a shoulder 888a on the test yoke 888 to prevent pivotal movement of this yoke about the shaft 412. A compression spring 890 interposed between an element secured to the shaft 412 and the test yoke 888 resiliently biases a projection 888b on the test yoke 880 into engagement with the adjacent surface of a coded element 891 that is keyed to the shaft 412. When the projecting portion 888b engages the edge of the disc 891, the yoke 513 is held in its normal position in which the tax start slide 515 is aligned with the notch 513a in the start yoke 513, the cash-credit start slide 510 and the merchandise start slide 618 are aligned with the edge of the start yoke 513, and the clerk start slide 648 is aligned with the recess 513c (see FIG. 72). Thus, in the normal setting of the start yoke 513, movement to the left of the start slides 510 and 618 is effective to pivot the start yoke 513 in a clockwise direction about the shaft 412 to initiate a cycle of operation of the cash register 250. On the other hand, movement of the tax start slide 515 and of the clerk start slide 648 is not effective to displace the start yoke 513 because of the recessed portions aligned with these two slides.

To adjust the setting of the start yoke 513, the initiation of a cycle of operation of the cash register 250 by pivoting the start yoke 513 in a clockwise direction about the shaft 412 places the start test assembly 267 in operation so that the slide 886 is moved to the left to engage the start yoke 513 and hold this yoke in a deflected position spaced from engagement with any of the start slides 510, 515, 618 and 648 (see line 11 in FIG. 82). If the start assembly 267 determines that a valid start condition of the cash register exists, the main shaft 314 for the keyboard assembly 256 is rotated in a counterclockwise direction so that an axially raised lip 892a on a cam 892 that is keyed to the shaft 314 moves into engagement with the projecting portion or tongue 888a on the test yoke 888. During the interval between 3° and 23° of rotation of the main shaft 314 (see line 12 in FIG. 82), the cam 892 displaces the test yoke 888 and the start yoke 513 to the right (FIG. 69) so that the projecting portion 888b is spaced from the disc 891. The yokes 513 and 888 are maintained in this displaced position until 105° of rotation of the main shaft 314 has been completed (see line 12 of FIG. 82). During this interval, the transaction differential assemblies complete their setting movement (see line 6 of FIG. 81) so that the control shaft 412 has now been set to a position determined by the operation of the mode of operation bank 280, and this shaft and the disc 891 are free to move without interfering engagement with the test yoke 888.

At 105° of rotation of the main shaft 314, the projection 892a permits the compression spring 890 to move the yokes 513 and 888 to the left (FIG. 70) so that the projecting portion 888b on the test yoke 888 senses the disc 891. If the mode of operation differential assembly has been adjusted to any position other than its eighth setting (see FIG. 78), the projection 888b bears against the disc 891, and the start yoke 513 is maintained in its normal position described above. Alternatively, when the mode of operation differential assembly 258 has been adjusted to its eighth setting in which one of the taxable item accumulators is being automatically reset and the total of the taxable item group is to be transferred to the indicating assembly (see FIG. 83), an opening 891a (FIG. 78) in the disc 891 is aligned with the projecting portion 888b. This permits the compression spring 890 to move the start yoke 513 and the test yoke 888 to an extreme left position.

In this position, the tax start slide 515 is aligned with the edge of the yoke 513 along with the merchandise start slide 618, and the cash-credit slide 510 is aligned with the opening 513b in the edge of the start slide 513. The clerk start slide 648 remains aligned with the recess 513c. Thus, the tax start slide 515 is now capable of pivoting the start slide 513, and the cash-credit start slide 510 is ineffective to pivot the start yoke 513. As described above, the operation of one of the tax amount keys 284–286 initiates the cycle of operation for entering a tax amount immediately following the automatic recall of one of the taxable items from the accumulator assembly 264 to the indicating assembly 260. The start yoke slide 886 is restored to its normal position by the start test assembly 267 between 190° and 220° of movement of the main shaft 314 (see line 11 in FIG. 82).

When the start yoke 513 is next pivoted by the actuation of an effective start slide, such as the tax start slide 515, the disc 891 is set to a position corresponding to the next setting of the mode of operation differential assembly 258. In the illustrative example, the entrance of a tax amount by the actuation of one of the keys 284–286 controls the setting of the mode of operation differential assembly 258 to its ninth setting, and during this cycle of operation the projecting portion 888b engages the periphery of the disc 891 so that the start slide 513 is held in its normal position in which the cash-credit start slide 510 is effective and the tax start slide 515 is ineffective. Thus, the mode of operation bank 280 controls the setting of the start yoke 513 to a position corresponding to the setting of the mode of operation differential assembly 258 during the preceding cycle of operation. In other words, the start yoke 513 is shifted in position after the initiation of each cycle of operation of the cash register 250 and remains in this position until the next following cycle of operation is initiated.

(11) INDICATOR REPEAT

The cash register 250 not only includes means controlled by the maintained depression of one of the keys in the merchandise bank 278 for producing a repeated entry of an item or amount into the cash register but also includes means controlled by the indicating assembly 260 of the cash register 250 and rendered effective by the depression of the repeat key 293 in the mode of operation bank 280 for producing repeated entries of a data item. In general, the indicator repeat operation consists of locking the indicating assembly 260 in a previously set condition and then repeatedly setting the plurality of differential assemblies 258 under the control of the locked indicating assembly 260 to secure the repeated entry of identical amounts or items into the cash register 250.

The indicator repeat operation is controlled by the manual repeat key 293 in the mode of operation bank 280. As illustrated in FIG. 84, the manual key 293 can be depressed to a set condition in which the mode of operation differential assembly 258 is adjusted to its fourth setting whenever the no repeat memory slide 761 in the program memory means 690 and the key locking slide 823 are in their normal condition. Since the memory slide 761 is reset to its normal condition only by the actuation of the automatic listing key 700, the manual repeat key 293 can be depressed only when the preceding operation of the cash register 250 involved a listing operation. Thus, the key 293 can be operated to repeatedly enter only an entry which is to be listed in the cash register.

When the key 293 is depressed to an effective setting, the arm 701a on the related key shaft 701 engages the single projection 820a on the repeat group slide 820 and the similarly disposed projections on the group slides 616, 497, 491, 502, 505 and 374 to displace all of these slides to their normal left-hand position. The clerk group slide 646 is not restored because it is necessary to maintain one of the clerk keys 291a or 291b in a depressed condition in order to free the keyboard assembly 256 for operation, as described above. If any one of the keys in the banks related to the above identified group slides has previously been actuated, which represents an incorrect key actuation and would cause a faulty repeat operation, the related group slide in the mode of operation bank would be held in a displaced position and the key 293 could not be depressed. The operation of the repeat group slide 820 to its left position conditions the cash register 250 to perform a repeat operation. It should be noted that the repeat group slide 820 is normally held in its right position (FIG. 53D) by resilient means (not shown) and is not reset to a left position by the start test assembly 267.

A shoulder formed in the upper edge of the upper opening in the group slide 820 (FIG. 79B) engages an L-shaped lever or crank 893 that is pivotally mounted on the post or shaft 373 (FIG. 21B). The other end of the crank 893 is connected to a connecting slide 894 that extends across the rear edge of the keyboard assembly 256. Accordingly, when the repeat slide 820 is moved to the left by the actuation of the key 293, the crank 893 is pivoted in a clockwise direction about the post 373 so that the connecting slide 894 is moved to the right. The left end of the slide 894 is provided with a notch 894a in which is received an intermediate portion of a link 895. The two opposite ends of the link 895 are formed with tongue portions 895a that are received within aligned openings in a pair of support elements 896 that are secured to the frame structure of the keyboard assembly 256. When the link 894 is moved to the right, the link 895 is pivoted in a clockwise direction so that an arm 895b projecting from the link 895 moves upwardly. The projecting arm 895b is connected to a link 897 that is effective, when moved upwardly, to cause the locking of the indicating assembly 260, with the exception of the clerk and mode of operation indicating means, in the position to which they were set during the preceding cycle of operation of the cash register 250. Thus, the differential assemblies 258 can be adjusted under the control of the locked indicating assembly 260 to the position determined by the preceding entry. The resilient biasing or restoring means connected to the repeat group slide 820 or the elements actuated thereby restore the repeat slide 820 to its right position when the repeat key 293 is returned to its normal or elevated position.

As indicated above, an indicator repeat operation initiated by the depression of the key 293 can be performed only following a listing operation in which the automatic key 700 was depressed to set the mode of operation differential assembly to its ninth position. When the control shaft 412 is set to its ninth position, all of the banks of the keyboard assembly 256 are restored to a normal condition with the exception of the clerk's bank 279. Further, since the repeat operation initiated by the depression of the key 293 involves the setting of the plurality of differential assemblies 258 under the control of the indicating assembly 260, the keys in the print banks 275, the amount banks 276, the account bank 277 and the merchandise bank 278 cannot be depressed without blocking the actuation of the key 293. However, since none of the keys in these banks will be operated during an indicator repeat operation, it is necessary to disable the zero stop assemblies to prevent the differential assemblies from being latched in zero representing positions when the repeat cycle of operation of the cash register 250 is initiated.

This is easily accomplished in the print banks 275 and the amount banks 276 since the differential assemblies for these banks are set following the setting of the mode of operation differential assembly 258. Therefore, when the control shaft 412 is set to its fourth position corresponding to the fourth setting of the mode of operation differential assembly 258 at the completion of 93° of rotation of the main shaft 314 (see line 6 of FIG. 81), the disc 454 (FIG. 75) is set in a position in which the levers 442 and 443 (see line 2 in FIG. 81) are positively operated to disable the zero stop means in the print banks 275 and the amount banks 276.

However, the zero stop means for the selector banks 277 and 278 are rendered effective prior to the setting of the mode of operation differential assembly 258 (see line 1 in FIG. 81) so that it is necessary to positively disable the zero stop assemblies in the account bank 277 and the merchandise bank 278 prior to starting the cash register 250 and in direct response to the operation of the repeat group slide 820. It is not necessary to disable the zero stop assembly for the clerk bank 279 since the actuated one of the clerk keys 291a or 291b remains depressed and the associated clerk indicating means is not locked against movement.

To disable the zero stop means for the account bank 277 and the merchandise bank 278, a somewhat L-shaped slide 898 (FIG. 73) is slidably mounted on the projecting end portions 344b of the wall elements 344 immediately adjacent the zero stop elements 473 and 609 for the banks 277 and 278, respectively. The slide 898 includes three slots 899 in its upper wall in which the zero stop elements 473, 609, 643 associated with the banks 277–279, respectively, are slidably mounted. The slots in which the elements 473 and 609 are mounted include notched portions 899a that are normally disposed in vertical alignment with two pins 900 carried on the account bank zero stop element 473 and the merchandise bank zero stop element 609. The slide 898 includes a projecting portion 898a that is received within an opening 894b (FIGS. 21B and 73) in the connecting slide 894.

As indicated above, the pins 900 on the zero stop elements 473 and 609 are normally disposed in alignment with the notches 899a in the two related slots 899. Thus, the zero stop elements 473 and 609 can be moved between effective and ineffective positions in the manner described above. However, when the repeat group slide 820 is shifted by the operation of the repeat key 293, the slide 894 is moved to the right in the manner described above so that the slide 898 is shifted to the right to move the slots 899a out of alignment with the pins 900 on the zero stop elements 473 and 609. Thus, these two stop elements cannot be lowered to an effective position during repeat operations, and the associated account and merchandise differential assemblies 258 are set under the control of the locked indicating assembly 260. The zero stop element 643 for the clerk bank 279 is not provided with a pin 900 and is free to move to an effective position during a repeat operation. However, this will not happen because the clerk key remains depressed for the reasons set forth above.

*Lock bank 281*

(1) GENERAL

The lock bank 281 is used to manually control the reading and resetting of the plurality of different accumulators or totalizers in the accumulator assembly 264 and comprises a plurality of locking type keys which are operated in conjunction with the other keys in the transaction banks of the keyboard assembly 256 to either read or reset each of the individual accumulators in the cash register 250.

As shown in FIG. 4 of the drawings, the lock bank 281 includes a reset clerk key 300, a read clerk key 301, a reset tax key 302, a read tax key 303, a reset cash-credit key 304, a read cash-credit key 305, a reset merchandise key 306 and a read merchandise key 307. The lock bank 281 also includes a no-receipt key 308 that is selectively operated to render the printing assembly 266 effective or ineffective to print a receipt or ticket for a cash register operation. Each of the keys 300–308 is of a conventional design and includes a lock body 905 (FIGS. 6B and 74) that is mounted on the frame of the keyboard assembly 256 between the wall element 704 and the right wall 312 with a portion of the body 905 received within a positioning slot 312a formed in the upper edge of the wall 312. The lock bodies 905 are secured in position by a plurality of headed fasteners 906 with their upper ends extending upwardly through suitable openings in the top plate 313 of the housing for the keyboard assembly 256. A lock cylinder 907 is rotatably mounted in each of the lock bodies 905 for movement in a counterclockwise direction (FIG. 4) from the normal position illustrated therein to an operated position.

The keys 300–308 control the operation of the keyboard assembly 256 and the cash register 250 by selectively actuating a plurality of lock slides between set and normal positions. To provide means for actuating the lock slides, each of the key cylinders 907 is adapted to actuate a shaft 908 that is carried on a U-shaped element or yoke 909. The element 909 is pivotally mounted on a shaft 910, the upper end of which is journaled in a plate 911 (FIG. 6B) and the lower end of which is received within an opening 912 (FIG. 74) in a top plate 913 of a housing for the lock slides. The lower end of the shaft 908 projects downwardly through an arcuate opening 914 in the plate 913. In the normal condition of each of the locks 300–308, the shaft 908 occupies the right-hand portion of the slot 914 so that when one of these locks is actuated by rotating the lock cylinder 907 in a counterclockwise direction, the shaft 908 is moved in a counterclockwise direction from the right end of the slot 914 to the left end thereof.

The lock slides actuated by the keys 300–308 include a reset lock slide 915, a read lock slide 916, a clerk lock slides 917, a tax lock slides 918, an account lock slide 919, a merchandise lock slide 920, a key slide 921, and a no-receipt slide 922. These eight slides are slidably mounted in a position parallel to the lower wall 310 and disposed between the wall element 704 and the upright wall of a generally L-shaped supporting frame or housing 923 that is secured to the frame of the keyboard assembly 256. The plate 913 is carried on the wall 704 and the vertical wall of the housing 923. The horizontal wall of the housing 923 includes an arcuate slot aligned with each of the slots 914 for receiving the lower ends of the shafts 908. Suitable spacing means are disposed between the slides 915–922 (FIG. 6B), and a flat spring 924 (FIG. 74) is disposed between the upper surface of the lock slide 915 and the lower surface of the plate 913 to bias the slides 915–922.

To provide means for selectively operating the slides 915–922, the shafts 908 of the keys 300–308 extend through openings of different configurations in the slides. If the actuation of a particular one of the keys 300–308 is to cause actuation of one of the slides, the slide to be actuated is provided with an opening 925 (FIG. 74) for receiving the related shaft 908. Alternatively, if the actuation of a given one of the keys 300–308 is not to result in the actuation of one of the slides, the key shaft 908 of this key extends through an opening 926. As an example, if the key 300 is to actuate the slide 915, the shaft 908 of the key 300 in its normal position is received in the lower right-hand corner of the first opening 925 in the slide 915 (FIG. 74). When the cylinder 907 of the key 300 is rotated in a counterclockwise direction, the shaft 908 of this key rides along the inclined lower edge of the slot 925 and moves the slide 915 downwardly and to the left to its set position. When the slide 915 is operated by one of the keys other than the key 300, the shaft 908 of the key 300 moves along the right edge of the opening 925 as the slide 915 is moved downwardly to the left (FIG. 74). The setting movement of the slide 915 is not obstructed by the shaft 908 of the key 301, for instance, because the shaft 908 of this key in its normal position moves upwardly along the right edge of the slot 926 to permit free movement of the slide 915. Further, when the shaft 908 of the key 301 is rotated, the shaft 908 passes through the arcuate left-hand portion of the slot 926 and does not shift the position of the slide 915. The slides 915–920 are provided with openings 925 and 926 in accordance with the ones of these slides that are to be actuated by the different ones of the keys 300–308.

The slide 921 is provided with a plurality of slots 927 that perform substantially the same function as the openings 925 insofar as the actuation of the slide 921 by the displacement of one of the shafts 908 is concerned. However, the slide 921 also functions as an interlock because of the configuration of the slot 927. Once the slide 921 has been actuated by moving one of the shafts 908, the angular portion of the slot 927 prevents any other shaft 908 from being turned to an operated position. The configuration of an opening 928 in the slide 921 in which the shaft 908 of the no-receipt key 308 is received is such as to permit the no-receipt key 308 to return to and remain in either its no-receipt or its receipt positions without affecting the operation of the slide 921.

The plurality of slides 915–922 are provided with different openings or slots in accordance with the combination of slides to be actuated by each of the keys 300–308. More specifically, the actuation of the key 300 actuates the slides 915, 917 and 921. The key 301 actuates the slides 916, 917 and 921. The key 302 actuates the slides 915, 918 and 921. The key 303 actuates the slides 916, 918 and 921. The key 304 actuates the slides 915, 919 and 921. The key 305 actuates the slides 916, 919 and 921. The key 306 actuates the slides 915, 920 and 921. The key 307 actuates the slides 916, 920 and 921. The key 308 actuates only the slide 922.

To provide means for aligning the slides 915–920, the slide 921 is provided with an upwardly projecting arm 921b (FIG. 74) that extends through an opening 929 in each of the slides 915–920. When the slide 921 is in its normal or upper right-hand position, the projecting portion 921a engages the right-hand edges of the openings 929 to hold the slides 915–920 in an aligned normal position.

An additional means is provided for securing these slides 921 and 922 in position. This securing means comprises a bell crank 930 (FIG. 74) that is pivotally mounted on the lower wall of the frame 923 by a pivot pin 931. A tension spring 932 connected between one end of the bell crank 930 and the supporting frame resiliently biases the bell crank 930 for movement in a clockwise direction about the pivot pin 931. A pin 933 is secured to the other end of the bell crank 930 and extends upwardly into a pair of openings 934 in the slides 921 and 922. When these slides are displaced to their lower or set positions, the pin 933 cams against a pair of lugs 934a that project into the openings 934 and snaps over these projecting portions to secure the slides in a displaced position.

(2) CONTROL OF START YOKE 513

The lock bank 281 includes means controlled by the actuation of one of the keys 300–307 for shifting the start yoke 513 to a position in which all four of the start slides 510, 515, 618 and 648 can be used to initiate a cycle of operation of the cash register 250 when reading or resetting operations controlled by the bank 281 are being performed. This operation is performed by the key locking slide 921 which, as indicated above, is actuated to a set position in response to the actuation of any of the keys 300–307.

More specifically, a pin 935 is secured within an opening 936 (FIG. 74) in the slide 921 and extends downwardly through aligned openings in the slide 921 and the lower wall of the housing 923. This pin normally bears against an edge of a lever 937 that is pivotally mounted on the lower wall of the structure 923 by a pivot pin 938. A free end portion 937a of the lever 937 bears against the test yoke 888 (FIG. 71).

When the slide 921 is set, the pin 935 bears against the edge of the lever 937 to pivot this lever in a counterclockwise direction about the pin 938. The end portion 937a of the lever 937 bears against the yoke 888 to move this yoke to the right along the shaft 412 (FIG. 69) to produce a corresponding movement of the start yoke 513 to the right (FIG. 72). The degree of movement to the right is sufficient to place the clerk start slide 648 to the left of the recess 513c so that all of the slides 510, 515, 618 and 648 are aligned with an edge of the start yoke 513 and are not aligned with one of the recesses, such as the recess 513a. When the key slide 921 is restored to its normal condition, the spring 890 (FIG. 69) restores the yokes 513 and 888 to their normal position.

(3) NO-RECEIPT MECHANISM

The operation of the key 308 or the operation of one of the keys 300–307 renders the printing assembly 266 operative to print a receipt or ticket. One end of a first motion transmitting link or lever for controlling the assembly 266 passes through a slot 939a in the slide 922 and is received in a notch 939 in the slide 921. Whenever one of the keys 300–307 is operated, the slide 921 is set and moves the connected first link in the notch 939 to a position in which the receipt printing means in the assembly 266 is enabled.

Similarly, one end of a second control link or lever is received within a notch 940 (FIG. 74) in the no-receipt slide 922. When this slide is moved to a set condition by the operation of the key 308, the second control lever renders the receipt issuing means in the assembly 266 effective to print a ticket. Thus, when one of the keys 300–307 is operated with the no-receipt key 308 in its normal "no-receipt" position or when the no-receipt key 308 is turned to an operated "receipt" position, the assembly 266 is rendered effective to produce a ticket or a receipt.

(4) KEYBOARD LATCH

The actuation of the lock bank 281 by certain of the keys therein frees the keyboard latch so that the keyboard assembly 256 can be manually actuated to control the operation of the cash register. In the illustrated cash register 250, the setting of one of the slides 918–920 by the operation of one of the keys 302–307 is effective to release the keyboard latch and free the keyboard assembly 256 for operation.

Each of the slides 918–920 is provided with a notch 941 (FIG. 74) in its right rear edge in which a pin 942 (FIGS. 52 and 74) is disposed. The pin 942 is mounted on a lever 943 that is pivotally mounted on the lower wall 310 of the frame structure by a pivot pin 944 (FIG. 52). The other end of the lever 943 bears against a depending arm 945a on a slide 945 that is slidably mounted on the frame of the keyboard assembly 256 by a pair of pins 946 which are slidably received within slots formed in the the slide 945. A bell crank 947 is pivotally mounted on the bight portion of the bracket 682 by a pivot pin 948 and is resiliently biased into engagement with a shoulder 945b on the slide 945 by a tension spring 949 that is connected between the bell crank 947 and a lug on the slide 945.

When one of the slides 918–920 is set by movement to the left (FIG. 74), the pin 942 is engaged and moved by the actuated one of the slides 918–920 to pivot the lever 943 in a clockwise direction about the pin 944 (FIG. 52). This shifts the slide 945 to the right so that the bell crank 947 pivots in a clockwise direction about the pivot pin 948. The free end of the bell crank 947 bears against the shaft 679 to displace this pin so that this pin cams against the slot 680 in the arm 675 to pivot this arm in a clockwise direction about the pivot pin 676. In this pivoted or displaced position, the locking portion 675a of the arm 675 is moved out of engagement with the connecting slides 494 (FIG. 21) to free the keyboard assembly 256 for operation in the manner described above. When the operated one of the slides 918–920 is restored to its normal position, the slide 945 and the lever 947 are restored to their normal positions by the resilient bias applied to the pin 679 from the tension spring connected to the slide 649 in the clerk bank 279 of the keyboard assembly 256.

In this connection, it should be noted that when the pin 679 is displaced as a result of the movement of the slide 495, the link 678 to which the pin 679 is secured is displaced to the right to move the slide 649 to the right. This blocks the depression of either of the clerk keys 291a and 291b in the manner described above. Since the slide 945 is not moved by movement of the slide 917, the clerk keys 291a and 291b can be depressed when either of the lock keys 300 or 301 is actuated.

(5) LOCK BANK DISABLING MEANS

The cash register 250 also includes means for preventing the operation of the no-receipt slide 922 and the key lock group slide 823 in the mode of operation bank 280 unless the cash register 250 has been conditioned for or has completed a particular type or mode of operation under the control of the keyboard assembly 256. More specifically, the cash register 250 includes means for preventing the operation of the no-receipt slide 922 or the key lock group slide 823 during listing operations of the cash register and until the preceding operation performed by this cash register comprises a total operation in which the listing accumulator has been cleared or reset. Since the slide 823 is operated whenever one of the keys 300–307 is operated, the locking of the slides 823 and 922 locks all of keys 300–307.

This interlocking mechanism cooperates with a downwardly extending projection 823 on the key lock group slide 823 (FIG. 53D) and a similarly disposed downwardly projecting portion 922a (FIG. 74) on the no-receipt slide 922. These two projections are disposed in transverse alignment and extend downwardly through an opening in the lower frame element 310 so as to be disposed above and to the right of a latch elements 950 (FIG. 84) when these two slides are in their normal position. The detent element 950 is slidably mounted on a frame 951 and is resiliently urged to a position disposed to the left of and in the path of movement of the projections 823k and 922a by a tension spring 952 that is connected between the lower end of the detent 950 and a portion of the frame 951 (FIGS. 80 and 84). Thus, the slides 823 and 922 cannot be displaced by actuation of the keys in the lock bank 281 and the keys 300–308 cannot be operated.

To provide means for disabling the latch means 950, a lever 953 (FIG. 80) is pivotally mounted on a wall of the main frame of the cash register 250 by a stud or pivot pin 954. The position of the lever 953 is controlled by the setting of the mode of operation differential assembly 258 by means of a pin 955 carried on a disc 956 that is set in eleven different positions in dependence on the setting of the mode of operation differential assembly 258. Whenever the mode of operation differential assembly 258 is adjusted to its eleventh setting during a total operation (see FIG. 83), the disc 956 is adjusted to a position in which the pin 955 cams against the right end of the lever 953 to pivot this lever in a counterclockwise direction to the position shown in FIG. 80. In this position, the detent 950 is moved downwardly against the bias of the spring 952 and out of the path of movement of the projections 823k and 922. The no-receipt slide 922 and the key locking slide 823 can now be adjusted to their set positions under the control of the keys 300–308 in the lock bank 281.

It should be noted that the detent 950 will be restored to an effective position disposed to the right of the projection 823k or 922a by the spring 952 after the slides 823 or 922 have been set and the cash register 250 has been operated. This holds an actuated key in the lock bank 281 in an actuated condition until the mode of operation differential assembly 258 is next moved to its eleventh setting. The actuated key in the bank 281 can then be turned to a normal position. This insures that the read and reset operations are terminated by a total operation and also prevents a change in the receipt control for the printing assembly 266 in the middle of a listing operation.

(6) OPERATION OF GROUP SLIDES IN MODE OF OPERATION BANK 280

The slides 915–921 in the lock bank 281, when selectively operated to their set condition, selectively lock different ones of the group slides in the mode of operation bank 280 in their normal positions and selectively operate the slides 821–823 to set positions so as to control the operation of the mode of operation keys 292–295 and 691–700 and to selectively free the keys in the keyboard assembly 256 for operation in accordance with the read and reset program of operation for which the cash register 250 has been designed. As described above, the group slides are selectively operated to or locked in their normal positions in accordance with the lengths of the openings 826–832 in the group slides.

More specifically, each of the slides 915–921 is provided with a projecting portion 915a–921a along its left edge which extends through openings in the wall element 704 (FIG. 53E) and into the one of the openings 826–832 in the group slides. The projection 921a is shown in FIG. 74, and the projections 915a–921a are shown in section in FIGS. 60 and 61 in relation to the openings 826–832. The setting of one of the slides 915–921 is effective to set those of the group slides in the mode of operation bank 280 where the related projection portion 915a–921a is disposed in an opening of a shorter longitudinal length. If the one at the openings 826–832 is of a longer longitudinal length, the shifting movement of the related slide in the lock bank 281 does not shift of lock the group slide. As an example, the projection 919a on the account lock slide 919 extends through the openings 829 and is effective when the slide 919 is set to lock the slides 616, 502, 505, 374 and 646 in a normal position but does not affect the settings of the slides 820, 497, and 491 (see FIG. 79B).

The setting of the reset slide 915 in the lock bank 281 moves the slide 822 in the mode of operation bank to its set position. The setting of the read slide 916 moves the slide 821 in the mode of operation bank 280 to its set position. The setting of the clerk slide 917 locks the group slides 616, 497, 491, 502, 505 and 374 in normal position. The setting of the tax slide 918 locks the group slides 616, 497, 491, 374 and 646 in normal position. The setting of the account slide 919 locks the group slides 616, 502, 505, 374 and 646 in a normal position. The setting of the merchandise slide 920 locks the group slides 497, 491, 502, 505, 374 and 646 in a normal position. The setting of the key lock slide 921 moves the slide 823 in the mode of operation bank 280 to its set position.

(7) READ AND RESET PROGRAM

The reading and resetting program of the cash register 250, which is controlled by the keys of the lock bank 281 in conjunction with the other transaction keys of the keyboard assembly 256, is described below with reference to some typical operations that are illustrated in FIG. 86. In general, during reading operations, the data stored in the accumulators in the assembly 264 selected by the actuation of the keys in the transaction banks is transferred to the indicating assembly 260 and the printing assembly 264 and is then returned to storage in the accumulator assembly 264. In reset operations, data standing in the selected accumulator in the assembly 264 is cleared out of the accumulator and transferred to the indicating assembly 264 and the printing assembly 266.

Assuming that the keyboard assembly 256 is in a normal condition with none of the keys in an operated condition, the memory slides in the program memory means 690 and the group slides in the mode of operation bank 280 are in the position illustrated in line 1 of FIG. 86. If the values standing in the clerk A and clerk B accumulators are to be read, the read clerk key 301 is actuated to actuate the slides 916, 917 and 921 to a set condition. The operation of the slide 921 sets the group slide 823 in the mode of operation bank 280 and pivots the lever 937 (FIG. 74) so that the start yoke 513 is shifted to the right (FIG. 72) to a position in which all of the start slides 510, 515, 618 and 648 are effective to pivot the start yoke 513. The setting of the group slide 823 frees the manual key 292 and the automatic keys 693 and 694 for operation and blocks the keys 293, 691, 692 and 695–700 from being actuated to a depressed condition (see FIG. 83). The actuation of the slide 916 sets the group slide 821 in the mode of operation bank 280 to block the actuation of the automatic key 693 and to free the automatic key 694 for operation. The actuation or the setting of the lock slide 917 locks the group slides 616, 497, 491, 502, 505 and 374 in a normal condition so that none of the keys in the print banks 275, the amount banks 276, the account bank 277 and the merchandise bank 278 can be actuated. Although line 1 in FIG. 86 shows all of the group slides in the mode of operation bank 280 as being in a normal condition, the group slides controlled by the keys in the transaction banks and in the prints and amount banks might be in a set condition. However, the operation of the slide 917 positively restores all of these group slides, except the group slide 646, to a normal condition. Thus, only the keys 291a and 291b in the clerk bank 279 are freed for operation.

If the clerk A accumulator is the first clerk accumulator to be read, the operator actuated the clerk key 291a to set the group slide 646 so that the group slides in the mode of operation bank now presents the pattern of set and normal conditions shown in line 2 of FIG. 86. The actuation of the clerk key 291a also actuates the clerk start slide 648 so that the start yoke 513 is pivoted to initiate a cycle of operation of the cash register 250. By comparing the settings of the slides 761–767 in line 1 of FIG. 86 and the group slides in line 2 of FIG. 86, it will be seen that only the automatic key 694 in the mode of operation bank 280 can be lowered to set the mode of operation differential assembly 258 in its second position. The depression of the clerk key 291a is effective to set the clerk differential assembly 258 to its ninth setting in which the clerk A accumulator is selected.

During the following cycle of operation, the total stored in the clerk A accumulator is transferred to the printing assembly 266 and the indicator assembly 260 and is then returned to the clerk A accumulator. In addition, when the mode of operation differential assembly is in its second setting, the total standing in the clerk A accumulator is listed in the itemizer. As indicated in FIG. 84, the operation of the automatic key 694 also sets the slide 762 and resets the slide 764 in the program memory means 690. However, these slides were previously in these positions so that no actual setting of the slides in the program memory means 690 occurs. Since the mode of operation differential assembly 258 is set to its second position, the reset means for the clerk keys 291a and 291b is effective to restore the operated keys 291a toward the end of the operating cycle. This returns the start slide 648 to its normal position so that the cash register 250 stops at the completion of the cycle of operation in which the clerk A accumulator is read. The clerk B accumulator can now be read in the manner described above by depressing the clerk B key 291b. At the termination of the reading of the clerk B accumulator, the memory slides and group slides in the mode of operation bank 280 are in the position shown in line 2 of FIG. 86, and the itemizer contains the sum of the clerk A and clerk B totals.

To produce a total of the readings, the total key 292 is now depressed. The depression of the total key 292 restores the clerk slide 646 to its normal position (see FIGS. 84 and 86) and displaces the mode of operation start slide 724 to pivot the start yoke 513 so that a cycle of operation of the cash register 250 is initiated. The slide 726 (FIG. 54) is shifted by the actuation of the key 292 to block depression of the key 694. During this cycle of operation, the mode of operation differential assembly 258 is adjusted to its eleventh position under the control of the depressed key 292 (see FIG. 83), and the cash register itemizer is engaged with the amount and print differential assemblies 258 to transfer the total of the clerk readings from the itemizer to the printing assembly 266 and the indicating assembly 260. The timing of the engagement of the itemizer with the differential assemblies 258 is such that the itemizer is reset to a normal condition to clear the total from the itemizer.

At the end of this cycle of operation of the cash register 250, the start slide 724 is restored to its normal condition so that further operation of the cash register 250 is prevented. The read clerk key 301 is then manually restored to its normal condition so that the group slides in the mode of operation bank and the memory slides 761–767 can be placed in the normal position shown in line 4 of FIG. 86. The resetting of the slide 921 when the key 301 is restored also releases the start yoke 513 for movement by the compression spring 890. Since the mode of operation differential assembly 258 was left in its eleventh position, the projecting portion 888b bears against the edge of the disc 891 to hold the yoke 513 in the normal position shown in FIG. 72.

The cash and credit accumulators and the nine merchandise accumulators, two of which form clerk refund accumulators, can be read in the same manner as the clerk accumulators by first actuating the keys 305 or 307 and then operating the keys 282 and 283 or 290 in sequence. The tax amount accumulators can also be read by first actuating the read tax key 303. Since, however, the tax amount keys 284–286 that control the account differential assembly 258 to select the three tax amount accumulators are normally blocked by the account memory means 460, the related taxable item key must be actuated immediately preceding each of the tax amount keys to set the account memory means 460 in a condition in which the desired tax amount key can be depressed. As an example, the taxable item key 287 is depressed to operate the cash register 250 through its cycle of operation in which the first taxable item accumulator is read in order to set the account memory means 460 to a condition in which the first tax amount key 284 can be operated. The operation of the key 284 initiates a cycle of operation in which the value standing in the first tax amount accumulator is transferred to the printing assembly 266, the indicating assembly 260, and the cash register itemizer. This operation is set forth below in conjunction with a description of a resetting of the tax amount accumulators.

When the three tax amount accumulators are to be reset, the reset tax key 302 is actuated to set the slides 915, 918 and 921. The setting of the slide 921 sets the start yoke 513 to a position in which all four of the start slides 510, 515, 618 and 648 are effective together with the mode of operation start slide 724 and sets the key lock group slide 823 in the mode of operation bank 280 so that the keys 292, 693 and 694 are again freed for operation. The setting of the reset slide 915 sets the reset group slide 822 in the mode of operation bank 280 so that the automatic key 694 is blocked and the enabling of the automatic key 693 is completed. The setting of the tax slide 918 locks the group slides 616, 497, 491, 374 and 646 in their normal position so that the print banks 275, the amount banks 276, the cash and credit keys 282 and 283, the merchandise bank 278, and the clerk bank 279 are blocked against operation.

If the first tax amount accumulator is to be reset, the first tax amount key 284 cannot be actuated at this time because the depression of this key is blocked by the account memory means 460. Accordingly, the first taxable item key 287 is depressed to set the taxable item group slide 502 in the mode of operation bank 280 and to displace the start slide 515 so that the yoke 513 is pivoted to initiate a cycle of operation of the cash register 250. Since all of the automatic keys 691–700, with the exception of the automatic key 693, are blocked from movement to a depressed condition (see FIG. 83), only the key 693 is lowered to set the mode of operation differential assembly in its sixth position. The depressed key 287 selects the first taxable item accumulator for connection to the print and amount differential assemblies 258. The first taxable item accumulator is in a normal or empty condition at this time. However, during this cycle of operation, the slides in the account memory means 460 are set to a position in which the first tax amount key 284 can be depressed. At the end of this cycle of operation of the cash register 250, the first taxable item key 287 is restored to a normal condition, and the tax start slide 515 is returned to an ineffective position to prevent further operation of the cash register 250. The group and memory slides in the mode of operation bank 280 now provide the pattern of normal and set conditions illustrated in line 5 of FIG. 86.

To reset the first taxable amount accumulator, the operator now depresses the first tax amount key 284 so that the start slide 515 again pivots the yoke 513 to initiate a cycle of operation of the cash register. The depression of the key 284 also sets the tax amount group slide 505 in the mode of operation bank 280. Since the taxable item group slide 502 remains set because the account memory means 460 has not been restored to its normal condition, the memory and group slides in the mode of operation bank 280 provide the pattern of set and normal conditions shown in line 6 of FIG. 86. During this cycle of operation, the depressed key 284 controls the account differential assembly 258 to select the first tax accumulator, and the automatic key 693 sets the mode of operation differential assembly 258 to its sixth position so that the first tax amount accumulator is reset to a normal or zero condition and the value standing therein is transferred to the printing assembly 266, the indicating assembly 260, and the cash register itemizer. During this cycle of operation, the account memory means 460 is reset to a normal condition by the depressed key 284 so that the taxable item group slide 502 in the mode of operation bank 280 is freed for return to a normal position. At the conclusion of this cycle of operation, the depressed key 284 is restored to a normal condition, and the start slide 515 is restored to its normal position so that an additional cycle of operation of the cash register 250 is not automatically initiated.

To reset the second tax amount accumulator, the second taxable item key 288 is next depressed, and a cycle of operation of the cash register 250 is initiated by the tax start slide 515. When the start test assembly 267 attempts to restore the group slides to a normal condition, the taxable amount group slide 505 is restored to a normal condition so that the memory slides and group slides in the mode of operation bank 280 occupy the positions shown in line 7 of FIG. 86. During this cycle of operation, the empty second tax amount accumulator is reset, and the memory means 460 in the account bank 277 is set to a condition in which the second tax amount key 285 can be manually depressed to reset the second tax amount accumulator in the manner described above. After this operation, the third tax amount accumulator can be reset under the control of the keys 286 and 289 in the manner described above (see lines 8–10 of FIG. 86).

The depression of the total key 292 following the resetting of the third tax amount accumulator under the control of the key 286 resets the cash register itemizer and transfers the total of the accumulated tax amounts to the printing assembly 266 and the indicating assembly 260. At the conclusion of the total operation initiated by the actuation of the key 292, the program memory slides 761–767 in the mode of operation bank 280 are restored to the condition shown in line 12 of FIG. 86. The remaining clerk, merchandise, cash, and credit accumulators can be reset in the manner described above except that the keys in the selector banks 277, 278 and 279 can be directly actuated without requiring the additional operation of the tax item keys used in resetting the tax amount accumulators.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. In an accounting machine, differential means operable to spaced settings, a bank of keys operable from normal positions to actuated positions to control the setting of said differential means, zero stop means controlled by said keys and operable between an ineffective position and an effective position in which the operation of said differential means is arrested, mode of operation means operable to a plurality of settings to condition said machine for different modes of operation, drive means for operating said machine through a cycle of operation, means operated by said drive means during one portion of each cycle of operation for controlling the movement of said zero stop means to an effective position, testing means operated by said drive means during a cycle of operation of said machine for detecting the setting of said mode of operation means, and means coupled to and controlled by the testing means and actuated by the drive means for selectively operating said zero stop means from an effective position to an ineffective position during different portions of a cycle of operation subsequent to said one portion in accordance with the setting of the mode of operation means detected by the testing means.

2. In an accounting machine, a differentially settable assembly, a bank of manually operable keys for controlling the setting of said assembly, accumulating means for controlling the setting of said assembly, selecting means operable to one setting for rendering said bank of keys effective to control the setting of said assembly and to a second setting for rendering said accumulating means effective to control the setting of said assembly, zero stop means for arresting operation of said assembly in a normal position, said zero stop means normally being in an ineffective setting and being operable to an effective setting in which the operation of said assembly is arrested, drive means for operating the accounting machine through a cycle of operation, first control means coupled to the zero stop means and actuated by the drive means for controlling the movement of said zero stop means to said effective setting during a given portion of each cycle of operation of said accounting machine, and second control means controlled by said selecting means for coupling said zero stop means to the drive means to control movement of the zero stop means to said ineffective setting at one time during a cycle of operation of said accounting machine when the selecting means is in the first setting in which said assembly is to be set by said bank of keys and for coupling said zero stop means to the drive means to control movement of the zero stop means to said ineffective setting at a time different from said one time during a cycle of operation of said accounting machine when the selecting means is in the second setting in which said assembly is to be set by said accumulating means.

3. In an accounting machine, a differentially settable assembly, a bank of manually operable keys for controlling the setting of said assembly, accumulating means for controlling the setting of said assembly, selecting means operable to different positions for rendering a selected one of said bank of keys and said accumulating means effective to control the setting of said assembly, zero stop means for arresting operation of said assembly in a normal position, said zero stop means normally being in an ineffective setting and being operable to an effective setting in which the operation of said assembly is arrested, drive means for operating the machine through a cycle of operation, first control means for coupling the zero stop means to the drive means to operate said zero stop means to said effective setting at a first point during a cycle of operation of said accounting machine and for returning said zero stop means to said ineffective setting at a second subsequent point in the operating cycle of said accounting machine, and second control means controlled by said selecting means for coupling the zero stop means to the drive means to return said zero stop means to said ineffective setting at a third point during the operating cycle of said accounting machine, said third point being located between said first and second points in the operating cycle of said accounting machine.

4. The accounting machine set forth in claim 3 including an element coupled to the selecting means and operable to different positions corresponding to the different positions of the selecting means, and sensing means actuated by the drive means and included in the second control means for sensing the positions of the elements and for controlling the operation of the second control means in accordance with the sensed position of the elements.

5. In an accounting machine, a differentially settable assembly, a bank of manually operable keys for controlling the setting of said assembly, accumulating means for controlling the setting of said assembly, selecting means for rendering a selected one of said bank of keys and said accumulating means effective to control the setting of said assembly, zero stop means for arresting operation of said assembly in a normal position, said zero stop means being held in an ineffective position setting and being operable to an effective setting in which the operation of said assembly is arrested, first control means moved to a position obstructing movement of said zero stop means to an effective setting by operation of a key in said bank, drive means for operating the machine through a cycle of operation, second control means normally holding the zero stop means in its ineffective setting and coupled to and operated by the drive means for releasing said zero stop means for control by said first control means during a cycle of operation of said accounting machine, and third control means coupled to and controlled by said selecting means for coupling said zero stop means to said drive means to return the zero stop means to said ineffective setting independently of said first control means and prior to the setting of said assembly when said assembly is set by said accumulating means and for returning said zero stop means to said ineffective setting following the setting of said assembly when said assembly is set by said bank of keys.

6. In an accounting machine, a differentially settable assembly, a bank of manually operable keys for controlling the setting of said assembly, accumulating means for controlling the setting of said assembly, selecting means for rendering a selected one of said bank selecting means for rendering a selected one of said bank of keys and said accumulating means effective to control the setting of said assembly, zero stop means for arresting operation of said assembly in a normal position, linkage means for normally holding said zero stop means in an ineffective position and being operable to a displaced position to release said zero stop means for movement to an effective setting in which the operation of said assembly is arrested, drive means for operating the machine through a cycle of operation, first control means coupled to the linkage means and actuated by the drive means for moving said linkage means to said displaced position to release said zero stop means for movement to said effective setting at a first point in a cycle of operation of said accounting machine, second control means coupled to and actuated by said bank of keys for retaining said zero stop means in said ineffective setting following release by said first control means when a key in said bank has been actuated, third control means coupled to the linkage means and actuated by the drive means for returning said linkage means to its normal position to operate said zero stop means to said ineffective setting at a second point in an operating cycle of said accounting machine in which said assembly is set by said bank of keys, and fourth control means coupled to and controlled by said selecting means and coupled between the drive means and the linkage means for returning said linkage means to its normal position to operate said zero stop means to said ineffective setting at a third point in a cycle of operation of said accounting machine in which said assembly is set by said accumulating means, said third point being prior to said second point in the operating cycle of said accounting machine.

7. In an accounting machine, a bank of keys for controlling the operation of said machine, each of said keys having a normal position and being operable to an actuated position in which it is effective to control the operation of said machine, restoring means coupled to the keys for restoring the keys in said bank from the actuated position to the position, resilient means coupled to the restoring means for actuating said restoring means, power driven means coupled to the restoring means for actuating said restoring means, and control means for selectively rendering the resilient means or said power driven means effective to actuate said restoring means.

8. The accounting machine set forth in claim 7 including means for conditioning said machine for different modes of operation, and means controlled by said last mentioned means and connected to the control means for operating said control means to select said power driven means or said resilient means in accordance with the mode of operation for which said machine is conditioned.

9. In an accounting machine, a first bank of keys manually operable from normal positions to actuated positions to control the operation of said machine, a second bank of keys manually operable from normal positions to actuated positions for controlling the operation of said machine, first restoring means coupled to the keys in the first bank for restoring the keys in said first bank to normal positions, second restoring means coupled to the keys in the second bank for restoring the keys in said second bank to normal positions, detecting means coupled to the second bank for determining when the keys in the second bank are restored, and control means controlled by the detecting means and coupled to the first restoring means and responsive to the successful restoration of the keys in said second bank by said second restoring means for rendering said first restoring means effective to restore the keys in said first bank.

10. The accounting machine set forth in claim 9 including drive means for operating said machine through cycles of operation, and means in said control means for selectively connecting said first restoring means to said drive means for actuation thereby when said second restoring means is effective to restore the keys in said second bank.

11. In an accounting machine, a bank of keys each operable from a normal position to an actuated position, drive means for operating said machine through different numbers of cycles of operation, start means operated by the actuation of one of said keys for placing said drive means in operation, resiliently biased restoring means for restoring the keys in said bank, control means operated by said drive means for rendering said restoring means effective to attempt to restore the keys in said bank once during each cycle of operation, said resiliently biased restoring means being ineffective to restore an actuated key when manual force is applied thereto, and means responsive to the restoration of all of the keys in said bank for rendering said start means ineffective.

12. In an accounting machine, a bank of keys for controlling the operation of said machine, said keys being individually operable from a normal position to an actuated position in which the key is effective to control the machine, restoring means coupled to the keys for restoring said bank of keys from their actuated position to their normal position, power driven means coupled to the restoring means for actuating said restoring means, control means operable to different settings for conditioning said machine for different modes of operation, means coupled to and controlled by said control means in certain settings for rendering said power driven means effective to actuate said restoring means when said machine is conditioned for operation in certain of said modes and in at least one other setting for rendering said power driven means ineffective to actuate said restoring means when said machine is conditioned for operation in at least one other mode, and additional means coupled to the restoring means for actuating said restoring means when said machine is conditioned for operation in said one other mode.

13. In an accounting machine, a plurality of accumulators, a plurality of banks of amount keys selectively operable from normal position to actuated positions to control the entry of amounts into said accumulators, a bank of selector keys for rendering a selected one of said accumulators responsive to control by said banks of amount keys, restoring means coupled to the amount keys for restoring said banks of amount keys from actuated positions to normal positions, drive means for operating said machine through cycles of operation, coupling means for coupling the restoring means to the drive means for operation by the drive means, mode of operation control means operable to different settings for conditioning said machine to perform different types of operations during said cycles of operation, sensing means for sensing the setting of the mode of operation control means, means connected to the coupling means and controlled by said sensing means in certain settings of the mode of operation control means for controlling the coupling means to couple the drive means to the restoring means for automatic operation during a cycle of operation and controlled by said sensing means in at least one other setting of the mode of operation control means for controlling the coupling means to leave the drive means and the restoring means in an uncoupled relation, and means controlled by the selector keys in said other setting for controlling the coupling means to couple the drive means to the restoring means.

14. In an accounting machine, an accumulator means, a plurality of amount keys selectively operable from normal to actuated conditions to control the entry of an amount into said accumulator means, drive means for operating said machine through different numbers of cycles of operation in accordance with the number of times the amount selected by the amount keys is to be entered into said accumulator means, first restoring means coupled to the amount keys for restoring the actuated amount keys to a normal condition, an additional key operable from a normal position to an actuated position to initiate operation of said drive means, second restoring means coupled to the additional key and operable during each cycle of operation of said machine for attempting to restore said additional key from an actuated position to a normal position, said second restoring means including a resilient element and being ineffective to restore said additional key if manual force is applied thereto, detecting means operated by the restoration of the additional key, and control means coupled to the detecting means and the first restoring means for rendering said first restoring means effective to restore the amount keys when the additional key is restored.

15. The accounting machine set forth in claims 14 in which said control means includes means for coupling said first restoring means to said drive means for actuation thereby.

16. In an accounting machine, a bank of manually operable keys movable between operated and released positions, a plurality of coupling links pivotally mounted adjacent said bank of keys, each of said keys including means for actuating or for actuation by two adjacent ones of said links, means actuated by the operation of one of said keys to an operated position for pivoting the links at one side of the operated key in a clockwise direction and for pivoting the remaining links at the other side of the operated key in a counterclockwise direction so that said links restore any other operated one of the keys in said bank to a released position, drive means for operating said accounting machine, and means actuated by said drive means for pivoting all of said links in a single one of said directions to restore all of the keys in said bank to a released condition.

17. The accounting machine set forth in claim 16 including a differential means set in different positions under the control of the manually operable keys, a zero stop means movable between spaced positions for controlling the setting of the differential means, and means controlled by the coupling links for controlling the movement of the zero stop means.

18. In an accounting machine, a bank of manually operable keys movable between operated and released positions, a plurality of pivotally mounted coupling links each having a first arm and a second arm, each of said keys including means movable into engagement with the first arm on one link and the second arm on a second link, means coupling said links for the transmission of movement in opposite directions, actuation of one of said keys to an operated position pivoting one group of said links in a clockwise direction so that the first arms on said one group of links restore the keys associated with said one group of links to released positions and concurrently pivoting a second group of said links in a counterclockwise direction so that the second arms on said second group of links restore the keys associated with said second group of links to released positions, a differentially settable assembly controlled by said bank of keys, zero stop means movable between an ineffective setting and effective setting in which operation of said assembly is arrested, and means controlled by pivotal movement of at least one of said links in only one of said opposite directions for holding said zero stop means in said ineffective setting.

19. In an accounting machine, a plurality of banks of manual keys operable from normal positions to depressed positions in which the keys are effective to control the operation of the machine, a plurality of lock keys each operable from a normal setting to an actuated setting in which the key is effective to control the machine, differential means set by the manual keys and the lock keys, drive means for operating the machine through cycles of operation and for operating the plurality of differential means, a plurality of slides each disposed adjacent one bank of manual keys, each of said slides having a normal position in which the keys in the adjacent bank are blocked by the slide against movement to a depressed position and being movable to a set position in response to the actuation of one of the keys in the adjacent bank to a depressed position, a plurality of mode of operation keys for conditioning said machine for different types of operation, a plurality of control elements for controlling the operation of said mode of operation keys, means coupled to the control elements for sensing the positions of the slides controlled by the sensed positions of said slides for setting said control elements to different positions, and means controlled by said plurality of lock keys and coupled to the slides for selectively locking said plurality of slides in their normal positions until one of the lock keys is operated to an actuated position in which the differential means associated with the lock keys can be selectively set and to prevent the setting of said control elements.

References Cited by the Examiner
UNITED STATES PATENTS

| | | | |
|---|---|---|---|
| 2,108,896 | 2/1938 | Lehmann et al. | 235—130 |
| 2,162,605 | 6/1939 | Coil | 235—130 |
| 2,224,203 | 12/1940 | Turck et al. | 235—130 |
| 2,226,919 | 12/1940 | Gubelmann | 235—6 |
| 2,343,268 | 3/1944 | Wheeler | 235—130 |
| 2,515,442 | 7/1950 | Drake | 235—60 |
| 2,583,377 | 1/1952 | Hurni | 235—145 |
| 2,593,666 | 4/1952 | Goodbar et al. | 235—130 |
| 2,607,526 | 8/1952 | Boyden et al. | 235—130 |
| 2,861,746 | 11/1958 | Anderson | 245—145 |
| 2,880,930 | 4/1959 | Werner et al. | 235—6 |
| 3,008,637 | 11/1961 | Placke et al. | 235—145 |
| 3,017,088 | 1/1962 | Edwards et al. | 235—145 |
| 3,030,010 | 4/1962 | Sundstrand | 235—130 |

FOREIGN PATENTS 660,638  11/1951  Great Britain.

STEPHEN J. TOMSKY, *Primary Examiner.*
LOUIS J. CAPOZI, RICHARD B. WILKINSON,
*Examiners.*
J. G. MURRAY, *Assistant Examiner.*